United States Patent
Shatz et al.

(10) Patent No.: US 9,742,492 B2
(45) Date of Patent: Aug. 22, 2017

(54) SYSTEMS AND METHODS FOR AD-HOC NETWORKING IN AN OPTICAL NARROWCASTING SYSTEM

(71) Applicant: SureFire LLC, Fountain Valley, CA (US)

(72) Inventors: Narkis E. Shatz, La Jolla, CA (US); John C. Bortz, Spokane, WA (US)

(73) Assignee: SureFire LLC, Fountain Valley, CA (US)

( * ) Notice: Subject to any disclaimer, the term of this patent is extended or adjusted under 35 U.S.C. 154(b) by 0 days.

(21) Appl. No.: 15/395,840

(22) Filed: Dec. 30, 2016

(65) Prior Publication Data
US 2017/0195049 A1   Jul. 6, 2017

Related U.S. Application Data

(60) Provisional application No. 62/273,276, filed on Dec. 30, 2015.

(51) Int. Cl.
*H04B 10/116* (2013.01)
*G06F 3/12* (2006.01)
(Continued)

(52) U.S. Cl.
CPC .......... *H04B 10/1141* (2013.01); *G06F 3/14* (2013.01); *G06Q 30/0643* (2013.01);
(Continued)

(58) Field of Classification Search
None
See application file for complete search history.

(56) References Cited

U.S. PATENT DOCUMENTS

| | | |
|---|---|---|
| 3,761,184 A | 9/1973 | McLaughlin |
| 3,987,297 A | 10/1976 | Brienza |

(Continued)

FOREIGN PATENT DOCUMENTS

| | | |
|---|---|---|
| GB | 2499693 | 8/2013 |
| WO | 0004660 | 1/2000 |

(Continued)

OTHER PUBLICATIONS

Aleksandar Jovicic, Principal Engineer Qualcomm Flarion Technologies , "Qualcomm® Lumicast™: A high accuracy indoor positioning system based on visible light communication", Apr. 2016.

(Continued)

*Primary Examiner* — Oommen Jacob
(74) *Attorney, Agent, or Firm* — Sheppard, Mullin, Richter; Daniel Yannuzzi; Jonathan Marina

(57) ABSTRACT

Systems and methods for optical narrowcasting are provided for transmitting various types of content. Optical narrowcasting content indicative of the presence of additional information along with identifying information may be transmitted. The additional information (which may include meaningful amounts of advertising information, media, or any other content) may also be transmitted as optical narrowcasting content. Elements of an optical narrowcasting system may include optical transmitters and optical receivers which can be configured to be operative at distances ranging from, e.g., 400 meters to 1200 meters. Moreover, the elements can be implemented on a miniaturized scale in conjunction with small, user devices such as smartphones, thereby also realizing optical ad-hoc networking, as well as interoperability with other types of data networks. Optically narrowcast content can be used to augment a real-world (Continued)

experience, enhance and/or spawn new forms of social-media and media content.

22 Claims, 65 Drawing Sheets

(51) Int. Cl.

| | | |
|---|---|---|
| *G06T 17/05* | (2011.01) | |
| *H04B 10/114* | (2013.01) | |
| *H04W 84/18* | (2009.01) | |
| *H04W 8/00* | (2009.01) | |
| *G06Q 30/06* | (2012.01) | |
| *G06F 3/14* | (2006.01) | |
| *G06F 3/0484* | (2013.01) | |
| *G06T 11/00* | (2006.01) | |

(52) U.S. Cl.
CPC ........... *H04W 8/005* (2013.01); *H04W 84/18* (2013.01); *G06F 3/04842* (2013.01); *G06T 11/00* (2013.01)

(56) References Cited

U.S. PATENT DOCUMENTS

| | | | |
|---|---|---|---|
| 5,029,195 A | 7/1991 | Danos | |
| 5,359,446 A | 10/1994 | Johnson | |
| 5,475,523 A | 12/1995 | Shinada | |
| 5,566,022 A | 10/1996 | Segev | |
| 5,596,452 A | 1/1997 | Yamakawa | |
| 5,598,281 A | 1/1997 | Zimmerman | |
| 5,604,630 A | 2/1997 | Palmer | |
| 5,610,753 A | 3/1997 | Kessler | |
| 5,777,768 A | 7/1998 | Korevaar | |
| 5,778,256 A | 7/1998 | Darbee | |
| 5,999,294 A | 12/1999 | Petsko | |
| 6,065,880 A | 5/2000 | Thompson | |
| 6,104,513 A | 8/2000 | Bloom | |
| 6,122,084 A | 9/2000 | Britz et al. | |
| 6,260,763 B1 | 7/2001 | Svetal | |
| 6,292,283 B1* | 9/2001 | Grandbois | G08C 23/04 348/734 |
| 6,324,013 B1 | 11/2001 | Nakai | |
| 6,381,055 B1 | 4/2002 | Javitt | |
| 6,410,942 B1 | 6/2002 | Thibeault | |
| 6,501,581 B1 | 12/2002 | Snyder | |
| 6,504,632 B1 | 1/2003 | Watanabe | |
| 6,529,329 B2 | 3/2003 | Dang | |
| 6,559,993 B2 | 5/2003 | Doucet | |
| 6,560,038 B1 | 5/2003 | Parkyn | |
| 6,568,627 B1 | 5/2003 | Jones | |
| 6,643,068 B2 | 11/2003 | Mandella | |
| 6,657,790 B2 | 12/2003 | Kim | |
| 6,822,634 B1* | 11/2004 | Kemp | G09B 5/065 341/22 |
| 6,829,439 B1 | 12/2004 | Sidorovich | |
| 6,868,237 B2 | 3/2005 | Willebrand | |
| 6,910,780 B2 | 6/2005 | Vail | |
| 7,035,546 B2 | 4/2006 | Keller | |
| 7,058,316 B2 | 6/2006 | Vilnrotter | |
| 7,079,774 B2 | 7/2006 | Sidorovich | |
| 7,099,649 B2 | 8/2006 | Patterson | |
| 7,106,973 B2 | 9/2006 | Kube | |
| 7,116,661 B2 | 10/2006 | Patton | |
| 7,120,363 B2 | 10/2006 | Andreu-von Euw | |
| 7,203,424 B2 | 4/2007 | Alwan | |
| 7,221,910 B2 | 5/2007 | Ishii | |
| 7,223,315 B2 | 5/2007 | Chen | |
| 7,245,798 B2 | 7/2007 | Graves | |
| 7,308,194 B2 | 12/2007 | Iizuka | |
| 7,319,822 B2 | 1/2008 | Lo | |
| 7,324,271 B2 | 1/2008 | Winterot | |
| 7,375,804 B2 | 5/2008 | Liebman | |
| 7,382,103 B2 | 6/2008 | Shirazee | |
| 7,480,101 B2 | 1/2009 | Lubart | |
| 7,495,837 B2 | 2/2009 | Smith | |
| 7,508,588 B2 | 3/2009 | Nakajima | |
| 7,538,879 B2 | 5/2009 | Power | |
| 7,554,076 B2 | 6/2009 | Wang | |
| 7,583,901 B2 | 9/2009 | Nakagawa | |
| 7,587,141 B2 | 9/2009 | Fisher | |
| 7,639,948 B2 | 12/2009 | Gilbert | |
| 7,663,501 B2 | 2/2010 | Hyun | |
| 7,699,229 B2* | 4/2010 | Bennett | H04N 21/4113 235/375 |
| 7,715,723 B2 | 5/2010 | Kagawa | |
| 7,734,181 B2 | 6/2010 | Bahar | |
| 7,800,541 B2 | 9/2010 | Moshfeghi | |
| 7,884,931 B2 | 2/2011 | Achal | |
| 7,885,547 B2 | 2/2011 | Nakaso | |
| 7,889,998 B2 | 2/2011 | Son | |
| 7,907,345 B2 | 3/2011 | Paulussen | |
| 7,953,326 B2 | 5/2011 | Farr | |
| 8,029,167 B2 | 10/2011 | Ikeda | |
| 8,031,414 B1 | 10/2011 | Liu | |
| 8,036,244 B2 | 10/2011 | Naoe | |
| 8,103,167 B2 | 1/2012 | Tidhar | |
| 8,204,383 B2 | 6/2012 | Shin | |
| 8,269,971 B1 | 9/2012 | Marsh | |
| 8,304,733 B2 | 11/2012 | Alameh | |
| 8,406,427 B2 | 3/2013 | Chand | |
| 8,417,058 B2 | 4/2013 | Tardif | |
| 8,422,119 B1 | 4/2013 | Keaton | |
| 8,452,182 B2 | 5/2013 | Davidson | |
| 8,526,403 B1 | 9/2013 | Nadji | |
| 8,582,973 B2* | 11/2013 | Takahashi | H04B 10/1149 396/429 |
| 8,593,647 B2 | 11/2013 | Charny | |
| 8,611,754 B2 | 12/2013 | Templ | |
| 8,639,106 B1 | 1/2014 | Gleason | |
| 8,687,965 B2 | 4/2014 | Pederson | |
| 8,706,815 B2 | 4/2014 | Redmond | |
| 8,805,192 B2 | 8/2014 | Eide | |
| 8,831,427 B2 | 9/2014 | Grubor | |
| 8,848,059 B2 | 9/2014 | Tiscareno | |
| 8,908,074 B2 | 12/2014 | Oshima | |
| 8,922,666 B2 | 12/2014 | Oshima | |
| 8,923,701 B2 | 12/2014 | D'Errico | |
| 8,948,601 B2 | 2/2015 | Shar | |
| 8,965,214 B2 | 2/2015 | Weckwerth | |
| 8,965,215 B2* | 2/2015 | Na | H04N 5/4403 398/118 |
| 9,118,420 B2 | 8/2015 | Kwon | |
| 9,134,538 B1 | 9/2015 | Augst | |
| 9,143,232 B2 | 9/2015 | Bhide | |
| 9,146,103 B2 | 9/2015 | Rousseau | |
| 9,166,683 B2* | 10/2015 | Jovicic | H04B 10/116 |
| 9,203,524 B2 | 12/2015 | Simpson | |
| 9,210,376 B2* | 12/2015 | Yu | H04N 7/15 |
| 9,215,032 B2 | 12/2015 | Zhang | |
| 9,225,427 B2 | 12/2015 | Jung | |
| 9,250,355 B2 | 2/2016 | Deng | |
| 9,252,875 B2 | 2/2016 | Bae | |
| 9,264,136 B2 | 2/2016 | Vaananen | |
| 9,300,398 B2 | 3/2016 | Chaffee | |
| 9,317,747 B2* | 4/2016 | Jovicic | G06K 9/00624 |
| 9,350,448 B2 | 5/2016 | Byers | |
| 9,360,554 B2 | 6/2016 | Retterath | |
| 9,386,666 B2 | 7/2016 | Economy | |
| 9,401,121 B2* | 7/2016 | Chen | |
| 9,420,264 B2 | 8/2016 | Gilliland | |
| 9,438,337 B2 | 9/2016 | Byers | |
| 9,453,976 B2 | 9/2016 | Qian | |
| 9,509,402 B2* | 11/2016 | Ryan | H04B 10/116 |
| 9,520,939 B2* | 12/2016 | Jovicic | H04B 10/116 |
| 2002/0089726 A1 | 7/2002 | He | |
| 2002/0109884 A1 | 8/2002 | Presley et al. | |
| 2002/0149822 A1 | 10/2002 | Stroud | |
| 2002/0163699 A1 | 11/2002 | Kavehrad | |
| 2003/0090765 A1 | 5/2003 | Neff | |
| 2003/0151818 A1 | 8/2003 | Wagner | |
| 2004/0135935 A1 | 7/2004 | Glaeser | |

(56) References Cited

U.S. PATENT DOCUMENTS

| | | |
|---|---|---|
| 2004/0141753 A1* | 7/2004 | Andreu-von Euw ...................... H04B 10/1127 398/122 |
| 2004/0161246 A1 | 8/2004 | Matsushita |
| 2004/0208602 A1 | 10/2004 | Plante |
| 2004/0258414 A1 | 12/2004 | Lee |
| 2005/0169643 A1 | 8/2005 | Franklin |
| 2006/0076473 A1 | 4/2006 | Wilcken |
| 2007/0070060 A1 | 3/2007 | Kagawa et al. |
| 2007/0127926 A1 | 6/2007 | Marioni |
| 2007/0133097 A1 | 6/2007 | Lubart |
| 2007/0147843 A1* | 6/2007 | Fujiwara ............ H04B 10/1143 398/118 |
| 2007/0253716 A1 | 11/2007 | Nakaso et al. |
| 2008/0074752 A1 | 3/2008 | Chaves |
| 2008/0095533 A1 | 4/2008 | Lee |
| 2008/0107419 A1 | 5/2008 | Won |
| 2008/0124083 A1 | 5/2008 | Esser et al. |
| 2008/0138077 A1 | 6/2008 | Stretton |
| 2008/0170296 A1 | 7/2008 | Chaves |
| 2008/0218850 A1 | 9/2008 | Power |
| 2008/0240722 A1 | 10/2008 | Karaki |
| 2009/0028564 A1 | 1/2009 | Villarruel |
| 2009/0103925 A1 | 4/2009 | Alpert |
| 2009/0128921 A1 | 5/2009 | Roth |
| 2009/0244716 A1 | 10/2009 | Mathai |
| 2010/0157434 A1 | 6/2010 | Lee |
| 2010/0188753 A1 | 7/2010 | Paulussen |
| 2010/0257569 A1 | 10/2010 | O'Hanlon |
| 2011/0026931 A1 | 2/2011 | Koizumi |
| 2011/0270585 A1 | 11/2011 | Chen |
| 2012/0060177 A1 | 3/2012 | Stinson |
| 2012/0068913 A1* | 3/2012 | Bar-Zeev ............ G02B 26/026 345/8 |
| 2012/0098934 A1 | 4/2012 | McKiel |
| 2012/0098945 A1 | 4/2012 | McKiel |
| 2012/0106200 A1 | 5/2012 | Yin |
| 2012/0148189 A1 | 6/2012 | Zhang |
| 2012/0287511 A1 | 11/2012 | Dross |
| 2013/0004173 A1 | 1/2013 | Maricevic |
| 2013/0061259 A1 | 3/2013 | Raman |
| 2013/0216063 A1* | 8/2013 | Sherman ................ H04R 3/00 381/82 |
| 2013/0236183 A1 | 9/2013 | Chao |
| 2013/0315604 A1 | 11/2013 | LoPresti |
| 2013/0330088 A1* | 12/2013 | Oshima ................ H04B 10/11 398/130 |
| 2014/0029494 A1 | 1/2014 | Sundaram |
| 2014/0037294 A1* | 2/2014 | Cox ....................... H04B 10/07 398/115 |
| 2014/0072119 A1* | 3/2014 | Hranilovic ............ H04L 9/3215 380/270 |
| 2014/0169796 A1 | 6/2014 | Sasaki |
| 2014/0201400 A1* | 7/2014 | Beel ..................... G06F 3/04842 710/63 |
| 2014/0225916 A1 | 8/2014 | Theimer |
| 2014/0226977 A1 | 8/2014 | Jovicic |
| 2014/0273834 A1 | 9/2014 | Merckling |
| 2014/0301735 A1 | 10/2014 | Okada |
| 2014/0306866 A1* | 10/2014 | Miller .................... G06T 19/006 345/8 |
| 2014/0355057 A1* | 12/2014 | Jang ..................... G06K 7/10297 358/1.15 |
| 2014/0363168 A1 | 12/2014 | Walker |
| 2014/0368533 A1 | 12/2014 | Salter |
| 2015/0037040 A1* | 2/2015 | Lyn-Shue ............ H04B 10/11 398/115 |
| 2015/0156568 A1 | 6/2015 | Byers |
| 2015/0177526 A1 | 6/2015 | Zhang |
| 2015/0185492 A1 | 7/2015 | Nagano |
| 2015/0215040 A1 | 7/2015 | Dickson |
| 2015/0244624 A1 | 8/2015 | Asiano |
| 2015/0293228 A1 | 10/2015 | Retterath |
| 2015/0332500 A1* | 11/2015 | France .................... G01S 19/51 345/633 |
| 2015/0339855 A1* | 11/2015 | Diaz .................. G02B 27/0101 345/633 |
| 2015/0349892 A1 | 12/2015 | Fischer |
| 2015/0358079 A1* | 12/2015 | Cronin ................. H04B 10/116 398/118 |
| 2016/0020855 A1 | 1/2016 | Guetta |
| 2016/0021354 A1 | 1/2016 | Lan |
| 2016/0025994 A1 | 1/2016 | Shagam |
| 2016/0033386 A1 | 2/2016 | Reed |
| 2016/0041359 A1 | 2/2016 | Gaskin |
| 2016/0047890 A1 | 2/2016 | Ryan |
| 2016/0072580 A1 | 3/2016 | Wabnig |
| 2016/0087724 A1 | 3/2016 | Liu |
| 2016/0088511 A1* | 3/2016 | Nguyen .................. H04L 5/006 398/115 |
| 2016/0127040 A1 | 5/2016 | Vaananen |
| 2016/0131843 A1 | 5/2016 | Amit |
| 2016/0164261 A1 | 6/2016 | Warren |
| 2016/0231521 A1 | 8/2016 | Smith |
| 2016/0259038 A1 | 9/2016 | Retterath |
| 2016/0277140 A1 | 9/2016 | Wu |
| 2016/0294472 A1 | 10/2016 | Palmer |
| 2016/0342297 A1* | 11/2016 | Ellwood .................. G09G 5/12 |
| 2017/0017947 A1 | 1/2017 | Robinton |

FOREIGN PATENT DOCUMENTS

| | | |
|---|---|---|
| WO | 02056507 | 7/2002 |
| WO | 2005055436 | 6/2005 |
| WO | 2014015353 | 1/2014 |
| WO | 2015086668 | 6/2015 |
| WO | 2015086671 | 6/2015 |
| WO | 2015168842 | 11/2015 |
| WO | 2015188948 | 12/2015 |
| WO | 2016028226 | 2/2016 |
| WO | 2015049180 | 4/2016 |
| WO | 2016086276 | 6/2016 |
| WO | 2016154470 | 9/2016 |

OTHER PUBLICATIONS

Ali Mansour, Raed Mesleh, and Mohamed Abaza, "New challenges in wireless and free space optical communications", May 12, 2016.

Alvin Abraham and Jintu K Joseph, "Short Distance Optical Wireless Communication," M.tech, 2015.

Chao Wang, Minglun Zhang, Hetian Zhu, Xujing Guo, Xiangwen Zhai and Xiaonan Bai, "Visible Light Communication Application Scenarios Based on Android Smart Devices' LED Lamp", 14th Int. Conf. on ICOCN, Jul. 2015.

Devendra J. Varanva and Kantipudi MVV Prasad, "LED to LED communication with WDM concept for flash light of Mobile phones", IJACSA vol. 4, No. 7, 2013.

Giorgio Corbellini, Kaan Aksit, Stefan Schmid, Stefan Mangold and Thomas Gross, "Connecting Networks of Toys and Smartphones with Visible Light Communication", IEEE Communications Magazine Jul. 2014.

Hemani Kaushal and Georges Kaddoum, "Free Space Optical Communication: Challenges and Mitigation Techniques," Jun. 16, 2015.

J Latal, A Vanderka, P Koudelka, and M Lucki, "Software design of segment optical transmitter for indoor free-space optical networks," 2015.

Jeffrey B. Carruthers and Joseph M. Kahn, "Angle Diversity for Nondirected Wireless Infrared Communication", IEEE Transactions on Communications, vol. 48, No. 6, Jun. 6, 2000.

Mariam M. Galal, Ahmed A. Abd El Aziz, Heba A. Fayed, and Moustafa H Aly, "Smartphone payment via flashlight: Utilizing the built-in flashlight of smartphones as replacement for magnetic cards," Optic IJLEO, Nov. 2015.

Pekka Kamsula, "Design and Implementation of a Bi-directional Visible Light Communication TestBed," Univ. of Oulu, 2015.

Rayana Boubezari, Hoa Le Minh, Zabih Ghassemlooy, Ahmed Bouridane, "Novel detection technique for smartphone to smartphone visible light communications," 10th Int. Symposium on CSNDSP, 2016.

(56) References Cited

OTHER PUBLICATIONS

Rayana Boubezari, Hoa Le Minh, Zabih Ghassemlooy, Ahmed Bouridane, "Smartphone camera based visible light commmunication," Journal of Lightwave Technology, vol. 34, No. 17, Sep. 1, 2016.

Shuchita Chaudhary, "Optical Wireless Communication: A Future Perspective for Next Generation Wireless Systems", IJSER, vol. 3, Iss. 9, Sep. 2012.

Stefan Schmid, Giorgio Corbellini, Stefan Mangold and Thomas Gross, "Continuous Synchronization for LED-to-LED Visible Light Communication Networks" International Workshop on Optical Wireless (IWOW) 2014.

Stefan Schmid, Giorgio Corbellini, Stefan Mangold and Thomas Gross, "EnLighting: An Indoor Visible Light Communication System Based on Networked Light Bulbs", International Conference on Sensing, Communication and Networking (SECON) 2016.

Stefan Schmid, Giorgio Corbellini, Stefan Mangold, and Thomas R. Gross, "An LED-to-LED Visible Light Communication System with Software-Based Synchronization", 2012.

V. Jungnickel et al., "A European View on the Next Generation Optical Wireless Communication Standard," 2015 IEEE Conference, Oct. 2015.

\* cited by examiner

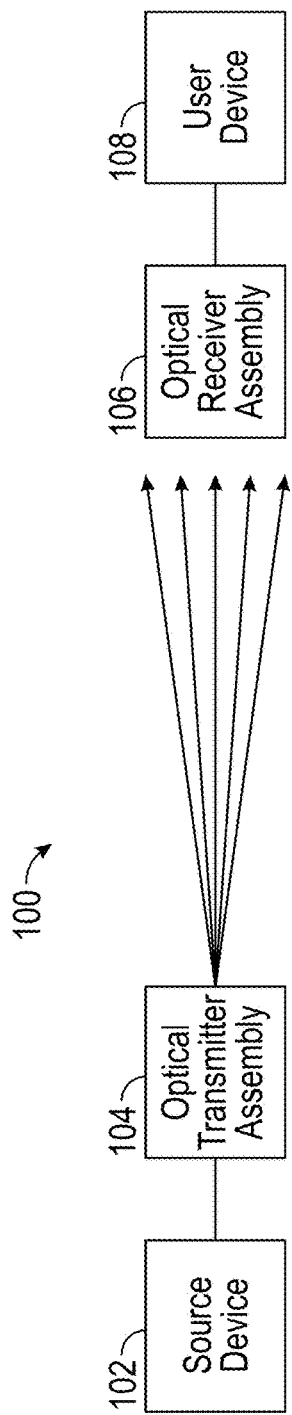
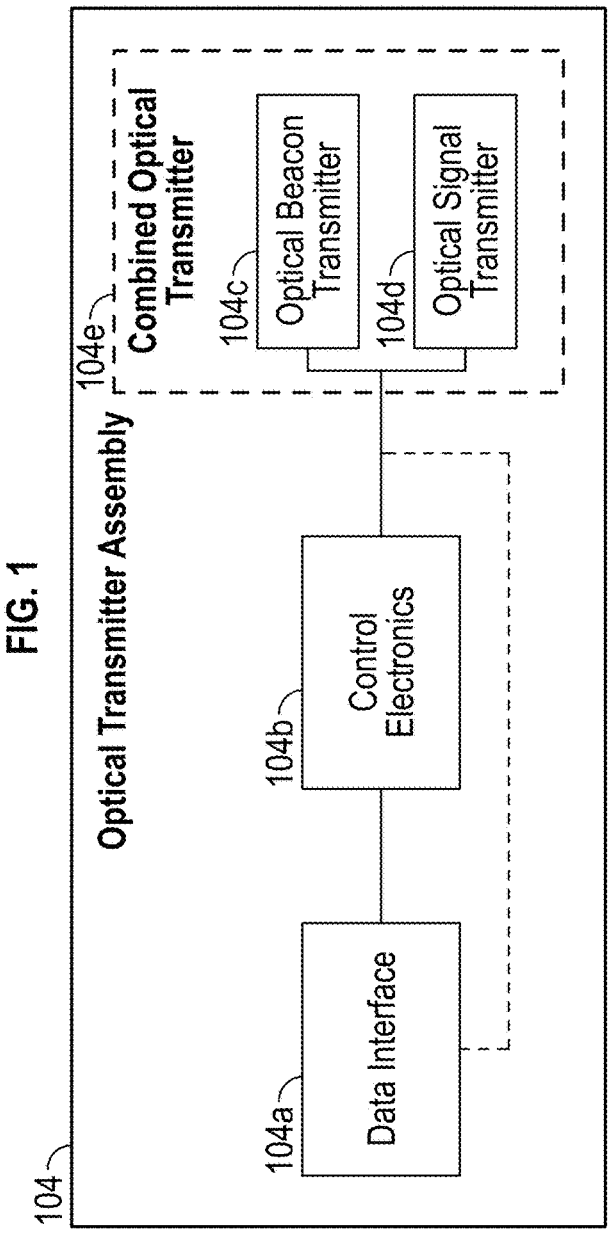
FIG. 1
FIG. 2A

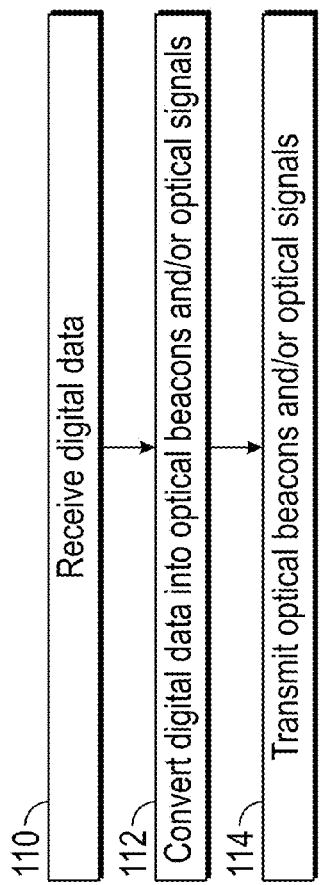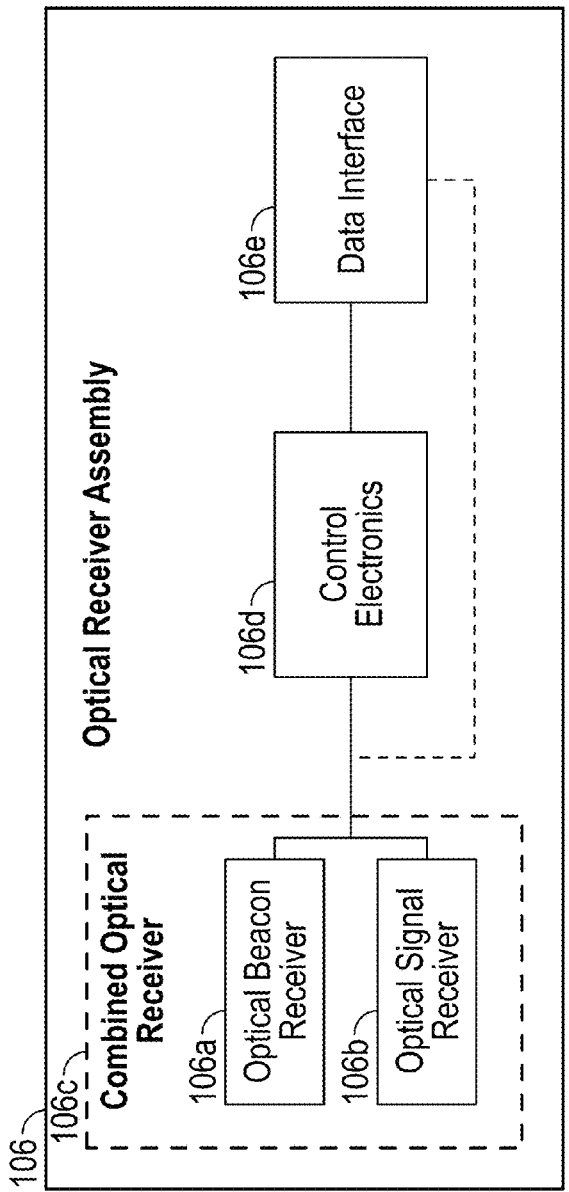

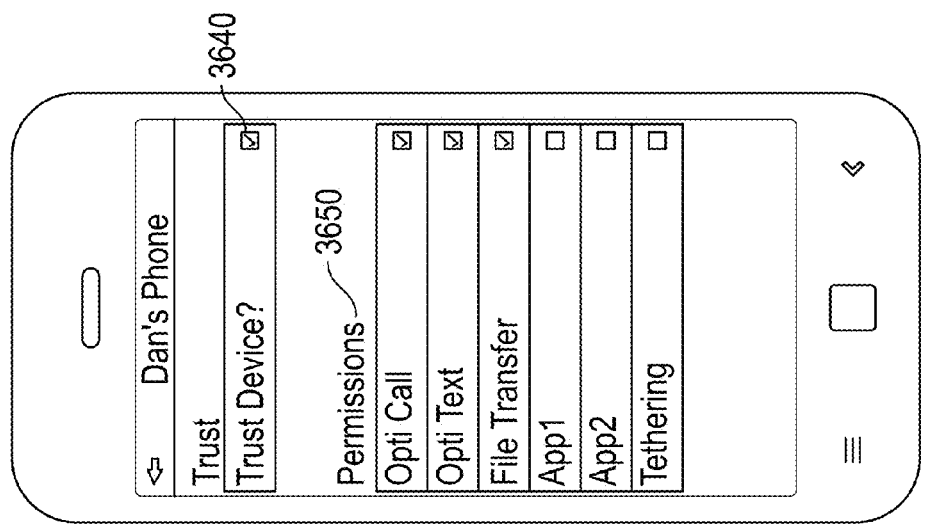
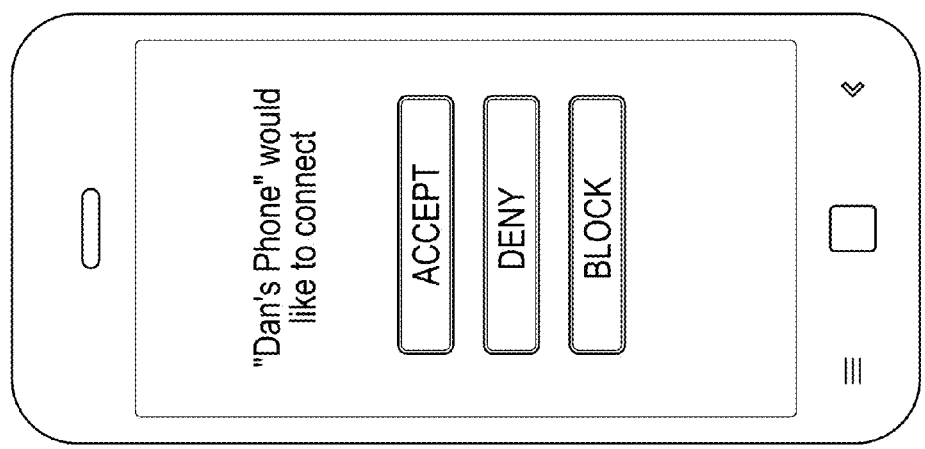
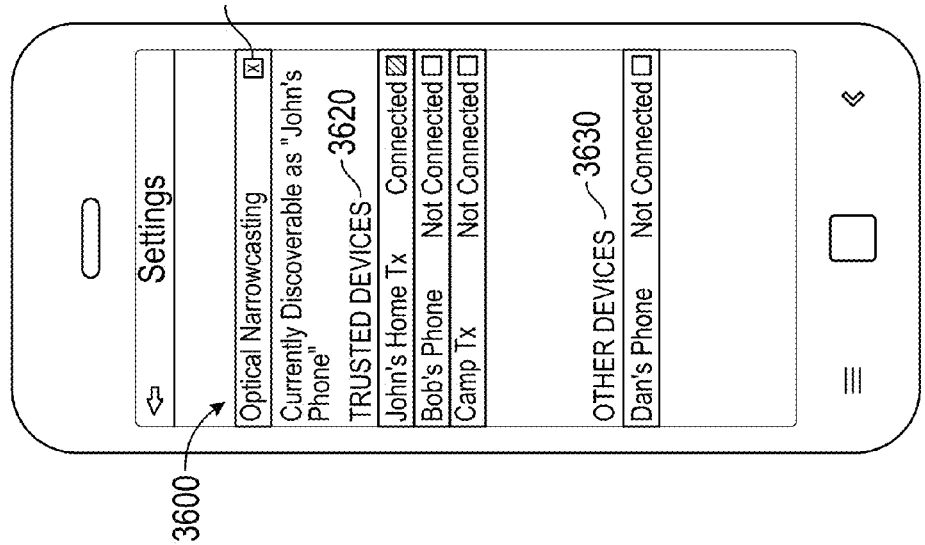
FIG. 36C
FIG. 36B
FIG. 36A

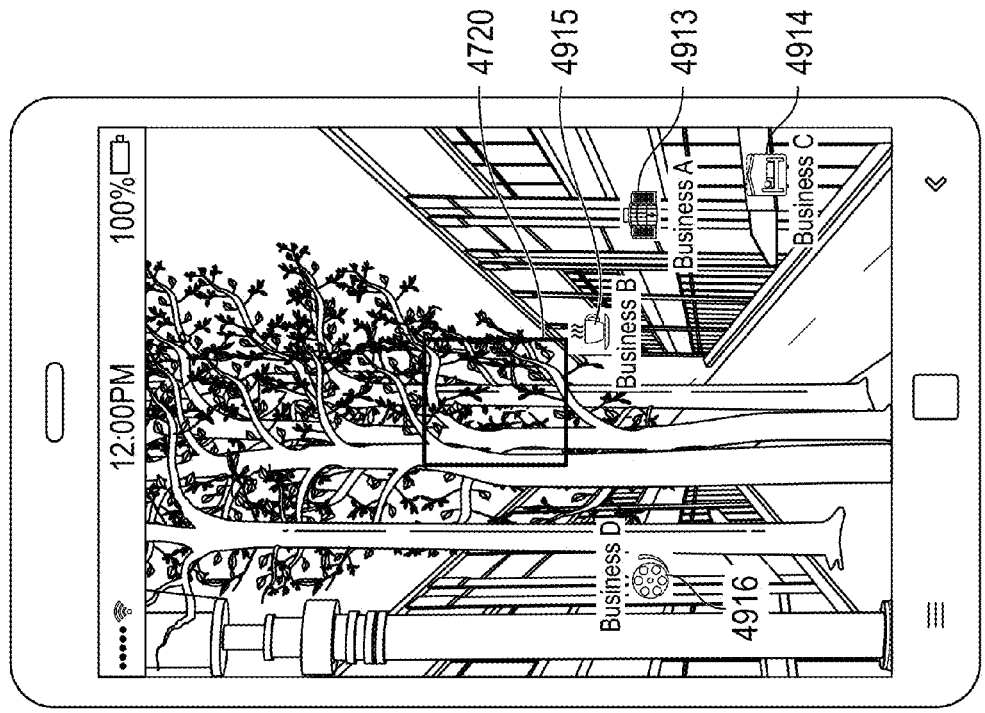
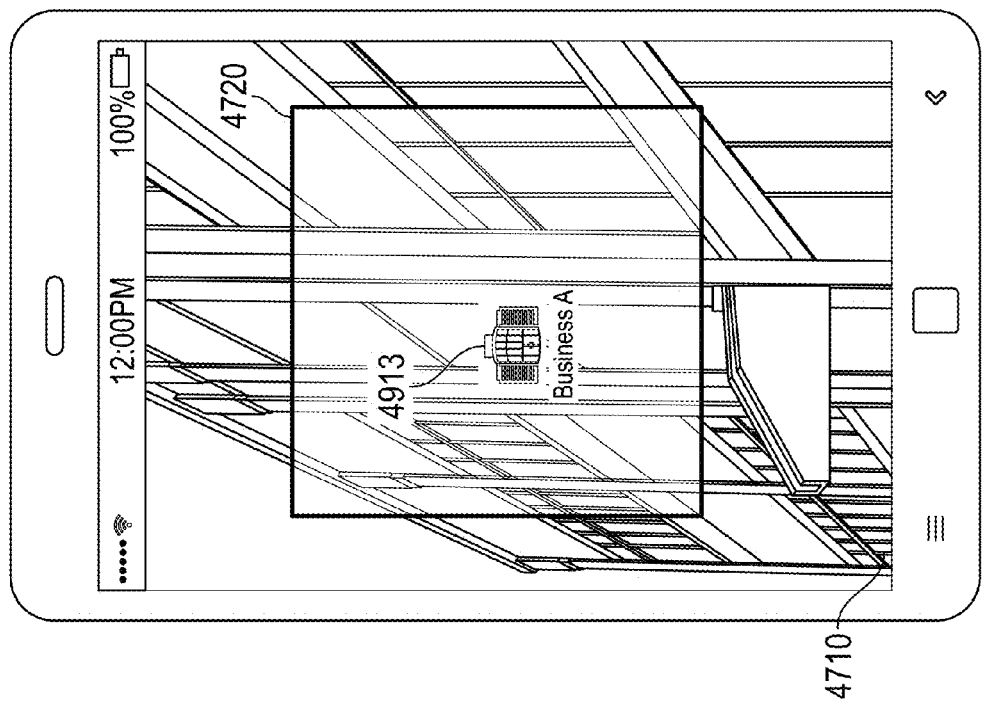
FIG. 49B
FIG. 49A

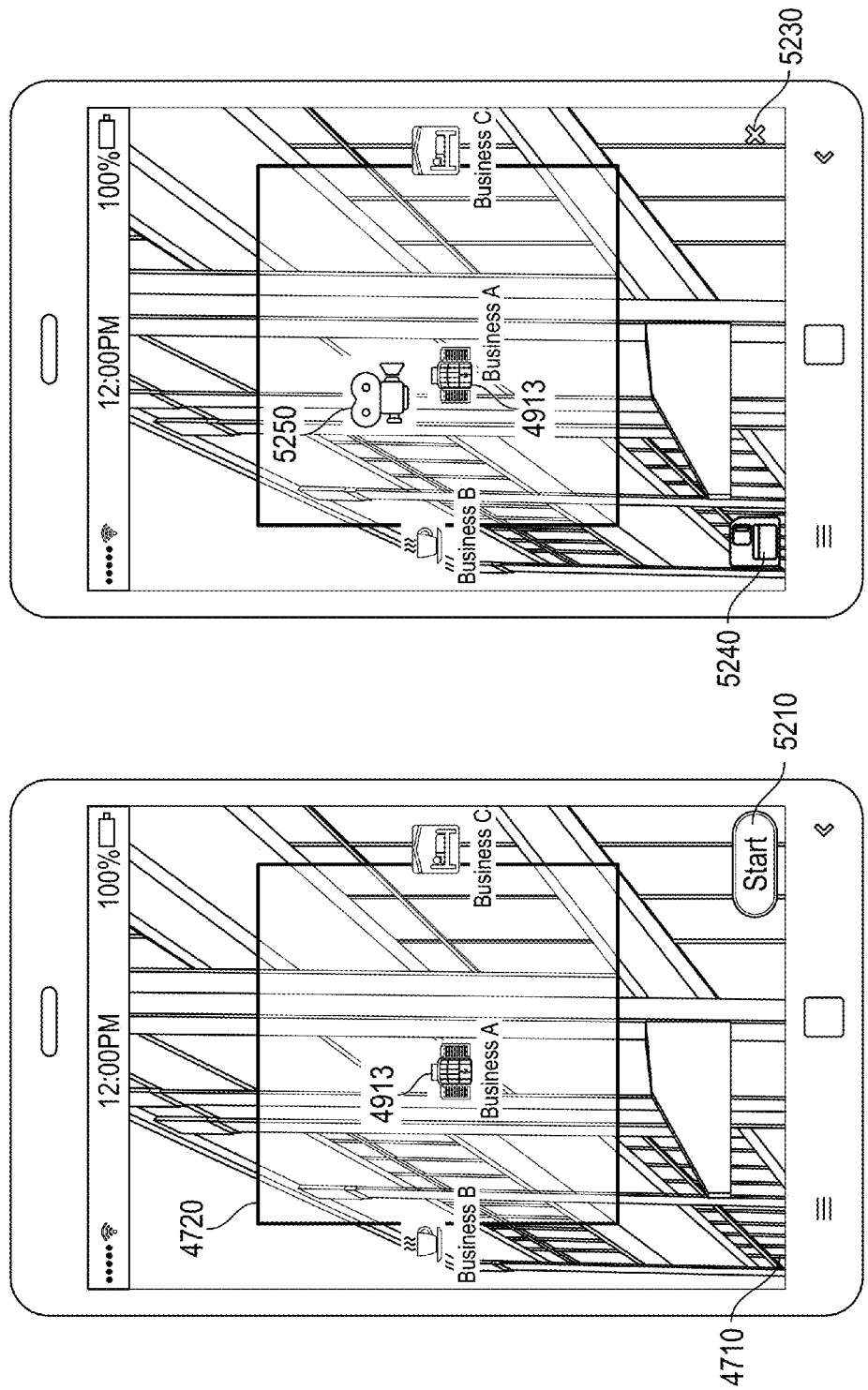

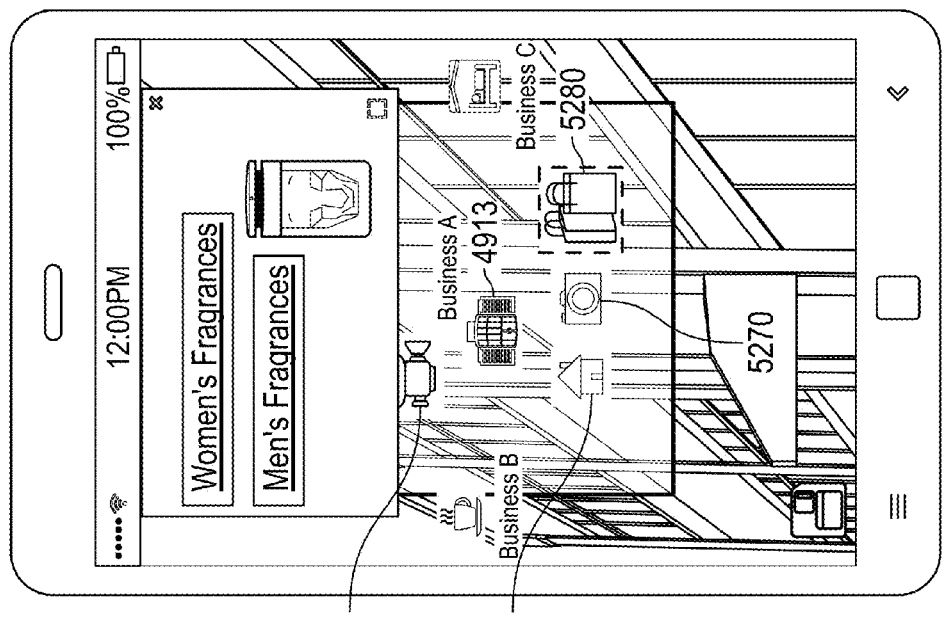
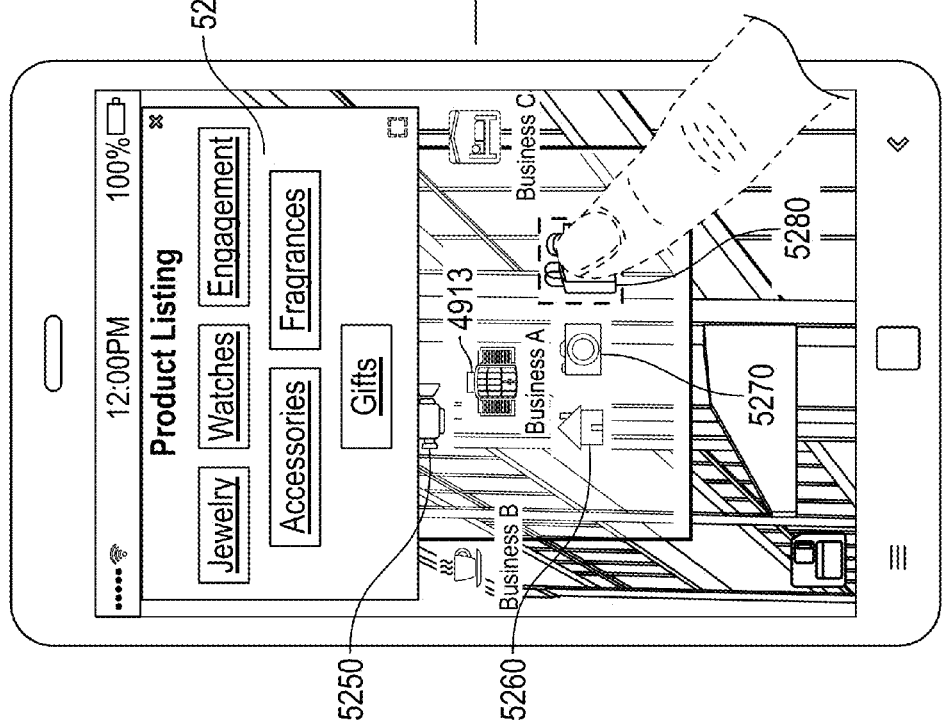
FIG. 52G
FIG. 52F

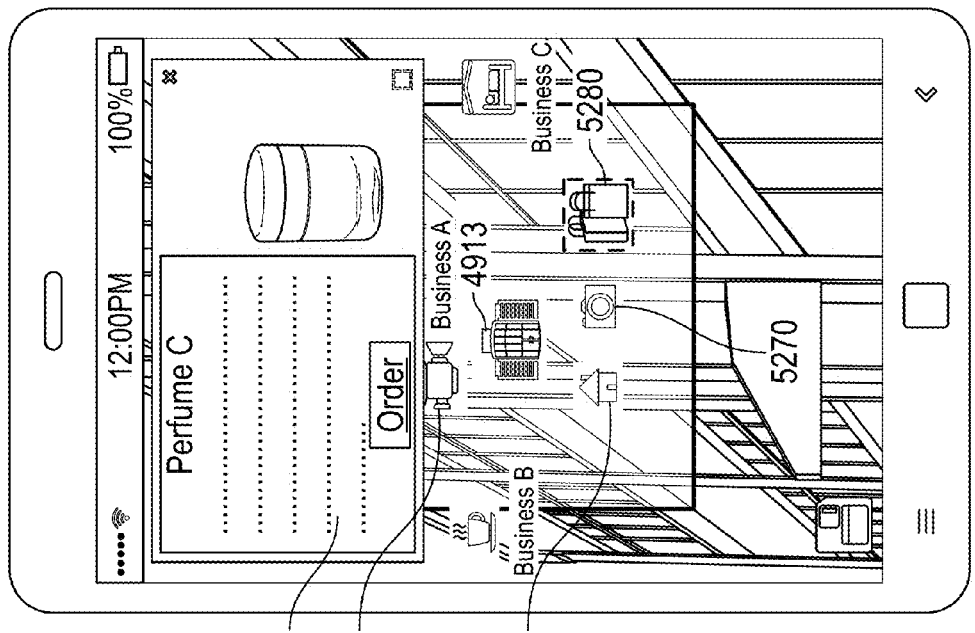
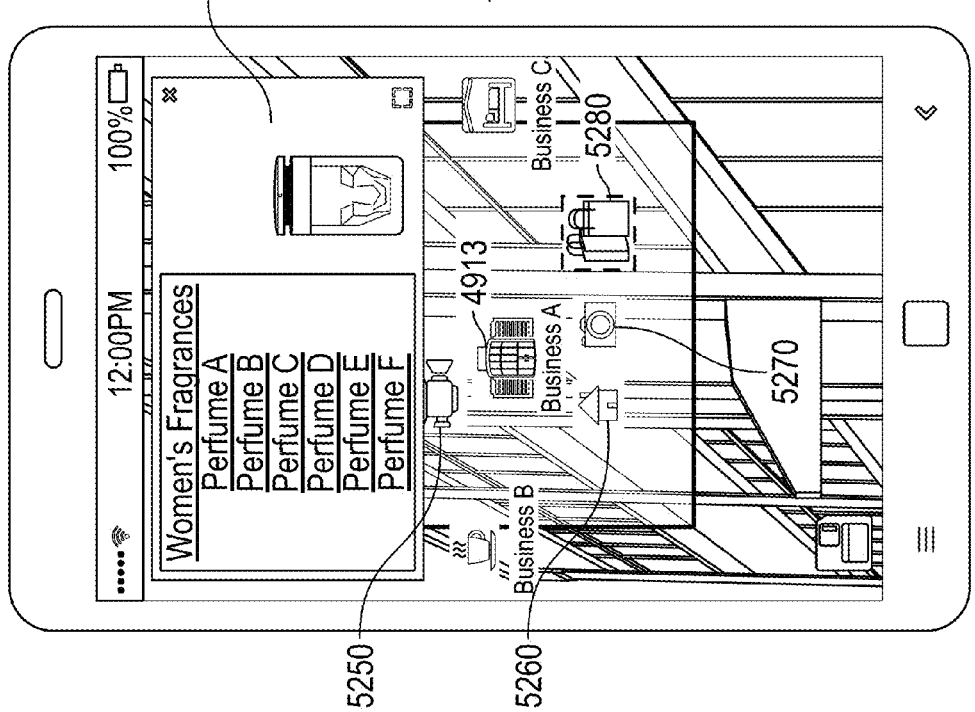
FIG. 52H
FIG. 52I

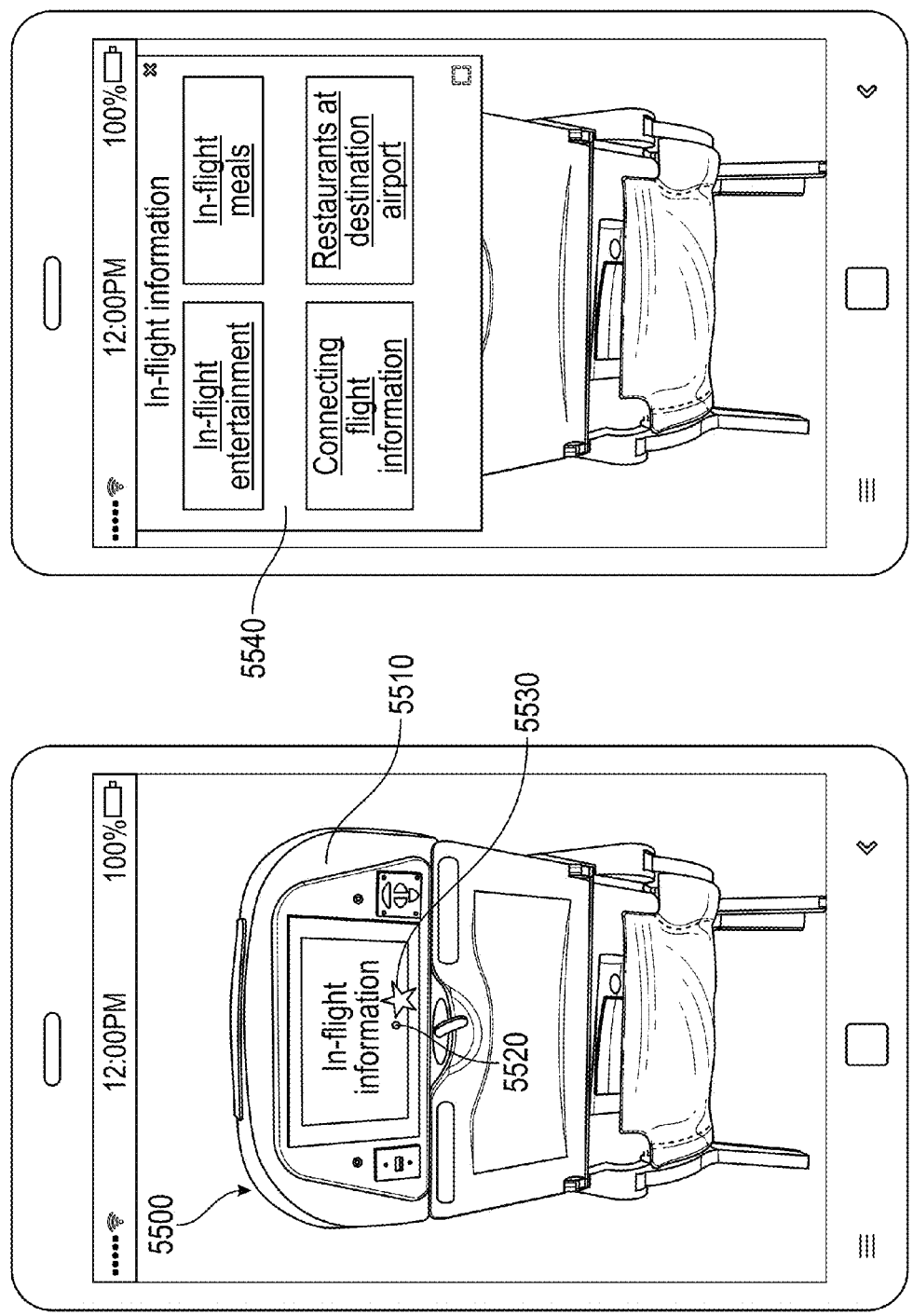

SYSTEMS AND METHODS FOR AD-HOC NETWORKING IN AN OPTICAL NARROWCASTING SYSTEM

CROSS-REFERENCE TO RELATED APPLICATIONS

This application claims the benefit of U.S. Provisional Patent Application No. 62/273,276 filed on Dec. 30, 2015, which is incorporated herein by reference in its entirety.

TECHNICAL FIELD

The present disclosure relates generally to wireless optical communications. Some embodiments relate to systems and methods for optical narrowcasting.

DESCRIPTION OF THE RELATED ART

Generally, mobile communications systems, both long and short-range, are based on the transmission and/or receipt of radio waves (e.g., cellular networks, WiFi networks, Bluetooth® communications, Near-Field Communications (NFC), etc.). Services, such as location-based services, may oftentimes also rely on radio-wave-based communications (e.g., Global Positioning System (GPS) positioning, WiFi triangulation, etc.).

BRIEF SUMMARY OF THE DISCLOSURE

In various embodiments, a first transmitter comprises a first light source and a first collimator. The first collimator may include a first portion and a second portion each of which being rotationally symmetric about an optical axis substantially centered on a light-emitting element of the first light source. The first portion of the first collimator may have a broad middle body between a narrow circular first entrance pupil and a narrow circular first exit pupil. The broad middle body may have a first diameter greater than a second diameter of the narrow circular first entrance pupil and greater than a third diameter of the narrow circular first exit pupil. The second portion of the first collimator may have a flared body between a narrow circular second entrance pupil and a broad circular second exit pupil, the narrow second entrance pupil being coupled to, and having the same diameter as, the narrow circular first exit pupil. A fourth diameter of the broad second exit pupil may be greater than the first diameter of the broad middle body of the first portion. The narrow first entrance pupil may be positioned near the light source to receive light from the first light source. The light may be emitted from the broad second exit pupil.

In some embodiments, the first transmitter may further comprise a data-format converter configured to convert data to an optical format for optical transmission and a light source driver configured to receive data from the data-format converter and control the first light source to transmit the converted data. The data-format converter may be configured to convert data to a return-to-zero on-off-keying (RZ-OOK) format or a non-return-to-zero on-off keying (NRZ-OOK) format. In some embodiments, the data-format converter is configured to incorporate transmit and receive first-in-first-outs (FIFOs) to prevent overflow errors.

The first transmitter may further comprise a first pair of lenslet arrays positioned in front of the broad second exit pupil of the first collimator. The first pair of lenslet arrays may be identical Köhler homogenizers to improve uniformity of light output from the broad second exit pupil of the first collimator. The first pair of lenslet arrays may be positioned parallel to each other in front of the broad second exit pupil of the first collimator. Each of the first pair of lenslet arrays may be separated from each other by a distance equal to a focal length of each of the lenslets of the first pair of lenslet arrays.

The first portion of the first collimator may have a length from the narrow circular first entrance pupil to the narrow first exit pupil that is 10 mm or less. The second portion of the first collimator may have a length from the narrow second entrance pupil to the broad second exit pupil of the first collimator that is 12 mm or less. The first and second portions of first collimator may each include an inner surface and an outer surface, the inner surfaces being reflective. The first light source may output optical radiation with a spectrum having a centroid wavelength of 850 nm. In some embodiments, the first light source includes an incoherent light emitter or a coherent light emitter.

In various embodiments, the first transmitter may further comprise a digital device that is coupled to the data-format converter, the digital device being configured to provide data to be transmitted as a modulated optical beam by the first transmitter.

The first transmitter may comprise a tilt actuator configured to control a pointing direction of the first transmitter. The first transmitter may further comprise a heat sink configured to dissipate heat from the first light source.

In various embodiments, there may be one or more additional transmitters, each being identical to each other and identical to the first transmitter; each optical axis of each collimator of each of the one or more additional transmitters and the first transmitter may be parallel to each other. A digital device may be simultaneously coupled to each of the one or more additional transmitters and the first transmitter. The digital device may be configured to provide data to be transmitted as a modulated optical beam by each of the one or more additional transmitters and the first transmitter. In some embodiments, the optical intensity output produced at any given time by each of the one or more transmitters and the first transmitter as a function of a horizontal and a vertical angular coordinate has a root-mean-square (RMS) non-uniformity of 5% or less within a polygonal angular region, wherein sizes and shapes of each of the polygonal angular regions are identical, and wherein a mean optical intensity produced at a given time by each of the one or more transmitters and the first transmitter within the respective polygonal angular region is approximately equal to a mean optical intensity produced at a same time by each of the one or more transmitters and the first transmitter within each of their respective polygonal angular regions. The angular orientation of each of the one or more transmitters and the first transmitter may be relative to each other such that corresponding individual polygonal angular regions of 5% or lower RMS non-uniformity associated with each of the one or more transmitters and the first transmitter are arranged in a non-overlapping configuration without gaps between any adjacent polygonal regions, such that the RMS non-uniformity of the optical intensity within a single larger combined polygonal angular region constructed from each of the individual polygonal angular regions is 5% or lower.

An example method may comprise receiving light from a first light source of a first transmitter and aligning the light received from the first light source with a first collimator of the first transmitter. The first collimator may include a first portion and a second portion each of which being rotationally symmetric about an optical axis substantially centered on a light-emitting element of the first light source. The light may be received by a narrow circular first entrance pupil of a first portion of the first collimator. The first portion of the first collimator may have a broad middle body between the narrow circular first entrance pupil and a narrow circular first exit pupil. The broad middle body may have a first diameter greater than a second diameter of the narrow circular first entrance pupil and greater than a third diameter of the narrow circular first exit pupil. The narrow circular first exit pupil may provide light from the broad middle body to a narrow circular second entrance pupil of the second portion of the first collimator. The second portion of the first collimator may have a flared body between the narrow circular second entrance pupil and a broad second exit pupil, the narrow circular second entrance pupil being coupled to the narrow circular first exit pupil of the first portion of the first collimator to receive the light from the first portion of the first collimator. A fourth diameter of the broad second exit pupil may be greater than the first diameter of the broad middle body of the first portion of the first collimator. The broad second exit pupil may emit the light to transmit aligned optical energy.

The method may further comprise converting received data to an optical format for optical transmission to create optically formatted data and driving the first light source to emit the optically formatted data as optical beams, at least a portion of the optical beams being received by the first collimator. The optically formatted data may be converted using a return-to-zero on-off-keying (RZ-OOK) format or a non-return-to-zero on-off keying (NRZ-OOK) format. The method may further comprise incorporating transmit and receive first-in-first-outs (FIFOs) within the optically formatted data to prevent overflow errors.

The method may further comprise increasing uniformity of the aligned optical energy with a first pair of lenslet arrays positioned in front of the broad second exit pupil of the second portion of the first collimator. The first pair of lenslet arrays may be identical Köhler homogenizers. The first pair of lenslet arrays may be positioned parallel to each other in front of the broad second exit pupil of the second portion of the first collimator, each of the first pair of lenslet arrays may be separated from each other by a distance equal to a focal length of each of the lenslets of the first pair of lenslet arrays.

In some embodiments, the first portion of the first collimator has a length from the narrow circular first entrance pupil to the narrow circular first exit pupil that is 10 mm or less. The second portion of the first collimator may have a length from the narrow circular second entrance pupil to the broad second exit pupil of the first collimator that is 12 mm or less. The first and second portions of the first collimator may each include an inner surface and an outer surface, the inner surfaces being reflective.

The method may further comprise controlling a pointing direction of the first transmitter using a tilt actuator. In some embodiments, the method may further comprise receiving device data from a digital device by the data-format converter to create received data, the device data including at least one file to be transmitted as a modulated optical beam by the first transmitter.

The first light source may output optical radiation with a spectrum having a centroid wavelength of 850 nm. The first light source may be an incoherent or coherent light emitter. The method may further comprise dissipating heat from the first light source with a heat sink.

In various embodiments, the method further comprises emitting optical beams by one or more additional transmitters, each being identical to each other and identical to the first transmitter, each optical axis of each collimator of each of the one or more additional transmitters and the first transmitter being parallel to each other. The method may comprise providing, by a digital device, data to be transmitted as a modulated optical beam by each of the one or more additional transmitters and the first transmitter. The digital device may be simultaneously coupled to each of the one or more additional transmitters and the first transmitter. The optical intensity output produced at any given time by each of the one or more transmitters and the first transmitter may be a function of a horizontal and a vertical angular coordinate which has a root-mean-square (RMS) non-uniformity of 5% or less within a polygonal angular region. Sizes and shapes of each of the polygonal angular regions may be identical. A mean optical intensity produced at a given time by each of the one or more transmitters and the first transmitter within the respective polygonal angular region may be approximately equal to a mean optical intensity produced at a same time by each of the one or more transmitters and the first transmitter within each of their respective polygonal angular regions. The angular orientation of each of the one or more transmitters and the first transmitter relative to each other may be such that corresponding individual polygonal angular regions of 5% or lower RMS non-uniformity associated with each of the one or more transmitters and the first transmitter are arranged in a non-overlapping configuration without gaps between any adjacent polygonal regions, such that the RMS non-uniformity of the optical intensity within a single larger combined polygonal angular region constructed from each of the individual polygonal angular regions is 5% or lower.

Another example transmitter may include a light source and a wineglass collimator. The wineglass collimator may include a first portion and a second portion each of which being rotationally symmetric about an optical axis substantially centered on a light-emitting element of the light source. The first portion may be approximately ellipsoidal in shape with a broad middle body between a narrow entrance pupil and a narrow circular exit. The broad middle body may have a first diameter greater than a second diameter of the narrow entrance pupil and greater than a third diameter of the narrow circular exit. The second portion may be approximately paraboloidal in shape with a flared body between a narrow circular entrance and a broad exit pupil. The narrow circular entrance may be coupled to the narrow circular exit of the first portion. A fourth diameter of the broad exit pupil may be greater than the first diameter of the broad middle body of the first portion. The narrow entrance pupil positioned near the light source to receive light from the light source. The broad exit pupil may emit the light.

In various embodiments, a receiver comprises a lenslet array, an optical detector array, a signal amplifier and filter, a format converter, and a port. The lenslet array may include a plurality of lenslets, each of the plurality of lenslets including a first side and a second side, the first side being convex and the second side being planar. The optical detector array may include a plurality of optical detectors, each optical detector of the plurality of optical detectors positioned in the focal plane of the plurality of lenslets. Each of the lenslets may be positioned to concentrate flux collected over the convex side received from a field of view (FOV) onto at least one optical detector of the plurality of optical detectors. The signal amplifier and filter may be coupled to the optical detector array and configured to amplify and filter signals received from the optical detector array to create an amplified signal. The format converter may be configured to convert an optical format of the amplified signal to a digital signal. The port may be configured to output the digital signal to a digital device.

In some embodiments, a digital device case is capable of coupling with a digital device, the digital device case may include the lenslet array, the optical detector array, the signal amplifier and filter, the format converter, and the port. Alternately, a digital device may include the lenslet array, the optical detector array, the signal amplifier and filter, the format converter, and the port.

The width from one of the optical detectors of the plurality of optical detectors to an apex of the closest lenslet of the plurality of lenslets is 4 mm or smaller.

In various embodiments, the receiver may further comprise an imaging lens, at least one beacon detector, and a data processor. The at least one beacon detector may be in the focal plane of the imaging lens. The imaging lens and the at least one beacon detector may be capable of receiving at least one optical beacon from at least one transmitter. The data processor may be configured to generate a notification when the optical beacon is detected to indicate that additional information may be detectable by at least one optical detector of the plurality of optical detectors.

Each optical detector, in some embodiments, can detect an optical signal in the 10 nm to 106 nm spectrum. The optical detector array may include, for example, a 6×6 array of optical detectors and the lenslet array includes a 6×6 array of lenslets. The lenslet array may be, for example, a 2.75 mm or less square.

The receiver may be a multi-channel receiver and each optical detector of the plurality of optical detectors may be dedicated to receive flux within an optical waveband of a channel. The receiver may further comprise a spectral filter configured to reduce levels of out-of-band flux incident on at least one side of the at least one optical detector of the plurality of optical detectors. In some embodiments, a spectral filter may be configured to reduce levels of out-of-band flux incident on the at least one beacon detector.

In various embodiments, a tilt actuator may be configured to control tilt orientation of the receiver. The receiver may further comprise a processor configured to control the tilt actuator based on transmitter position information calculated by the processor using a position of the beacon received at one location on the at least one beacon detector. Each lenslet of the plurality of lenslets may be approximately a 2.75 mm square with a lens thickness at the center of approximately 1.85 mm.

An example method may comprise collecting an optical signal from an optical transmitter by a lenslet array including a plurality of lenslets, each of the plurality of lenslets including a first side and a second side, the first side being convex and the second side being planar, concentrating, by the lenslet array, the optical signal to an optical detector array including a plurality of optical detectors, each optical detector of the plurality of optical detectors positioned in the focal plane of the plurality of lenslets, each of the lenslets concentrating flux collected over the convex side received from a field of view (FOV) onto at least one optical detector of the plurality of optical detectors, generating a detector signal by the plurality of optical detectors in response to the concentration of the optical signal, amplifying and filtering the detector signal by a signal amplifier and filter coupled to the optical detector array to create an amplified signal, converting the amplified signal from an optical format to a digital signal, and providing the digital signal to a digital device.

In some embodiments, the method may further comprise coupling a digital device case with the digital device, the digital device case including the lenslet array, the optical detector array, the signal amplifier and filter, the format converter, and the port. Alternately, the digital device may comprises the lenslet array, the optical detector array, the signal amplifier and filter, the format converter, and the port.

In some embodiments, the width from one of the optical detectors of the plurality of optical detectors to an apex of the closest lenslet of the plurality of lenslets is 4 mm or smaller.

The method may further comprise collecting an optical beacon from the optical transmitter by an imaging lens, concentrating, by the imaging lens, the optical beacon to an beacon detector in the focal plane of the imaging lens, the imaging lens, generating a beacon detector signal by the beacon detector in response to the concentration of the beacon signal, and generating, by a data processor, a notification based on the beacon detector signal to indicate that additional information may be detectable from the optical transmitter through the lenslet array and by at least one optical detector of the plurality of optical detectors.

In some embodiments, each optical detector can detect the optical signal in the 10 nm to 106 nm spectrum. The optical detector array may include a 6×6 array of optical detectors and the lenslet array may include a 6×6 array of lenslets. The lenslet array may be a 2.75 mm or less square. In various embodiments, the receiver is a multi-channel receiver and each optical detector of the plurality of optical detectors is dedicated to receive flux within an optical waveband of a channel.

The method may further comprise reducing, by a spectral filter, levels of out-of-band flux incident on at least one side of the at least one optical detector of the plurality of optical detectors. In some embodiments, the method may further comprise reducing, by a spectral filter, levels of out-of-band flux incident on the at least one beacon detector.

In some embodiments, the method may further comprise controlling direction of the lenslet array and the optical detector array with a tilt actuator. The method may further comprise controlling, by a processor, the tilt actuator based on transmitter position information calculated by the processor using a position of the beacon received at one location on the at least one beacon detector. Each lenslet of the plurality of lenslets may be approximately a 2.75 mm square with a lens thickness at the center of approximately 1.85 mm.

In accordance with one embodiment, a system, comprises a plurality of light sources. The system further comprises a light-source driver element adapted to receive data to be optically transmitted and to output modulated electrical signals representative of the received data, identical and synchronized copies of the output modulated electrical signals driving each of the plurality of light sources. Further still, the system comprises a plurality of beamforming optics, one of each of the plurality of beamforming optics having an optical axis substantially centered on a light-emitting element of one of each of the plurality of light sources such that the plurality of beamforming optics transmit a combination of optical beams, the combination of optical beams comprising an optical beam output from each of the plurality of beamforming optics, the combination of optical beams having an optical intensity distributed over a two-dimensional angular output region.

In accordance with some aspects, the light-source driver element may comprise a single light source driver or a plurality of mutually synchronized light-source drivers. One or more of the plurality of beamforming optics and one or more light sources of the plurality of light sources corresponding to the one or more of the plurality of beamforming optics are positioned with an angular offset. The optical intensity distribution may be a function of a horizontal angular coordinate and a vertical angular coordinate within the two-dimensional angular output region. The angular offset comprises at least one of a horizontal angular offset or a vertical angular offset relative to the two-dimensional angular output region. Each optical beam transmitted by each of the plurality of beamforming optics has a uniform optical intensity distribution that is a function of a horizontal angular coordinate and a vertical angular coordinate within the two-dimensional angular output region specified for each of the plurality of beamforming optics.

In some embodiments, a first subset of the plurality of beamforming optics collects light from a first corresponding subset of light sources and outputs the collected light as a modulated optical beam comprising an optical beacon including beacon information indicative of a presence or availability of additional or other information associated with the system and representative of at least a portion of the received data. A second subset of the plurality of beamforming optics collects light from a second corresponding subset of light sources and outputs the collected light as a modulated optical beam comprising an optical signal including the additional or other information associated with the system and representative of at least another portion of the received data.

In some embodiments, the combination of optical beams comprises the optical signals temporally interleaved with the optical beacons. In some embodiments, the combination of optical beams comprises a combination of the optical signals and the optical beacons, each of the optical signals including a first identifier and each of the optical beacons including a second identifier. In some embodiments, the combination of optical beams comprises a combination of optical signals transmitted in a first optical wavelength band and optical beacons transmitted in a second optical wavelength band, the first optical wavelength band being a different, non-overlapping optical wavelength band than that of the second optical wavelength band.

In some embodiments, each of the plurality of beamforming optics collects light from a corresponding light source and outputs the collected light as a modulated optical beam. The modulated optical beam comprises at least one of an optical beacon including beacon information indicative of a presence or availability of additional or other information associated with the system and representative of at least a portion of the received data or an optical signal including the additional or other information associated with the system and representative of at least another portion of the received data.

In some embodiments, the combination of optical beams comprises the optical signals temporally interleaved with the optical beacons.

In some embodiments, the combination of optical beams comprises a combination of the optical signals and the optical beacons, each of the optical signals including a first identifier and each of the optical beacons including a second identifier.

In some embodiments, the combination of optical beams comprises a combination of the optical signals modulated by the optical beacons. In some embodiments, a first data rate used to transmit the optical beacons is lower than a second data rate used to transmit the optical signals. In some embodiments, a modulation representative of the optical signals is modulated by a modulation representative of the optical beacons, wherein the received data comprises: beacon information indicative of a presence or availability of additional or other information associated with the system; and signal information comprising the additional or other information associated with the system.

In accordance with some embodiments, each of the plurality of beamforming optics comprises a wineglass collimator including a first portion and a second portion each of which being rotationally symmetric about the optical axis substantially centered on the light-emitting element of a corresponding light source, the first portion of the wineglass collimator having a broad middle body between a narrow circular first entrance pupil and a narrow circular first exit pupil, the broad middle body having a first diameter greater than a second diameter of the narrow circular first entrance pupil and greater than a third diameter of the narrow circular first exit pupil, the second portion of the wineglass collimator having a flared body between a narrow circular second entrance pupil and a broad circular second exit pupil, the narrow second entrance pupil being coupled to, and having the same diameter as, the narrow circular first exit pupil, a fourth diameter of the broad second exit pupil being greater than the first diameter of the broad middle body of the first portion, the narrow first entrance pupil positioned near the corresponding light source to receive light from the corresponding light source and emit the light from the broad second exit pupil.

In accordance with one embodiment, an optical receiver assembly comprises an optical beacon receiver configured to: detect and receive an optical beacon from an optical transmitter assembly; and extract identification information from the received optical beacon, wherein the extracted identification information identifies a source of the optical transmitter assembly. The optical receiver assembly further comprises an optical signal receiver configured to: detect and receive an optical signal from the optical transmitter assembly; and extract information from the received optical signal.

In some aspects, the optical beacon receiver comprises a plurality of optical detectors. Each of the plurality of optical detectors may comprise an optical detector array.

In some aspects, the optical beacon receiver comprises a plurality of receiver optics, each one of the plurality of receiver optics being optically aligned with a corresponding one of the plurality of optical detectors. The plurality of receiver optics may be positioned such that each of their respective optical axes are parallel to each other.

In some aspects, the optical signal receiver comprises a plurality of optical detectors. Each of the plurality of optical detectors may comprise an optical detector array.

In some aspects, the optical signal receiver comprises a plurality of receiver optics, each one of the plurality of receiver optics being optically aligned with a corresponding one of the plurality of optical detectors. Each of the plurality of receiver optics may be positioned such that each of their respective optical axes are parallel to each other.

In some embodiments, the optical receiver assembly further comprises a non-transitory computer-readable medium having instructions stored thereon that, when executed by a processor, causes the system to: display on a graphical user interface, based on the identification information extracted from the received optical beacon, a visual representation of the source overlaid over a live display of a field of view of a video camera; receive data at the graphical user interface corresponding to user input selecting the visual representation of the source; and in response to receiving the data, display on the graphical user interface, a visual representation of the information extracted from the received optical signal.

In accordance with one embodiment, a method for presenting an augmented reality experience utilizing optically narrowcast information comprises: capturing a live scene; detecting the presence of a beacon; determining an angular position of the beacon; extracting identification data from the beacon indicative of a source of the beacon; augmenting the live scene with an augmented reality representation of the beacon's angular positioning and identification data; receiving a selection regarding the augmented reality representation; extracting descriptive data from an optical signal transmitted by the source of the beacon or an optical signal source associated with the source of the beacon; and presenting the extracted descriptive data.

In accordance with one aspect, the presenting of the extracted descriptive data comprises augmenting the live scene with an augmented reality representation of the extracted descriptive data in conjunction with or as a replacement for the augmented reality representation of the beacon's angular positioning and identification data. The presenting of the extracted description data may occur on a user device with which the live scene is captured.

The method may further comprise pointing one or more optical receivers in a direction of the source of the beacon based on the angular position of the beacon. Moreover, the method may comprise forwarding the extracted descriptive data to one or more applications that when executed cause one or more processors to display the extracted description data.

The one or more processors may comprise an additional user device other than a user device with which the live scene is captured. The method may further comprise forwarding the extracted descriptive data to one or more applications that when executed cause one or more processors to display a website associated with the source of the beacon. The extracted descriptive data may comprise a universal resource locator directing the one or more applications to the website, wherein the one or more applications comprise a web browser. The extracted descriptive data may comprise advertising information associated with one or more objects of interest within a field of view of the captured live scene. The extracted descriptive data may comprise advertising information regarding an entity associated with at least one of the source of the beacon or the optical signal source.

In accordance with one embodiment, a system comprises a camera adapted to capture a live scene, and an optical beacon receiver adapted to: detect the presence of a beacon; determine an angular position of the beacon; and extract identification data from the beacon indicative of a source of the beacon. The system further comprises one or more processors operatively connected to a non-transitory computer-readable medium having computer executable program code embodied thereon, the computer executable program code, when executed, cause the one or more processors to augment the live scene with an augmented reality representation of the beacon's angular positioning and identification data. The system further comprises an optical signal receiver adapted to extract descriptive data from an optical signal transmitted by the source of the beacon or an optical signal source associated with the source of the beacon upon receiving a selection regarding the augmented reality representation. Additionally, the computer executable program code, when executed, further causes the one or more processors to present the extracted descriptive data.

In presenting the extracted descriptive data, the one or more processors may augment the live scene with an augmented reality representation of the extracted descriptive data in conjunction with or as a replacement for the augmented reality representation of the beacon's angular positioning and identification data. The presentation of the extracted description data can occur on a display operatively connected to the camera with which the live scene is captured.

Moreover, the computer executable program code, when executed, further causes the one or more processors to forward the extracted descriptive data to one or more applications that when executed cause one or more processors to display the extracted description data. The one or more applications are executed on the system or a user device remotely located from the system.

The computer executable program code, when executed, further causes the one or more processors to forward the extracted descriptive data to one or more applications that when executed cause one or more processors to display a website associated with the source of the beacon. In accordance with some aspects, the extracted descriptive data comprises a universal resource locator directing the one or more applications to the website, the one or more applications comprising a web browser. In accordance with other aspects, the descriptive data comprises advertising information associated with one or more objects of interest within a field of view of the captured live scene. In accordance with still other aspects, the extracted descriptive data comprises advertising information regarding an entity associated with at least one of the source of the beacon or the optical signal source.

The optical beacon receiver and the optical signal receiver are implemented within a single optical receiver assembly.

In accordance with one embodiment, a method comprises: initializing, on a device, an application for displaying information extracted from a modulated optical beam by an optical receiver communicatively coupled to the device; and displaying, on a graphical user interface of the application, a visual representation of the optical receiver's field of view (FOV) overlaid over a live display of a FOV of a video camera of the device, wherein the displayed visual representation of the optical receiver's FOV is sized relative to the displayed FOV of the video camera. In implementations, the device is a mobile device such as a smartphone or a head mounted display.

In one implementation of this method, the optical receiver is an optical signal receiver. In this implementation, the method further includes zooming the camera (e.g., digitally or optically), and in response to zooming the camera, resizing the visual representation of the optical signal receiver's field of view. In further implementations, the visual representation of the optical signal receiver's field of view is not resized when the camera is panned, tilted, or rolled.

In various implementations of this method, the visual representation of the optical receiver's field of view comprises a geometric shape having boundaries. For example, the geometric shape may be a polygon (e.g., a rectangle or square) or an ellipse (e.g., a circle). In particular implementations, the boundaries of the geometric shape are based on an area of an optical signal receiver's FOV that receives optical signals at a threshold signal to noise ratio (SNR) or a threshold bit rate.

In one implementation of this method, the optical signal receiver is a component of an optical receiver assembly comprising the optical signal receiver and an optical beacon receiver. In such an implementation, the FOV of the optical signal receiver may be less than a FOV of the optical beacon receiver.

In one implementation of this method, the method further includes the step of activating the optical receiver and the camera in response to initializing the application for displaying information extracted from the modulated optical beam.

In one implementation of this method, the method includes the additional steps of: detecting an optical beacon within a field of view of an optical beacon receiver communicatively coupled to the mobile device; extracting identification information from the received beacon; and based on the extracted identification information, rendering, on the graphical user interface, a visual representation of the beacon's source overlaid over the live display of the FOV of the camera. In yet further implementations, the method may include the steps of: estimating an angular position of the received beacon relative to the optical beacon receiver's field of view. In such implementations, the visual representation of the beacon's source may be rendered based on the estimated angular position, and the visual representation of the beacon's source visually may represent a location of the source relative to the live display of the FOV of the camera.

In one implementation of this method, the method includes the additional steps of: receiving data corresponding to user input selecting the visual representation of the beacon's source; and in response to receiving the data, determining if an optical signal transmitted by the beacon's source is within the optical signal receiver's FOV. If it is determined that the optical signal transmitted by the beacon's source is not within the optical signal receiver's FOV, the method may include the additional step of displaying on the GUI a prompt to position the mobile device such that the visual representation of the optical signal receiver's FOV surrounds the visual representation of the beacon's source. Additionally, if it is determined that the optical signal transmitted by the beacon's source is not within the optical signal receiver's FOV, the method may include the additional step of using a tilt actuator to tilt the optical signal receiver in a direction such that the optical signal transmitted by the beacon's source falls within the optical signal receiver's FOV.

In one implementation of this method, the method includes the additional steps of: receiving, at the optical signal receiver, an optical signal transmitted by the beacon's source; extracting information from the received optical signal; and displaying the extracted information on the graphical user interface. The information extracted from the received optical signal may include at least one of video data, audio data, or textual data.

In one embodiment, a non-transitory computer-readable medium may have instructions stored thereon that, when executed by a processor, causes a system to: initialize an application for displaying information extracted from a modulated optical beam by an optical receiver communicatively coupled to a mobile device; and display, on a graphical user interface of the application, a visual representation of the optical receiver's field of view (FOV) overlaid over a live display of a FOV of a video camera of the mobile device, wherein the displayed visual representation of the optical receiver's FOV is sized relative to the displayed FOV of the video camera. In implementations of this embodiment, the non-transitory computer-readable medium may be a component of a mobile device communicatively coupled to the optical receiver.

In one embodiment, a system includes an optical receiver assembly and a mobile device communicatively coupled to the optical receiver assembly, where the mobile device comprises a camera and the non-transitory computer-readable medium described in the previous paragraph. The optical receiver assembly may include an optical signal receiver configured to: detect and receive an optical signal from an optical transmitter assembly; and extract information from the received optical signal. The optical receiver assembly may be physically integrated into the mobile device or a case attached to the mobile device (e.g., a smartphone case).

In one embodiment, a method may be implemented for bidirectional communication in an optical narrowcasting system. In this embodiment, the method includes: receiving, at an optical receiver assembly communicatively coupled to a mobile device, a first modulated optical beam transmitted by an optical transmitter assembly of a source; extracting information from the modulated optical beam; displaying the extracted information on a graphical user interface of an application presented on the mobile device; receiving data corresponding to user input at the graphical user interface selecting the displayed information; in response to receiving the data corresponding to user input at the graphical user interface selecting the extracted descriptive data, generating digital data to be transmitted by an optical transmitter assembly communicatively coupled to the mobile device to an optical receiver assembly of the source; transferring the digital data to the optical transmitter assembly communicatively coupled to the mobile device; and transmitting an optical beam modulated with the digital data from the optical transmitter assembly communicatively coupled to the mobile device.

In one implementation of this embodiment, the method further includes the step of determining, prior to transmitting the second modulated optical beam, if the source's optical receiver assembly is within a signal path of an optical transmitter of the optical transmitter assembly communicatively coupled to the mobile device. In this implementation, the method may further include: displaying, on the graphical user interface, an augmented reality object corresponding to a transmitting emitting region covered by the optical transmitter, displaying, on the graphical user interface, a visual representation of the source; and displaying a prompt to position the mobile device such that the visual representation of the source is within the augmented reality object corresponding to the transmitting emitting region covered by the optical transmitter. In such an implementation, the method may additionally include the step of tilting the optical transmitter assembly communicatively coupled to the mobile device such that the source's optical receiver assembly is within a signal path of the optical transmitter.

In one implementation of this embodiment, the modulated optical beam is an optical beacon, the information extracted from the modulated optical beam indicates that the source is an optical narrowcasting hotspot, and the generated digital data is a request to access the hotspot. In another implementation of this embodiment, the modulated optical beam is an optical signal. In this implementation, the information extracted from the modulated optical beam may include information associated with a product offered for sale by the source, and the generated digital data may be a request to conduct a transaction to purchase the product.

In one embodiment, a system comprises: an optical receiver assembly communicatively coupled to a mobile device, the optical receiver assembly adapted to receive a first modulated optical beam transmitted by an optical transmitter assembly of a source and extract information from the modulated optical beam; and a non-transitory computer-readable medium having instructions stored thereon that, when executed by a processor, causes the mobile device to: display the extracted information on a graphical user interface; receive data corresponding to user input at the graphical user interface selecting the displayed information; in response to receiving the data corresponding to user input at the graphical user interface selecting the extracted descriptive data, generating digital data to be transmitted by an optical transmitter assembly communicatively coupled to the mobile device to an optical receiver assembly of the source; and transfer the digital data to an optical transmitter assembly communicatively coupled to the mobile device. The system may additionally include the optical transmitter assembly, where the optical transmitter assembly is adapted to transmit an optical beam modulated with the digital data to an optical receiver assembly of the source. In one implementation of this system, the optical receiver assembly and/or the optical transmitter assembly is/are integrated into a case attached to the mobile device.

In one implementation of this system, the modulated optical beam is an optical beacon, the information extracted from the optical beam indicates that the source is an optical narrowcasting hotspot, and wherein the generated digital data is a request to access the hotspot.

In one embodiment, a method implemented in an optical narrowcasting ad-hoc network system comprises: transmitting an optical beacon from a beacon transmitter of a first device, where the optical beacon is modulated with information identifying the device as an optical narrowcasting hotspot; receiving, at an optical signal receiver of the first device, an optical signal from a second device, where the optical signal is modulated with information to be transmitted over a radio frequency network; extracting the information from the received optical signal; and transmitting the information over a radio frequency network using a radio frequency connection interface of the first device. In particular implementations of this embodiment, the first device is an internet gateway, and the second device is a mobile device.

In one implementation of this embodiment, the method further comprises: in response to transmitting the information over the radio frequency network, receiving a response signal over the radio frequency network modulated with information; modulating the information from the response signal onto an optical signal; and transmitting the optical signal to an optical signal receiver of the second device.

In one implementation of this embodiment, the method further comprises: receiving, at an optical beacon receiver of the first device, an optical beacon from the second device requesting access to the optical narrowcasting hotspot; and permitting the second device to access the optical narrowcasting hotspot. The optical beacon may include a unique optical narrowcasting identification associated with the second device, and the step of permitting the second device to access the optical narrowcasting hotspot may include a determination that the device is trusted based on the unique optical narrowcasting identification.

In accordance with one embodiment, a signal-enhanced media system configured to enhance captured media with optically narrowcast content may comprise an optical receiver assembly adapted to receive the optically narrowcast content extracted from one or more optical beams transmitted by one or more optical transmitter assemblies. The system may further comprise an enhanced media component. The enhanced media component may be adapted to receive at least one media representation of a real-world scene, and embed the optically narrowcast content within or as part of the at least one media representation to generate an enhanced media dataset.

The one or more optical beams may comprise an optical beacon including beacon information indicative of a presence or availability of additional or other information associated with a source of the optical beacon. The beacon information may further comprise information identifying the source of the optical beacon. In accordance with another aspect, the beacon information may further comprise information regarding the source of the optical beacon. The one or more optical beams may comprise an optical signal including signal information comprising the additional or other information associated with the source of the optical beacon.

The enhanced media component may be adapted to embed two or more portions of the optically narrowcast content into two or more respective media representations. At least one media representation may comprise at least one of a photographic, video, or audio representation of the real-world scene.

According to one aspect, the enhanced media dataset may comprise the at least one of the photographic, video, or audio representations of the real-world scene in combination with information regarding a horizontal and vertical position of each of the one or more optical transmitter assemblies. Each of the one or more optical transmitter assemblies may be detected in a field of view of the optical receiver assembly. In accordance with another aspect, the enhanced media dataset may comprise the at least one of the photographic, video, or audio representations of the real-world scene in combination with at least one of a timestamp or a geographical position of the optical receiver assembly associated at a time during which the optical receiver assembly received the optically narrowcast content.

The system may further comprise a communications interface adapted to at least one of store or transmit the enhanced media dataset to one or more user devices adapted to consume the enhanced media dataset in real-time or non-real-time.

In accordance with another embodiment, a media presentation system may comprise one or more physical processors, and a memory having computer code being executed to cause the one or more physical processors to: receive an enhanced media dataset; detect existence of optically narrowcast content embedded within or as part of the enhanced media dataset; extract some or all of the embedded optically narrowcast content from the enhanced media dataset; and present some or all of the embedded optically narrowcast content with a presentation of some or all of a media representation portion of the enhanced media dataset.

The media representation portion of the enhanced media dataset may comprise at least one of a photographic, video, or audio representation of a real-world scene captured in conjunction with at least one of beacon information or signal information comprising the embedded optically narrowcast content. According to one aspect, the beacon information comprises information identifying a source entity from which the optically narrowcast content is transmitted. According to another aspect, the signal information comprises information other than the identifying information that is associated with the source entity.

The embedded optically narrowcast content may be represented as one or more interactive graphical elements overlaid on the media representation portion of the enhanced media dataset. The presentation of some or all of the media representation portion of the enhanced media dataset is navigable to bring the one or more interactive graphical elements representing the embedded optically narrowcast content into view commensurate with a location of one or more optical transmitter assemblies from which the optically narrowcast content is transmitted. The presentation of some or all of the embedded optically narrowcast content with the presentation of some or all of the media representation portion of the enhanced media dataset may include a graphical user interface through which one or more options for filtering the embedded optically narrowcast content are presented.

In accordance with another embodiment, a signal-enhanced media system may comprise an optical receiver adapted to receive optically narrowcast content extracted from one or more optical beams transmitted by an optical transmitter. The system may further comprise a first user device operatively connected to the optical receiver. The first user device may be adapted to capture at least one media representation of a real-world scene in which the one or more optical beams are detected, and embed the optically narrowcast content within the at least one media representation. The system may comprise a second user device adapted to: receive an enhanced media dataset comprising some or all of the embedded optically narrowcast content and some or all of the at least one media representation; extract some or all of the embedded optically narrowcast content from the enhanced media dataset; and present some or all of the embedded optically narrowcast content in conjunction with some or all of the at least one media representation. The second user device may be further adapted to at least one of download, store, or transmit some or all of the embedded optically narrowcast content to a third user device.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

FIG. 1 illustrates an example optical narrowcasting system.

FIG. 2A illustrates example components that may make up an optical transmitter assembly.

FIG. 2B is a flow chart illustrating example operations that may be performed by the optical transmitter assembly of FIG. 2A and/or its component parts or elements.

FIG. 3A illustrates an optical receiver assembly, including one or more example components that may make up the optical receiver assembly.

FIG. 19a is a graph of vertical slices taken through the center and at horizontal coordinates of ±4° relative to the center of the same intensity distribution produced by a single beamforming optic in some embodiments that is depicted as a surface plot in FIG. 18a.

FIG. 20a is a graph of horizontal slices taken through the center of the beam and at vertical coordinates of ±3.95° relative to the center of the same intensity distribution produced by a single beamforming optic in some embodiments that is depicted as a surface plot in FIG. 18a.

FIG. 36A illustrates an example graphical user interface for setting ad-hoc networking settings that may be implemented in embodiments.

FIG. 36B illustrates an example graphical user interface for setting ad-hoc networking settings that may be implemented in embodiments.

FIG. 36C illustrates an example graphical user interface for setting ad-hoc networking settings that may be implemented in embodiments.

FIG. 49A illustrates an example display of an augmented reality graphical user interface displaying an icon associated with a business transmitting a beacon that was detected by an optical receiver assembly of a mobile device.

FIG. 49B illustrates an example display of an augmented reality graphical user interface displaying a plurality of icons associated with corresponding optical transmitter assemblies.

FIG. 52A illustrates an example display of a graphical user interface for retrieving optical signal information transmitted by an optical transmitter assembly.

FIG. 52B illustrates an example display of a graphical user interface for retrieving optical signal information transmitted by an optical transmitter assembly.

FIG. 52F illustrates an example display of a graphical user interface after user input selecting a product-listing icon displayed by the graphical user interface of FIG. 52D.

FIG. 52G illustrates an example display of a graphical user interface after user input selecting a fragrance product category shown in FIG. 52F.

FIG. 52H illustrates an example display of a graphical user interface after user input selecting a women's fragrances product category shown in FIG. 52G.

FIG. 52I illustrates an example display of a graphical user interface after user input selecting a particular fragrance shown in FIG. 52H.

FIG. 55A illustrates an example augmented reality graphical user interface that may be presented in an airplane environment by running an optical narrowcasting application on a mobile device.

FIG. 55B illustrates an example augmented reality graphical user interface after user input selecting an augmented reality object shown in FIG. 55A.

Figure 3B:
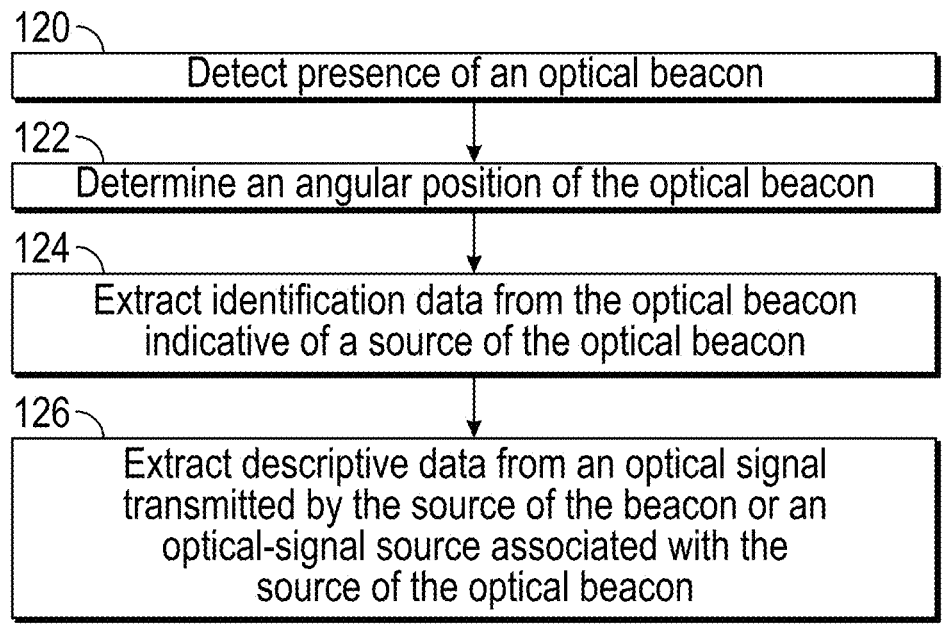
FIG. 3B is a flow chart illustrating example operations that can be performed by the optical receiver assembly of FIG. 3A and/or its component parts or elements.

The figures are not exhaustive and do not limit the disclosure to the precise form disclosed.

DETAILED DESCRIPTION

Definitions

As used herein, an "optical narrowcasting system" or "ONS" is a system that can transmit information from one or more locations to one or more other locations using one or more digitally modulated optical beams transmitted through one or more propagation media. Contemplated propagation media may include, but are not limited to, air, water, glass windows, and the vacuum of space. An ONS may include one or more optical transmitter assemblies (OTAs) to transmit optical beams to one or more optical receiver assemblies (ORAS).

As used herein, an "optical beam" is a directed beam of electromagnetic radiation having wavelengths in a spectral region ranging from approximately 10 nm (e.g., extreme ultraviolet (UV) radiation) to approximately $10^6$ nm (e.g., far infrared (IR) radiation). As used herein to refer to an optical beam, the term "directed" beam can refer to energy, e.g., light energy sent in a specific range of propagation directions, but not in other directions. For example, a laser may emit a narrow directed beam of light, whereas the sun may be understood to emit undirected light that propagates outward in all possible directions.

As used herein, an "optical transmitter assembly" or "OTA" is a device including electronics, software (and/or firmware), and one or more optical transmitters (OTs). An OTA may be an element of an ONS. The OT(s) within an OTA can provide the functionality of at least one optical beacon transmitter (OBT) and/or at least one optical signal transmitter (OST). In some implementations, a single OT may function as both an OBT and an OST. In other implementations, the OBT(s) and OST(s) of an OTA can be separate devices. An OTA may also contain one or more tilt actuators allowing it to control the pointing direction(s) of the optical beam(s) output by its OT(s). An OTA's electronics and associated software (and/or firmware) may perform various useful functions, such as: providing an interface between the OTA and its user(s) (or its users' devices); supplying timing pulses and electrical power to its OT(s); controlling the operation of the OT(s) (e.g., turning them on and off, setting their data-transmission rate, etc.); transferring digital data to the OT(s) for them to output as one or more digitally modulated optical beams; and controlling one or more tilt actuators to alter the pointing direction(s) of the output optical beam(s).

As used herein, an "optical transmitter" or "OT" is a device including one or more optical sources, one or more beam-forming optics, and electronics with associated software (and/or firmware) adapted to transmit optical beams. One or more OTs may form at least part of an OTA. The optical sources may be coherent (e.g., lasers) or incoherent (e.g., light emitting diodes (LEDs)). The optical output of each optical source may be electronically modulated at a desired bit rate (or at one of a user-selectable range of bit rates) to transmit digital data in the form of a series of one-bits and zero-bits. The optical source(s) produce optical radiation in a desired optical waveband. Each beam-forming optic may collect flux emitted by one or more optical source(s) and utilize refraction, reflection, and/or diffraction to concentrate it into a transmitted beam having a desired angular intensity distribution. In some cases, the beam-forming optic may also include one or more spectral filters to minimize the amount of flux transmitted outside of the desired waveband. Multiple OTs could in some implementations be used in a single OTA to increase the solid angle of the output beam and/or to increase the output intensity in certain solid-angular regions. The electronics and associated software (and/or firmware) of an OT may perform the following functions: receive and (if necessary) modify timing pulses and electrical power sent to it by the OTA of which it is a component; receive and properly interpret various control signals sent to it from the OTA; and receive from the OTA, data in digital electronic form that it will then output in digital optical form.

As used herein, an "optical beacon transmitter" or "OBT" is a type of OT that produces a beacon associated with an OTA. An "optical beacon" or "beacon" is a modulated optical beam containing information that allows an ORA to detect the presence of an OTA. An optical beacon makes a user or entity receiving optically transmitted information aware of the presence or availability of information transmitted by the OTA associated with the beacon. In addition to detecting the presence of the OTA, a beacon produced by an OBT may also contain information allowing an optical receiver assembly (ORA) to identify the entity (e.g., business, organization, private individual, product, landmark, etc.) and type (i.e., category) of entity (e.g., restaurant, department store, movie theater, etc.) with which the OTA is associated. A beacon may also be used by an OBR to determine the angular position of the OTA. In some embodiments, the angular position, e.g., horizontal and/or vertical angular position, of the OTA can be determined based on information optically transmitted within or as part of the optical beacon. For example, latitudinal, longitudinal, and altitudinal information indicative of the location of an OTA may be transmitted in a beacon. In some embodiments, one or more measurements made by an OBR of the propagation direction of an optical beacon can be used by the OBR to derive, calculate, or otherwise determine an angular position of the OTA within the FOV of the OBR. As mentioned previously, a single OT within an OTA may function as both an OBT and an OST, or the OBT(s) and OST(s) within an OTA may be separate devices.

As used herein, an "optical signal transmitter" or "OST" is a type of OT that produces an optical signal associated with an OTA. An "optical signal" is a modulated optical beam containing information, other than information contained in an optical beacon, which the operators of an OTA desire to transmit to optical receiver assemblies (ORAs). The purpose of an OST is to transmit information to ORAs that have already detected the OTA of which the OST is a component. In some instances, the ORAs may have also identified and determined the angular location of the OTA prior to receiving optical signals transmitted by the OTA. A single OT within an OTA may function as both an OBT and an OST, or the OBT(s) and OST(s) within an OTA may be separate devices.

A modulated optical beam produced by an OTA may contain both optical beacons and optical signals. Alternatively, a modulated optical beam may contain only one or more optical beacons and no optical signals, or it may contain only one or more optical signals and no optical beacons. For example, an OTA may simultaneously output two separate optical beams, one being an optical beacon and another being an optical signal, where the optical beacon has a different wavelength spectrum than the optical signal.

As used herein, the term "optical information" generally refers to information extracted from a modulated optical beam or used to modulate an optical beam. Optical information may include identification data extracted from or contained in an optical beacon (e.g., identifying a particular OTA and/or source of the OTA) and descriptive data extracted from or contained in an optical signal (e.g., an advertisement or other message). This data may comprise machine-readable and/or human-readable data, such as text, video, audio, metadata, or other types of information.

As used herein, an "optical receiver assembly" or "ORA" is a device including electronics, software (and/or firmware), and one or more optical receivers (OR). The OR(s) within an ORA can provide the functionality of at least one optical beacon receiver (OBR) and/or at least one optical signal receiver (OSR). An ORA may be an element of an ONS. In some cases, an ORA may also contain one or more tilt actuators allowing it to control the directions from which its OBR(s) and OSR(s) can receive modulated optical beams. An ORA can perform one or more of the following functions. It may detect the presence of beacons transmitted by OTAs. It may extract information from beacons, such as the identities of the entities (e.g., businesses, organizations, private individuals, products, landmarks, etc.) with which OTAs are associated. It may determine the angular positions of OTAs by sensing the direction of incidence of beacons or extracting positioning information therefrom. It may receive and/or extract data from optical signals transmitted by OTAs. An ORA's electronics and associated software (and/or firmware) perform various useful functions, such as: providing an interface between the ORA and its user(s) (or its users' devices); supplying timing pulses and electrical power to its OBR(s) and OSR(s); controlling the operation of its OBR(s) and OSR(s) (e.g., turning them on and off, setting their data-reception rate, etc.); receiving and transferring to users (or to users' devices) information, such as identifying information and angular position, obtained by its OBR(s) regarding OTAs that have been detected; receiving and transferring to users (or to users' devices) data received from OTAs by its OSR(s); and controlling one or more tilt actuators to alter the pointing direction(s) of one or more OBRs and one or more OSRs.

As used herein, an "optical beacon receiver" or "OBR" is a device adapted to receive an optical beacon that may make up at least part of an ORA. An OBR may detect the presence of one or more OTAs. An OBR may also identify the entities (e.g., businesses, organizations, or private individuals) with which OTAs are associated through, e.g., information contained within an optical beacon, as well as determine the angular positions of OTAs. As noted previously, the angular positions of OTAs may be derived from measurement(s) of the propagation direction of a beacon and/or determined from information contained within the beacon. An OBR may include, for example: one or more optical detectors or detector arrays; one or more collection optics, each including one or more optical components (e.g., lenses, reflectors, and/or diffractive optical elements); and control electronics with associated software (and/or firmware). A spectral filter may be included in each collection optic to reduce to low levels the out-of-band flux incident on the detector(s). The optical detectors are capable of detecting optical flux in the waveband and at the bit rates of beacons which the OBR is designed to receive. In some cases an OBR could share some or all of its detectors, collection optics, electronic hardware, and software/firmware with one or more OSRs within the ORA of which it is a part. The electronics and associated software (and/or firmware) of an OBR perform at least the following functions: providing the means to receive and (if necessary) modify timing pulses and electrical power sent to it by the ORA of which it is a part; receiving and properly interpreting various control signals sent to it by the ORA; and transferring to the ORA information (e.g., identifying information and angular position) it has obtained regarding beacons it has detected and from which it has received information.

As used herein, an "optical signal receiver" or "OSR" is a device adapted to receive optical signals and to convert the data they contain into digital or electronic form. An OSR may include one or more optical detectors or detector arrays, one or more collection optics, and control electronics with associated software (and/or firmware). The optical detectors are capable of detecting optical flux in the waveband and at the bit rates of optical signals the OSR is designed to receive. Each collection optic can collect incident in-band flux over its entrance pupil and within its specified field of view (FOV), and utilizes refraction, reflection, and/or diffraction to concentrate it onto one or more of the optical detectors. A spectral filter may also be included in the optical train to reduce to low levels, the out-of-band flux incident on the detectors. In some cases, an OSR may share some or all of its detectors, collection optics, electronic hardware, and software/firmware with one or more OBRs within the ORA of which it is a part. The electronics and associated software (and/or firmware) of an OSR can perform one or more of the following functions: receive and (if necessary) modify timing pulses and electrical power sent to it by the ORA (of which it is a part); receive and properly interpret various control signals sent to it by the ORA; and transfer to the ORA, digital data extracted from optical signals it has received.

Disclosed herein are systems and methods of communication that utilize non-radio-wave-based communications channels. That is, communications may be achieved through the transmission and/or receipt of information in the form of modulated optical beams. In this way, a user or entity, such as a business wishing to transmit information, e.g., advertising information, may do so by utilizing an OTA that can convert a digital representation of the information into one or more modulated optical beams for transmission. It should be noted that the information transmitted may include information disseminated by businesses and other organizations, including government agencies, for example, and by individuals. Personal content, such as messages, photos, and videos shared by individuals within a social media context are other examples of information that may be transmitted.

A characteristic of the optical communications methods and systems disclosed herein is that a user of an ORA designed to receive information sent by one or more OTAs may not know ahead of time what specific optical transmitters will be sending information of interest to him/her or where they will be located. For this reason, one aspect of various embodiments is that an ORA may be equipped with one or more components adapted to detect the presence of optically transmitted information prior to receiving that information.

A user wishing to receive the information transmitted in the form of one or more modulated optical beams may utilize an ORA implemented within or in conjunction with a user device, such as a smartphone, to scan for and detect the presence of available optical beacons, extract the identifying information contained in the beacons, and display the identifying information through, e.g., an augmented reality (AR) interface. Upon selecting a specific OTA using information extracted from its associated beacon and displayed on the AR interface, the user, if he/she so desires, may further obtain some or all of the information contained within or represented by the optical signal associated with said OTA through the AR interface or other information-presentation mechanism, such as a media player (e.g., advertising information in the form of digital video).

Advantages can be realized by using such an optical communications system, referred to herein as an optical narrowcasting system. For example, optical narrowcasting systems such as those disclosed herein may have long-range, high-bandwidth capabilities, avoid regulatory limitations (optical transmissions are thus far unregulated by the Federal Communications Commission (FCC) or any other regulatory body). For example, optical narrowcasting systems can provide users with the ability to utilize existing hardware and/or software technologies that are enhanced by extremely compact non-imaging optical components that have low power needs and are energy efficient. For example, the operable range of an optical narrowcasting system can be approximately 400 m (e.g., during the day) to approximately 1200 m (e.g., during nighttime) compared to that of WiFi that is effective within approximately 50 m. Moreover, optical narrowcasting systems are able to direct information in one or more desired directions using, e.g., beamforming. This can be accomplished through the use of the aforementioned non-imaging optics, whereas directionality using WiFi is not practical given the need (of WiFi routers) to use expensive and bulky directional antennas. Regarding efficiency, optical narrowcasting networks can be up to 300 times more energy efficient than WiFi networks. Further still, the security that can be achieved in an optical narrowcasting network is much higher than that possible in a WiFi® network, due to the directionality of the transmitted optical beams.

FIG. 1 illustrates an example optical narrowcasting system 100. Transmitting and/or receiving an optical beam(s) may be accomplished using an OTA, e.g., optical transmitter assembly 104, and an ORA, e.g., optical receiver assembly 106. An noted previously, "optical transmitter assembly," or "OTA," may refer to an optical narrowcasting element adapted to transmit one or more optical beams, and can include certain electronics and/or circuitry, software and/or firmware, and one or more optical transmitters, which will be described in greater detail below with reference to FIG. 2. As illustrated in FIG. 1, optical transmitter assembly 104 may transmit one or more optical beams into a medium, such as air. As alluded to previously, an optical beam may comprise one or more of an optical beacon and an optical signal.

Optical transmitter assembly 104 may receive, modulate, convert, and/or otherwise process digital information into an optical format for transmission as an optical beam to be received by optical receiver assembly 106. The digital information may be received by optical transmitter assembly 104 from one or more sources, e.g., source device 102. Source device 102 may be a computer tablet, smartphone, data server, or other information source.

Optical transmitter assembly 104 may be installed on various fixed structures, such as buildings, billboards, road signs, and the like. It may also be installed on vehicles such as automobiles and buses. It should be understood that these installations are merely examples and not limiting in any way. Optical transmitter assembly 104 may also be incorporated into portable and/or handheld devices, such as smartphones, tablet computers, and head mounted displays, or it may be incorporated into devices intended to be attached to, or kept in close proximity to, portable and/or handheld devices, such as smartphone cases and cases for tablet computers. It should be understood that the devices mentioned here are merely examples and not limiting in any way. Moreover, although optical transmitter assembly 104 is illustrated as being associated with a single source device 102, optical transmitter assembly 104, in some embodiments, may be associated with and/or receive digital information from additional source devices.

Optical receiver assembly 106 may be installed on various fixed structures, such as buildings, billboards, road signs, and the like. It may also be installed on vehicles such as automobiles and buses. It should be understood that these installations are merely examples and not limiting in any way. Optical receiver assembly 106 may also be incorporated into portable and/or handheld devices, such as smartphones, tablet computers, and head mounted displays, or it may be incorporated into devices intended to be attached to, or kept in close proximity to, portable and/or handheld devices, such as smartphone cases and cases for tablet computers. It should be understood that the devices mentioned here are merely examples and not limiting in any way. Moreover, although optical receiver assembly 106 is illustrated as being associated with a single user device 108, optical receiver assembly 106, in some embodiments, may be associated with, controlled by, and/or share digital information with additional user devices.

Optical receiver assembly 106 may be an optical narrowcasting element adapted to receive one or more optical beams, and can include certain electronics and/or circuitry, software and/or firmware, and one or more optical receivers, which will be described in detail below with reference to FIG. 4. Optical receiver assembly 106 may receive an optical beam and demodulate, convert, and/or otherwise process the optical beam back into digital information. Optical receiver assembly 106 may transmit or forward the digital information to a receiving device, such as user device 108. User device 108 may be a computer tablet, smartphone, network server, or other device capable of receiving and/or utilizing the digital information or data. Optical receiver assembly 106 may be integrated with user device 108 or optical receiver assembly 106 may be operatively attached to user device 108. It should be noted that optical receiver assembly 106 need not be associated with only a single user device. In some embodiments, optical receiver assembly 106 may transmit or forward received digital information to more than one user device, e.g., via broadcasting, multicasting, etc.

It should be noted that although FIG. 1 depicts one-way communications between optical transmitter assembly 104 and optical receiver assembly 106, an optical narrowcasting system may also involve two-way communications. For example, source device 102 and user device 108 may each have respective optical transmitter and optical receiver assemblies integrated therein or operatively attached thereto. Optical beams may, in some cases, be in the visible or near-IR bands. Optical beams may be produced using either incoherent sources (e.g., light emitting diodes (LEDs)), lasers, or other appropriate light sources. Depending on the application, different angular beam widths can be used. Optical beams may either propagate from an optical transmitter assembly directly to an optical receiver assembly along an unobstructed line of sight (LOS), or optical beams may propagate along an indirect, non-LOS path, utilizing diffuse reflections from ceilings, walls, or other structures, for example, or from suspensions of small particles (e.g., airborne dust) or liquid droplets (e.g., clouds or fog). As illustrated in FIG. 21, two or more identical modular transmitter-optics units may be used to produce combined beams having increased horizontal and/or vertical angular beam widths, and/or increased intensity within certain solid-angular regions.

An ad hoc network (e.g., a communications network established directly between two or more computers or other devices) need not rely on a base station or other centralized access point. Such communications networks are generally established on a temporary basis between a small number of participants in close physical proximity for a specific common purpose, such as sharing a set of documents being written by the participants or playing multi-player computer games. In some embodiments, two or more user devices (one embodiment of which can be user device 108) may each comprise optical transmitter assemblies and optical receiver assemblies (embodiments of which can be optical transmitter assembly 104 and optical receiver assembly 106 of FIG. 1). The two or more user devices may be used to transmit and receive data via optical beams, thereby creating an ad hoc optical narrowcasting network.

FIG. 2A illustrates example components that may make up optical transmitter assembly 104. Optical transmitter assembly 104 may include a data interface 104a. Data interface 104a may comprise electronics and/or circuitry, as well as associated software (and/or firmware) adapted to provide an interface between optical transmitter assembly 104 and source device 102 (and/or a user of source device 102). For example, optical transmitter assembly 104 may be controlled by source device 102 via data interface 104a. Data interface 104a may communicate with source device 102 by way of a hardwired and/or wireless (e.g., Bluetooth®) connection. One or more software applications on source device 102 may allow data files to be uploaded to a memory unit of optical transmitter assembly 104 via data interface 104a. These one or more software applications may also allow a user to send commands instructing optical transmitter assembly 104 to optically transmit the contents of one or more data files that have been uploaded to optical transmitter assembly 104. The user may also be able to specify values, such as bit rate, optical output intensity, pulse duty cycle, and other relevant operating parameters for optical transmitter assembly 104.

Optical transmitter assembly 104 may include control electronics 104b. Control electronics 104b may receive the above-noted values that have been input by the user and utilized to control operation of optical transmitter assembly 104. For example, control electronics 104b may supply timing pulses and electrical power to the optical transmitters, control the operation of one or more optical transmitters, e.g., optical beacon transmitter 104c and optical signal transmitter 104d, (for example, by turning them on and off, setting their data-transmission rate, etc.). Control electronics 104b may effectuate the transfer of digital data to one or more of the optical transmitters to be output as one or more digitally modulated optical beams.

In some embodiments, optical transmitter assembly 104 may also comprise one or more tilt actuators, such as microelectromechanical systems (MEMS) actuators, that allow optical transmitter assembly 104 to control direction(s) in which one or more optical beams may be pointed upon being output. For example, optical beacon transmitter 104c, optical signal transmitter 104d, and/or combined optical transmitter 104e may be mounted or otherwise incorporated into optical transmitter assembly 104 via a connection that allows for the one or more tilt actuators to move the transmitters. Control electronics 104b may control operation of the one or more tilt actuators.

Optical transmitter assembly 104 may include one or more optical transmitters adapted to process digital information received from, e.g., source device 102, for transmission as an optical beam. As illustrated in FIG. 2A, some embodiments may have an optical beacon transmitter 104c and an optical signal transmitter 104d. Optical beacon transmitter 104c may be adapted to transmit optical beacons that are specifically intended to be received by optical beacon receivers. Optical beacons allow the presence of optical transmitter assembly 104 to be detected. Optical beacons may allow the source (e.g., user or entity associated with source device 102, source device 102, and/or optical transmitter assembly 104) to be identified. Optical beacons may also allow the horizontal and/or vertical angular position of the optical transmitter assembly 104 within the FOV of an OBR at a different location to be determined. This can be accomplished, for example, by an OBR utilizing a lens, such as an imaging lens, to concentrate (i.e., focus) optical beacons incident on the lens from different directions onto correspondingly different locations on a detector array located in the focal plane of the lens. The location in the detector array at which an optical beacon is currently focused can be a measure of the current angular position relative to the OBR's FOV of the OTA from which the optical beacon is transmitted. That is, optical power in the form of an optical beacon may be currently, primarily or entirely, concentrated (by the OBR's lens) onto a detector located at a particular row and column of the detector array used in the OBR. The OBR may be a camera that is sensitive to the waveband of the optical beacon. The row and column of the detector array at which the optical beacon is concentrated can be a current estimated location (within the FOV of the OBR) of the OTA that sent the beacon. OTA locations in this form can be mapped to analogous locations within the FOV of an associated visible-light camera, such as the forward-looking camera of a smartphone. This allows the locations of OTAs to be represented on a user's real-time video display (e.g., that of the smartphone). An icon representing the OTA can then, for example, be overlaid at this location in the real-time video display. It should be noted that the horizontal and vertical angular location of an OTA can in general, be a function of time. For example if an OTA moves due to it being mounted on a vehicle that moves, its location within the FOV of an OBR may change. Similarly, if the ORA moves to a new location and/or is tilted, the OTA location within the FOV of the OBR may also change, even though the OTA has stayed in the same physical location.

Optical signal transmitter 104d may be adapted to transmit optical signals specifically intended to be received by optical signal receivers. Optical signals transmit information from optical transmitter assembly 104 to optical receiver assembly 106, where optical transmitter assembly 104 and/or an entity associated with it may have already been detected, identified, and whose horizontal and/or vertical angular position relative to the FOV of an OBR has already been determined. Moreover, two or more optical transmitters may be implemented in optical transmitter assembly 104 to increase the solid angle of an output optical beam and/or to increase output intensity in certain solid-angular regions.

As also illustrated in FIG. 2A, an alternative may be to utilize a "combined" optical transmitter 104e that realizes the functionality of both optical beacon transmitter 104c and optical signal transmitter 104d. For example, combined optical transmitter 104e may comprise a single optical transmitter adapted to transmit both optical beacons and optical signals. That is, combined optical transmitter 104e may be designed to transmit an optical beam intended to be received both by optical beacon receivers and by optical signal receivers.

Figure 9:
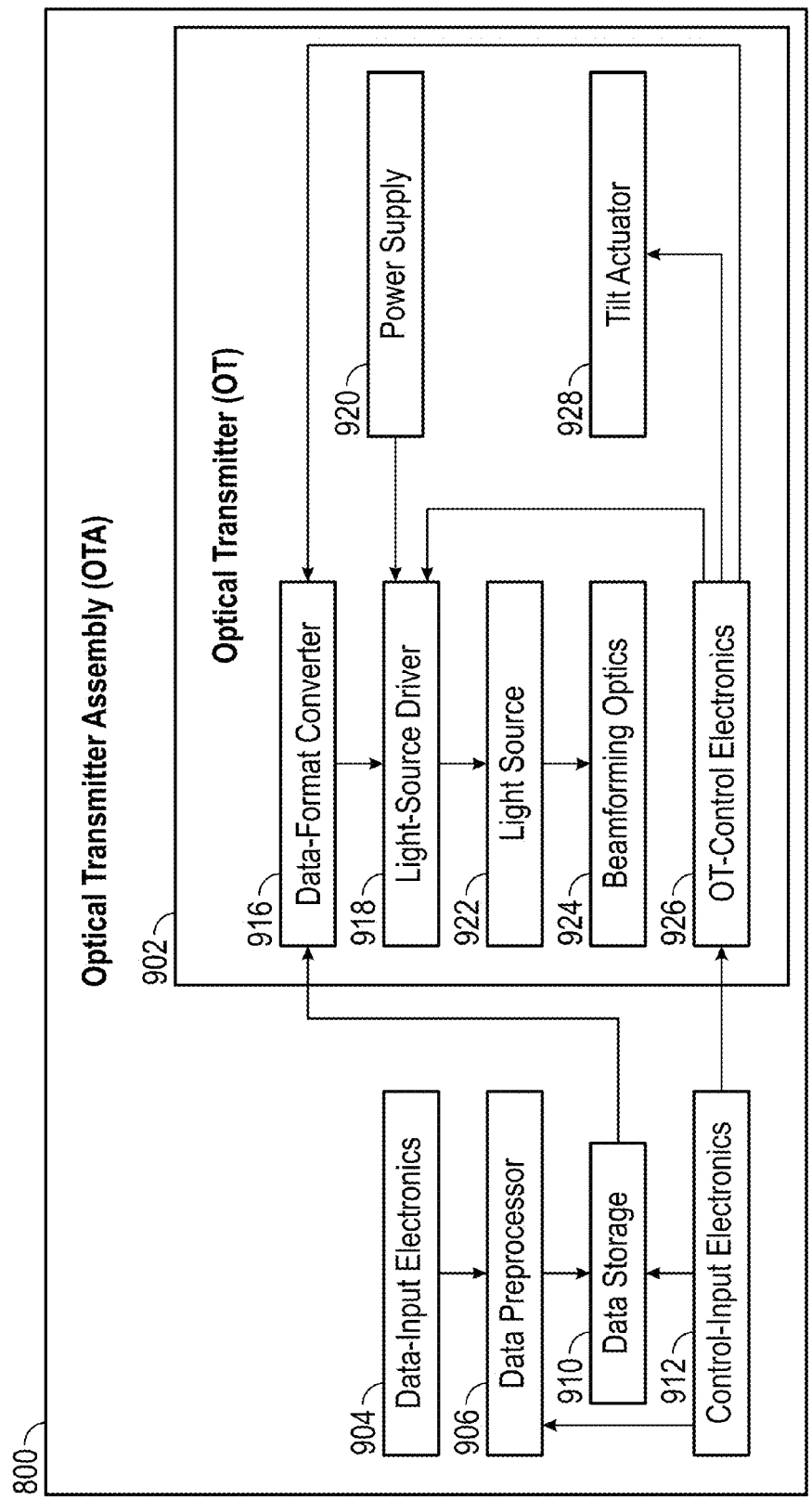
FIG. 9 depicts an example functional block diagram of an optical transmitter assembly.

An optical transmitter, e.g., optical beacon transmitter 104c, optical signal transmitter 104d, and/or combined optical transmitter 104e, may include one or more optical sources, one or more beam-forming optics, as well as electronics with associated software and/or firmware (see FIG. 9). The optical sources may be coherent (e.g., lasers) or incoherent (e.g., LEDs). The optical output of each optical source may be electronically modulated at a desired bit rate (or at one of a user-selectable range of bit rates) to transmit digital information in the form of a series of one-bits and zero-bits. The optical source(s) may produce optical radiation in a desired optical waveband. Each beam-forming optic can collect flux emitted by the one or more optical sources and utilizes refraction, reflection, and/or diffraction to concentrate it into a transmitted beam having a desired angular intensity distribution. In some cases, a beam-forming optic may include one or more spectral filters to minimize the amount of flux transmitted outside of a desired waveband.

The electronics and associated software (and/or firmware) of an optical transmitter, e.g., optical beacon transmitter 104c, optical signal transmitter 104d, and/or combined optical transmitter 104e, may perform one or more of the following functions: receiving and, if necessary, modifying timing pulses and/or electrical power received from optical transmitter assembly 104; receiving and properly interpreting various control signals sent to it from optical transmitter assembly 104; and receiving, from, e.g., data interface 104a by way of control electronics 104b, information or data in digital form that it will then output in digital optical form vis-à-vis an optical beam. It should be noted that in some embodiments, digital information or data may be received directly from data interface 104a.

FIG. 2B is a flow chart illustrating example operations that may be performed by optical transmitter assembly 104 and/or its component parts or elements. At operation 110, digital data to be optically transmitted may be received by optical transmitter assembly 104. As described above, the digital data to be optically transmitted may be received via data interface 104a. For example, a user, through source device 102 may upload a digital video advertisement to optical transmitter assembly 104. At operation 112, the digital data may be converted into one or more optical beacons and/or optical signals. For example, the digital video advertisement may be converted into an optically formatted representation of the digital video advertisement for transmission in the form of an optical signal. This operation is described in greater detail with respect to FIG. 9, and may involve performing one or more conversion, processing, and/or modulation operations at one or more of optical beacon transmitter 104c, optical signal transmitter 104d, and/or combined optical transmitter 104e under the control of control electronics 104b. At operation 114, the optical beacons and/or optical signals are transmitted by one or more of optical beacon transmitter 104c, optical signal transmitter 104d, and/or combined optical transmitter 104e. In the case of an optical beacon, information identifying, e.g., the user of source device 102, may be transmitted with the optical signal or converted into an optical beacon that is transmitted separately.

FIG. 3A illustrates optical receiver assembly 106 in more detail including one or more example components that may make up optical receiver assembly 106. For example, optical receiver assembly 106 may include one or more of an optical beacon receiver 106a, and an optical signal receiver 106b, or as an alternative, a "combined" optical receiver 106c that realizes the functionality of both optical beacon receiver 106a and optical signal receiver 106b. For example, combined optical receiver 106c may comprise a single optical receiver adapted to receive both optical beacons and optical signals.

In some embodiments, similar to optical transmitter assembly 104, optical receiver assembly 106 may include one or more tilt actuators allowing optical receiver assembly 106 to control the direction(s) from which its optical beacon receiver(s) and/or optical signal receiver(s) may receive optical beams transmitted by one or more optical transmitter assemblies, e.g., optical transmitter assembly 104.

The purpose of optical receiver assembly 106, as alluded to previously, may be to detect the presence of and/or receive data (in the form of optical beacons and/or optical signals) transmitted by optical transmitter assembly 104. For example, optical receiver assembly 106 may detect the presence of optical transmitter assemblies by detecting optical beacons sent by them, extract identifying information from optical beacons regarding, e.g., entities associated with the optical transmitters that sent the optical beacons, determining horizontal and/or vertical angular positions of optical transmitter assemblies (by sensing the direction of incidence of the optical beacons), and receiving information or data in the form of optical signals.

Optical receiver assembly 106 may comprise a data interface 106e that provides an interface between the optical receiver assembly and one or more users and/or user devices, e.g., user device 108. Data interface 106e may be responsible for receiving and transferring to users (or to users' devices, e.g., user device 108) information, such as identifying information and horizontal and/or vertical angular positions obtained by optical beacon receiver 106a regarding detected optical beacons. Data interface 106e may be responsible for receiving and transferring to users (or to users' devices, e.g., user device 108) data received via an optical signal by optical signal receiver 106b, for example. Optical receiver assembly 106 may be interfaced with user device 108 by way of a wired or wireless connection via data interface 106e. Software resident on user device 108 may be utilized by a user to operate optical receiver assembly 106. Additionally, the user may be able to specify the range of bit rates for signals to be received, error-correction methods to be used, and/or various other receiver operating parameters using user device 108, where the operating parameters may be transmitted to optical receiver assembly 106 via data interface 106e.

Optical receiver assembly 106 may comprise control electronics 106d. Control electronics 106d may supply timing pulses and electrical power to optical beacon receiver 106a, optical signal receiver 106b, or alternatively, to combined optical receiver 106c. Control electronics 106d may control the operation of optical beacon receiver 106a, optical signal receiver 106b, or alternatively, combined optical receiver 106c (e.g., turning them on and off, setting the data-output format, etc.). Data interface 106e may control the one or more tilt actuators that can be used to alter the direction(s) in which of one or more optical beacon receivers and/or one or more optical signal receivers may be pointed.

Optical beacon receiver 106a and/or combined optical receiver 106c may be adapted to detect the presence of one or more transmitted optical beams, distinguishing them from incident in-band radiation produced by radiation sources other than optical transmitters of an optical narrowcasting system (e.g., natural and artificial illumination sources). Optical beacon receiver 106a and/or combined optical receiver 106c may be configured to determine a horizontal and vertical angular position of one or more transmitted optical beams within its field of view (FOV). Optical beacon receiver 106a and/or combined optical receiver 106c may receive identifying information from one or more optical transmitter assemblies, e.g., optical transmitter assembly 104, whose optical beacons it has detected and received. For example, an optical transmitter assembly operated by a restaurant may transmit an optical beacon containing the (digitally encoded) name of the restaurant and/or type of restaurant in a format intended to be received by optical beacon receiver 106a and/or combined optical receiver 106c.

Optical beacon receiver 106a and/or combined optical receiver 106c may include one or more optical detectors or detector arrays, one or more collection optics, each including one or more optical components (e.g., lenses, reflectors, and/or diffractive optical elements), as well as its own control electronics with associated software (and/or firmware). A spectral filter may be included in each collection optic to increase communication range by reducing to low levels the out-of-band flux incident on the detector(s). Optical beacon receiver 106a and/or combined optical receiver 106c may be capable of detecting optical flux in the waveband and at the bit rates used by optical transmitters to transmit optical beacons it is designed to detect. The component parts of optical beacon receiver 106a and/or combined optical receiver 106c are described in greater detail with respect to FIGS. 26-27.

In some cases, an optical beacon receiver may share some or all of its detectors, collection optics, electronic hardware, and software/firmware with one or more optical signal receivers, an embodiment of which may be combined optical receiver 106c. The electronics and associated software (and/or firmware) of optical beacon receiver 106a and/or combined optical receiver 106c can perform at least one or more of the following functions: receive and (if necessary) modify timing pulses and electrical power sent to it by optical receiver assembly 106; receive and properly interpret various control signals sent to it by optical receiver assembly 106; and transfer to optical receiver assembly 106, information (e.g., identifying information and angular position) it has obtained regarding optical beacons it has detected.

Optical signal receiver 106b and/or combined optical receiver 106c may receive optical signals from one or more optical transmitter assemblies, e.g., optical transmitter assembly 104. Optical signal receiver 106b and/or combined optical receiver 106c may convert the optically formatted digital data into digital data in electronic form. Similar to optical beacon receiver 106a, optical signal receiver 106b and/or combined optical receiver 106c may include one or more optical detectors or detector arrays, one or more collection optics, and control electronics with associated software (and/or firmware). In the case of combined optical receiver 106c, the component parts of optical beacon receiver 106a may be adapted to also operate as an optical signal receiver. The optical detectors can detect optical flux in the waveband and at the bit rates used by optical transmitters to transmit optical signals and/or optical beacons it is designed to receive. Each collection optic may collect incident in-band flux over its entrance pupil and within its specified FOV, and utilize refraction, reflection, and/or diffraction to concentrate it onto one or more of the optical detectors. A spectral filter may also be included in each receiver optic to increase communication range by reducing the out-of-band flux incident on the detectors to lower levels.

It should be noted that one or more of the aforementioned optics and/or detectors or detector arrays that, in part, make up optical beacon receiver 106a, optical signal receiver 106b, and/or combined optical receiver 106c may be custom manufactured and/or commercially available. For example, one or more refractive optics may be customized with respect to one or more optical characteristics or properties such that its operation may be optimized for use in optical receiver assembly 106. For example, one or more optical detectors or detector arrays may be commercially available near-IR detectors or detector arrays.

The electronics and associated software (and/or firmware) of optical signal receiver 106b and/or combined optical receiver 106c can perform one or more of the following functions: receive and (if necessary) modify timing pulses and electrical power sent by the optical receiver assembly 106; receive and properly interpret various control signals sent to it by optical receiver assembly 106; and transfer digital data received from one or more optical transmitters, e.g., optical signal transmitter 104d and/or combined optical transmitter 104e, to optical receiver assembly 106. In some embodiments, the electronics and associated software (and/or firmware) may be customized to provide appropriate electrical power to operate the optical detectors. Moreover, it should be noted that electronics hardware and/or software may continuously monitor the output of the optical detectors, determining when an output therefrom may represent a signal sent by an optical transmitter—as opposed to, for example, flux received from artificial or manmade illumination sources.

Once an optical beacon has been detected, optical receiver assembly 106 may receive a related optical signal and store it as a data file in its memory. For example, optical receiver assembly 106 may buffer its detector outputs using one or more memory units or memory partitions to permit at least a portion of a given optical signal to be received prior to it being recognized as an actual optical signal. Alternatively, optical transmitter assembly 104 may transmit an optical signal that contains at its beginning, a short "alert"-pulse sequence. This alert-pulse sequence may inform optical receiver assembly 106 that transmission of an optical signal dataset has begun, thereby allowing it to store the entire dataset in its memory, without the need for buffering. That is, optical beacon transmitter 104c of optical transmitter assembly 104 may transmit an optical beacon followed by an optical signal that begins with an alert-pulse sequence. These operations may be continuously repeated by optical transmitter assembly 104. In some embodiments, each transmitted optical beacon may end with an alert-pulse sequence, rather than having an alert-pulse sequence be included at the beginning of each transmitted optical signal.

FIG. 3B is a flow chart illustrating example operations that can be performed by an optical receiver assembly, e.g., optical receiver assembly 106 and/or its component parts or elements. At operation 120, optical receiver assembly 106 may detect the presence of an optical beacon that can be transmitted by optical transmitter assembly 104. As previously discussed, an optical beacon may be an optical beam comprising information identifying a source of the optical beacon. An optical beacon may also allow an optical receiver assembly 106 to estimate the horizontal and vertical angular position of its associated optical transmitter assembly relative to the FOV of one or more optical beacon receivers comprising part of the optical receiver assembly 106. At operation 122, the angular position of the optical beacon relative to the FOV(s) of one or more optical beacon receivers is determined based on its incident propagation direction. Because a plurality of optical beacons and/or optical signals may be transmitted within optical narrowcasting system 100, the angular position of an optical beacon transmission may be utilized to point or focus optical signal receiver 106b or combined optical receiver 106c in the direction of optical transmitter assembly 104 from where the optical beacon and associated optical signal(s) may originate. The angular position of an optical beacon transmission may also be utilized for other purposes, such as to assist a user in navigating to a location at which an OTA is located. At operation 124, the identification information may be extracted from the optical beacon, the identification information being indicative of or otherwise identifying the source of the optical beacon. In this context, the source of the optical beacon may be optical transmitter assembly 104, source device 102 and/or a user or entity utilizing source device 102 to transmit optical beams via optical transmitter assembly 104. At operation 126, information sent in the form of an optical signal by the source of the optical beacon may be extracted. Again, the source of an optical signal and the source of an optical beacon with which it is associated may be one in the same, e.g., source device 102 or optical transmitter assembly 104, or alternatively a user or entity utilizing source device 102 to transmit optical beams via optical transmitter assembly 104.

In some embodiments, optical narrowcasting system elements, such as optical receiver assemblies, may be integrated into a device, e.g., user device 108. That is, user device 108 may have resident optical receiver functionality. Alternatively, optical receiver assemblies may be operatively and communicatively connected to user device 108. In this case, an optical receiver assembly may be added to user device 108 as an attachment or enhancement. The same can be true for optical transmitter assemblies, although, in some cases, optical transmitter assemblies may be "stand-alone" elements that are fixed at a particular location.

Figure 4A:
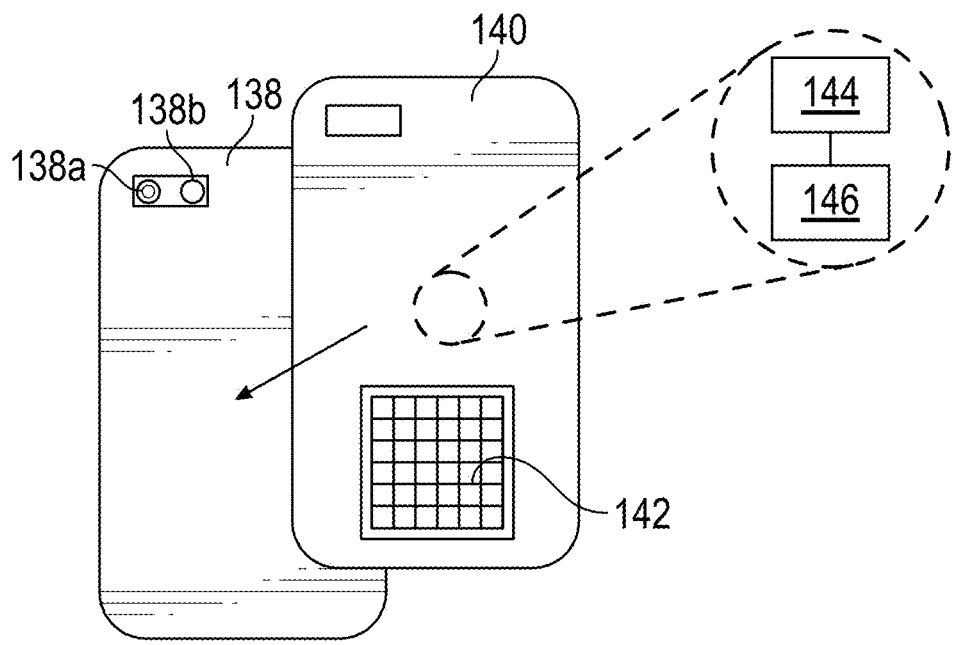
FIG. 4A illustrates an example of an optical receiver assembly attachment.

FIG. 4A illustrates an example of an optical receiver assembly attachment. In the illustrated embodiment, optical receiver assembly 142 may be incorporated into a user device case 140 for user device 138 (e.g., a smartphone case for a smartphone device). It should be noted that the "visible" aspects of optical receiver assembly 142 may include one or more optical receiver elements, such as one or more lenses or lenslet arrays and one or more optical detectors. For example, optical receiver assembly 142 of FIG. 4A may include a lenslet array and detectors, each lenslet in the array having an optical detector in its focal plane. It should be noted that the optical detectors are not visible in FIG. 4A because they are hidden behind the lenslets. Other components parts of optical receiver assembly 142 may be incorporated into user device case 140, but may not be visible when user device case 140 is placed on user device 138.

Figure 4B:
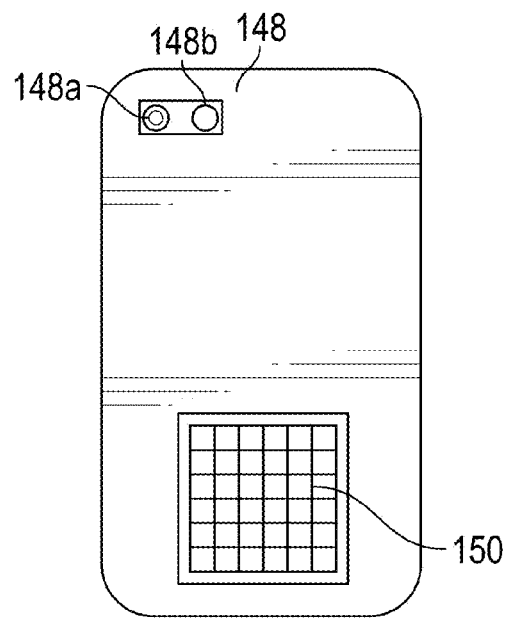
FIG. 4B illustrates an example of an optical receiver assembly that is incorporated into a device.

FIG. 4B illustrates an example of an optical receiver assembly that is incorporated into a device. In particular, optical receiver assembly 150 may be incorporated directly into user device 148. For example, during the manufacturing of user device 148, optical receiver assembly 150 may be installed. Again, although only visible aspects of optical receiver assembly 150 are shown, other components of optical receiver assembly 150 may be incorporated into user device 148 within the housing of user device 148.

As alluded to previously, a user may utilize a device to interact with an optical receiver assembly to input operating parameters, receive transmitted data, control the optical receiver assembly, etc. The software/software applications may be utilized by the user to manage messages received optically. In addition, if the user is a subscriber of a social media service, the controlling software may allow the user to access all of the capabilities of that service, such as posting optically received messages, images, videos, or other information on a social media "page," viewing and responding to posts on other users' pages, sharing posts, etc., in the usual manner in which such tasks are performed within the context of social media services.

To that end, FIG. 4A illustrates that user device case 140 may also include one or more communications elements that allow user device 138 and optical receiver assembly 142 to communicate and/or interact. For example, as described above, user device 138 may be utilized by a user to input operating parameters for optical receiver assembly 142, etc. As illustrated in FIG. 4A, one such communications element 144 may be a Bluetooth® transceiver, an NFC transceiver or other communications element. If needed, a power supply 146 (e.g., a compact battery, an energy harvesting sensor, or other appropriate power source) may be provided to energize communications element 144. Here, communications element 144 and power supply 146 may embedded in or located on the device-facing side of case 140 for aesthetics and/or to gain closer operating proximity to user device 138. It should be noted that power supply 146 may also provide power to optical receiver assembly 142, or optical receiver assembly 142 may have its own power source that can be used to power communications element 144. In some embodiments, optical receiver assembly 142 and/or communications element 144 may be integrated into a single unit or device that may be attached to an input/output port, such as a micro-USB or Lightning port of user device 138.

Figure 60:
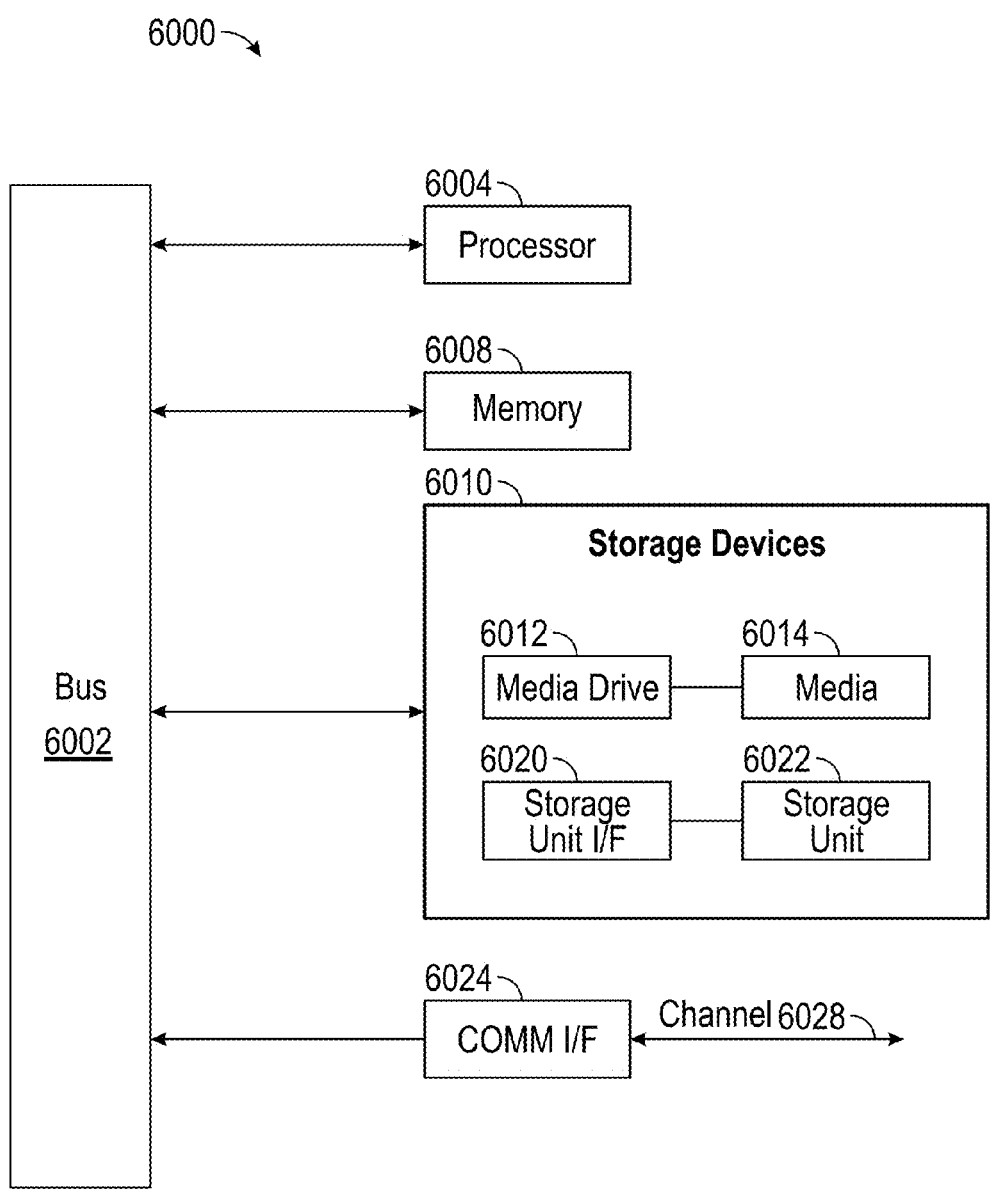
FIG. 60 illustrates an example computing module that may be used to implement various features of the methods disclosed herein.

In the case of user device 148, a user may control optical receiver assembly 150 and/or perform the above-noted functions and/or interactions via a hardwired connection between optical receiver assembly 150 and one or more processors, memory units, and/or other applicable components of user device 148, which may be an embodiment of a computing component illustrated in FIG. 60.

Figure 5A:
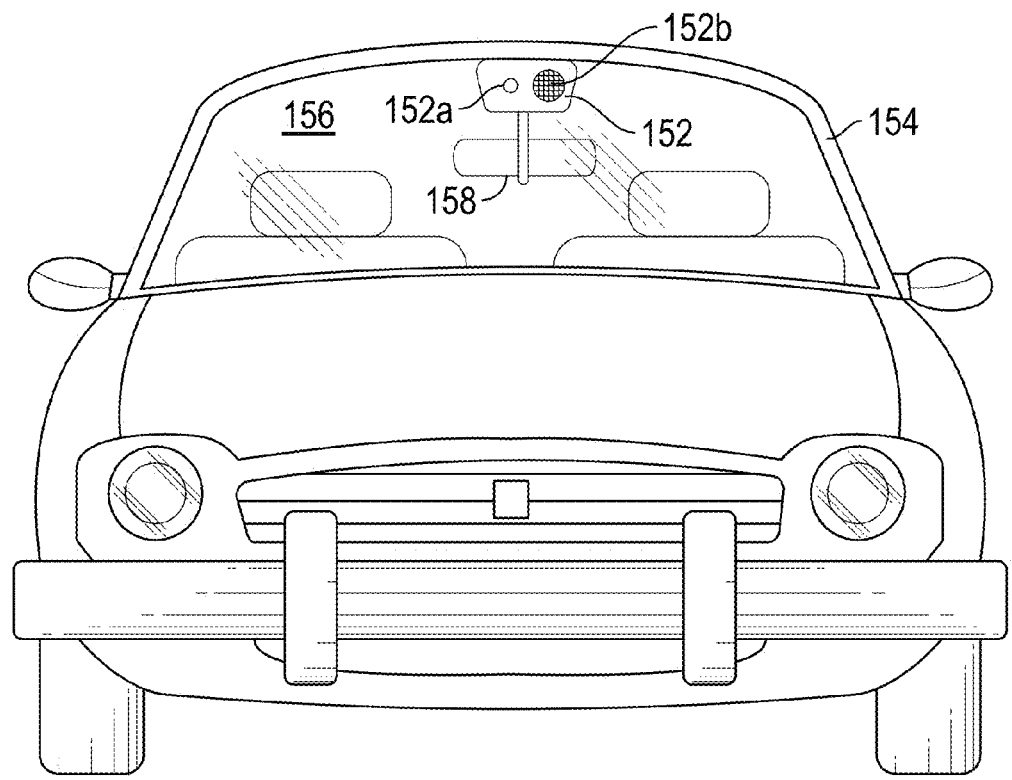
FIG. 5A illustrates a frontal view of an automobile in which an optical receiver assembly is installed in and electronically interfaced with a vehicle.
Figure 5B:
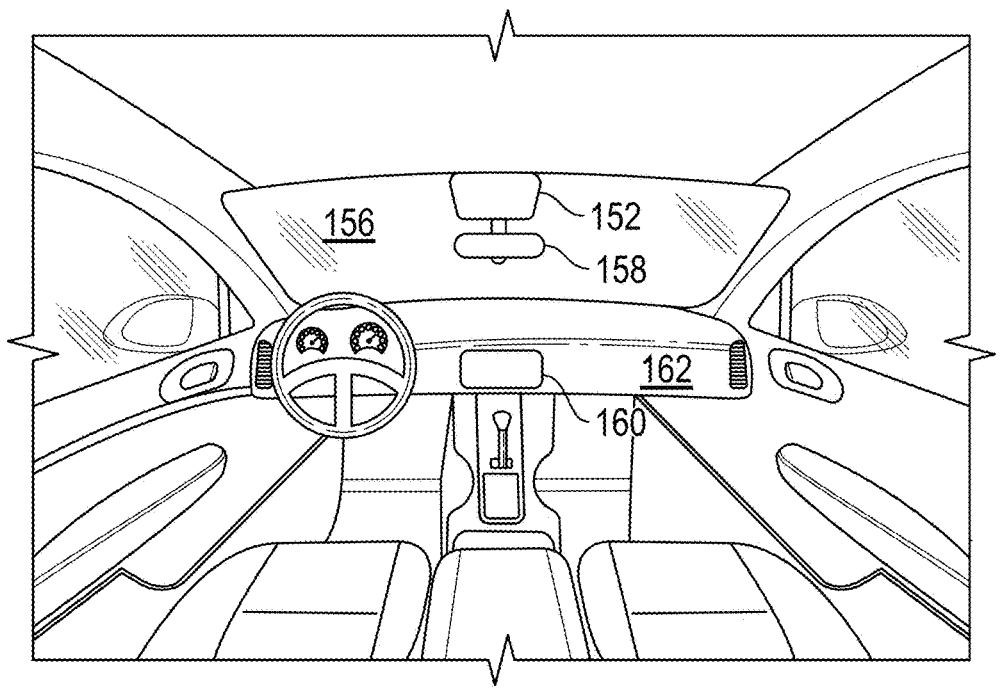
FIG. 5B illustrates an example interior view of the automobile of FIG. 5A.

FIGS. 5A and 5B depict a contemplated implementation where an optical receiver assembly 152 may be installed in and electronically interfaced with a vehicle. FIG. 5A illustrates a frontal view of an automobile 154 in which an optical receiver assembly 152 is installed in automobile 154 near a top portion of windshield 156 above rearview mirror 158. Optical receiver assembly 152 may be attached to the outside of windshield 156 or on an inside surface of windshield 156. In the latter case, optical receiver assembly 152 may receive optical beacons and/or optical signals that have passed through windshield 156. Although optical receiver assembly 152 is shown to be mounted near the top of windshield 156 and above rearview mirror 158, optical receiver assembly 152 may be mounted on a different part of windshield 156 or on another part of automobile 154 entirely (e.g., on its roof) so long as it is in a position to receive one or more optical beams.

Optical receiver assembly 152 may include an optical beacon receiver 152a and an optical signal receiver 152b, as well as any electronics and/or software (and/or firmware), e.g., the aforementioned control electronics, data interface, etc. utilized in operating optical receiver assembly 152 and/or communicating with, e.g., media and/or information systems resident in a vehicle such as a vehicle's navigation system, media, system, heads-up display, etc. It should be noted that the electronics and software/firmware are not visible in the frontal view depicted in FIG. 5A, but are nevertheless present in optical receiver assembly 152 and/or in an associated component(s). In some embodiments, optical beacon receiver 152a and optical signal receiver 152b may share some or all of their optical components and optical detectors or detector arrays.

FIG. 5B illustrates an example interior view of automobile 154 of FIG. 5A. In FIG. 5B, a back or rear portion of optical receiver assembly 152 is visible above rearview mirror 158. As is also illustrated in FIG. 5B, automobile 154 may be equipped with a display 160, such as touchscreen information display mounted on a dashboard 162. Display 160 may be utilized by a driver and/or passenger of automobile 154 to operate optical receiver assembly 152 and/or view information received by optical receiver assembly 152 from one or more optical transmitter assemblies. In some embodiments, optical receiver assembly 152 may be hard-wired or wirelessly connected to display 160 (or one or more processors controlling display 160 (not shown)).

In some embodiments, unmodified user devices may be utilized in an optical narrowcasting system. For example, an existing camera 138a of user device 138 may be utilized as an optical receiver assembly. As another example, software may be used to generate a modulated optical beam comprising optical beacons and/or optical signals by modulating the output from one or more LEDs designed for use as photographic flash units, e.g., LED 138b of user device 138.

In some embodiments, optical receiver assemblies 142, 150, and/or 152 may incorporate high-bit-rate near-IR optical detectors. High-bit-rate optical detectors can receive data at higher bit rates than may be possible using existing hardware of a user device, e.g., camera 138a.

Referring back to FIG. 3B, various operations may be performed by an optical receiver assembly to detect the presence of optical beacons, determine the angular position of optical beacons, receive identifying information from optical beacons, and ultimately receive information transmitted via an optical signal. From a user's perspective, interactions with an optical narrowcasting system (aside from, e.g., controlling the operation of an optical receiver assembly) can involve selecting visual representations of sources of one or more optical beacons that have been detected and receiving and/or interacting with information received from one or more optical signals.

Figure 6:
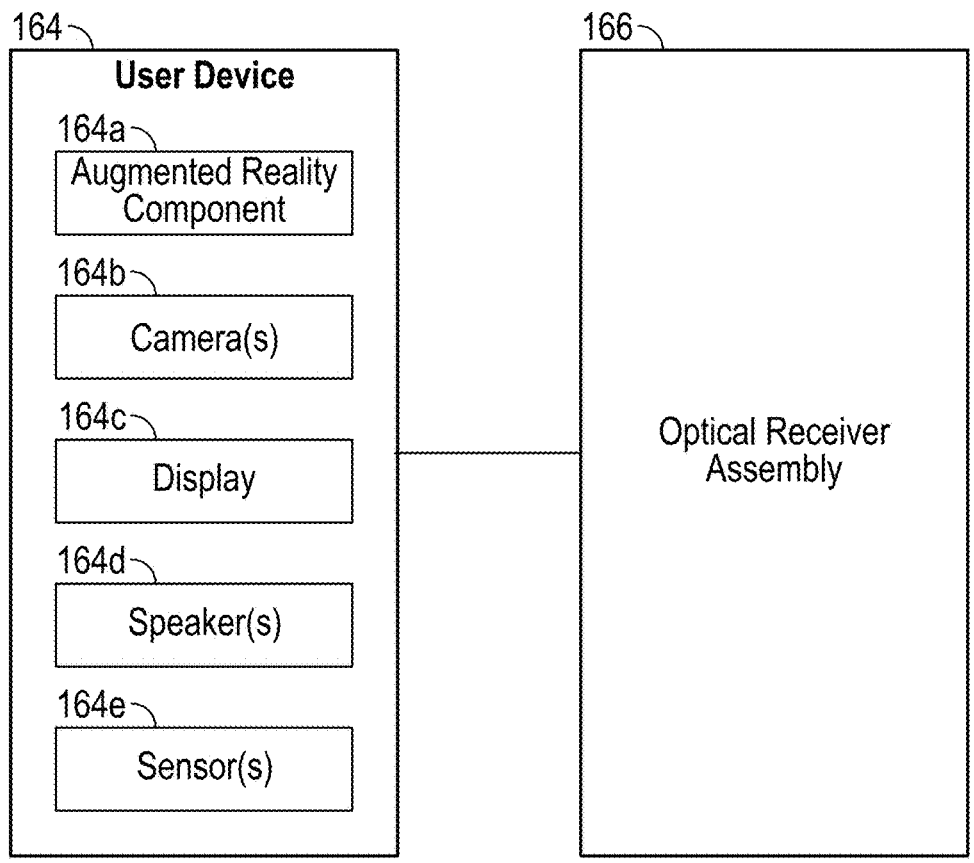
FIG. 6 illustrates a user device that is operatively and/or communicatively connected to an optical receiver assembly.

In some embodiments, augmented reality functionality resident in or available through a user device, e.g., user device 108 (see FIG. 1), may be utilized to facilitate the above-noted user interactions with one or more aspects of optical narrowcasting system 100. FIG. 6 illustrates a user device 164 (which can be one embodiment of user device 108) that is operatively and/or communicatively connected to an optical receiver assembly 166 (which can be one embodiment of optical receiver assembly 106).

User device 164 may comprise an augmented reality component 164a, one or more cameras 164b, a display 164c (which may be a touchscreen or non-touchscreen display), one or more speakers 164d, and/or one or more sensors 164e. User device 164 may, in part, embody an augmented reality device that is capable of displaying a real-time view of a physical, real-world environment while altering elements within the displayed view of the environment. As such, unlike a virtual reality device which displays a view of an entirely computer-generated world, an augmented reality device displays a view of the real world but augments (e.g., adds or modifies) elements using computer graphics technology. Such an augmented reality device may include and/or be communicatively coupled to a camera device (or multiple camera devices) used to capture a view of the real-world environment and may further include computer software and/or hardware configured to augment elements of the captured scene. For example, and as will be described in greater detail herein, an augmented reality device could capture a series of images or a scene representative of a user's view of a street, city, or other location, modify the series of images so that detected optical beacons appear as overlaid, selectable items or icons in real-time to a user. As such, the user can be presented with an augmented view of the physical real-world environment in which the user is located.

The one or more cameras 164b may include cameras for capturing the visual scene. The one or more cameras 164b may be an existing camera(s) of user device 164, which may be, for example, a smartphone. As used herein, a visual scene refers to one or more views of the real-world environment in which user device 164 is being used (and in which one or more optical beacons and/or optical signals are being transmitted in an optical narrowcasting system).

For example, video imagery captured by one or more cameras 164b and presented on display 164c may be a live feed of an urban scene viewed from the perspective of a user who is utilizing user device 164 to explore a particular city. An icon representative of an optical beacon detected by optical receiver assembly 166 may be overlaid on the scene commensurate with the location of a source of the optical beacon. As previously discussed, optical beacons may be transmitted by optical transmitter assemblies, and optical receiver assembly 166 may detect the optical beacon and extract identifying information therefrom. For example, the overlaid icon may be representative of a hotel in the line of sight of the user that is transmitting descriptive or advertising information. There may be accompanying text that indicate the name and location of the source of the optical beacon, e.g., the name and address of the hotel.

One example of one or more sensors 164e may be an accelerometer capable of measuring the physical acceleration of user device 164, e.g., when manipulated by the viewer (as the user scans the urban scene to obtain information about one or more businesses, points of interest, etc.). User device 164 may use the accelerometer to determine when the position of user device 164 is changing, for example, which could indicate that the position of user device 164 is changing relative to one or more transmitted optical beacons and/or the scene itself. Augmented reality component 164a may also on its own or with assistance from the accelerometer, determine the positioning of an optical beacon relative to user device 164. It should be noted that other sensors, such as GPS receivers, compasses, gyroscopes, and/or other sensors may be utilized to more accurately characterize or further enhance one or more aspects of an augmented reality experience provided by augmented reality component 164a.

Augmented reality component 164a may control aspects of presenting the augmented reality view of the urban scene on display 164c, such as how optical-beacon-derived information may be presented, e.g., via static icons, animated elements. Augmented reality component 164a may control the incorporation of position or location-aiding cues or visuals, as well as the presentation of information extracted from one or more optical signals associated with the optical beacons, reacting to user inputs and/or selections, among other aspects.

For example, information received by an optical beacon receiver of optical receiver assembly 166 may be cached after it has been received. Caching may occur immediately after receipt. Icons/markers used to represent detected optical beacons can be located in the augmented reality visual scene such that the location of each of the icons/markers may coincide with the corresponding optical transmitter assemblies' actual location within one or more cameras 164b's FOV. The icons/markers may "stay" in their correct locations as one or more cameras 164b is zoomed, panned, or otherwise moved, resulting in a location-accurate augmented reality experience.

For example, a user may select an icon representative of a particular optical beacon by touching or otherwise actuating the icon, and as described above, information regarding the source of the optical beacon may be presented, e.g., via a pop-up window. It should be noted that touching different areas of the pop-up window may bring up different types of additional information regarding the source of the optical beacon. In some embodiments, the additional information may be considered identifying information associated with the source of the optical beacon that can extracted from the optical beacon. In some embodiments, the additional information may be information that has been extracted from an optical signal transmitted by the same source as that of the optical beacon, or a related optical signal source. For example, the additional information may comprise advertising multimedia that can be presented to the user via display 164c and/or the one or more speakers 164d.

In some embodiments, one or more boxes or other representative graphic overlaid on the display of live imagery from the camera(s) may be used in an augmented reality experience, where the size and position of each of the boxes can represent the size and position of an FOV associated or commensurate with each optical signal receiver of optical receiver assembly 166. A user may take advantage of such FOV representations by, e.g., tilting user device 164 such that an icon/marker representing a detected optical beacon may be moved within one of the FOV-representative boxes. The user may select the icon/marker to initiate optical receiver assembly 166's receipt of one or more optical signals corresponding to the detected optical beacon.

The augmented reality experience comprising at least the augmented reality scene, which include one or more selectable representations (and/or associated information) of one or more detected optical beacons and/or signals may be thought of an optical narrowcasting graphical user interface (GUI).

In some embodiments, augmented reality component 164a may permit recording of the augmented reality scene and embedding any optical beacon-extracted information, angular positioning information, as well as optical signal-extracted information in the resulting media file. If desired, the user may disseminate the recorded scene via, e.g., social media outlets, to be accessed by others. This embedding technique can allow optically transmitted information to be accessed in a non-real-time manner, not only by the user, e.g., at a later time, but by social-media subscribers or others (e.g., on social-media sites), which may provide an enhanced social-media experience for social-media subscribers and may significantly increase the number of viewers of optically narrowcast information (e.g., advertisements), as well as provide new opportunities for social-media services to generate online advertising revenue.

Figure 7:
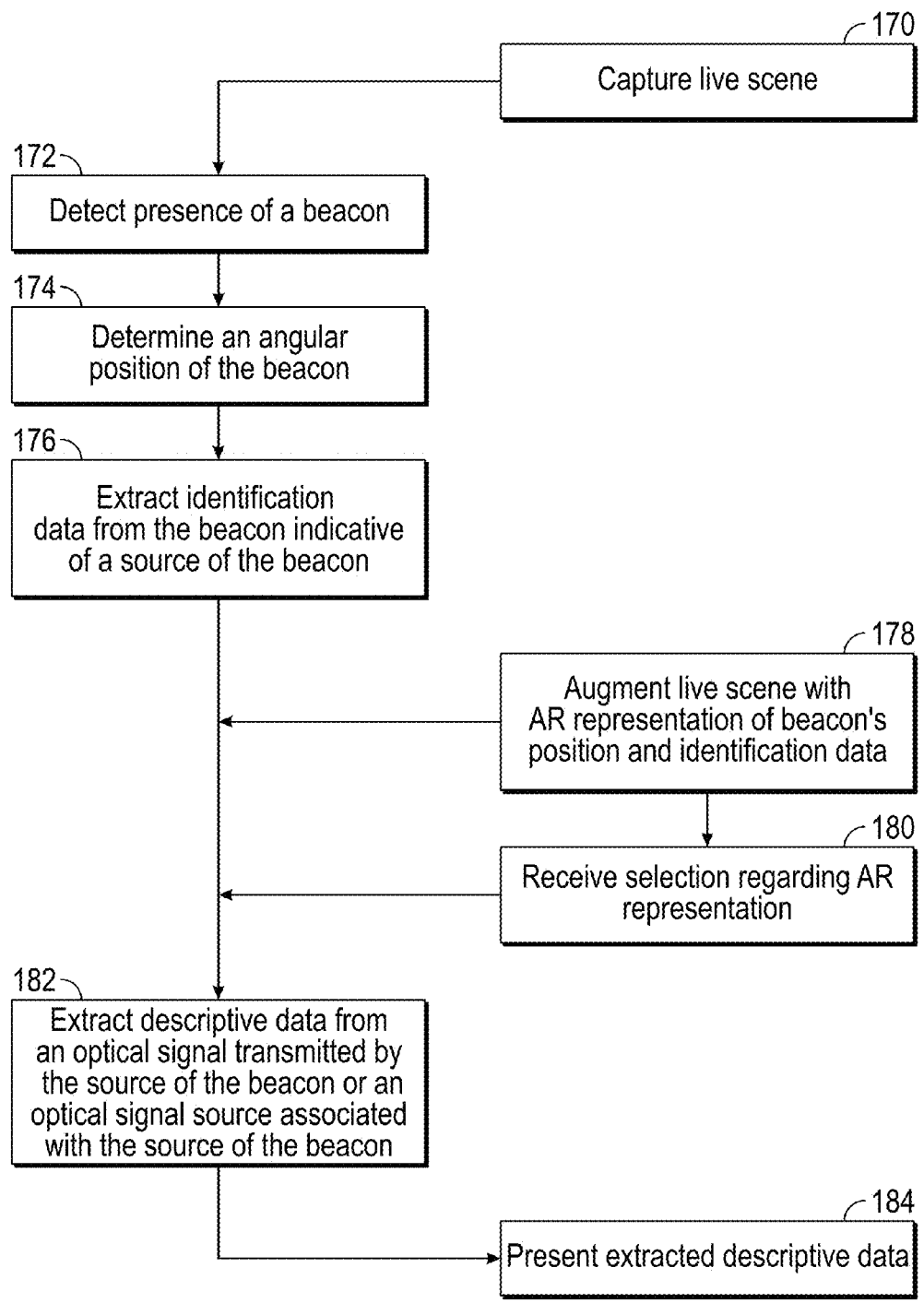
FIG. 7 is a flow chart illustrating example operations that may be performed by a user/controlling device and optical receiver assembly within an optical narrowcasting system.

FIG. 7 is a flow chart illustrating example operations that may be performed by a user/controlling device and optical receiver assembly (which, as described previously, may be embodied in a single device or in, e.g., two devices that are operatively connected) within an optical narrowcasting system. At operation 170, a live scene may be captured. As described above, the live scene may be one or more, or a series of images representative of a real-world scene. The capture can be performed by one or more cameras of the user/controlling device, such as one or more cameras 164*b* of user device 164.

At operation 172, optical receiver assembly 166 may detect the presence of an optical beacon that can be transmitted by an optical transmitter assembly of an optical narrowcasting system. As previously discussed, an optical beacon may be an optical beam comprising information identifying a source of the optical beacon.

At operation 174, the horizontal and vertical angular position of the optical beacon is determined by measuring the propagation direction of the optical beacon relative to the FOV of one or more optical beacon receivers that are part of the optical receiver assembly 166. Because a plurality of optical beacons and/or optical signals may be transmitted within an optical narrowcasting system, the angular position of an optical beacon transmission may be utilized to point or focus one or more optical signal receivers of optical receiver assembly 166 in the direction of a source from where the optical beam and an associated optical signal may originate. In addition, knowledge of angular positions of optical beacons may be useful in helping the user determine the locations of and/or navigate to optical transmitter assemblies from which optical beacons have been received.

At operation 176, the identification information may be extracted from the optical beacon, the identification information being indicative of or otherwise identifying the source of the optical beacon. As noted previously, the source of the optical beacon may be an optical transmitter assembly, a source device, and/or a user or entity utilizing the source device to transmit optical beams via the optical transmitter assembly.

At operation 178, the live scene (captured at operation 170) may be augmented with an augmented reality representation of the beacon's position, and identification data may be presented. As discussed, angular positioning and identifying information may be obtained from or in relation to an optical beacon and presented by augmented reality component 164*a*, alone or in accordance with information obtained by one or more sensors 164*e*. The augmented reality representation may include one or more graphical representations of at least the identifying information, as well as representations of the positions of received optical beacons (e.g., by utilizing symbols or icons overlaid on the displayed live camera imagery at the locations of optical beacons relative to that imagery). The augmented reality representation may be presented on display 164*c*.

At operation 180, one or more selections regarding the augmented reality representation may be received. A user of user device 164 may utilize display 164*c*, if, for example, display 164*c* is a touchscreen, or some other input device or mechanism to select the augmented reality representation. There may be multiple augmented reality representations presented on display 164*c*, and the user may select one that is of interest.

At operation 182, descriptive data or information from an optical signal sent by the source of the optical beacon or by an optical-signal source associated with the source of the optical beacon may be extracted. Again, the optical-signal source and the beacon source may be one in the same, e.g., a source device or optical transmitter assembly, or alternatively a user or entity utilizing the source device to transmit optical beams via the optical transmitter assembly.

At operation 184, the extracted descriptive data may be presented to the user. In some embodiments, the extracted descriptive data may be presented in a manner that further augments the live scene or augmented reality experience. In some embodiments, the extracted descriptive data may be presented in or via another application or using other software, such as a media player, a web browser, etc. In some embodiments, the extracted descriptive data may be a universal resource locator (URL) that can be used to direct a web browser to display a particular webpage or website.

It should be noted that the example applications and use case scenarios described herein are not limiting, and that an optical narrowcasting system may be utilized in many other applications or scenarios. For example, an optical narrowcasting system may be used to enhance merchandise displays in stores or store windows, where information regarding one or more products for sale may be presented to consumers through an augmented reality experience that leverages the information exchange made possible by an optical narrowcasting system. For example, the optical narrowcasting system may be used to optically transmit not only product information, but other information, such as store hours and/or other information of interest to potential customers. Billboards and other locations where out-of-home advertising is utilized may leverage optical narrowcasting to make visual aspects of the advertising more appealing and/or viewable from farther away, while also providing much more information than can currently be provided via, e.g., a billboard image/text.

New social media sites and/or applications may be based on the sharing of content obtained via optical narrowcasting, and if desired, generating income through online ads appearing on these sites and applications. For example, a social media application may allow individuals to use smartphones and other portable devices to create and share videos and photos containing embedded optically transmitted content.

In various embodiments, optical narrowcasting may be considered highly localized in nature, where the term "localized" can refers to the ability to transmit data from one location to another with a sufficiently small path length to prevent excessive bit errors. This characteristic can be leveraged in a social media context to obtain information that might otherwise be difficult or impossible to obtain regarding the location of people sending the information. For example, one or more optical receiver assemblies may be mounted in the ceiling of a store to collect customer feedback. The optical receiver assemblies' respective FOVs can be designed to only pick up information optically transmitted by people actually in the store. In addition, optical information does not pass through walls, floors, or ceilings, as WiFi signals may often do. Using an array of optical receiver assemblies, detailed information about where people are within the store could also be obtained. This could be used to provide accurate navigation within the store, with a search feature to help people locate specific products they're interested in.

The localized nature of the optical narrowcasting may also be used to motivate people to visit a particular geographic location, e.g., by encouraging people to transmit contact information to an optical receiver assembly (found in a store, for example) using an optical transmitter assembly controlled by a social media application on a user device. Optical narrowcasting may provide superior localization relative to what could be achieved using WiFi or built-in location sensors. A network of optical receiver assemblies may be created at certain locales allowing users to share information about the surrounding area, share relevant text, photos, videos, etc.

Security, privacy, and/or anonymity can be achieved through the use of an optical narrowcasting system. Unlike, e.g., WiFi networks, that require users to log into the network in order to obtain service, a user may receive an optical beam without disclosing any sensitive information (or any information for that matter). Moreover, the optical beam transmitted by an optical transmitter assembly can be made quite narrow, if desired, to limit the receipt of the optical beam to only those optical receiver assemblies in line with the narrow width of the optical beam.

An appealing characteristic of optical narrowcasting is that the transmittal of information is unobtrusive, indeed invisible. That is, only people that are interested in obtaining optically transmitted information can see (e.g., via an augmented reality experience) the information.

Figure 8:
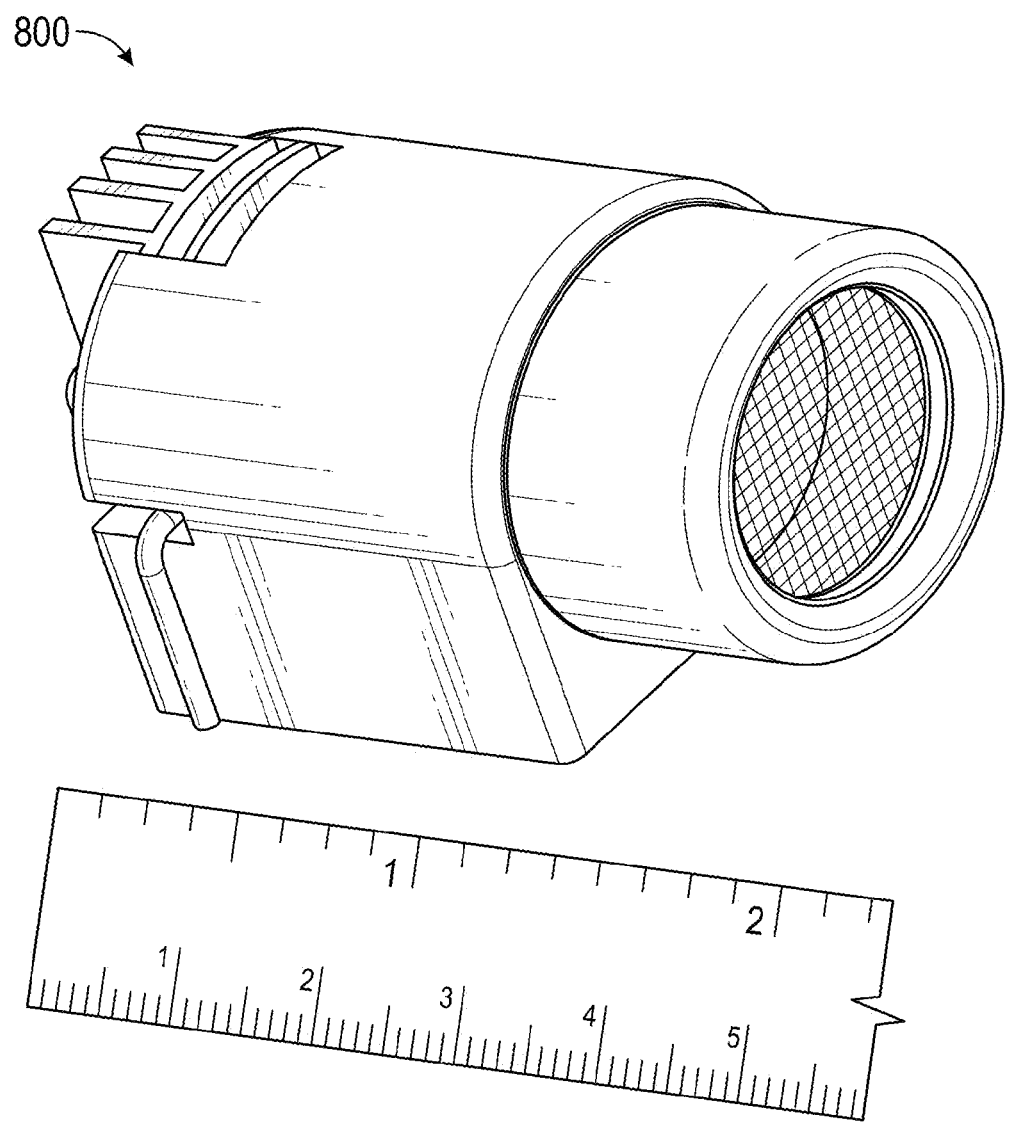
FIG. 8 is a depiction of an example optical transmitter assembly.

FIG. 8 is a depiction of example optical transmitter assembly (OTA) 800. The OTA 800 is capable of providing one or more long-range, high-bandwidth optical narrowcast signals. While typical smartphone communications are solely based on the transmission of radio waves (e.g., cellular networks, WIFI, GPS, and Bluetooth®), the OTA 800 transmits one or more optical beacons and/or optical signals, i.e., one or more modulated beams of optical radiation. In various embodiments, the OTA 800 may be part of a one-way or two-way communications system. It will be appreciated that, in some embodiments described herein, nonimaging optical design techniques are utilized to design small-form-factor beamforming optics for the OTA 800, such that it may exhibit unexpected range and information bandwidth performance for a device of its size.

In various embodiments, the OTA 800 is a device including electronics, software (and/or firmware), and one or more optical transmitters (OTs) (described herein) that transmit optical beacons and/or optical signals as part of an optical narrowcasting system (ONS). The OTA 800 may be capable of long communication range, providing sufficient information at long distances for streaming video with low, correctable error rates. In one example, the modulated optical beams provided by the OTA 800 may be received by an ORA described herein. The ORA may include or be attached to a digital computing device such as a smartphone, media tablet, laptop, camera, game device, wearable device (e.g., smartwatch), or the like.

The OTA 800 may generate and transmit optical beacons and/or optical signals in the visible, near-infrared (IR), or other optical bands produced using incoherent optical sources (e.g., LEDs), coherent optical sources (e.g., lasers), or the like. An optical beam is a beam of electromagnetic waves in the spectral region from the extreme ultraviolet (UV) to the far IR, which may include wavelengths in the range of 10 to $10^6$ nm. It will be appreciated that the OTA 800 may generate and transmit optical beams at any wavelength or range of wavelengths in the aforementioned spectral region. For example, the OTA 800 may generate and transmit optical signals in the visible or near-infrared (IR) bands.

The OTA 800 may generate optical beam(s) that transmit information to another location through air, water, transparent solids (e.g., glass windows), and/or space (i.e., a vacuum). The propagation path of a beam transmitted by an optical transmitter may be direct (i.e., line of sight) or indirect. In an example of an indirect path, the beam may reflect and/or scatter off of one or more liquid and/or solid objects before being received by an ORA.

In various embodiments, a single OTA 800 may produce optical beams having different intensity distributions as a function of horizontal and vertical angular coordinates. In some embodiments, two or more different OTAs 800 may each produce two or more different optical beams having different intensity distributions.

The OTA 800's electronics and associated software (and/or firmware) perform various useful functions, such as, but not limited to: providing an interface between the OTA 800 and one or more of its user's or users' computing devices, supplying timing pulses and electrical power to its OT(s), controlling the operation of its OT(s) (e.g., turning them on and off, setting their data-transmission rate, or the like), transferring digital data to one or more of the OTs for them to output as one or more digitally modulated optical beams, and controlling one or more tilt actuators to alter the pointing direction(s) of the output optical beam(s).

The OTA 800 may be compact as depicted in FIG. 8. For example, the OTA 800 may be 2 inches in length or be shorter than 2 inches. Various example components of the OTA 800 are described herein. It will be appreciated that the OTA 800 may be any length including longer than 2 inches or shorter than 2 inches. In some embodiments, length of the OTA 800 may produce different performance characteristics (e.g., communication range, bit rate, beam width, or the like).

The OTA 800 may be mobile or stationary. For example, a dedicated OTA 800 may be stationary and installed on various structures (e.g., buildings and billboards) or it may be mobile, due to it being installed on vehicles (e.g., buses, automobiles, and aircraft). In addition, it may be mobile due to it being a portable or wearable device, or due to it being a component of or attachment to a portable or wearable device.

Although FIG. 8 depicts an OTA 800 for optical communication, it will be appreciated that a smartphone or other digital device may perform one or more functions of the OTA 800. For example, an LED flash unit built into a smartphone may be utilized as an OT (e.g., without a collimator) and a smartphone application may produce the necessary digital modulation of the flash unit's optical output. In some embodiments, a smartphone may be coupled to a smartphone case with one or more elements of the OTA 800 (e.g., integrated IR emitter and beamforming optics, firmware, and/or software interface).

Utilizing optical communications has many advantages for users of smartphones and/or other digital computing devices. For example, optical communications may provide long-range and high-bandwidth capabilities even in the absence of cellular coverage or WiFi. Further, optical transmissions are not regulated by the FCC. Optical communications also have low power requirements and high energy efficiency. Users may also prefer to utilize optical communication because they are not necessarily required to provide location information through the personal devices (e.g., smartphone) or provide location information by utilizing cellular towers that triangulate position.

Optical communications may provide an additional degree of security relative to radio-wave-based communications. For example, due to the ease with which optical beams having narrow beam widths may be produced, in some embodiments transmitted optical signals are only received by optical receivers located within a narrow angular zone. It will be appreciated that receiving or transmitting information optically may not require that users utilize any of the limited cellular data provided by their cell-phone service plan.

FIG. 9 depicts an example functional block diagram of an OTA 800. The OTA 800 includes data-input electronics 904, a data preprocessor 906, data storage 910, control-input electronics 912, and an optical transmitter OT 902. In other embodiments a single OTA 800 may include any number of OTs 902. The OT 902 may include a data-format converter

916, a light-source driver 918, a power supply 920, a light source 922, beamforming optics 924, OT-control electronics 926, and a tilt actuator 928 which controls the horizontal and vertical pointing direction of the optical beam output by the OT 902.

A user may utilize a computer, smartphone, or other digital computing device to provide data files of streaming video or other data to OTA 800 by means of the data-input electronics 904. The data-input electronics 904 may accept data via a hardwired data connection (e.g., a USB port), a wireless data connection (e.g.,) Bluetooth®), or both. As an example, a user may upload one or more data files via the data-input electronics 904 from local storage (e.g., hard drive or SSD) network storage, or memory within his computing device. In various embodiments, the data-input electronics 904 may include an interface, port, antenna, or the like to receive information from another digital device. The data-input electronics 904 may receive information over a hardwired data connection (e.g., USB, Ethernet cable, SATA cable, or the like) and/or wirelessly (e.g., Bluetooth®, WiFi, or the like).

The user may also utilize a computing device to input commands via the control-input electronics 912 to control any number of operations of the data-format converter 916, the light-source driver 918 (e.g., commands specifying the bit rate of the optically transmitted data, optical output intensity, and optical pulse duty cycle), and/or the tilt actuator 928 (e.g., commands specifying horizontal and vertical pointing direction of the optical beam).

The control-input electronics 912 may also allow the user to input commands controlling the operation of the data preprocessor 906, as well as the data storage 910 (e.g., commands to delete files from storage or to transfer one or more specified stored files to the OT 902, which may transmit the file(s)). The control-input electronics 912 may accept such control-command inputs from one or more computing devices via a hardwired data connection (e.g., a USB connection), a wireless data connection (e.g., Bluetooth®), or both. In various embodiments the data-input electronics 904 and control-input electronics 912 may share one or more data connections. In various embodiments, control commands may be received by the control-input electronics 912 over the data-input electronics 904. In various embodiments, the control-input electronics 912 may retrieve or receive control commands from software executing on the OTA 800.

The OTA 800 may optionally preprocess the input data by means of the data preprocessor 906. The preprocessor 906 may be any physical or virtual processor. In some embodiments, the data may be organized, filtered, compressed, combined with other data, and the like to prepare it for transmission in the form of a modulated optical beam output by the OT 902. One or more users may utilize computing devices to specify by means of control commands input via the control-input electronics 912 desired preprocessing to be performed by the data preprocessor 906 on different types of data files.

In various embodiments, the OTA 800 may accept 720p video files as input data to be optically transmitted at bit rates in the range of 300-500 kb/s. It will be appreciated that any video format may be accepted as input data and then optically transmitted, including standard or high-definition formats. It will also be appreciated that the OTA 800 may optically transmit any file or combination of files including video, images, audio, text files or the like.

The data storage 910 in the OTA 800 may store data that has been input via the data-input electronics 904 and pre- processed by the data preprocessor 906. The data storage may be any storage including hard drive, SSD, network storage, or the like. One or more users may utilize computing devices to control the operation of the data storage 910 by means of control commands input via the control-input electronics 912. For example, commands may be issued to delete data files from the data storage 910. Additionally, commands may be issued to transfer files that have been stored in data storage 910 to the OT 902, so that the information in the files can be optically transmitted.

In various embodiments, the OTA 800 may provide the preprocessed input data stored in data storage 910 to the data-format converter 916. Commands to provide such input data may be issued to the data storage 910 by the control-input electronics 912, based on commands received from one or more computing devices. The purpose of the data-format converter 916 may be to convert data into an appropriate format for optical transmission. The conversion process may include data segmentation, in which the data to be transmitted are broken up into segments, such as forward error correction (FEC) segments. Such FEC segments may be of any size and may assist in recovery (e.g., instant recovery) using a protocol (e.g., TCP). In one example, if a segment is not properly received, the next segment provides recovery information. It will be appreciated that different data segmentation methods may be used. In some embodiments, the data may not be segmented at all, or the segmentation procedure may be an optional step, dependent on control inputs received from the user(s).

In other embodiments, the data-format converter 916 may apportion the data for error correction (e.g., based on Vandermonde matrices to allow for recovery). Such data apportionment may also be an optional step, dependent on control inputs received from the user(s). The data-format converter 916 may also perform parallel-to-serial conversion of the data in preparation for transmitting it optically.

In some embodiments, the data-format converter 916 may convert the data to an appropriate format for optical transmission. In one example, the data-format converter 916 may convert the data into a return-to-zero on-off-keying (RZ-OOK) format, which provides a clock signal to the optical receiver. The data-format converter 916 may incorporate transmit and receive first-in-first-outs (FIFOs) into the data in order to prevent overflow errors and improve data optimization. The specific set of procedures performed by the data-format converter 916 on data from a given data file may depend on what specific data-format-converter commands have been input via the control-input electronics 912 and transferred to the data-format converter 916 via the OT-control electronics 926. These data-format-converter commands may alter the nature of specific procedures performed by the data-format converter 916. For example, a particular command may cause the number of bits in each segment produced by the data-segmentation procedure to be changed from a previous value, or another command may eliminate the data-segmentation procedure from the data-format-conversion processing for one or more specific data files or files of a certain type or types.

The light-source driver 918 accepts data to be optically transmitted from the data-format converter 916 and outputs the appropriate modulated electrical signals to drive the light source 922, using power supplied by power supply 920. The operation of the light-source driver 918 is controlled by user commands input via the control-input electronics 912 and transferred to the light-source driver 918 via the OT-control electronics 926. For example, characteristics of the modulated output optical beam such as the bit-rate, optical output power level, and optical pulse duty cycle may be controlled in this manner.

In some embodiments, the OT 902 may be equipped with a tilt actuator 928. The tilt actuator 928 may include any number of actuators that may alter the horizontal and vertical pointing direction of the output optical beam. The specific pointing direction used at any given time may be controlled by user commands input via the control-input electronics 912 and transferred to the tilt actuator 928 via the OT-control electronics 926. In various embodiments, the tilt actuator 928 may include any number of actuators to move the beamforming optics 924 and/or the light source 922.

The OT-control electronics 926 provides a means of transferring user commands received via the control-input electronics 912 to different components of the OT 902, including the data-format converter 916, the light-source driver 918, and/or the tilt actuator 928. In some embodiments the OT-control electronics may control all three of the aforementioned components, while in other embodiments it may control only one or two of these components.

In various embodiments, the beamforming optics 924 may include custom or commercially available reflective and refractive optics.

In various embodiments the light source 922 may consist of one or more custom or commercially available optical emitters. For example, the light source 922 may incorporate at least one commercially available near-IR emitter.

In a particular implementation, the light source 922 may output optical radiation with a spectrum having a centroid wavelength of 850 nm, and a peak power of 1.4 W (e.g., during a 1-bit output pulse). It will be appreciated that the light source 922 may produce optical radiation having any wavelength spectrum. Similarly, the light source 922 may produce optical radiation at any output power level.

The light source 922 may be any light source. For example, the light source 922 may be or include any incoherent optical emitters (e.g., LEDs) and/or coherent optical emitters (e.g., lasers). In some embodiments, the light source 922 may be mounted on a Berquist thermal Clad LED substrate for heat dissipation. The light source 922 may be an IR emitter having a die size and/or active emitter area of 1 mm×1 mm. It will be appreciated that the light source 922 may have any size. In some embodiments, the light source 922 may comprise one or more OSRAM SFH 4235 Platinum Dragon high power IR emitters. While the OSRAM SFH 4235 IR emitter has a maximum transmitted bit rate of 24 MHz it will be appreciated that the light source 922 may have any transmission rate. In one example, the active emitter area of light source 922 may be a 1 mm square and its maximum transmitted bit rate may be 24 MHz.

In various embodiments, the electrical power for the light source 922 to produce 1 W of optical output power is 3.579 W. It will be appreciated that the light source 922 may utilize any amount of electrical power (e.g., more or less electrical power) to produce 1 W of optical output power.

The light-source driver 918 may utilize the formatted data provided by the data-format converter 916 to drive the light source 922. In some embodiments, the light-source driver 918 may include a high-speed MOSFET that drives the light source 922. The MOSFET may be selected to provide high current while maintaining the desired data bandwidth.

The light source 922 may generate one or more modulated optical beams that are provided to the beamforming optics 924. The beamforming optics 924 receives each beam produced by the light source 922 and transforms it into an output beam having a desired intensity distribution as a function of horizontal and vertical angular coordinates. As discussed herein, the light source 922 may output optical radiation in the near IR wavelength range.

The beamforming optics 924 may be or include, for example, collimator/homogenizer optics discussed herein. In various embodiments, the beamforming optics 924 uses a reflective "wineglass" collimator (further discussed herein) and at least one pair of lenslet arrays (e.g., Köhler lenslet arrays) (also further discussed herein) to produce an output beam that is highly uniform within a square angular region.

It will be appreciated that there may be different OTAs 800 for different purposes. For example, an OTA 800 designed to be used outdoors may include electronics, emitters, transmitters, and the like capable of long distance optical transmission while an OTA 800 designed to be used indoors may include electronics, emitters, and transmitters designed for indoor use and shorter distance optical transmission.

Figure 10:
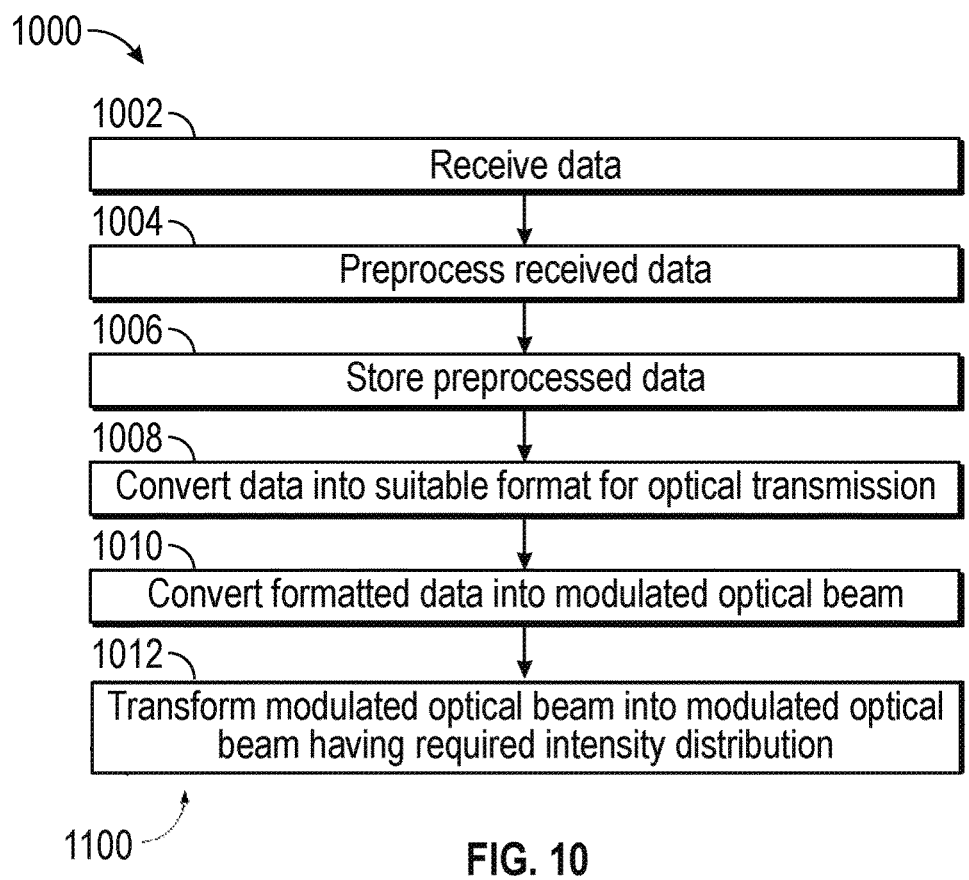
FIG. 10 is a flowchart for optical narrowcast transmission of data in some embodiments.

FIG. 10 is a flowchart 1000 for optical narrowcast transmission of data in some embodiments. In step 1002, the OTA 800 receives data to be transmitted optically. The data may include any number of files. The data, for example, may include, but is not limited to, video, PowerPoint slides, audio, documents, and/or images. The data may include any combination of different types of media or files (e.g., any combination of video, slides, audio, documents, images, and the like).

The OTA 800 may receive the data from any computing device or combination of computing devices. In some embodiments, a remote computing device (i.e., a computing device that is remote to the OTA 800) may provide any or all of the data to the OTA 800 via a data-input electronics 904 using a wired or wireless network. For example, a server may provide any number of files to any number of OTAs 800 over one or more networks. The server may provide the same files or different files to a number of OTAs 800.

In various embodiments, the server may coordinate and/or manage delivery of digital content to any number of OTAs 800 for an entity or user. For example, a retail store may have any number of different outlets, one or more of which includes any number of OTAs 800. The server may send different or the same data to any number of OTAs 800 located at any number of the different outlets. The server may be controlled or configured to provide updates or changes to content among the different OTAs 800. It will be appreciated that a centralized server may provide consistent and/or organized messaging through any number of OTAs 800 at one or more locations thereby allowing the entity or user to provide consistent messaging and/or branding.

Similarly, it will be appreciated that a centralized server may provide consistent and/or organized messaging through any number of OTAs 800 at any number of locations on behalf of any number of entities. For example, the same centralized server may receive files (e.g., video, images, audio, text, or the like) from two different retailers. The centralized server may provide different files to one or more different OTAs 800 based on instructions or configurations of the first retailer. Similarly, the centralized server may provide other files to one or more other OTAs 800 based on instructions or configurations of the second retailer. In this way, the centralized server may be used by any number of entities to coordinate and provide optical narrowcasting content over any number of OTAs 800 to stores, restaurants, landmarks, facilities, private residences, government offices, and/or the like.

In step 1004, the OTA 800 preprocesses the received data. For example, the data preprocessor 906 may organize, filter, compress, combine with other data, and/or the like to prepare the data for transmission in the form of a modulated optical beam output by the OT 902. It will be appreciated that the data may include a combination of video, text, and/or images. It will also be appreciated that different types of data may be preprocessed in different ways. Video data, for example, may be transformed into a compressed video file using a video codec, while other types of data may be compressed in a different manner, or may not be compressed at all. In step 1006, the data storage 910 may store the preprocessed data in memory (e.g., hard disk, SSD, network memory, or RAM).

In step 1008, the data-format converter 916 (within the OT 902) converts the stored data into an appropriate format for optical transmission. The conversion process may include data segmentation, parallel-to-serial conversion, and/or conversion into a signal format suitable for optical transmission, such as an RZ-OOK format, which provides a clock signal to the optical receiver. As part of step 1008, the data-format converter 916 may also incorporate transmit and receive FIFOs into the data to prevent overflow errors and improve data optimization. The data may be apportioned for error correction (e.g., based on Vandermonde matrices to allow for recovery). It will be appreciated that one or more of the aforementioned data-format conversion processes may be optional or may not be used at all. For example, in some embodiments step 1008 may not include a data-segmentation process. It will also be appreciated that in one or more embodiments, one or more data-format conversion procedures other than the aforementioned procedures may be performed as part of the complete data-format-conversion process.

In step 1010, the OTA 800 may convert the data formatted in step 1008 into a modulated optical beam, by means of the light-source driver 918 and the light source 922. The light-source driver 918 may accept as input the data output from the data-format converter 916. The light-source driver 918 may subsequently output appropriate modulated electrical signals to drive the light source 922, using electrical power supplied by the power supply 920. These modulated electrical signals may cause the light source 922 to output the data in the form of a modulated optical beam.

In step 1012, the modulated optical beam produced in step 1010 may be transformed into a modulated optical beam having a required intensity distribution. This step may be accomplished by passing the modulated optical beam produced by the light source 922 through the beamforming optics 924, which transforms the beam into a beam having a required intensity distribution as a function of horizontal and vertical angular coordinates. In some embodiments the modulated optical beam produced by the light source 922 may already have the desired or required intensity distribution, in which case the beamforming optics 924 may not be included as part of the OTA 800. In some embodiments, the beamforming optics 924 may include a reflective "wineglass" collimator (further discussed herein) and at least one pair of lenslet arrays (e.g., Köhler lenslet arrays) (also further discussed herein) to produce an output beam that is highly uniform within a square angular region.

The modulated data may have a modulation duty cycle of $\eta_{mod}$, the value of which is less than unity. In one example of the modulation duty cycle, the modulation duty cycle may be defined as $$\eta_{mod} = \frac{\tau}{\tau_{int}}$$

where $\tau$ is the duration of an optical binary 1-bit (i.e., a single transmitted optical pulse representing a binary 1-bit) and $\tau_{int}$ is the time interval between the beginning of a bit and the beginning of the next bit in a sequence of transmitted bits. The quantity $\tau_{int}$ is also the effective integration time of the optical receiver assembly (ORA) used to receive signals from the OTA 800. Since the bit rate B, in units of Hz, is the inverse of $\tau_{int}$, the above formula can also be written as $$\eta_{mod} = \tau B$$

In various embodiments, bit-error probability $P_{error}$ is defined as the probability that noise in the system will cause any given optically transmitted bit to be incorrectly interpreted by an optical receiver (i.e., will cause a 1-bit to be interpreted as a 0-bit or vice versa). In some embodiments, the system may utilize a single optical channel with a center wavelength of $\lambda_c$ and wavelength range $\Delta\lambda$. For systems with multiple optical channels using different optical wavebands, the performance analysis must be done separately for each channel.

Figure 11:
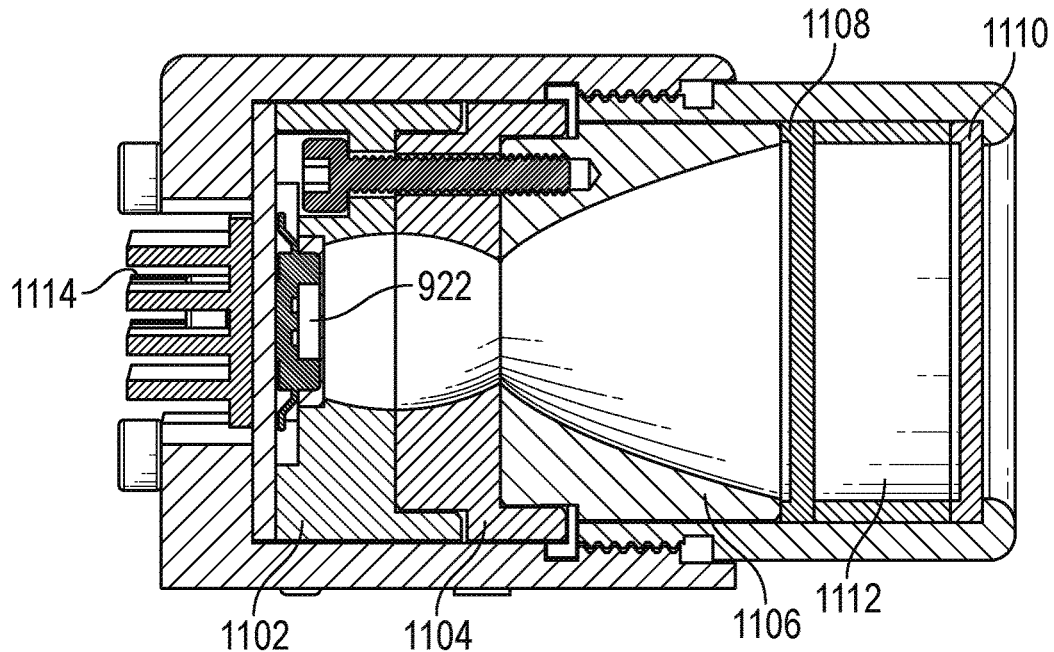
FIG. 11 is a depiction of an example optical transmitter assembly.

FIG. 11 is a depiction of an example OTA 800. The OTA 800 may include a light source 922 with an attached heat sink 1114 mounted together with beamforming optics 924. The light source 922 in this case is an OSRAM SFH 4235 IR emitter. The heat sink 1114 is a thermally conductive structure that is in thermal contact with the light source 922 and incorporates one or more thermally conductive fin-shaped structures to radiate heat from the light source 922, thereby keeping it sufficiently cool to maintain its required average optical output power and to prevent thermal damage.

The beamforming optics comprise a reflective wineglass collimator 1100 and two identical lenslet arrays 1108 and 1110. The wineglass collimator 1100, which may comprise three separate reflective components 1102, 1104, and 1106, may be coupled with and/or receive an optical beam from the light source 922. An interior portion of an inner surface of each of the separate reflective components 1102, 1104, and 1106 may be at least partially reflective. The outer surface of the separate reflective components 1102, 1104, and 1106 may not be reflective.

The separate reflective components 1102, 1104, and 1106 may be coupled together to form the wineglass collimator 1100. As discussed herein, the wineglass collimator may be or include an ellipsoidal portion and a paraboloidal portion. Components 1102 and 1104 may be coupled to form the ellipsoidal portion. In some embodiments, the components 1102 and 1104 are coupled at the broadest diameter of the ellipsoidal portion (e.g., in the middle of the broad middle body further described herein). Component 1106 may be coupled to a side of the component 1104 that is opposite that of the component 1102. Component 1106 may include the paraboloidal portion of the wineglass collimator. In some embodiments, the components 1102, 1104, and 1106 position and align the ellipsoidal portion and paraboloidal portion of the wineglass collimator such that the optical axis of the wineglass collimator is aligned with the light source.

The reflective optical surface of the wineglass collimator 1100 may be rotationally symmetric about an optical axis substantially centered on the light-emitting element of the light source 922. In some embodiments, the reflective surface of the wineglass collimator 1100 may include the reflective surfaces of the two reflective components 1102 and 1104 which may have a shape that is close to being ellipsoidal, but yet which may deviate substantially from being ellipsoidal in order to reduce or minimize the horizontal and vertical beamwidth of the collimated beam produced by the wineglass collimator 1100. A second portion of the reflective surface of the wineglass collimator 1100 including the reflective surface of reflective component 1106 may have a shape that is close to being paraboloidal, but yet which may deviate substantially from being paraboloidal in order to reduce or minimize the horizontal and vertical beamwidth of the collimated beam produced by the wineglass collimator 1100.

The output optical beam produced by the wineglass collimator 1100 without the lenslet arrays 1108 and 1110 in place may have an intensity distribution as a function of horizontal and vertical angular coordinates that is somewhat uniform within a square angular region. The pair of lenslet arrays 1108 and 1110 may improve or substantially improve the uniformity of the intensity distribution of the optical beam output by the beamforming optics 924, thereby providing a communications range for receivers that may be substantially the same for any two or more identical ORAs lying within that square angular region. In some embodiments the pair of lenslet arrays 1108 and 1110 may convert the output beam produced by the wineglass collimator into a beam having an intensity distribution that is highly uniform within a rectangular or hexagonal angular region, rather than a square angular region.

The lenslet arrays 1108 and 1110 may, for example, comprise a pair of Köhler lenslet arrays. The lenslet arrays are further discussed herein. The lenslet arrays 1108 and 1110 may be spaced apart and/or positioned by structure unit 1112, where the spacing distance between the two lenslet arrays is substantially equal to the focal length of each lenslet in each array. The lenslet arrays 1108 and 1110 may be positioned in front of the exit pupil of the wineglass collimator 1100, where this exit pupil is the larger aperture of the reflective component 1106 (i.e., the rightmost aperture of 1106 in the cross-sectional view of FIG. 11).

In various embodiments, the beamforming optics 924, which may include the wineglass collimator 1100 and the pair of lenslet arrays 1108 and 1110, are capable of converting the optical output of the light source 922 into an output optical beam that has a highly uniform intensity distribution within an 8°-square angular region. It will be appreciated that the beamforming optics 924, in various embodiments, may convert the output of the light source into an output optical beam having an intensity distribution that is highly uniform within any square, rectangular, or hexagonal angular region.

Because of its uniform square output optical beam, multiple copies of this design of beamforming optics 924, each having its own light source 922, may be used together within a single OTA 800 that produces an output optical beam wider than 8° in a horizontal direction and/or a vertical direction. As discussed herein, the optical source (e.g., light source 922 of FIG. 9) may be a 1 W near IR solid-state emitter with a peak output wavelength of 860 nm. The beamforming optics 924 may have a clear-aperture diameter of 18.5 mm and a total length of 30.5 mm.

In various embodiments, when used with the appropriate ORA, the OTA 800 may allow for information transfer over distances in excess of 400 m during the day and 1200 m at night, with a bit rate of 1 MHz and a bit-error probability of $10^{-9}$. This data rate permits transmission of livestreamed HD video.

Figure 12A:
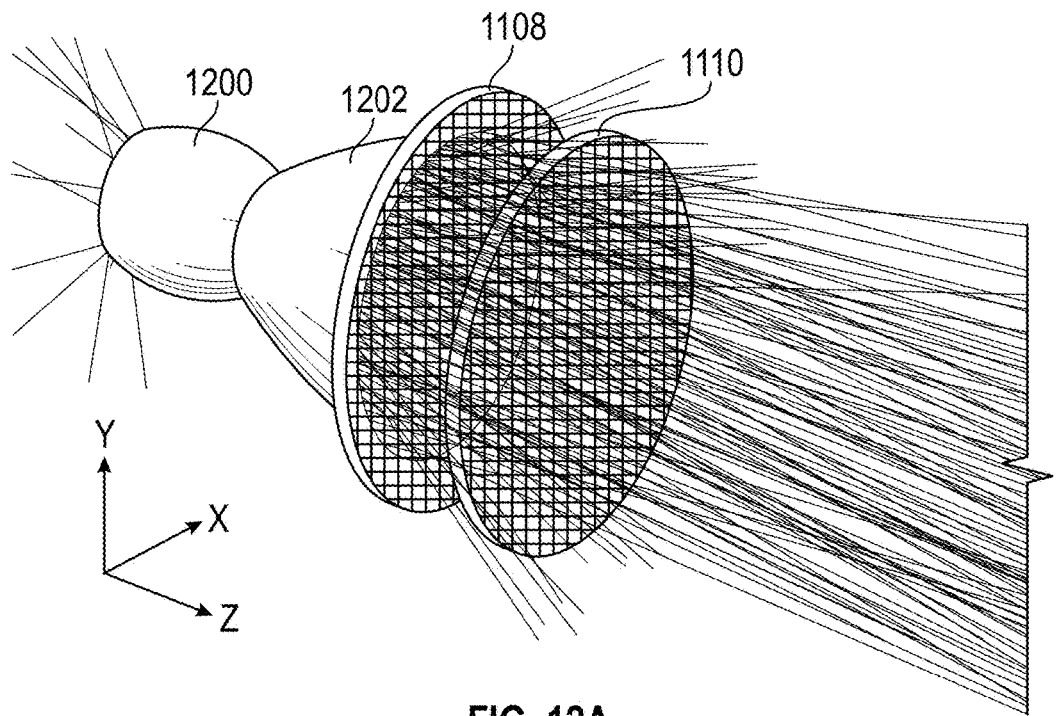
FIG. 12A depicts a three-dimensional perspective view of beamforming optics with traced rays from a light source.
Figure 12B:
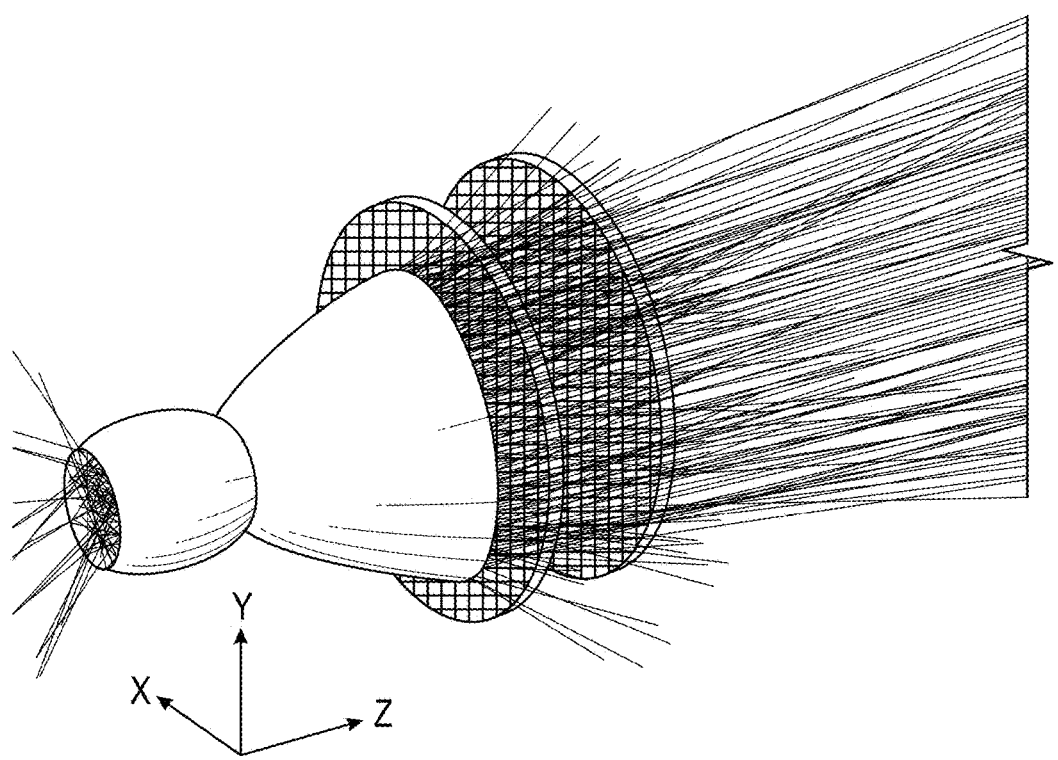
FIG. 12B depicts another three-dimensional perspective view of beamforming optics with traced rays from a light source.

FIGS. 12a and 12b depict two different three-dimensional perspective views of the beamforming optics 924 with traced rays from the light source 922. It should be noted that the light source 922 itself is not depicted in these two figures. It should also be noted that only the reflective optical surface of the wineglass collimator is depicted in FIGS. 12a and 12b; the mechanical structures surrounding this optical surface are not depicted in these two figures. FIG. 12a depicts the wineglass collimator 1100 which may include an ellipsoidal portion 1200 and a paraboloidal portion 1202, as well as the lenslet arrays 1108 and 1110. In one example, the lenslet arrays 1108 and 1110 are two identical Köhler lenslet arrays that improve the uniformity of the output intensity distribution.

The ellipsoidal portion 1200 may be rotationally symmetric. The ellipsoidal portion 1200 may include a narrow entrance pupil, a broader middle body, and a narrow circular exit. The narrow entrance pupil may be circular with a diameter that is smaller than the greatest diameter of the middle body. The narrow entrance pupil may be positioned to receive light from the light source. The diameter of the broad middle body may flare from the narrow entrance pupil to a diameter that is greater than that of the narrow entrance pupil and then diminish to the narrow circular exit.

The paraboloidal portion 1202 may also be rotationally symmetric. The paraboloidal portion 1202 may include a narrow circular entrance and a broad exit pupil. The diameter of the paraboloidal portion 1202 flare from the narrow circular entrance to the diameter of the broad exit pupil. The diameter of the exit pupil of the paraboloidal portion 1202 may be the greatest diameter of the reflective surface of the wineglass collimator. The narrow circular entrance may be or be coupled to the narrow circular exit of the ellipsoidal portion 1200. As such, the diameter of the narrow circular entrance of the paraboloidal portion 1202 may be the same as the diameter of the narrow circular exit of the ellipsoidal portion 1200.

In a second view, FIG. 12b depicts a different perspective view of the beamforming optics 924 with rays traced from the light source 922. In various embodiments, the length of the wineglass collimator 1100 is less than 1 inch.

Figure 13:
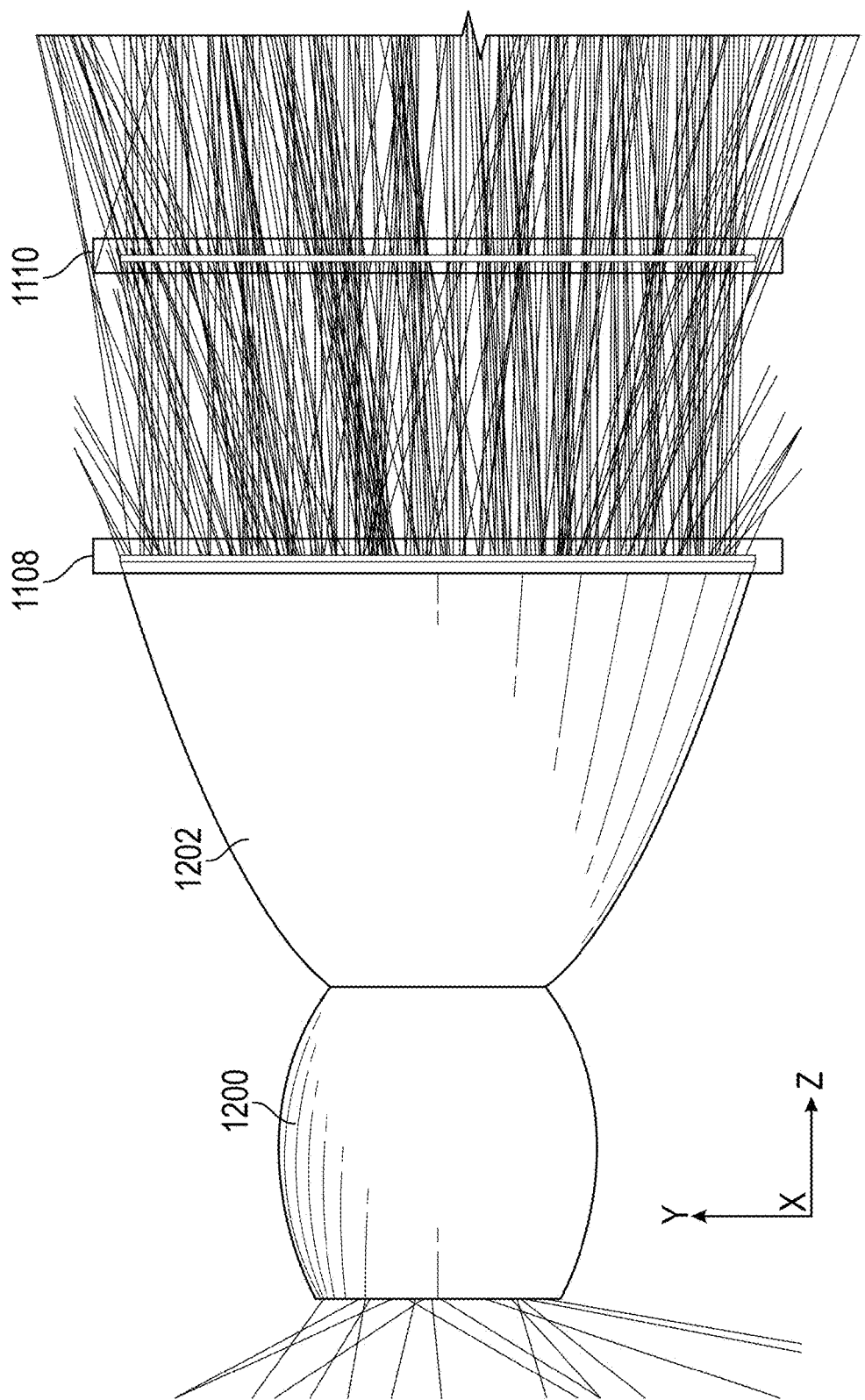
FIG. 13 depicts a side view of an example beamforming optic with traced rays from a light source.

FIG. 13 depicts a side view of the example beamforming optic with traced rays from a light source. The beamforming optic may include a collimator with a paraboloidal portion 1202 that is 12.5 mm in length. It will be appreciated that portion 1202 may be any length.

Figure 14:
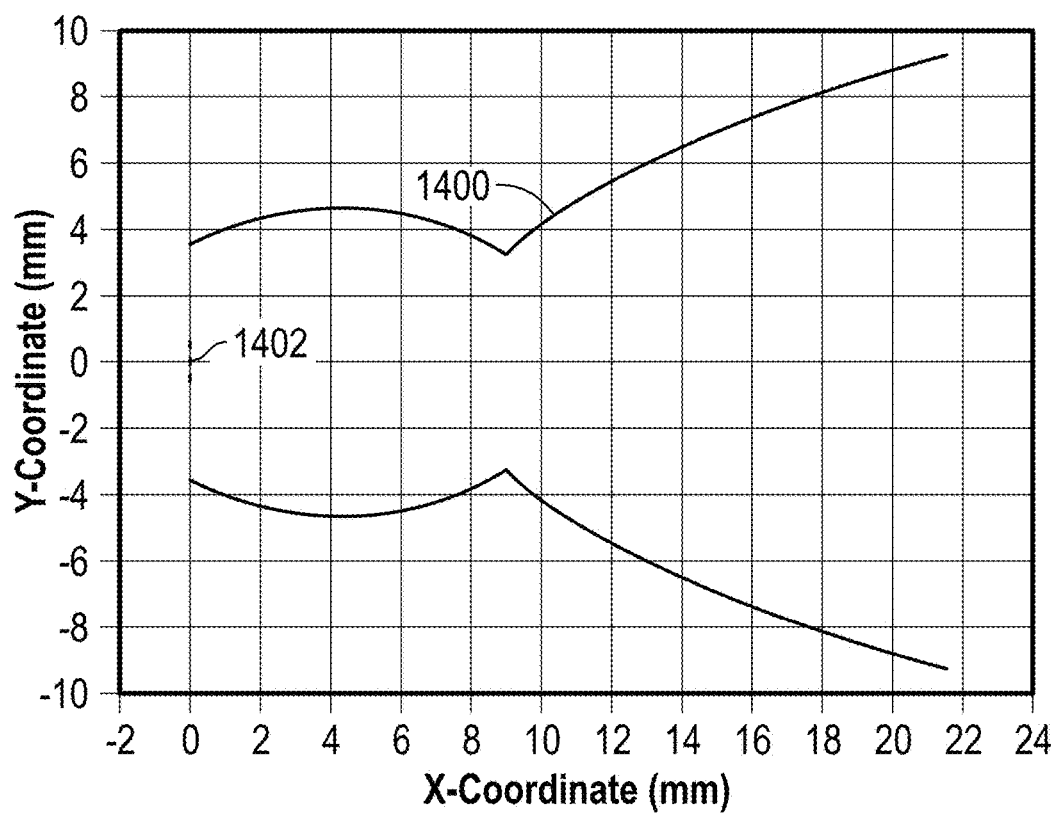
FIG. 14 is a cross-sectional view of an example axisymmetric reflective collimator.

FIG. 14 is a cross-sectional view of an example axisymmetric reflective collimator 1400 (e.g., the wineglass collimator 1100). The light source 1402 may be any source of optical radiation (e.g., light source 922 of FIG. 9) and may be positioned to provide optical beam(s) to the collimator 1400. In some embodiments, the light source 1402 or a light emitting surface of the optical emitter 1402 is positioned at the entrance pupil of the collimator 1400 (e.g., the wineglass collimator 1100).

In some embodiments, the wineglass collimator 1100 re-images the emitting surface of the light source 922 to infinity to produce a collimated output beam. The collimated beam may propagate through the pair of lenslet arrays 1108 and 1110 and exit as an optical beam having a highly uniform intensity distribution within an 8°-square angular region. Lenslet arrays 1108 and 1110 may homogenize the beam such that it has a flat (i.e., uniform) intensity distribution within this square angular region, providing uniform or near-uniform signal strength for two or more identical ORAs at the same distance from the OTA 800 and located within the aforementioned square angular region. It will be appreciated that, in various embodiments, the angular region over which the output optical beam is highly uniform may be rectangular or hexagonal rather than square.

In FIG. 14, the collimator 1400 has a length of slightly less than 22 mm and an exit-pupil diameter of 18.5 mm. It will be appreciated that the collimator 1400 may be longer than or shorter than 22 mm and may have an exit-pupil diameter that is greater than or less than 18.5 mm (e.g., 20 mm, 18 mm, or the like). In one example, the collimator 1400 may have an exit-pupil diameter of 18.511 mm and a total length of 21.50 mm. The central obscuration of the collimator 1400 may have a diameter of 6.536 mm.

While measurements are depicted in millimeters, it will be appreciated that the collimator 1400 may be any length, including fractions of millimeters.

Figure 15:
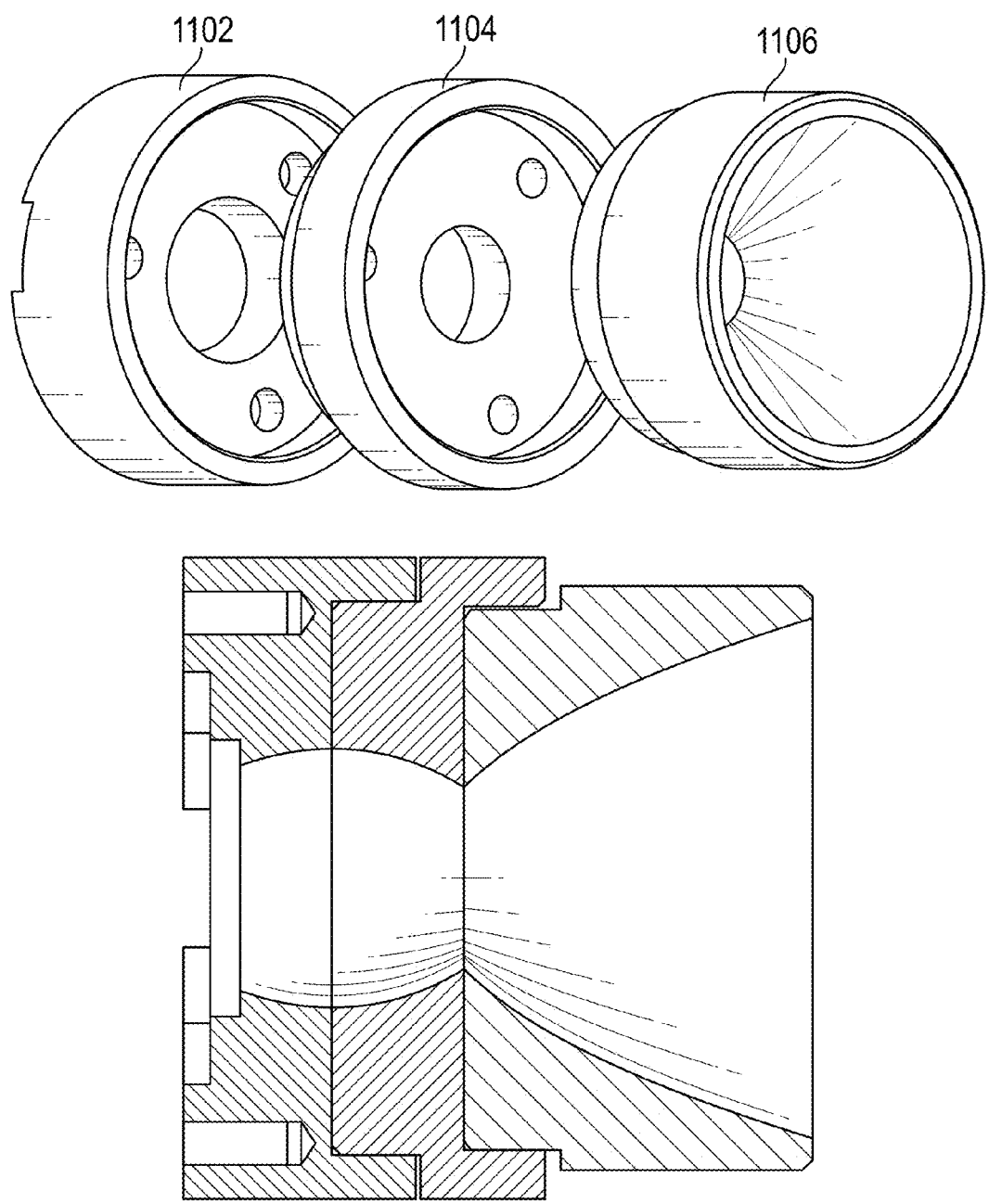
FIG. 15 depicts a three-dimensional view of an example of a wineglass collimator for use in beamforming optics.

FIG. 15 depicts a three-dimensional view of an example of a wineglass collimator 1100 for use in beamforming optics 924. The collimator may include the three reflective optical components 1102, 1104, and 1106. FIG. 15 depicts how the three reflective components 1102, 1104, and 1106 may fit together to form the wineglass collimator in some embodiments. The lenslet arrays 1108 and 1110 may be in front of the exit pupil of reflective component 1106.

The reflective components 1102, 1104, and 1106 may be fabricated in any number of ways. For example, they may be fabricated in a three-part fabrication process whereby each is turned from aluminum to near net shape such that the optical surface is within +0.010" of its shape. The components may then be diamond turned to produce the required optical surface shape. The optical surface of each of component may then be coated with a reflective coating that is highly reflective in the optical waveband of the light source 922.

Figure 16:
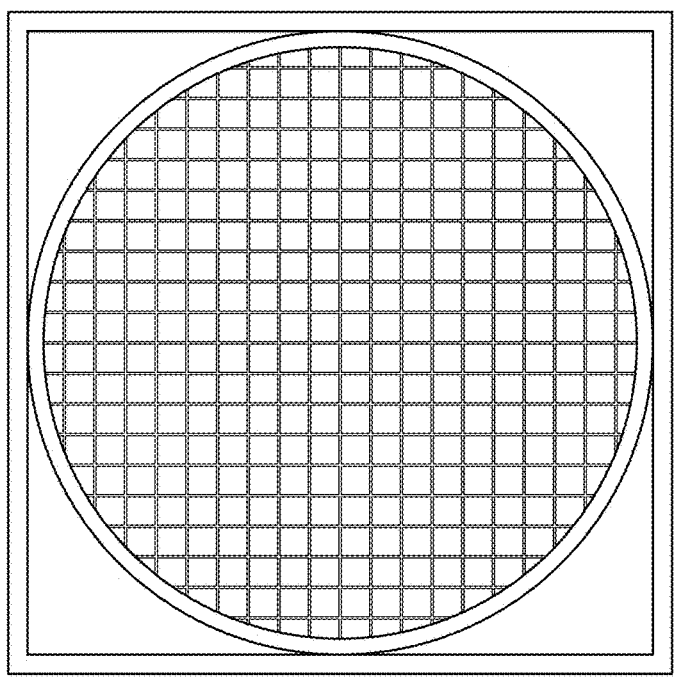
FIG. 16 depicts an example lenslet array.

FIG. 16 depicts an example lenslet array 1600. The lenslet array 1600, as discussed herein, may be one of a pair of Köhler lenslet arrays. There may be two lenslet arrays placed in the path of the beam output of the collimator 1100 (e.g., in front of the exit pupil of the wineglass collimator 1100). As depicted in FIG. 16, the lenslet array 1600 may include a square array of identical lenslets having square apertures, where the array is truncated such that the clear aperture of the lenslet array 1600 is circular. The lenslet array 1600 may have a first side opposite a second side, where the first side is closer to the wineglass collimator 1100 than the second side. The lenslets on the first side of the lenslet array 1600 may have identical convex spherical shape profiles. The convex spherical lenslet surfaces on the first side may have any physically realizable convex curvature. In one example, each lenslet on the first side of the lenslet array 1600 has a 3.695 mm radius of curvature. The first side of the lenslet array 1600 may be facing toward the exit pupil of the collimator 1100. The second side (opposite the first side) of the lenslet array 1600 may be planar.

In one example, each lenslet array may be made of Schott B270 glass. Each array may be 1.2 mm thick with a 20×20 square array of lenslets, which has been truncated to a clear aperture diameter of 20 mm. Each lenslet in the array has a 1-mm-square aperture. The refractive index of B270 glass is 1.51555 for a wavelength of 850 nm. The focal length of each lenslet may be 7.17 mm. The separation between the planar surfaces of the two lenslet arrays may be 7.5 mm. In one example, the total length of the beamforming optics 924, including the wineglass collimator 1100 and the Köhler lenslet arrays, is 30.50 mm.

It will be appreciated that each lenslet array may be made of any transparent refractive optical material, be of any thickness, and have any refractive index for any wavelength. The focal length may be greater than or less than 7.17 mm and the separation between lenslet arrays may be any distance. The length of the beamforming optics 924 may have any value.

Figure 17:
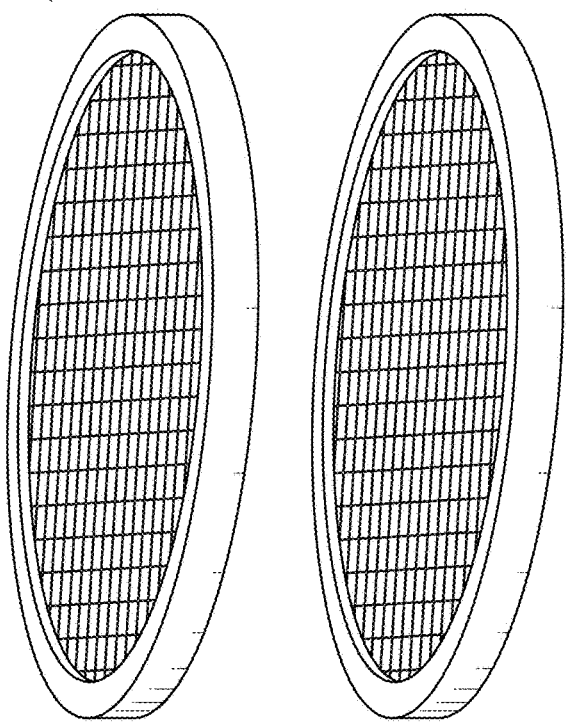
FIG. 17 depicts an example pair of lenslet arrays.

FIG. 17 depicts an example pair of lenslet arrays 1700. In some embodiments, the pair of lenslet arrays 1700 may be in place of or in addition to the pair of Köhler lenslet arrays. The lenslet arrays 1700 may, in various embodiments, be optically printed (e.g., in acrylic). In one example, the lenslet arrays 1700 may be printed using additive acrylic ink droplets prior to UV curing.

Performance of an example OTA 800 is discussed as follows. In this example, the OTA 800 includes an IR emitter with a centroid wavelength of 850 nm, a full-width-at-5%-of-peak optical bandwidth of 75 nm, and a peak optical output power of 1.4 W (e.g., during 1-bit pulse). The active emitter region may be a square 1 mm of a side and the maximum transmitted bit rate may be 24 MHz. The beamforming optic may include the wineglass collimator 1100 and lenslet arrays 1108 and 1110, which are Köhler lenslet arrays as described herein.

In computing the performance for this example, the optical efficiency of the beamforming optic is assumed to be $\eta_{trans}=0.80$. The beamforming optic for use in the example OTA 800 is designed to efficiently transfer flux from a 1-mm-square source into an 8°-square output beam, with a high degree of intensity uniformity. The efficiency in transferring flux from an idealized light source 922 defined as a 1-mm-square uniform Lambertian emitter into the 8°-square output beam may be about 82.2%. However, in some embodiments, the light emitting element of the light source 922 may be mounted at the bottom of a shallow hole in the base of the light source 922 (e.g., the IR emitting die mounted at the bottom of a shallow hole in the base of the OSRAM SFH 4235 IR emitter) such that a portion of light is scattered by the materials in the walls of the hole before it can be collected by the beamforming optic. As a result, the flux-transfer efficiency for such a non-idealized light source 922 may be 49.8%. This significantly increases the étendue of the source, preventing much of the light from being transferred into the desired 8°-square angular region.

Figure 18A:
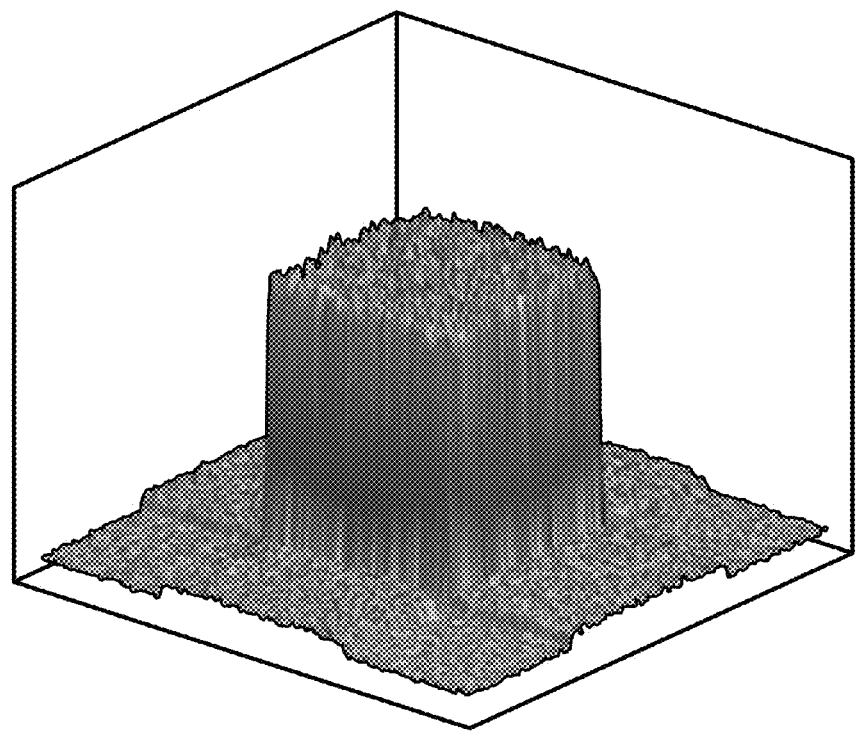
FIG. 18a is a surface plot of the output intensity distribution as a function of a horizontal angle and a vertical angle produced by a single beamforming optic consisting of a wineglass collimator and lenslet arrays in some embodiments.

FIGS. 18*a,b*-20*a,b* depict graphs indicating performance of the example OTA system (e.g., OTA 800) as described herein. FIG. 18*a* is a surface plot of the output intensity distribution as a function of a horizontal angle and a vertical angle produced by a single beamforming optic consisting of the aforementioned wineglass collimator 1100 and lenslet arrays 1108 and 1110 in some embodiments. The light source 922 used in generating this intensity distribution was the OSRAM SFH 4235 IR emitter, operated with an optical output power of 1.4 W. The beamforming optic and the light source were oriented such that they produced a highly uniform intensity output in an 8°-square angular region, with the top and bottom edges of each square region oriented parallel to the horizontal angular coordinate axis. The intensity distribution was generated by means of a ray-tracing simulation using loss-free optical materials and optical surfaces. Here the term "loss-free" means that in the ray-tracing simulation used to generate the intensity distribution the reflective surface of the wineglass collimator 1100 had 100% reflectance, the optical surface on each side of each of the two lenslet arrays 1108 and 1110 had 100% transmittance, and bulk absorption losses of optical power for rays propagating through the two lenslet arrays 1108 and 1110 were zero. Actual optical surfaces and optical materials will not be loss-free. To estimate the intensity output with non-loss-free optical materials and surfaces, the intensity distribution of FIG. 18*a* may be appropriately scaled by multiplying the intensity values by the product of all loss factors associated with the optical materials (i.e., bulk absorption losses) and surfaces. The light-source model used in the ray-tracing simulation was ray data generated from goniometric measurements of the OSRAM SFH 4235 IR emitter. The goniometric dataset used for this was provided by OSRAM.

Figure 18B:
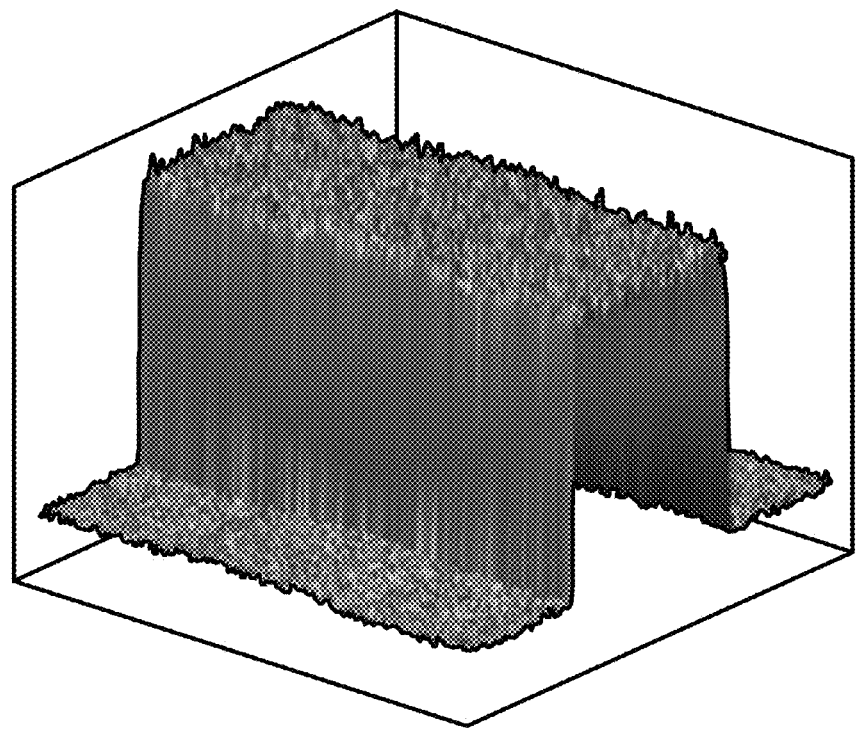
FIG. 18b is a surface plot of a portion of the combined output intensity distribution as a function of angle produced by six identical beamforming optics of the same type used to generate the results of FIG. 18a in some embodiments.

FIG. 18b is a surface plot of a portion of the combined output intensity distribution as a function of angle produced by six identical beamforming optics of the same type used to generate the results of FIG. 18a in some embodiments. The OSRAM SFH 4235 IR emitter operated with an optical output power of 1.4 W was used as the light source 922 in each of the six beamforming optics. Each beamforming optic and its associated light source were oriented such that they produced a highly uniform intensity output in an 8°-square angular region, with top and bottom edges of each square region oriented parallel to the horizontal angular coordinate axis. All six beamforming optics were pointed in the same vertical direction, while adjacent beamforming optics were pointed in horizontal directions differing by 8°, such that the combined output of the six beamforming optics was an intensity distribution that was highly uniform in a rectangular angular region 48°-wide in the horizontal direction and 8°-wide in the vertical direction. The same type of ray-tracing simulation and light-source model used to generate the results of FIG. 18a were used to generate the results of FIG. 18b, with all optical surfaces and optical materials being loss-free.

Figure 19A:
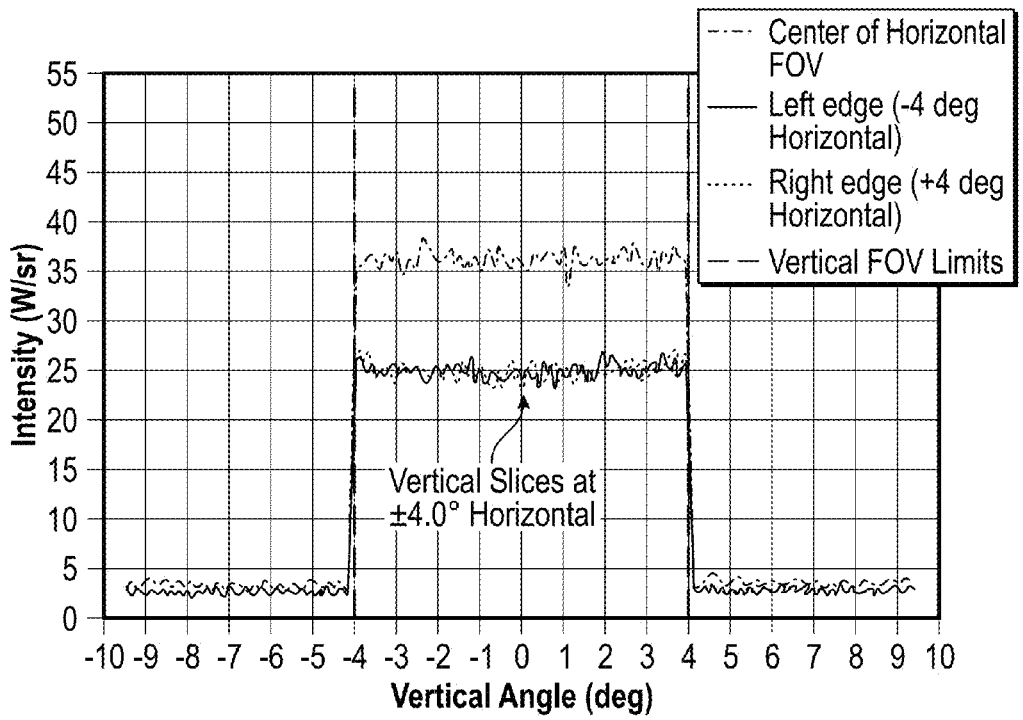

FIG. 19a is a graph of vertical slices taken through the center and vertical edges (i.e., vertical slices taken through the horizontal angular coordinates −4°, 0°, and +4° relative to the center of the 8°-square uniform region) of the same intensity distribution produced by a single beamforming optic in some embodiments that is depicted as a surface plot in FIG. 18a.

As can be seen from FIG. 19a, the intensity is approximately 36 W/sr within the aforementioned 8°-square angular region of high uniformity. At the edges of this region (i.e., the vertical edges at ±4° from the center of the region), the intensity is approximately 25 W/sr.

Figure 19B:
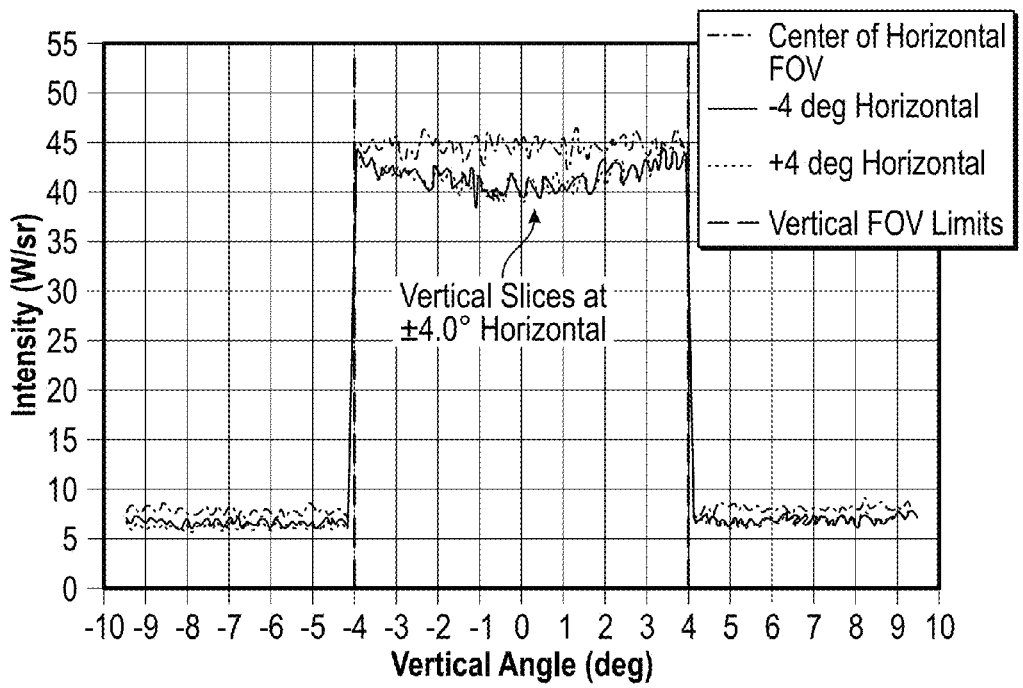
FIG. 19b is a graph of vertical slices taken through the center of the beam and at horizontal coordinates of ±4° relative to the center of the same intensity distribution produced by the six beamforming optics in some embodiments that is depicted as a surface plot in FIG. 18b.

FIG. 19b is a graph of vertical slices taken through the center of the beam and at horizontal coordinates of ±4° relative to the center of the same intensity distribution produced by the six beamforming optics in some embodiments that is depicted as a surface plot in FIG. 18b.

As can be seen from FIG. 19b, the intensity is approximately 44 W/sr along the vertical beamwidth near the center of the aforementioned 48° by 8° rectangular angular region of high uniformity. Along vertical slices taken through horizontal coordinates±4° from the center, the intensity within this rectangular angular region is approximately 42 W/sr.

Figure 20A:
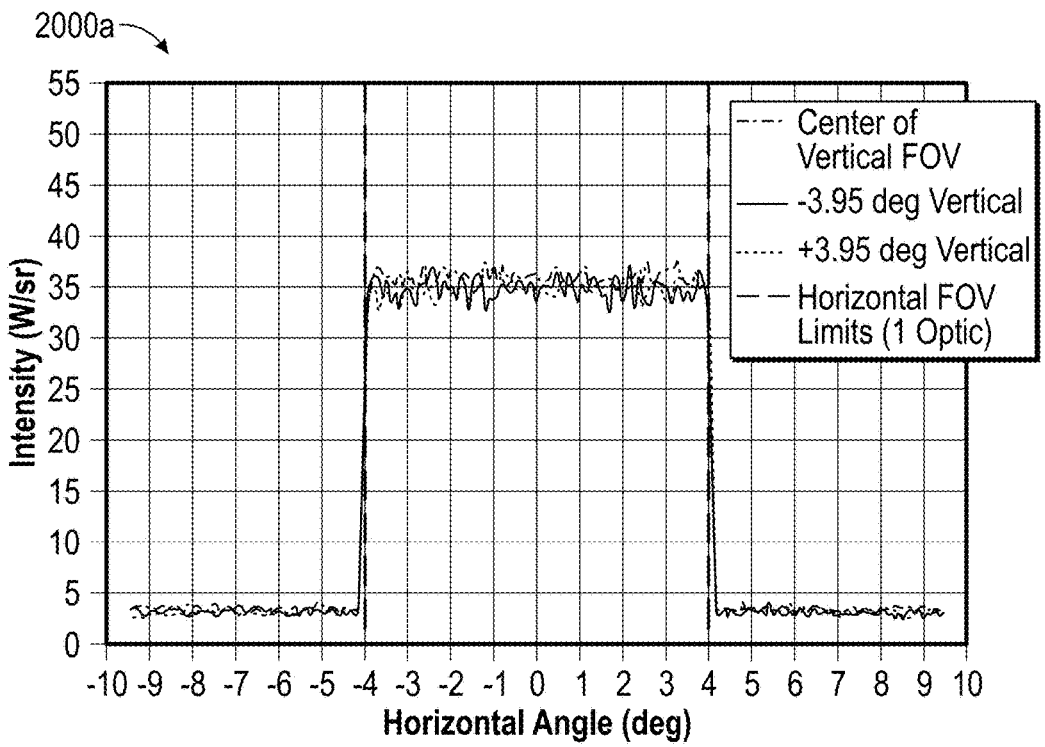

FIG. 20a is a graph of horizontal slices taken through the center and near the vertical edges (i.e., horizontal slices taken through the vertical angular coordinates −3.95°, 0°, and +3.95° relative to the center of the 8°-square uniform region) of the same intensity distribution produced by a single beamforming optic in some embodiments that is depicted as a surface plot in FIG. 18a.

As can be seen from FIG. 20a, the intensity is approximately 36 W/sr within the aforementioned 8°-square angular region of high uniformity. Near the edges of this region (i.e., at vertical coordinates±3.95° relative to the center of the region), the intensity is approximately 35 W/sr. It will be appreciated that the horizontal and vertical angular widths of the output optical beam may have any values and that the intensity level may have any value within the horizontal and vertical extent of the beam.

Figure 20B:
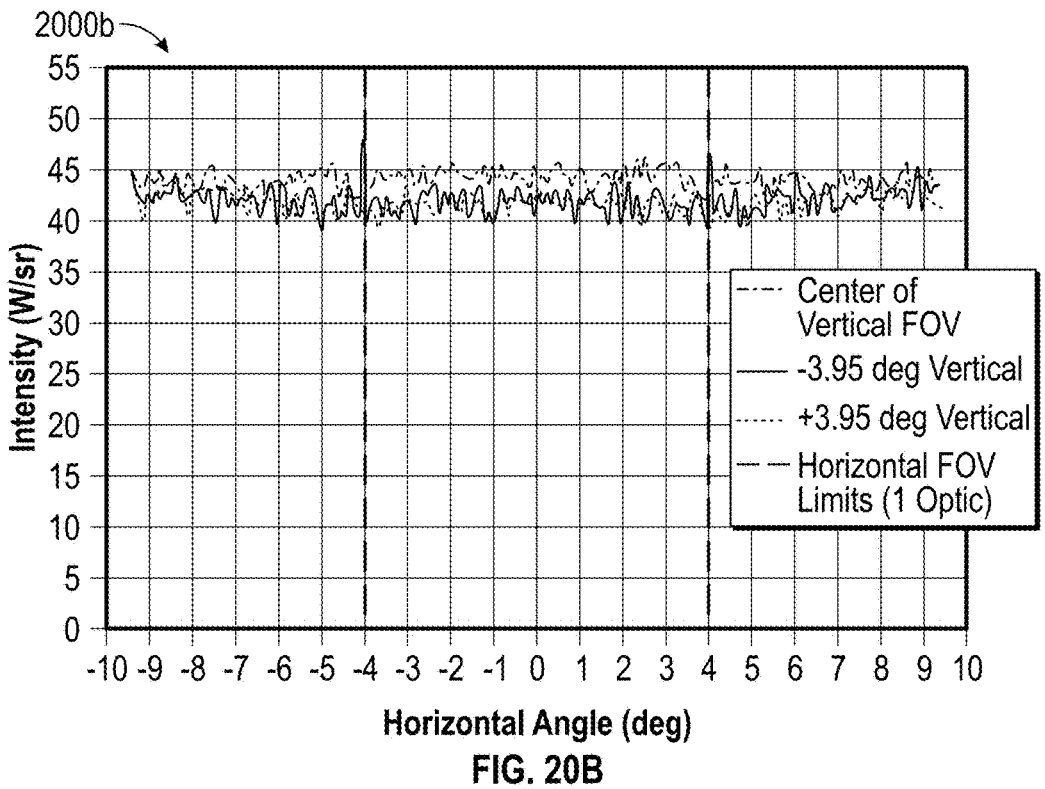
FIG. 20b is a graph of horizontal slices taken through the center of the beam and at vertical coordinates of ±3.95° relative to the center of the same intensity distribution produced by the six beamforming optics in some embodiments that is depicted as a surface plot in FIG. 18b.

FIG. 20b is a graph of horizontal slices taken through the center of the beam and at vertical coordinates of ±3.95° relative to the center of the same intensity distribution produced by the six beamforming optics in some embodiments that is depicted as a surface plot in FIG. 18b.

As can be seen from FIG. 20b, the intensity is approximately 44 W/sr along the horizontal centerline of the beam between −9.5° and +9.5° horizontally relative to the center of the aforementioned 48° by 8° rectangular angular region of high uniformity. Along horizontal slices taken through horizontal coordinates±3.95° from the center, the intensity within this rectangular angular region between −9.5° and +9.5° horizontally is approximately 42 W/sr.

Figure 21A:
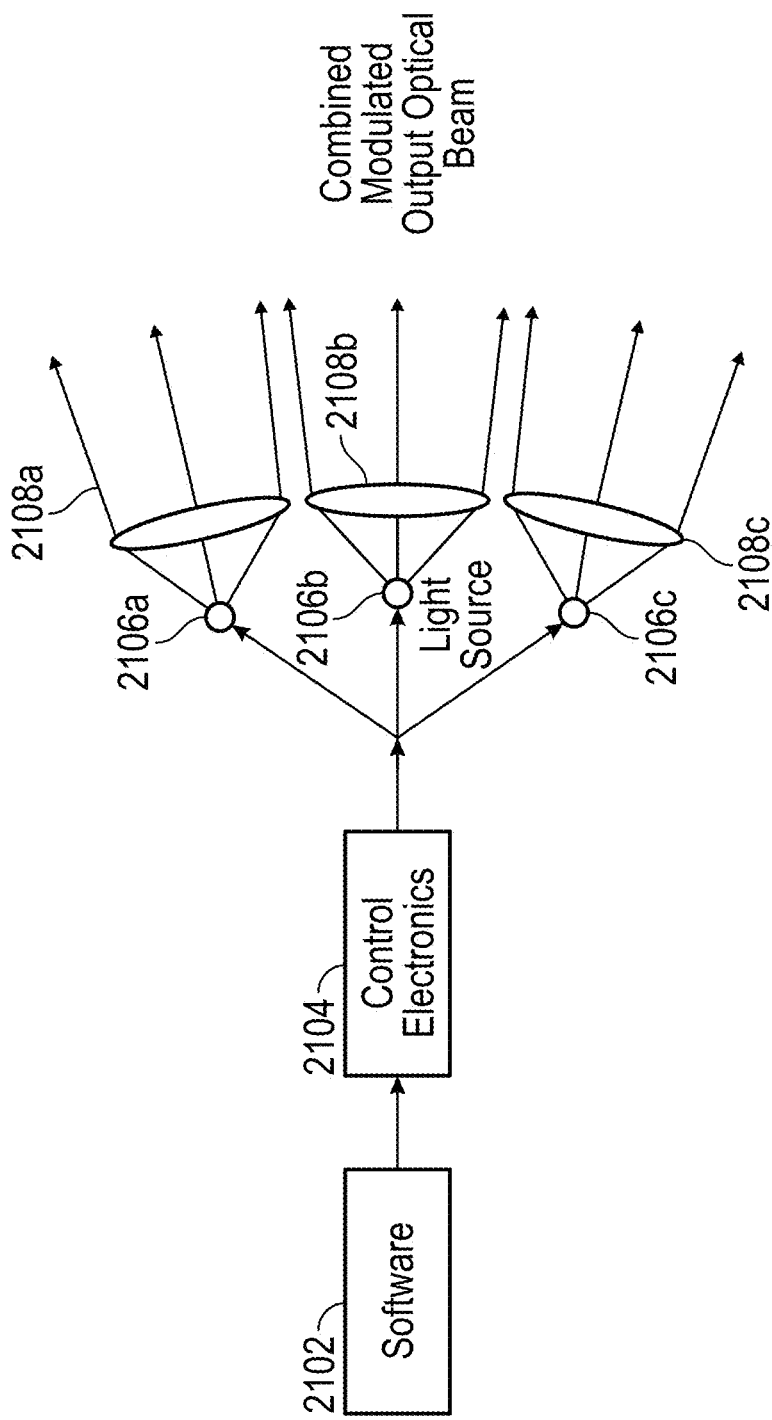
FIG. 21a depicts a simplified schematic diagram of an example OTA utilizing multiple light sources and beamforming optics.

FIG. 21a depicts a simplified schematic diagram of an example OTA utilizing multiple light sources 2106a-c and beamforming optics 2108a-c. Multiple copies of one or more designs of beamforming optics 2108a-c, each utilizing its own light source 2106a-c, may be used together within a single OTA to produce an output beam wider than that produced by any one of the beamforming optics by itself. In some embodiments, multiple beamforming optics, each utilizing its own optical source, may be used to produce a combined output optical beam having increased horizontal and/or vertical angular beam widths, and/or increased intensity within certain solid-angular regions.

In various embodiments, software 2102 (e.g., from a user's computing device) may provide files to transfer to control electronics 2104 (e.g., electronics within the OTA 800 of FIGS. 8 and 9). The control electronics may convert the information in these files into appropriate electrical signals for driving the light sources 2106a-c.

Each light source may generate a modulated optical beam, in which the modulations represent the information contained in the aforementioned files. The modulated optical beam from each of the light sources 2106a-c is converted into a modulated output optical beam having a required intensity distribution by each one of the multiple beamforming optics 2108a-c (e.g., a wineglass collimator 1100 and a pair of lenslet arrays 1108 and 1110). Although FIG. 21a depicts control of three light sources 2106a-c and three beamforming optics 2108a-c, it will be appreciated that there may be any number of light sources and any number of beamforming optics.

The light sources 2106a-c may be driven by identical synchronized electrical drive signals, so that their modulated optical outputs as a function of time are identical. Although depicted as refractive in FIG. 21, the optics could utilize refraction, reflection, and/or diffraction. The beams output by the beamforming optics 2108a-c may combine to produce a combined output beam having a desired intensity distribution over a desired two-dimensional angular zone, referred to as the angular output region.

Figure 21B:
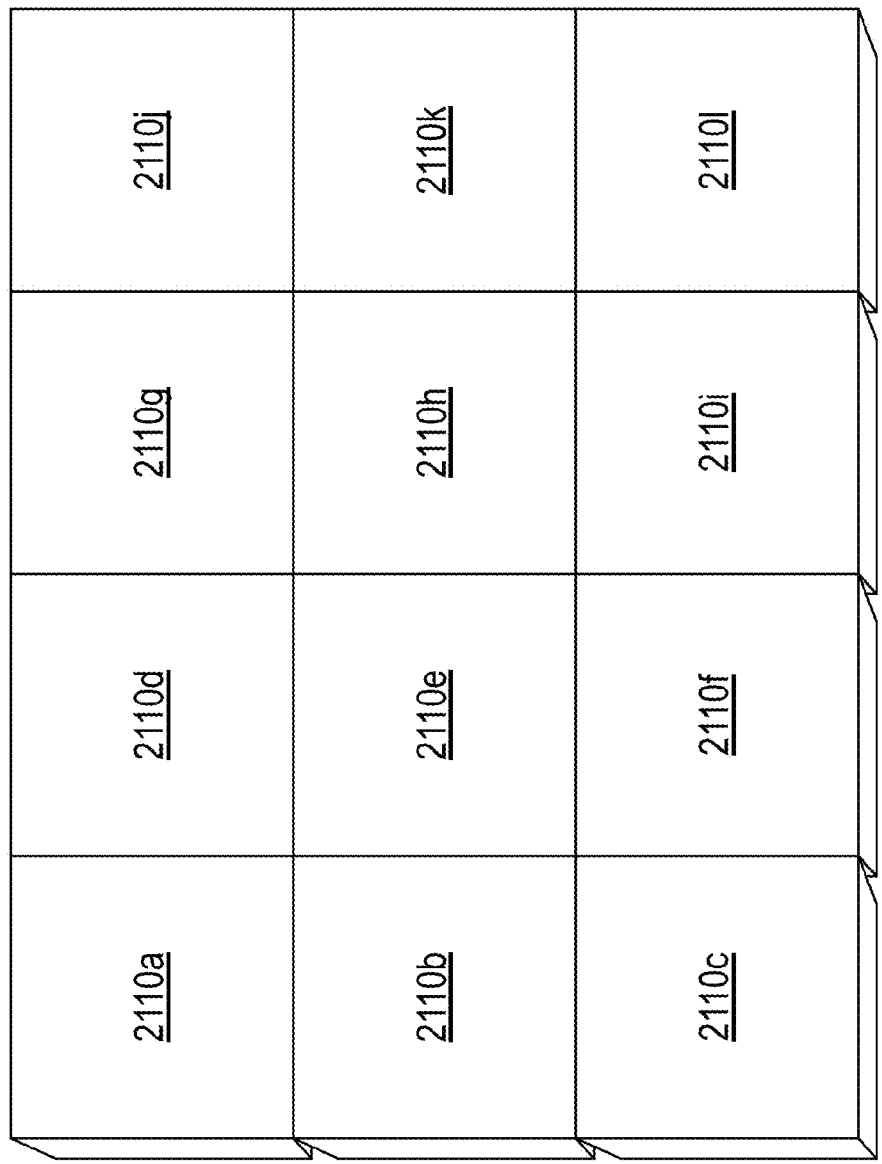
FIG. 21b depicts an example combined optical beam output from an OTA utilizing multiple light sources and beamforming optics.

FIG. 21b depicts an example of a combined optical beam output from an OTA utilizing multiple light sources and beamforming optics. As previously discussed, OTAs in accordance with various embodiments may comprise OTs (each of which may include a light source and beamforming optics) that are adapted to output an optical beam that is highly uniform within, e.g., a square angular region. FIG. 21b depicts a combination of multiple optical beams 2110a-2110l, each of which may comprise, for example, an 8°-square angular region. Although not shown in FIG. 21b, it can be appreciated that each of optical beams 2110a-2110l may be the result of a modulated optical beam that is output from a single OT (light source and beamforming optic). For example, optical beam 2110a may be the output of light source 2106a and beamforming optic 2108a (of FIG. 21a), optical beam 2110*b* may be the output of light source 2106*b* and beamforming optic 2108*b*, and so on.

In the example illustrated in FIG. 21*b*, each 8°-square angular region of each respective optical beam may "abut" each other to generate a "tiled" combined optical beam. It should further be appreciated that one or more of the OTs generating the combined optical beam can be aimed and/or positioned such that the respective optical beams output from each of the multiple OTs can result in the illustrated combined optical beam. That is, one or more angular offsets may be used when positioning one or more of the OTs, e.g., horizontal and/or vertical angular coordinates within the angular output region. Hence, the aforementioned intensity distribution may be a function of such angular coordinates. For example, the light rays comprising each of optical beams 2110*a*-2110*l* may be output generally in direction z, but offset by some angle. Here, the OTs generating optical beams 2110*b*, 2110*e*, 2110*h*, and 2110*k* may be positioned such that optical beams 2110*b*, 2110*e*, 2110*h*, and 2110*k* are not angled with respect to the y-direction, but are offset from each other by 8° in the x direction to create a 32° wide angular region. The OTs outputting optical beams 2110*a*, 2110*d*, 2110*g*, and 2110*j* may be offset in the x direction by 8° (relative to each other) to create a 32° wide angular region, and further offset in the y direction by 8° relative to optical beams 2110*b*, 2110*e*, 2110*h*, and 2110*k*. Optical beams 2110*c*, 2110*f*, 2110*i*, and 2110*l* may also be offset in the y direction by 8° relative to optical beams 2110*b*, 2110*e*, 2110*h*, and 2110*k*. The resulting combined optical beam output from the multiple OTs is a 32° by 24° rectangular optical beam.

It should be noted that an OTA which includes multiple OTs can have one or more of its OTs oriented in any desired manner. For example, an OTA may have a first OT oriented 90° with respect to a second OT. Such an arrangement may allow an OTA to be used to output optical beams along two different paths while being situated at the convergence of those two different paths (e.g., along two streets, where the OTA is located at the corner of those two streets). Other orientations are possible and contemplated herein.

It should be further noted that one or more of the optical beams output in such a tiled manner may be optical beacons, optical signals, or some combination thereof. For example, optical signals and optical beacons may be temporally interleaved for transmission. For example, optical signals and optical beacons may be appropriately identified, e.g., with a first identifier indicating that optical beams or portions of optical beams are optical signals/contain signal information and a second identifier indicating that optical beams or portions of optical beams are optical beacons/contain beacon information. For example, the optical beams may comprise an optical signal that is modulated by the optical beacon, e.g., the modulation representative of an optical signal is itself modulated by the modulation representative of the optical beacon. Data rates used to transmit optical signals may be different from those used to transmit optical beacons. For example, an optical signal data rate may be higher than an optical beacon data rate. Different optical wavelength bands may be used to transmit optical signals and optical beacons, the respective optical wavelength bands may be different and non-overlapping.

In various embodiments, an OTA 800 may transmit two different types of modulated optical beams: optical beacons and optical signals. These two types of modulated optical beams are discussed herein in terms of their functions. For optical beacons and optical signals to serve their respective purposes in an ONS, it is necessary that an effective method of differentiating between the two types of modulated optical beams be adopted. Otherwise, an ORA could incorrectly interpret an optical beacon or a portion of an optical beacon as being an optical signal or a portion of an optical signal. Similarly, an ORA could incorrectly interpret an optical signal or a portion of an optical signal as being an optical beacon or a portion of an optical beacon.

Possible methods of distinguishing between optical beacons and optical signals are now discussed. It will be appreciated that there may be any number of effective methods other than those presented herein for producing optical beacons that are distinguishable from optical signals. Methods discussed herein include: (1) spectral separation, (2) temporal separation, and (3) double modulation.

A straightforward method of enabling ORAs to distinguish between optical beacons and optical signals is to use spectral separation. In one example, the optical waveband (which can also be referred to as an optical wavelength band) used for optical beacons is separate from the optical waveband used for optical signals. For example, an OTA 800 may produce optical beacons by modulating an optical source that outputs near-IR radiation having a wavelength spectrum in the 800-900 nm range. The OTA 800 may also produce optical signals by modulating an optical source that outputs near-IR radiation having a wavelength spectrum in the 900-1000 nm range. ORAs for receiving optical beams transmitted by such an OTA may use OBRs (discussed herein) having significant sensitivity only to wavelengths in the 800-900 nm range and OSRs (discussed herein) having significant sensitivity only to wavelengths in the 900-1000 nm range. As long as the sensitivities of OBRs and OSRs to optical radiation having wavelengths in each other's bands are sufficiently low, the probability of an optical beacon being confused with an optical signal, and vice versa, may be negligible.

Further, if the bit rate used for optical beacons is significantly different than that used for optical signals, electronic bandpass filtering can further reduce the likelihood of optical beacons and optical signals being confused with each other. It will generally not be a problem for optical beacons to use significantly lower bit rates than optical signals, because the amount of information contained in an optical beacon will typically be far lower than that contained in an optical signal. In some embodiments, separate transmitter optics and optical sources may be used in an OTA to enable production of optical beacons and optical signals with spectral separation. Similarly, separate receiver optics and detectors (or detector arrays) may be required in ORAs to enable them to receive both optical beacons and optical signals.

Figure 22:
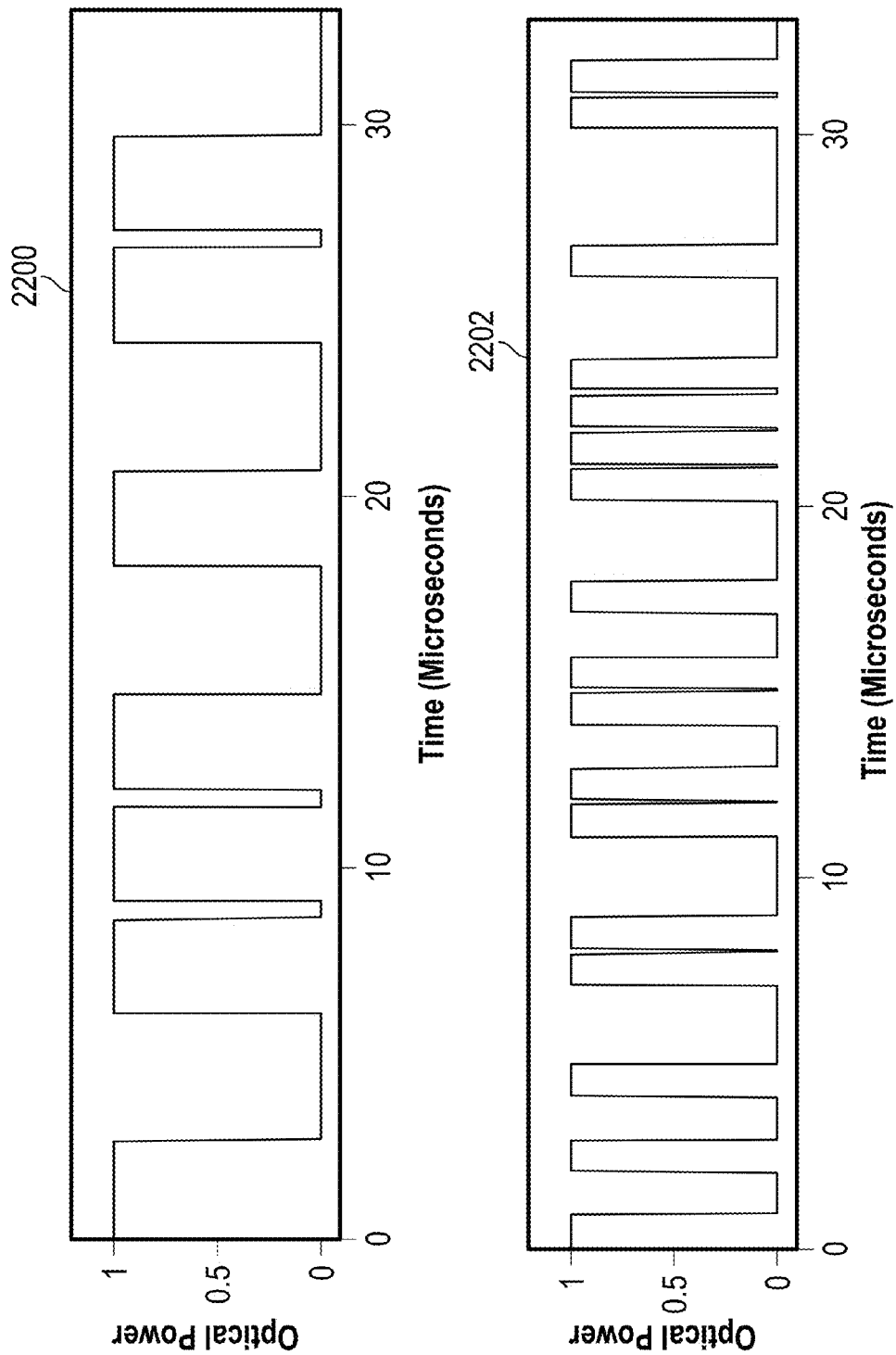
FIG. 22 depicts an example of the optical power output (in arbitrary units) as a function of time for an optical beacon operating in the 800-900 nm band, as well as for an optical signal operating in the 900-1000 nm band, where the bit rates for the optical beacon and the optical signal are 333.33 kHz and 1 MHz, respectively.

FIG. 22 depicts an example of the optical power output (in arbitrary units) as a function of time for an optical beacon operating in the 800-900 nm band, as well as for an optical signal operating in the 900-1000 nm band, where the bit rates for the optical beacon and the optical signal are 333.33 kHz and 1 MHz, respectively. The coding scheme used for both optical beacons and optical signals is that 1-bits are represented by the presence of a pulse and 0-bits are represented by the absence of a pulse. The upper plot 2200 in FIG. 22 depicts the optical output power as a function of time for an optical beacon during a time interval with a total duration of 33 ⍰ s. The lower plot 2202 in the figure depicts the optical output power as a function of time for an optical signal during the same time interval.

A second method of enabling optical beacons that are distinguishable from optical signals is temporal separation. As the name implies, this method separates optical beacons from optical signals temporally, rather than spectrally. In this example, at any given time an OTA 800 will output either an optical beacon or an optical signal, but will not output both simultaneously. Such an OTA may alternate between sending optical beacons and optical signals. In some embodiments, ORAs can determine whether they are currently receiving an optical beacon or an optical signal from such an OTA by looking for the presence of a header at the beginning of an optical beacon. Such a header may include a unique series of transmitted 1-bits and 0-bits that marks the beginning of an optical beacon. A different header may be used to mark the beginning of a transmission of optical signals, or, alternatively, each transmitted optical beacon may include a standard number of pulses, such that ORAs would always know when transmission of an optical beacon has ended and transmission of an optical signal has begun. Because optical beacons will typically include very small amounts of information relative to optical signals, the amount of time devoted by an OTA to transmitting optical beacons may typically be very small (e.g., 2%) relative to the amount of time devoted to transmitting optical signals (assuming the bit rate is the same for both). One advantage of the temporal separation method is that an OTA may use a single optical source and a single transmitter optic operating in a single waveband to produce both optical beacons and optical signals. Similarly, an ORA may be able to use a single receiver optic and a single detector (or detector array) to receive both optical beacons and optical signals. That is, the same receiver optic and detector (or detector array) may be able to serve as both an OBR and an OSR in an ORA designed to receive temporally separated optical beacons and optical signals.

The third method discussed herein of enabling optical beacons to be distinguished from optical signals is double modulation. In this method, an OTA transmits a single modulated optical beam having the relatively low-bit-rate modulation of an optical beacon combined with a relatively high-bit-rate modulation of an optical signal. In this way, an optical beacon and an optical signal are combined into a single beam. This allows the double modulation method to be implemented using an OTA operating in a single optical waveband using a single optical source and a single transmitter optic.

Figure 23:
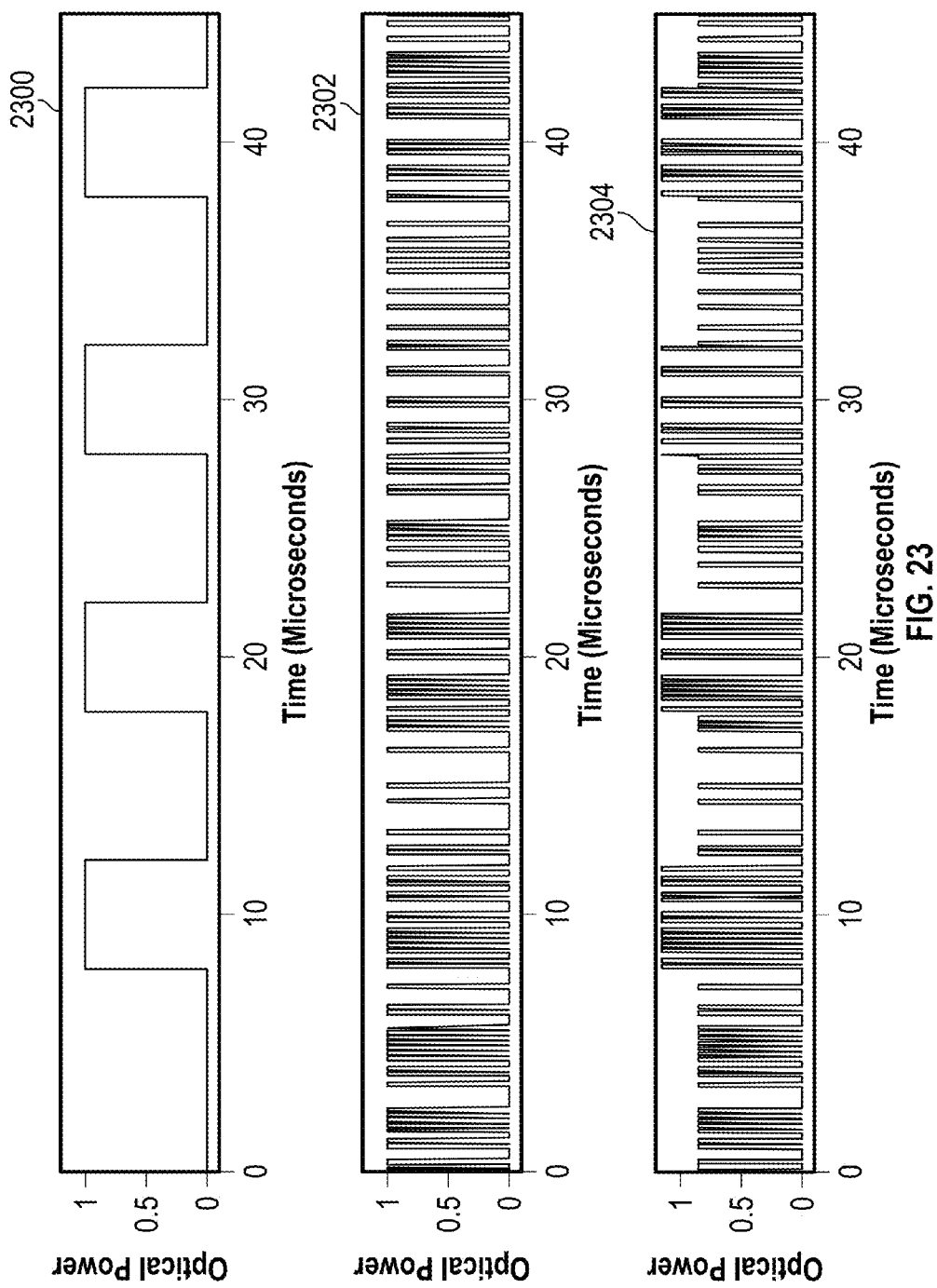
FIG. 23 depicts three plots of temporal waveforms of transmitted output beams for an example of double modulation.

FIG. 23 depicts three plots of temporal waveforms of transmitted output beams for an example of double modulation. "Temporal waveform" is herein defined as the output optical power as a function of time of a modulated optical beam. The upper plot 2300 depicts an example temporal waveform an optical beacon, whereas the middle plot 2302 depicts an example temporal waveform of an optical signal during the same time interval. As discussed with regard to the spectral separation method, this example of an optical beacon and optical signal may be transmitted simultaneously in two different wavebands. However, an alternative method is to use a single beam (in a single waveband) that is modulated by the temporal waveforms of both the desired optical beacon and the desired optical signal. Since the modulation includes both temporal waveforms, this modulation may have the advantage that a single optical source and transmitter optic can transmit a single beam that serves as both an optical beacon and an optical signal. The combined double-modulated waveform is depicted in the plot 2304. The amplitudes of the two components (i.e., the optical-beacon component and the optical-signal component) of the double modulation may be adjusted to provide approximately the same communications range for both optical beacons and optical signals, based on the known characteristics of OBRs and OSRs that will be used to receive such doubly-modulated optical beams. For an optical beacon with a bit rate that is significantly lower (e.g., by a factor of 100) than the corresponding optical signal, it may not be difficult for OBRs and OSRs to differentiate between the optical-beacon and optical-signal components of the doubly-modulated transmitted optical beam using, for example, electrical bandpass filtering. An optical beacon may have a much lower bit rate than an optical signal since the information content of optical beacons is typically much lower than that of optical signals.

Figure 24:
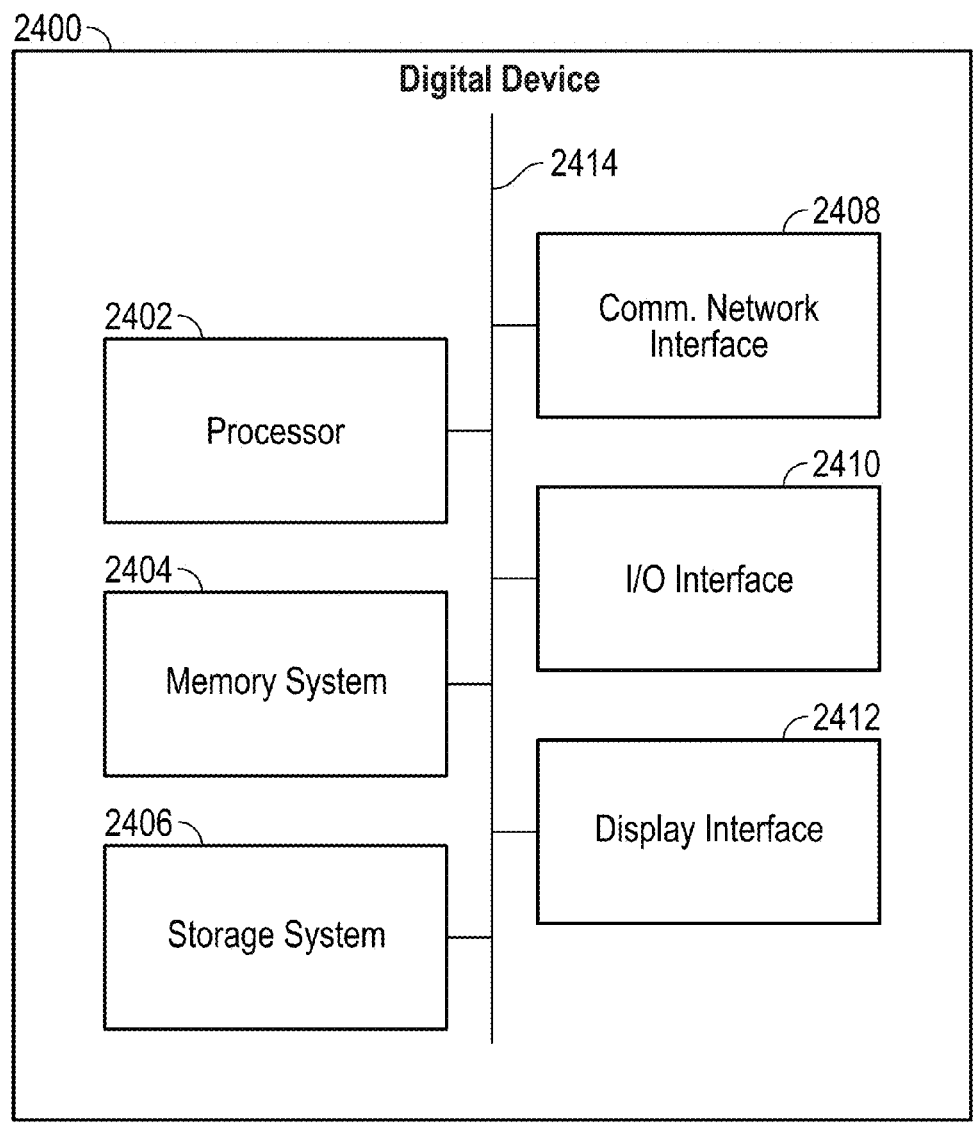
FIG. 24 is a block diagram of an example digital device.

FIG. 24 is a block diagram of an example digital device 2400. The digital device 2400 comprises a processor 2402, a memory system 2404, a storage system 2406, a communication network interface 2408, an I/O interface 2410, and a display interface 2412 communicatively coupled to a bus 2414. The processor 2402 is configured to execute executable instructions (e.g., programs). In some embodiments, the processor 2402 comprises circuitry or any processor capable of processing the executable instructions.

The memory system 2404 is any memory configured to store data. Some examples of the memory system 2404 are storage devices, such as RAM or ROM. The memory system 2404 may comprise the RAM cache. In various embodiments, data is stored within the memory system 2404. The data within the memory system 2404 may be cleared or ultimately transferred to the storage system 2406.

The storage system 2406 is any storage configured to retrieve and store data. Some examples of the storage system 2406 are flash drives, hard drives, optical drives, and/or magnetic tape. In some embodiments, the digital device 2400 includes a memory system 2404 in the form of RAM and a storage system 2406 in the form of flash data. Both the memory system 2404 and the storage system 2406 comprise computer readable media which may store instructions or programs that are executable by a computer processor including the processor 2402.

The communications network interface (comm. network interface) 2408 may be coupled to a network via the link 2414. The communication network interface 2408 may support communication over an Ethernet connection, a serial connection, a parallel connection, or an ATA connection, for example. The communication network interface 2408 may also support wireless communication (e.g., 802.11 a/b/g/n, WiMax). It will be apparent to those skilled in the art that the communication network interface 2408 may support many wired and wireless standards.

The optional input/output (I/O) interface 2410 is any device that receives input from the user and output data. The optional display interface 2412 is any device that is configured to output graphics and data to a display. In one example, the display interface 2412 is a graphics adapter.

It will be appreciated that the hardware elements of the digital device 2400 are not limited to those depicted in FIG. 24. A digital device 2400 may comprise more or less hardware elements than those depicted. Further, hardware elements may share functionality and still be within various embodiments described herein. In one example, encoding and/or decoding may be performed by the processor 2402 and/or a co-processor located on a GPU (i.e., NVIDIA).

Figure 25:
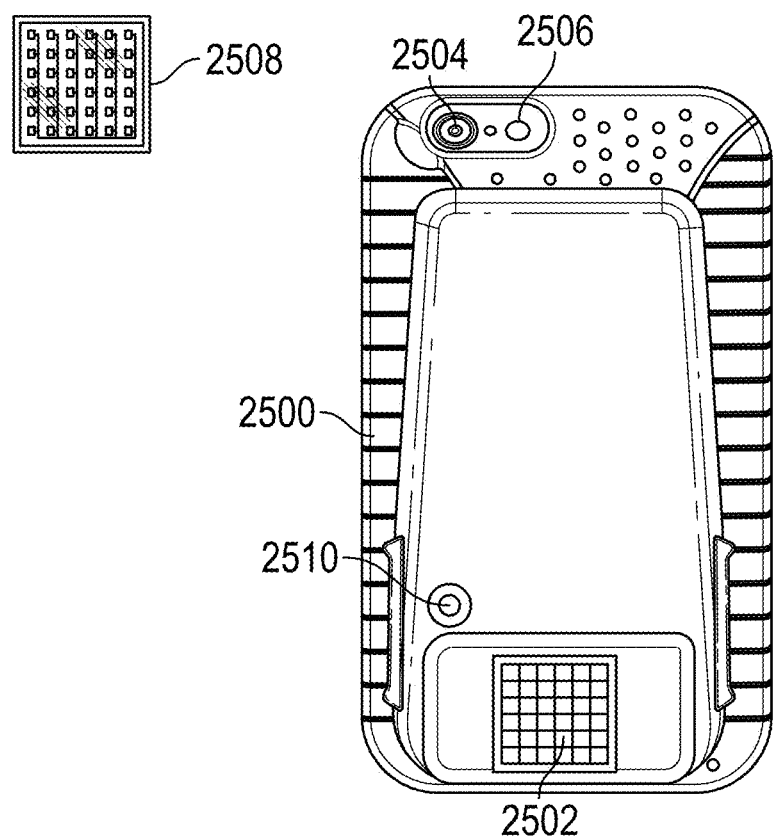
FIG. 25 is a depiction of an example optical receiver assembly.

FIG. 25 is a depiction of an example optical receiver assembly (ORA) 2500. The ORA 2500 is capable of receiving long-range, high-bandwidth optical narrowcast information. While typical smartphone communications are solely received from the transmission of radio waves (e.g., cellular networks, WIFI, GPS, and Bluetooth®), the ORA 2500 may receive information in the form of modulated optical beams (e.g., modulated beams of optical radiation). In various embodiments, the ORA 2500 may be part of a one-way or two-way optical narrowcast communications system. It will be appreciated that the ORA 2500 may be attached or included within a digital device. In one example, the digital device with the ORA 2500 may be capable of radio smartphone communications as well as capable of receiving information via optical narrowcasting.

The ORA 2500 may include electronics, software (and/or firmware), and one or more optical receivers (ORs) (described herein) that receive data (i.e., information) in the form of modulated optical beams as part of an optical narrowcasting system (ONS). The ORA 2500 may be capable of long communication range, receiving sufficient information at long distances for streaming video with low, correctable error rates. In one example, the signals received by the ORA 2500 may be transmitted by an optical transmitter assembly (e.g., OTA 800) described herein.

A modulated optical beam output by an OTA may be of two different types, as described herein: optical beacons and optical signals. In some cases a single modulated optical beam may simultaneously be both an optical beacon and an optical signal. A detailed discussion of optical beacons and optical signals is discussed herein. In some embodiments, an optical receiver that is designed to receive optical beacons is referred to as an optical beacon receiver (OBR). An OR that is designed to receive optical signals may be referred to as an optical signal receiver (OSR). In various embodiments, an ORA 2500 may include at least one OSR and one OBR. In some embodiments a single optical receiver may function as both an OBR and an OSR.

The ORA 2500 may include or be attached to a digital computing device such as a smartphone, media tablet, laptop, camera, game device, wearable device (e.g., smartwatch), automobile central computer, or the like. In various embodiments, any or all components of the ORA 2500 are within a case (e.g., a smartphone case) that is coupled to a digital device such as a smartphone. In one example, the digital device may be coupled to a smartphone case equipped with an ORA 2500 that incorporates one or more OSRs 2502 and one or more OBRs 2510. Such a smartphone case may also be equipped with an OTA 800 (not depicted in FIG. 25) to facilitate two-way communications.

The ORA 2500 may receive modulated optical beams in the visible, near-infrared (IR), or other optical bands produced using incoherent optical sources (e.g., LEDs), coherent optical sources (e.g., lasers), or the like. For example, the ORA 2500 may receive modulated optical beams in the spectral region from the extreme ultraviolet (UV) to the far IR, which may include wavelengths in the range of 10 to $10^6$ nm. It will be appreciated that the ORA 2500 may receive modulated optical beams at any wavelength or range of wavelengths in the aforementioned spectral region. For example, the ORA 2500 may receive modulated optical beams in the visible or near-IR bands.

The ORA 2500 may receive modulated optical beams transmitted through air, water, transparent solids (e.g., glass windows), and/or space (i.e., a vacuum). As previously discussed, the ORA 2500 may include a digital device case (e.g., a smartphone case). The digital device case may include or be coupled to one or more OSRs 2502 and one or more OBRs 2510. The OSR 2502 may include, for example, a detector array (e.g., a 6×6 array of detectors) 2508. The detector array 2508 is further discussed herein.

In some embodiments, if the OSR utilizes a single lens having a 16.5-mm-square aperture, or similarly sized aperture, the total thickness of the OSR may be required to be greater than 16.5 mm. As a result, an OSR utilizing a single lens may be impractical for smartphones or other personal digital devices, due to the inability to fit it into the available space in a typical device (e.g., a smartphone) or device case (e.g., a smartphone case).

Alternately, an OSR 2502 may include an array of lenslets having smaller apertures (e.g., a 6×6 array of 36 lenslets having 2.75-mm-square sub-apertures) with a combined 16.5-mm-square aperture with each lenslet in each sub-aperture being paired with a separate detector, which may enable designs that are significantly less than 16.5 inches thick. For example, there may be a separate detector located in the focal plane of each lenslet in each of the 36 2.75-mm-square sub-apertures of the 6×6 lenslet array such that the total thickness of the lenslet array and detector array may be less than 0.20 inches. In this example, a single 0.2-mm-square high-speed silicon photodetector may be placed in the focal plane of each lenslet. The total thickness of the receiver optics, measured from the photosensitive surface of each detector to the outermost surface of each lenslet, may be approximately 4 mm. As a result, the OSR 2502 including lenses and detectors may fit into a smart-phone or digital device case.

It will be appreciated that the ORA 2500 may be or include a separate ORA that is coupled to a digital device in any number of ways, may be or include a digital device case, or may be or include a digital device (e.g., the smartphone may internally include the ORA 2500). In one example, the ORA 2500 may include an OSR 2502 having a 6×6 array of lenslets with a combined 16.5-mm-square aperture, with each lenslet having an f/# near 1.0. In some embodiments the total thickness of the lenslet array and the detector array may be less than 0.20 inches. It will be appreciated that with 36 detectors in the OSR all summed into a single amplifier, the detector shot noise may be reduced allowing for higher signal-to-noise ratio (SNR) and longer range than could be obtained using only the signal from any one of the 36 detectors or using the summed signal from fewer than 36 of the detectors. In the same example, the ORA 2500 may also include an OBR 2510 consisting of a single imaging lens with a detector array in its focal plane, where said detector array is designed as for use in video cameras.

In various embodiments, the detectors in OSR 2502 operate at a high-bit-rate, which may provide the capability of receiving data at much higher bit rates than would be possible using the camera built into the digital device as an OSR. This is because, freed from the requirement to produce video imagery, the high-bit-rate OSR 2502 may be designed to operate at a much higher frame rate than could be achieved using the built-in camera 2504.

The high-bit-rate OSR 2502 may include optics (e.g., the previously discussed 6×6 lenslet array) that concentrate flux collected over its entrance pupil within a relatively narrow FOV (e.g., 3.6°×3.6°) onto one or more detectors (discussed further herein) capable of operating at the bit rate used by optical transmitters (e.g., OTA 800). In some embodiments, the high-bit-rate OSR 2502 is a multi-channel receiver, in which case it may have at least one detector dedicated to receiving flux within the optical waveband corresponding to each of the channels. The optical channels may be in the visible and/or near IR, but could also be in other spectral regions.

In various embodiments, an optical spectral filter may be used to reduce to low levels the out-of-band flux incident on each detector, thereby reducing background noise and increasing the operational range. The aperture size of the high-bit-rate OSR 2502 may be, in some embodiments, significantly larger than that of video cameras built into typical portable devices, which may significantly enhance its achievable operational range at a given bit rate, relative to using the video cameras as optical receivers. It will be appreciated that the high-bit-rate OSR 2502 may have fewer pixels and a higher frame rate than a visible-band camera because the high-bit-rate OSR 2502 may not need to produce high-resolution video imagery, but rather provide a means of receiving optical signals.

The optical receiver (e.g., ORA 2500) may work both with stand-alone optical transmitters not contained within any existing portable devices as well as with transmitters based on LED flash units in portable devices. The ORA 2500 may also provide part of the capability (i.e., the capability of receiving information in the form of modulated optical beams) for two-way optical communication between portable devices.

It will be appreciated that the ORA 2500 may include or be coupled to a device including electronics, software, firmware, one or more OBRs, and one or more number of OSRs. In some embodiments, the ORA 2500 may contain one or more tilt actuators allowing for control of the pointing direction(s) of OBRs and/or OSRs. An ORA's electronics and associated software (and/or firmware) perform various functions including, but not limited to, providing an interface between the ORA and its user(s) (or its users' devices), controlling operation of the OBRs and OSRs (e.g., turning them on and off, setting their data-sampling rate, or the like), receiving and transferring to users (or to users' devices) information, such as identifying information and angular position, obtained by OBRs regarding optical beacons they have detected, receiving and transferring to users (or to users' devices) data extracted from optical signals received by OSRs, and/or controlling one or more tilt actuators to alter the pointing direction(s) of one or more OBRs and one or more OSRs.

Figure 26A:
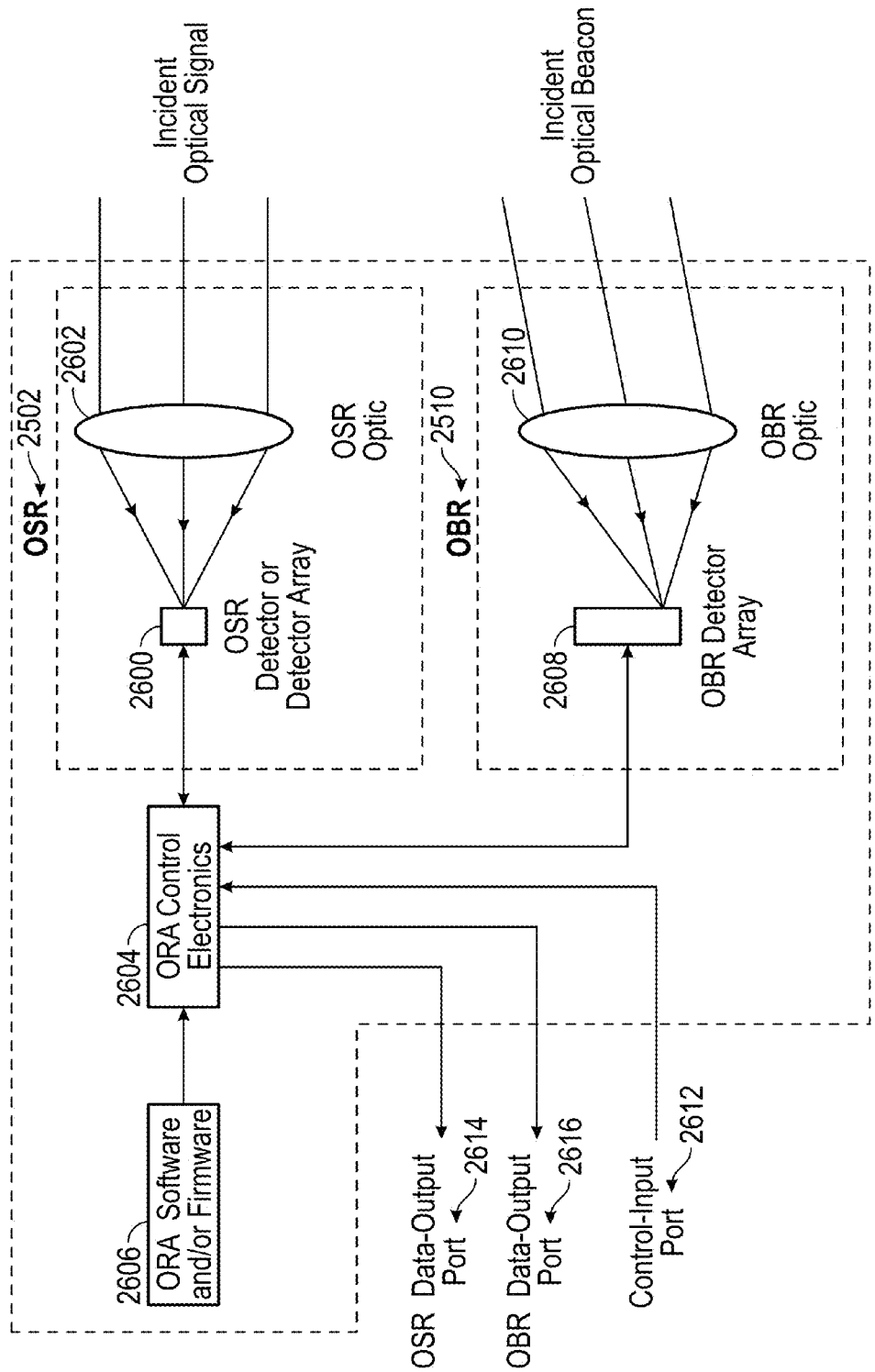
FIG. 26a schematically depicts an ORA that utilizes a single OSR and a single OBR.

FIG. 26A schematically depicts an ORA 2500 that utilizes a single OSR 2502 and a single OBR 2510. The OSR 2502 may include one or more optical detectors or detector arrays 2600 and one or more OSR optics 2602. The OBR 2510 may include one or more optical detector arrays 2608 and one or more OBR optics 2610. The ORA 2500 in FIG. 26A also includes ORA control electronics 2604 and ORA software and/or firmware 2606. The ORA software and/or firmware 2606 may control various aspects of how the ORA control electronics 2604 responds to user commands, how it processes data received optically, in what format it outputs data, and the like.

The ORA control electronics 2604 may accept control inputs from a user device via the control-input port 2612 (e.g., a physical or virtual port which may receive information from any number of digital devices). The ORA control electronics 2604 outputs to a user device via the OSR data-output port 2614 (e.g., a physical or virtual port which may provide information to any number of digital devices) information it has received from optical signals sent by one or more OTAs 800, and/or other relevant information related to optical signals (e.g., estimates of SNR of received optical signals).

The ORA control electronics 2604 may also output to a user device via the OBR data-output port 2616 (e.g., a physical or virtual port which may output information from any number of digital devices) information retrieved from optical beacons sent by one or more OTAs 800. Said information extracted from optical beacons and output via the OBR data-output port 2616 may include, but is not limited to, such information as: the number of optical beacons that have been detected and that currently fall within the OBR's FOV, the current estimated horizontal and vertical angular positions within the OBR's FOV of OTAs associated with detected optical beacons, and/or identifying information extracted from optical beacons that have been detected by the OBR. In one example, information retrieved from optical beacons may identify entities (e.g., business, organizations, or individuals) associated with the OTAs that sent said optical beacons.

The OSR detector(s) or detector array(s) 2600 may be capable of detecting optical flux in wavebands and at bit rates used by optical transmitters (e.g., OTA 800) to transmit optical signals. Similarly, the OBR detector array(s) 2608 may be capable of detecting optical flux in wavebands and at bit rates used by optical transmitters (e.g., OTA 800) to transmit optical beacons. Each OSR receiver optic 2602 may collect incident in-band flux over its entrance pupil and within its specified FOV, and utilize refraction, reflection, and/or diffraction to concentrate flux onto one or more of the OSR detectors or detector arrays 2600. Similarly, each OBR receiver optic 2610 may collect incident in-band flux over its entrance pupil and within its specified FOV, and utilize refraction, reflection, and/or diffraction to concentrate flux onto one or more of the OBR detector arrays 2608.

In some embodiments, one or more optical spectral bandpass filters may be included as part of each OSR optic 2602 and/or each OBR optic 2610 to reduce to low levels the out-of-band flux incident on the OSR detector(s) or detector array(s) 2600 and/or the OBR detector array(s) 2608. Each such spectral bandpass filter may be a separate component (e.g., a flat refractive plate coated with a spectral bandpass coating) or may include a spectral bandpass coating on an optical surface of one of the optical components (e.g., a lens or reflective concentrator) of OSR optic 2602 or OBR optic 2610 used to concentrate flux onto detectors or detector arrays.

In various embodiments, a single OSR 2502 may comprise multiple optical detectors or detector arrays 2600, each paired with its own OSR optic 2602. Similarly, in various embodiments, a single OBR 2510 may comprise multiple optical detector arrays 2608, each paired with its own OBR optic 2610. Said use of multiple detectors or multiple detector arrays paired with multiple OSR optics in a single OSR and/or multiple detector arrays paired with multiple OBR optics in a single OBR may provide a means of increasing the FOV and/or increasing the OSR's and/or OBR's sensitivity in certain solid-angular regions, while maintaining a sufficiently small thickness of the OSR and/or OBR so that they may fit into user devices (e.g., smartphones) or device cases (e.g., smartphone cases).

Figure 26B:
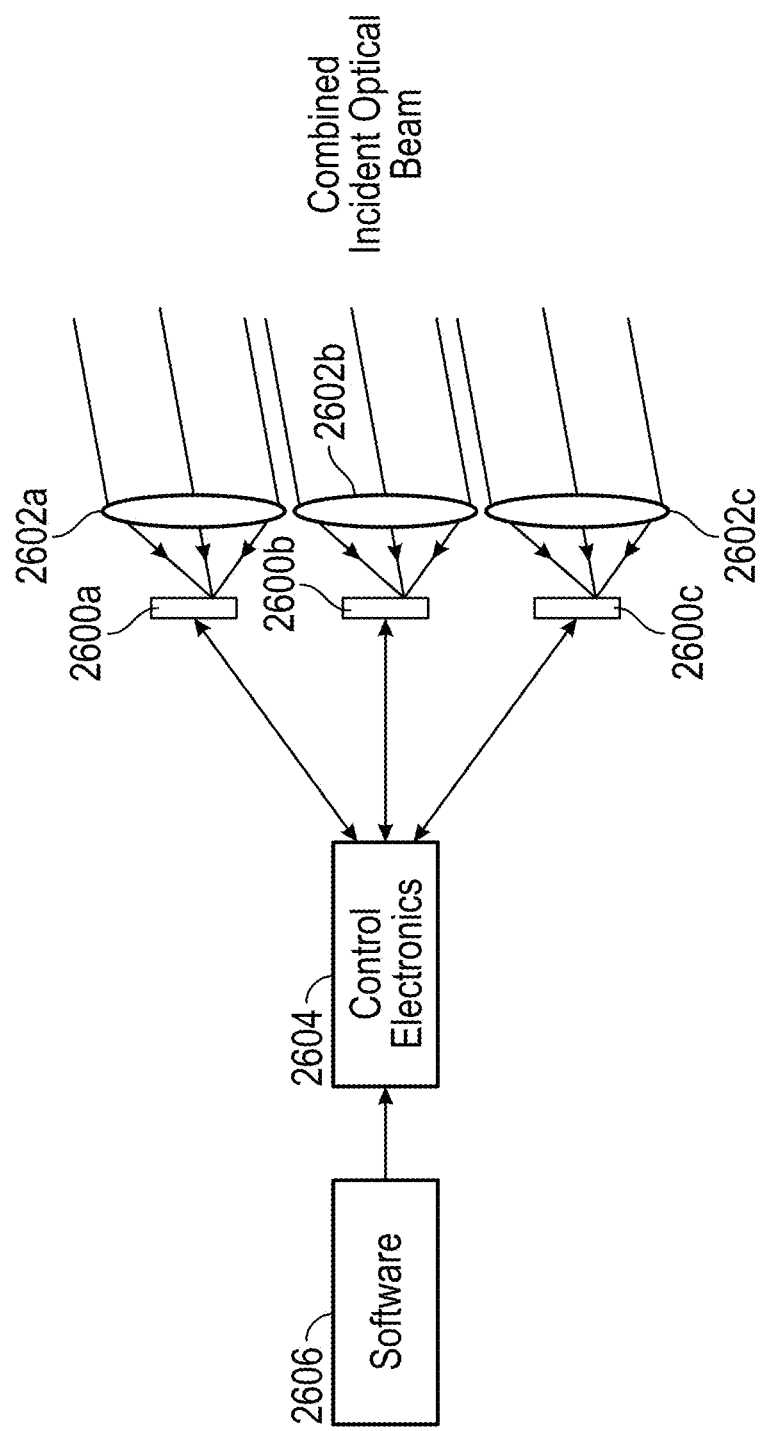
FIG. 26b schematically depicts an ORA utilizing multiple OSRs.

For example, FIG. 26*b* depicts a simplified schematic diagram of an example ORA utilizing multiple OSR detectors or detector arrays 2600*a-c* and OSR optics 2602-*c*. OSR detectors or detector arrays 2600*a-c* may be identical or at least similar to each other. OSR optics 2602-*c* may have optical axes that are parallel to each other. It should be noted that multiple OSR detectors or detector arrays along with their respective OSR optics may be configured in a variety of ways, one example of which may be similar the manner in which multiple OTs are configured in FIG. 21*b*, e.g., a two-dimensional array.

The ORA control electronics 2604 and ORA software and/or firmware 2606 may enable the user to adjust, via control commands input via the control-input port 2612, various operational settings, and/or provide electrical power and control signals for operation of the OSR detector(s) or detector array(s) 2600 and/or the OBR detector arrays(s)

2608. In addition, the ORA control electronics 2604 and ORA software and/or firmware 2606 may receive and amplify modulated signals from the OSR detector(s) or detector array(s) 2600 and the OBR detector array(s) 2608, optionally decrypt the information received optically in the form of optical signals and optical beacons, convert the received information into a format suitable for display and/or internal storage, and store the received information in internal storage (i.e., memory within the ORA control electronics 2604). The ORA control electronics 2604 and ORA software and/or firmware 2606 may also enable the user to transfer information received from OTAs 800, as well as other relevant data, from internal storage within the ORA control electronics to another electronic device or computer, via the OSR data-output port 2614 and the OBR data-output port 2616.

In some embodiments, the ORA control electronics 2604 and ORA software and/or firmware 2606 may be used to control the direction from which optical signals and optical beacons are received by tilting one or more of the OSR 2502 and/or OBR 2510 assemblies. In such cases, tilt actuators may perform the tilting movement. For example, when tilt actuators are used, the tilting could be based on user inputs or be controlled automatically by the ORA control electronics 2604 and ORA software and/or firmware 2606. In some embodiments, the tilting may be based on information received from the OBR 2510 regarding the horizontal and vertical angular positions of operating optical transmitters (e.g., OTA 800), or from pointing commands received via the control-input port 2612. In the case of ORAs 2500 in handheld and wearable devices, the direction from which signals are received may be controlled manually by the user, by means of hand and/or body motion.

In some embodiments, a function of the OBR 2510 may be to provide information to the ORA 2500 allowing it to detect the presence of optical beacons transmitted by OTAs 800, distinguishing them from incident in-band radiation produced by radiation sources other than optical transmitters (e.g., natural and artificial illumination sources). Further, the OBR 2510 may provide information to the ORA 2500 allowing it to determine the horizontal and vertical angular positions of received optical beacons, and therefore of the OTAs 800 that are transmitting said received optical beacons, within said OBR's FOV. The OBR 2510 may also provide information extracted from optical beacons to the ORA 2500 allowing it to identify entities (e.g., businesses, organizations, or private individuals) operating or otherwise associated with OTAs 800. In some embodiments, the OBR 2510 may share some or all of its optics and detector arrays with one or more OSRs 2502, or it could be a separate unit.

In some embodiments, as discussed herein, the LED flash unit 2506 built into a smartphone may be utilized as an OTA (e.g., without a collimator) to transmit optical signals and/or optical beacons to other smartphones' cameras or to an ORA 2500 (e.g., a smartphone or smartphone case equipped with an ORA 2500). To transmit optical information, a smartphone application may produce the necessary digital modulation of the flash unit's optical output.

In some cases, some or all of the information output by ORA 2500 via the OSR data-output port 2614 and/or the OBR data-output port 2616 may be combined with sensed data other than information obtained from optical transmitters. This could include information received by other sensors. For example, the digital device (e.g., a smartphone) in which an ORA 2500 is installed, or with which it is interfaced, may store photographic or video imagery collected concurrently by any number of cameras, or by one or more co-located cameras. The device in which an ORA 2500 is installed, or with which it is interfaced, might also include one or more microphones, or accept audio inputs from one or more co-located microphones, for the purpose of recording ambient sounds to accompany any information received (e.g., photographic imagery, videos, text, or the like) from one or more OTAs 800. In another example, the device in which the ORA 2500 is installed may include GPS information, information received from applications, or other digital devices (e.g., over a cellular or data network). It will be appreciated that the device may include any or all of the information discussed above with information retrieved from optical beams and/or sensors.

The digital device (e.g., a smartphone) in which an ORA 2500 is installed, or with which it is interfaced, may create a single dataset in a standardized format that combines such photographic, video, and/or audio data with information the ORA 2500 has received in the form of optical signals and/or optical beacons from one or more OTAs 800, as well as with relevant associated information, such as the estimated horizontal and vertical positions of OTAs 800 within the FOV of the OBR 2510. Optionally, other data could be included, such as a timestamp and the latitude, longitude, and altitude of the device in which the receiver and signal detector are located. Such a combined dataset could be uploaded or live-streamed to other devices or onto the internet via WiFi or other data connections and/or stored as a file for later use.

In some embodiments, the digital camera (e.g., camera 2504 in FIG. 25) in a user's device may serve as either an OBR, an OSR, or both. The bit rate for receiving optical beacons or optical signals may be relatively low, however, due to the frame-rate limitations of user-device (e.g., smartphone) cameras. In one example, the bit rate may be approximately 30 bits per second. In some embodiments, useful information in the form of short messages could still be received by a smartphone using one or more of its cameras as one or more OBRs and/or one or more OSRs.

OTAs may, in addition to transmitting high-bit-rate (e.g., 1 Mbit per second) optical signals to OSRs, transmit optical beacons at bit rates sufficiently low that they could be temporally resolved by typical video cameras (e.g., camera 2504 in FIG. 25) in portable user devices to which information is to be optically transmitted. Also, OBR 2510 in FIG. 26A may itself be a video camera capable of receiving such low-bit-rate optical beacons. Video cameras used to receive optical beacons may operate in the visible-light waveband or some other optical waveband (e.g., a near-IR band). In some embodiments, low-bit-rate optical beacons may provide characteristic signals that a video camera in a portable device could use to detect the presence of optical transmitters and determine their horizontal and vertical angular positions within the camera's FOV. Said low-bit-rate optical beacon(s) could be transmitted in one or more optical wavelength channels that are completely separate from the channel(s) used to transmit information in the form of optical signals to the OSR 2502 (see FIG. 25 and FIG. 26A). Alternatively, the optical beacon(s) could share one or more of the wavelength channels used to transmit optical signals. In the latter case, the optical beacon could take the form of a low-bit-rate modulation of the high-bit-rate optical signal, or transmission of the high-bit-rate optical signal could be paused periodically to provide time intervals during which the low-bit-rate optical beacon could be transmitted.

Figure 27:
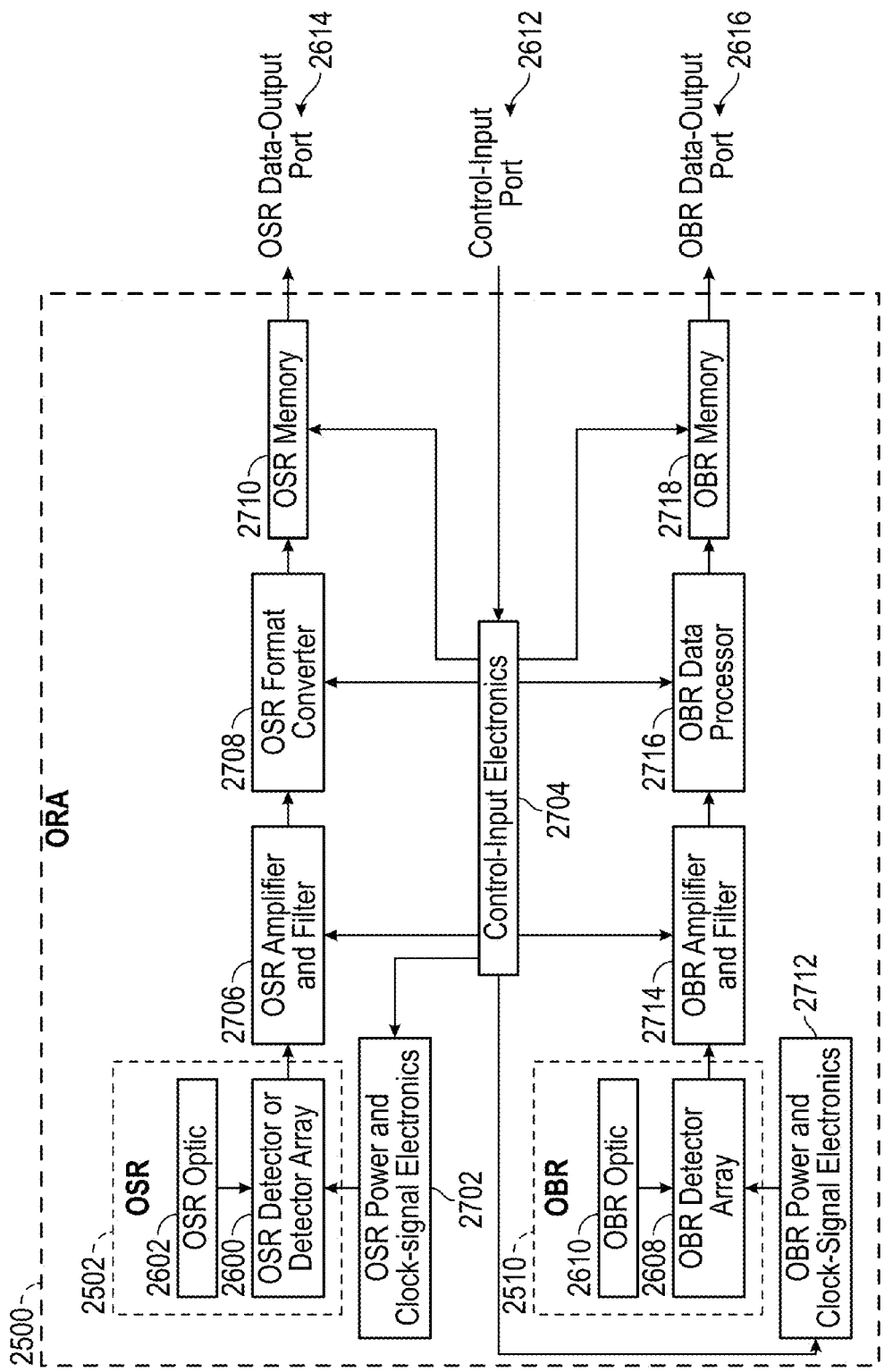
FIG. 27 depicts a functional block diagram of an optical receiver assembly.

FIG. 27 depicts a functional block diagram of an ORA 2500. The OSR 2502 receives optical signals from one or more OTAs (e.g., OTA 800) and converts the optical signals into electrical signals. In one example, the OSR 2502 includes one or more OSR optics 2602, which concentrate optical-signal flux (i.e., increase the flux density of optical signals) from OTAs onto one or more OSR detectors or detector arrays 2600. The OSR optic 2602 may include a square array of identical square-aperture aspheric lenslets, each of which has a single OSR detector in its focal plane. A narrowband optical filter may be included in the OSR optic 2602. The narrowband optical filter may be, for example, a multi-layer thin-film interference filter coating on a transparent flat substrate located on the side of the lenslets opposite the detectors (e.g., the detectors may be on one side of the lenslet array and the optical filter may be on the other side of the lenslet array), or it may comprise one or more multi-layer thin-film interference filter coatings on one or more of the optical surfaces of OSR optic 2602 (e.g., the surfaces of the aforementioned square-aperture lenslets). The substrate material used for the narrowband filter may be glass with high transmittance throughout the 800-900 nm waveband. It will be appreciated that the transmittance of the substrate material may be high for any waveband. In some embodiments, the substrate for the narrowband optical filter has a 20-mm-square aperture and a thickness of 1.1-mm. It will be appreciated that the narrowband optical filter may be of any size and shape (e.g., not necessarily square) and have any thickness. In one example, the narrowband optical filter may include a center wavelength of the passband of 850 nm and the width of the passband for 0° angle of incidence may be 75 nm.

In one example, the material of which the lenslet array of the OSR optic 2602 is made may be polycarbonate with a refractive index for wavelength 850 nm of 1.5710. Dimensions of the entrance pupil for each lenslet in the array may be 2.75-mm square. Dimensions of the combined entrance pupil of the lenslet array may be 16.5-mm square. The full width of the FOV of the OSR 2502 with OSR detectors 2600 having 0.203-mm-square light-sensitive regions may be 3.6° square when said detectors are located in the focal planes of the aforementioned lenslets. In some embodiments, the lens thickness at center is 1.850-mm. The focal length of each lens in a 6×6 lens array may be 3.230-mm. Distance from an outer surface of lens to focal plane may be 4.000-mm and in-band optical efficiency of uncoated lens (which may or may not include narrowband optical filter losses) may be 0.8939.

The OSR detectors or detector arrays 2600 may convert the concentrated optical signals provided by the OSR optic 2602 into electrical signals. The OSR power and clock-signal electronics 2702 may provide the electrical power and/or clock signals necessary for the OSR detectors or detector arrays 2600 to function properly. The electrical power and clock signals provided by the OSR power and clock-signal electronics 2702 are controlled by the control-input electronics 2704, based on inputs received from the user or user's device via the control-input port 2612 (see FIG. 26A). The output of the OSR detector or detector array 2600 may be amplified and filtered by the OSR amplifier and filter 2706. Said filtering may include, for example, bandpass filtering to improve the SNR. The amplified and filtered signal may have its format converted into a convenient form by the OSR format converter 2708. For example, the OSR format converter 2708 may convert the electrical signal pulses into a digital form suitable for storing in digital memory as well as perform error-correction.

The OSR format converter 2708 may also perform decryption, if received optical signals are encrypted. The OSR memory 2710 may accept the data from the OSR format converter 2708 and store the data in digital memory.

Data stored in OSR memory 2710 may be output via the OSR data-output port 2614, with said output being controlled by the control-input electronics 2704 based on commands received via the control-input port 2612. The control-input electronics 2704 also controls the operation of the OSR amplifier and filter 2706, as well as the OSR format converter 2708, based on commands received via the control-input port 2612.

The OBR 2510 in FIG. 27 may receive optical beacons sent by one or more OTAs (e.g., OTA 800) and convert said beacons into electrical signals. By analyzing the electrical signals, the ORA 2500 may detect the presence of optical beacons, estimate the horizontal and vertical angular positions relative to the OBR's FOV of OTAs sending said optical beacons, and extract information identifying entities operating or otherwise associated with said OTAs. As discussed herein, the OBR 2510 may include one or more OBR optics 2610, which concentrate optical-beacon flux (i.e., increase the flux density of optical beacons) from OTAs onto one or more OBR detector arrays 2608. The OBR optic 2610 may consist of one or more imaging lenses, each of which has a single OBR detector array 2608 in its focal plane. One or more narrowband optical filters may be included in the OBR optic 2610. Each such narrowband optical filter may be, for example, a multi-layer thin-film interference filter coating on a transparent flat substrate located on the side of an OBR imaging lens opposite the detector array with which it is associated (e.g., each detector array may be on one side of its associated imaging lens and the optical filter may be on the other side of the imaging lens), or it may comprise one or more multi-layer thin-film interference filter coatings on one or more of the optical surfaces of OBR optic 2610 (e.g., one or more optical surfaces of each of the aforementioned imaging lenses). The substrate material used for the narrowband filter may be glass with high transmittance throughout the 800-900 nm waveband. It will be appreciated that the transmittance of the substrate material may be high for any waveband. In some embodiments, the substrate for each narrowband optical filter has a 6-mm-diameter circular aperture and a thickness of 0.5-mm. It will be appreciated that the narrowband optical filter may be of any size and shape (e.g., not necessarily square) and have any thickness. In one example, the narrowband optical filter may include a center wavelength of the passband of 850 nm and the width of the passband for 0° angle of incidence may be 75 nm.

With reference to FIG. 27, the OBR detector array 2608 may convert the concentrated optical beacons provided by the OBR optic 2610 into electrical signals. The OBR power and clock-signal electronics 2712 may provide the electrical power and/or clock signals necessary for the OBR detector array 2608 to function properly. The electrical power and clock signals provided by the OBR power and clock-signal electronics 2712 may be controlled by the control-input electronics 2704, based on inputs received from the user or user's device via the control-input port 2612.

The output of the OBR detector array 2608 may be amplified and filtered by the OBR amplifier and filter 2714. Said filtering may include, for example, bandpass filtering to improve the SNR. The amplified and filtered signal may then be input into the OBR data processor 2716, which may perform the processing necessary to detect optical beacons, determine the horizontal and vertical angular positions within the OBR's FOV of the OTAs that sent the optical beacons, and extract the identifying information from the beacons.

The OBR data processor 2716 may be or include any number of processors (e.g., physical or virtual). The OBR data processor 2716 may detect optical beacons, for example, by searching the electrical-signal output as a function of time produced by each detector in the OBR detector array 2608 for a beacon header code, which is a specific binary sequence of 1-bit and 0-bit pulses (e.g., 0010110001000011101) included in optical beacons for the purpose of allowing OBRs to detect them.

In some embodiments, once an optical beacon has been detected, the OBR data processor 2716 may estimate the horizontal and vertical angular position of said optical beacon within the FOV of the OBR optics from the location in the OBR detector array of the electrical signal said beacon produces. Since the OBR optic 2610 is an imaging optic, there may be a straightforward mapping between the horizontal and vertical position where an electrical signal is produced in the OBR detector array and the horizontal and vertical angular position within the OBR's FOV of the optical beacon that produced said electrical signal. The OBR data processor 2716 may extract identifying information from a detected optical beacon by receiving and storing in digital form the sequence of 1-bit and 0-bit pulses that follow the beacon header code in the electrical signal corresponding to said detected optical beacon. When the identifying information has been encrypted, the OBR data processor 2716 may decrypt the identifying information. The OBR data processor 2716 may also perform error correction on the identifying information, as well as convert it into a convenient format for storage in digital memory. The results produced by the OBR data processor may be stored in digital form in the OBR memory 2718. Data stored in OBR memory 2718 may be output via the OBR data-output port 2616, with said output being controlled by the control-input electronics 2704 based on commands received via the control-input port 2612. The control-input electronics 2704 also controls the operation of the OBR amplifier and filter 2714, as well as the OBR data processor 2716, based on commands received via the control-input port 2612.

In some embodiments the identifying information and horizontal and vertical positioning information obtained from optical beacons that have been detected and received by the ORA 2500 may allow its user to select one or more OTAs of interest and then receive optical signals from those OTAs, but not from other OTAs which are not of interest to the user. In such cases, the received identifying information may provide the user with sufficient knowledge of the OTAs that have been detected (e.g., by a display of information regarding OTA(s) detected) to allow the user to select one or more of interest.

An optical signal from a given OTA of interest may then be received by first tilting the ORA 2500 either manually or by means of tilt actuators until the associated OTA is located within the FOV of the OSR 2502, where the positioning information previously obtained from said OTA's optical beacon may be used to tilt the ORA by the correct horizontal and vertical amounts to put the OTA within the OSR's FOV. Once an OTA of interest has been positioned within the OSR's FOV, a command issued by the user via the control-input port 2612 may cause the ORA to extract and store information from the optical signal transmitted by that OTA, which may then be output via the OSR data-output port 2614.

Like the OTA 800, the ORA 2500 may be interfaced with a computing device (e.g., a notebook computer or smartphone) by means of a wired or wireless connection that provides inputs to the ORA 2500 via the control-input port 2612 and accepts outputs from the ORA 2500 via the OSR data-output port 2614 and the OBR data-output port 2616. Software installed in this computing device may allow a user to operate and/or control the ORA 2500. For example, the user may be able to download received data files, as well as specify the signal filtering parameters, error-correction methods to be used, and various other receiver operating parameters.

In some embodiments, the computing device interfaced with the ORA 2500 may be any digital device. As discussed herein, a digital device is any device with a processor and memory. The computing device may receive data from the ORA 2500 (e.g., via a USB port).

Figure 28A:
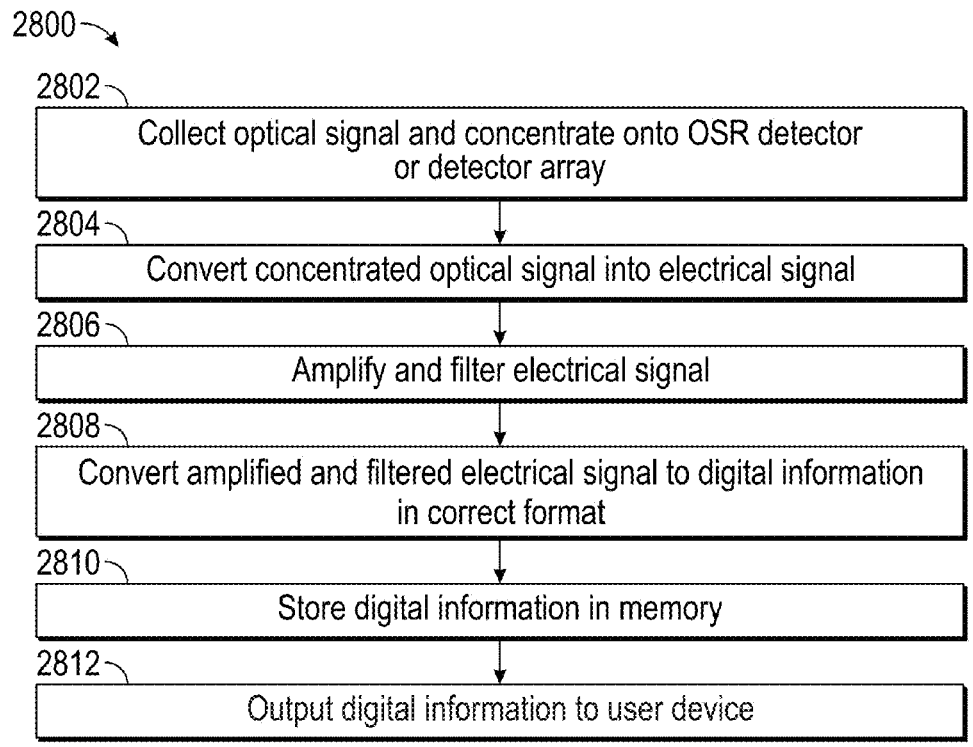
FIG. 28a is a flow diagram depicting a process of receiving optical signals by an optical receiver assembly.

FIG. 28*a* is a flow diagram 2800 depicting the process of receiving optical signals by an ORA 2500. In step 2802, the OSR optic 2602 collects an optical signal from an OTA located within its FOV and concentrates the optical signal onto the OSR detector or detector array 2600. The OSR optic 2602 may include an optical narrowband filter for improving the SNR by attenuating out-of-band optical radiation (e.g., sunlight, manmade light sources, and the like).

In step 2804, the OSR detector or detector array 2600 converts the concentrated optical signal into an electrical signal.

In step 2806, the OSR amplifier and filter 2706 amplifies and/or filters the electrical signal output from the OSR detector or detector array 2600. The filtering may include, for example, bandpass filtering to remove electrical noise that is outside of the signal band.

In step 2808, OSR format converter 2708 converts the amplified and filtered signal into a convenient digital format. During this step, error correction may be performed and the signal may be decrypted if the original optical signal was encrypted.

In step 2810, the OSR memory 2710 may store the formatted optical signal data output from the OSR format converter 2708.

In step 2812, the OSR data output port 2614 may output the formatted optical signal data stored in the OSR memory 2710 to a digital device.

Figure 28B:
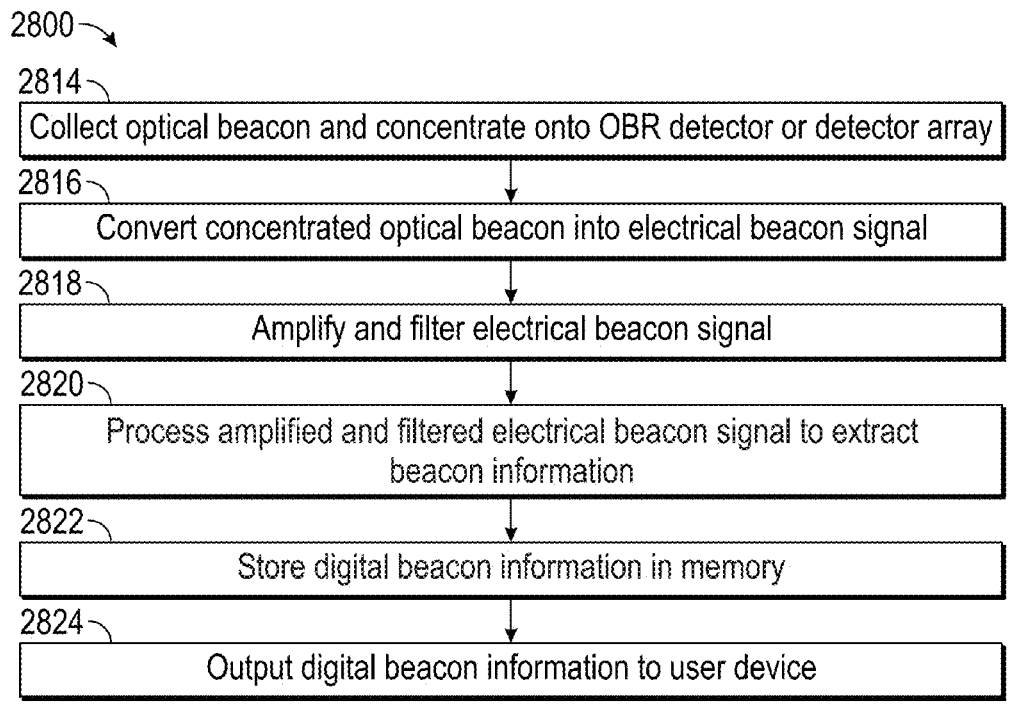
FIG. 28b is a flow diagram depicting a process of receiving optical beacons by an optical receiver assembly.

FIG. 28*b* is a flow diagram depicting the process of receiving optical beacons by an ORA 2500. In step 2814, the OBR optic 2610 collects an optical beacon from an OTA located within its FOV and concentrates said optical beacon onto the OBR detector array 2608. The OBR optic 2610 may include an optical narrowband filter for improving the SNR by attenuating out-of-band optical radiation (e.g., sunlight, manmade light sources, and the like).

In step 2816, the OBR detector array 2608 converts the concentrated optical beacon into an electrical signal. This electrical version of the optical beacon is referred to herein as an electrical beacon signal.

In step 2818, the OBR amplifier and filter 2714 amplifies and filters the electrical beacon signal output from the OBR detector array 2608. The filtering may include, for example, of bandpass filtering to remove electrical noise that is outside of the signal band.

In step 2820, the OBR data processor 2716 may process the amplified and filtered electrical beacon signal to detect the optical beacon, determine the horizontal and vertical angular positions within the OBR's FOV of the OTA that sent the optical beacon, and/or extract the identifying information from the beacon. During this step, error correction may also be performed and the signal may be decrypted if the original optical beacon was encrypted.

In step 2822, the OBR memory 2718 may store the beacon information obtained from the electrical beacon signal by the OBR data processor 2716.

In step 2824, the OBR data output port 2616 outputs the beacon information stored in the OBR memory 2718 to the digital device.

It will be appreciated that many different optical assemblies (e.g., combinations of one or more lenses, reflectors, filters, and/or other types of optical components, as well as one or more optical detectors or optical detector arrays) may be utilized in conjunction with embodiments described herein. FIGS. 29A-34 depict one example of a combination of lenslets and optical detectors comprising an OSR 2502, as well as possible performance measures for this example.

Figure 29A:
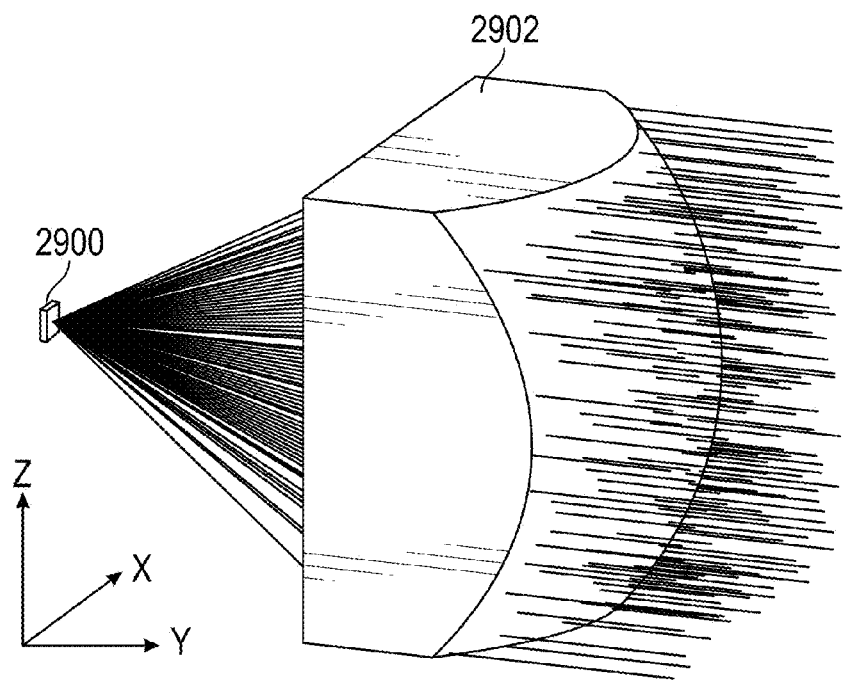
FIG. 29a is a three-dimensional depiction of a detector and a beam of collimated rays traced through a lenslet, which focuses (i.e., concentrates) the rays onto the light-sensitive surface of a detector.

FIG. 29a is a three-dimensional depiction of a detector 2900 and a beam of collimated rays traced through the lenslet 2902, which focuses (i.e., concentrates) the rays onto the light-sensitive surface of detector 2900. Each detector 2900 may be customized or commercially available.

Figure 29B:
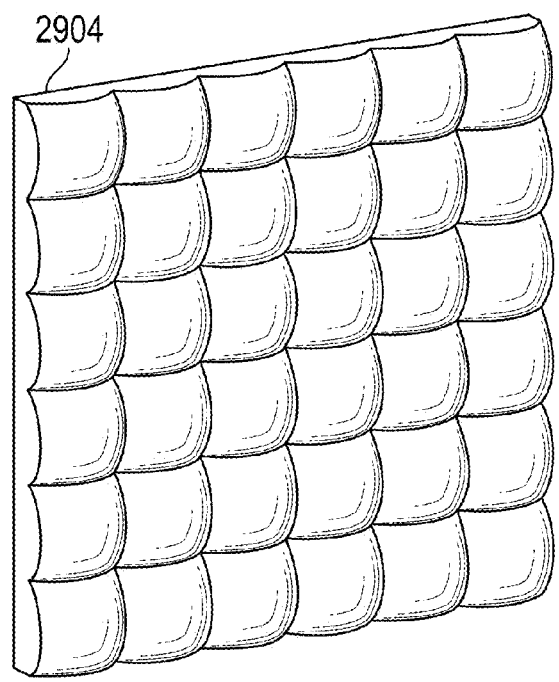
FIG. 29b depicts a three-dimensional view of an array of lenslets.

FIG. 29b depicts a three-dimensional view of an array of lenslets 2904. The lenslet array 2904 comprises 36 identical lenslets 2902 arranged in a 6×6 array. Each lenslet 2902 in the array 2904 may be a square-aperture aplanatic lenslet with aspheric optical surfaces on both sides. The optical axes of all the lenslets in the array are parallel to each other. The square optically sensitive surface of a detector lies in the focal plane of each lens, centered on the optical axis. In one example, the material of which the lenslet array 2904 is made may be uncoated polycarbonate with a refractive index of 1.5710 for light of wavelength equal to 850 nm. In this example, the entrance pupil of each lenslet in the array may be 2.75-mm square. The combined entrance pupil of the lenslet array 2904 may be 16.5-mm square. The FOV of an OSR comprising this optical assembly with a detector having a 0.203-mm-square light-sensitive surface perpendicular to and centered on the optical axis in the focal plane of each lenslet may be 3.6° square. In this example, the maximum incidence angle of rays incident on a detector's light sensitive surface for a point source at infinity centered on the FOV of the OSR is 37°.

In one example, each lenslet 2904 may include a square entrance pupil, 2.75-mm on a side so that the entrance-pupil area of each lenslet may be:

$$a_{rec} = (2.75 \text{ mm})^2 = 7.5625 \text{ mm}^2$$

It will be appreciated that the entrance pupil of each lenslet may be any shape (e.g., circular, oblong, rectangular, polygonal, or the like) and any size. As such, the receiver optic may include any entrance-pupil area.

In various embodiments, the ORA 2500 uses a 6×6 array of axisymmetric aspheric lenslets, each with a single near-IR detector in its focal plane. Thus the total number of receiver optics in this example is:

$$N_{rec} = 36$$

It will be appreciated that there may be any number of receiver optics and that the array may not necessarily be square. Further, although in this example all of the lenslets and detectors may be of the same type (i.e., each having the same properties and capabilities), it will be appreciated that there may be any number of lenslets including different combinations of different types of lenslets. Similarly, there may be any number of detectors including different combinations of different types of detectors.

The array of lenslets 2904 may be any size. In one example, the array of lenslets 2904 may be 0.5 inch per side. In this example, each lenslet 2902 of the array of lenslets 2904 may be about 0.083-inch in width.

Figure 30:
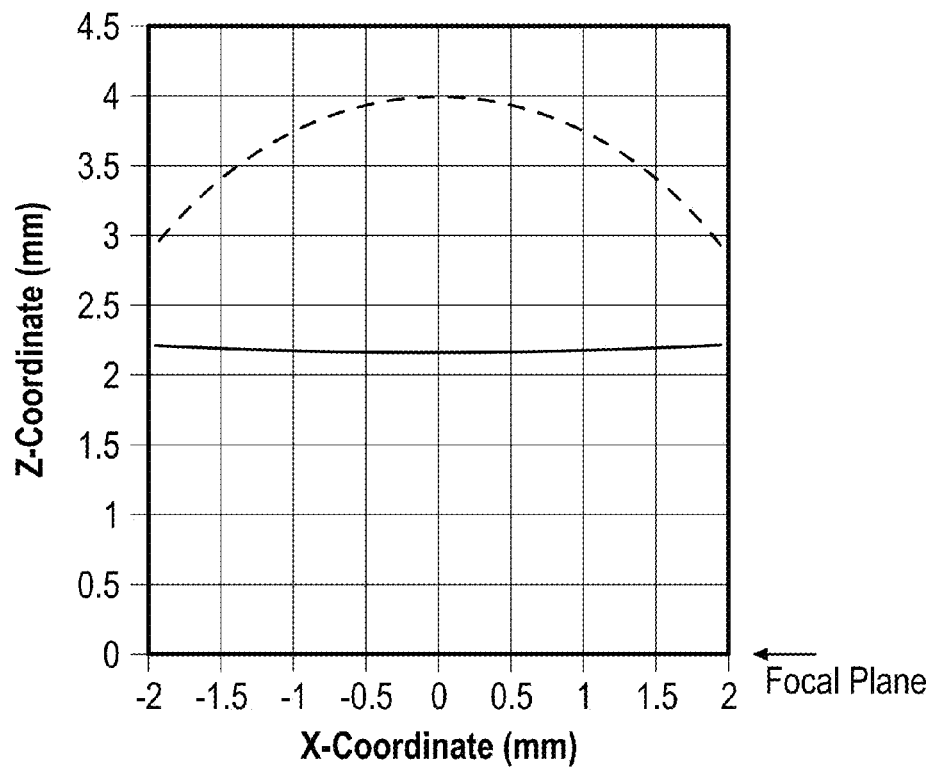
FIG. 30 depicts a diagonal cross-section (i.e., taken from one corner of the square entrance pupil to the corner on the opposite side) through an optical axis of an aspherical lenslet that may be used in an optical assembly.

FIG. 30 depicts a diagonal cross-section (i.e., taken from one corner of the square entrance pupil to the corner on the opposite side) through an optical axis of an aspherical lenslet (e.g., lenslet 2902) that may be used in an optical assembly. The light-sensitive surface of an optical detector (e.g., detector 2900) may be at the focal plane (z=0 mm) and is centered on and perpendicular to the optical axis. Here, the aspherical lenslet's generally planar side is located between 2.15 mm and 2.20 mm from the optical detector. The aspherical lenslet's generally convex side is approximately 4-mm from the optical detector at the lenslet's apex.

In this example, the combined entrance pupil of the array of lenslets 2904 is 16.5-mm square. The lenslet thickness, measured parallel to the z-axis of FIG. 30 is 1.85 mm at the center and 0.718 mm at a corner of the square lenslet aperture. The distance along the optical axis from the outer optical surface of the lenslet to the focal plane is approximately 4.0 mm. The focal length of the lens may be:

$$f_{rec} = 3.23 \text{ mm}$$

The in-band optical efficiency of the OSR optic is defined as the fraction of collected optical power in the operational waveband of the OSR that is lost due to reflection, transmission, and/or absorption losses in the optical materials and at the optical surfaces. The in-band optical efficiency of the example lenslet-array OSR optic design with uncoated optical surfaces may be:

$$n_{rec} = 0.894$$

for a collimated beam incident on the OSR optic parallel to the optical axis. The optical efficiency value provided in the above formula could be significantly higher with AR coatings on the lenslet surfaces. The optical efficiency may be substantially the same for all incident propagation directions within the FOV of the OSR.

Figure 31A:
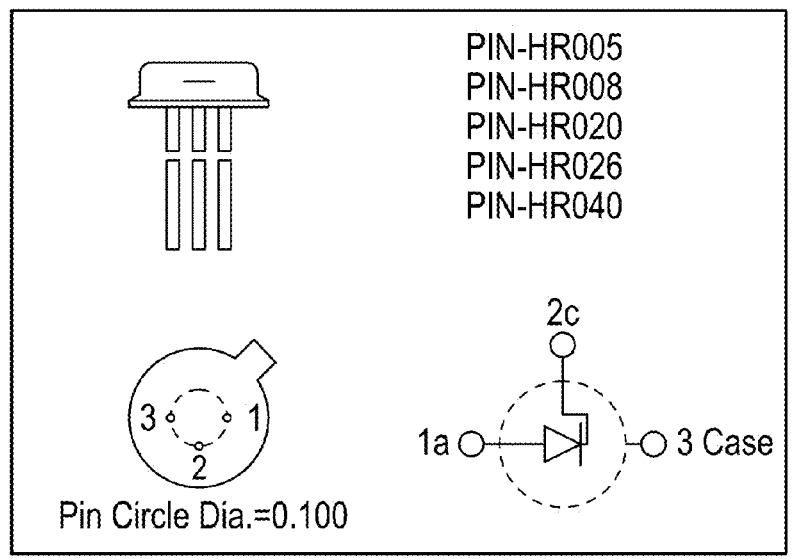
FIG. 31a depicts a specification of an example detector.

FIG. 31a depicts specification of an example detector (e.g., detector 2900 of FIG. 29A). In one example, the detectors used in the optical receiver are OSI Optoelectronics PIN-HR008 high-speed Si photodiodes. These are non-immersed detectors, so the refractive index of the material (i.e., air) in which the detectors are immersed is:

$$n_{det} = 1$$

The maximum bit rate of this particular photodiode is 800 MHz, and quantum efficiency is 0.740. The specific detectivity is $4.06 \times 10^{12}$ cm $Hz^{1/2}$ $W^{-1}$.

It will be appreciated that other detectors may be used such as, but not limited to, OSI Optoelectronics PIN-HR020 high-speed Si photodiodes. Other detectors used in conjunction with some embodiments may have any maximum bit rate, quantum efficiency, specific detectivity, and active area.

Figure 31B:
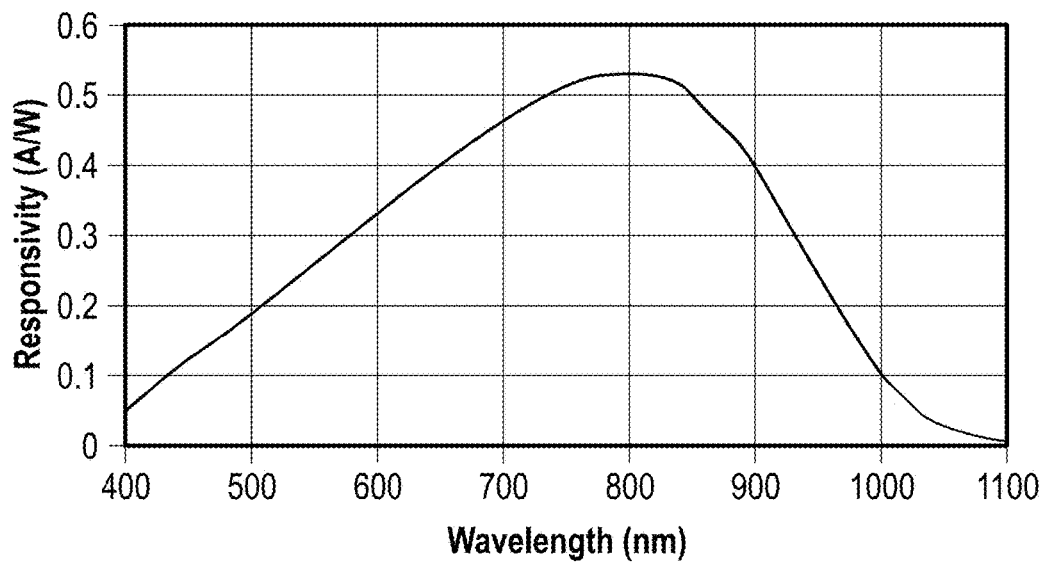
FIG. 31b depicts a plot of the PIN-HR008 detector's spectral response.

FIG. 31b depicts a plot of the PIN-HR008 detector's spectral response. The spectral response is wider than the transmitted spectrum. For this reason, the optical receiver may use an optical bandpass filter to prevent background radiation from outside the transmitted spectral region from contributing to the detector noise.

Figure 31C:
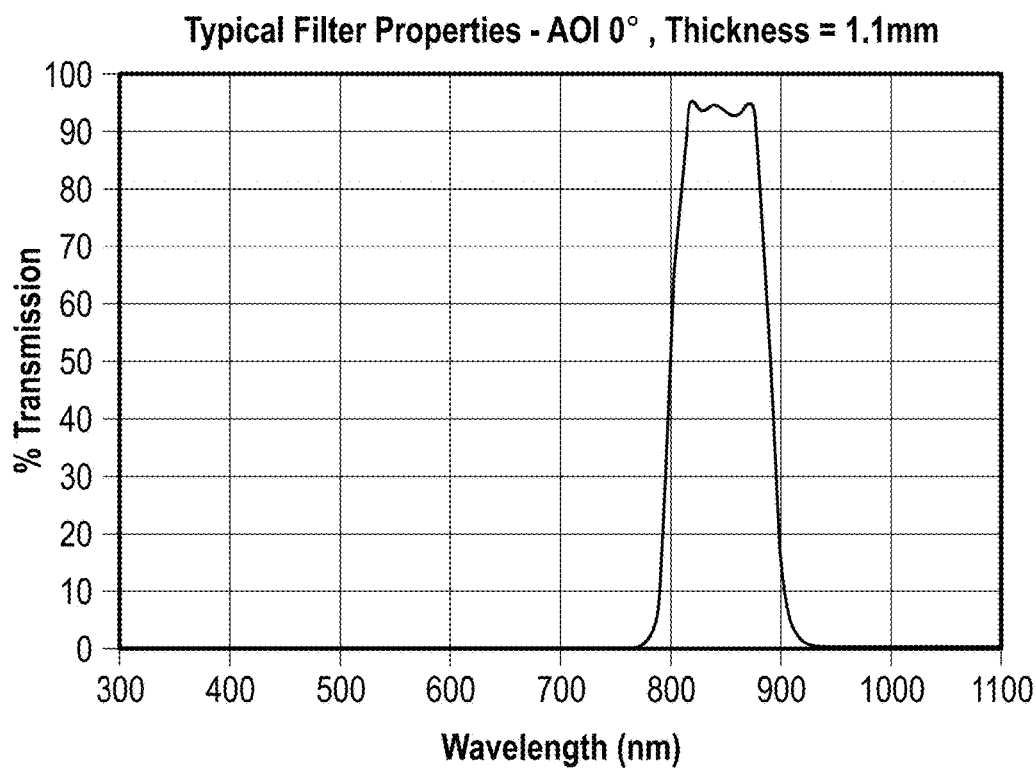
FIG. 31c is a plot of the spectral response of an example optical bandpass filter that may be used in conjunction with the PIN-HR0080 detector to reduce detector noise due to background radiation.

FIG. 31c is a plot of the spectral response of an example optical bandpass filter that may be used in conjunction with the PIN-HR0080 detector to reduce detector noise due to background radiation. As shown in the FIG. 31a, the active area of the detector is square in shape, with width $x_{det} = 0.203$ mm. Thus, each detector has an active area of:

$$a_{det} = (0.203 \text{ mm})^2 = 0.041209 \text{ mm}^2$$

Figure 32:
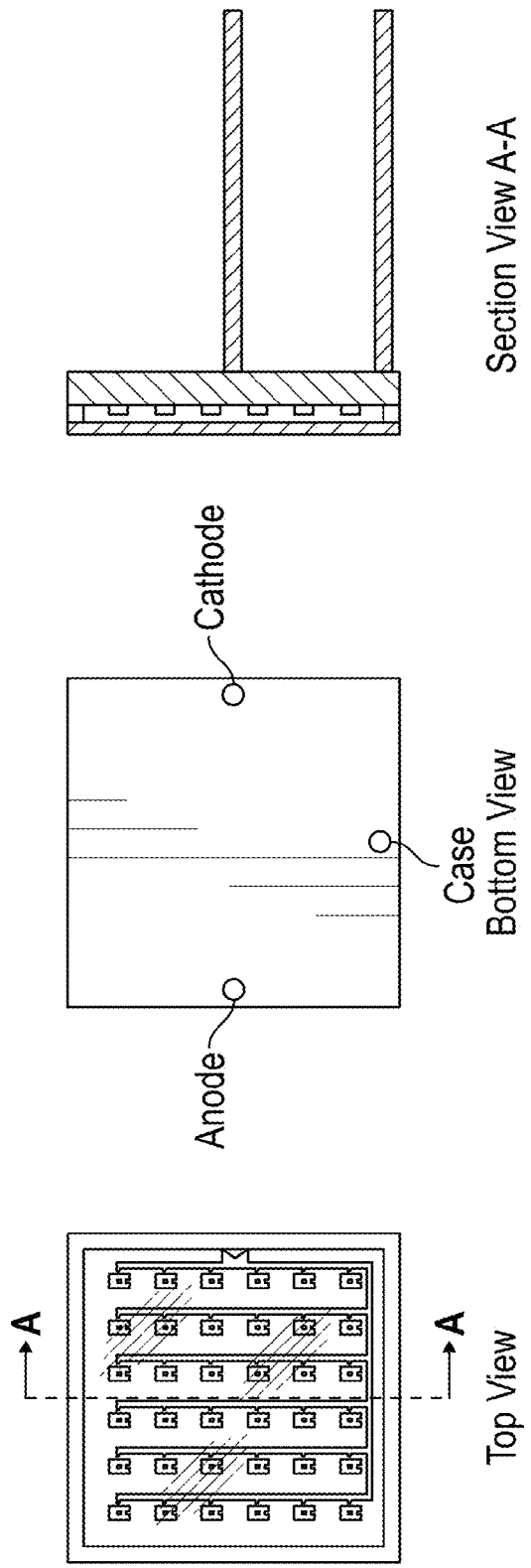
FIG. 32 is a depiction of a photodiode array using PIN-HR0080 detectors with dimensions in millimeters.

FIG. 32 is a depiction of a photodiode array (e.g., a detector array for use with the lenslets 2904) using PIN-HR0080 detectors with dimensions in millimeters. Each of these detectors is the same as the detector depicted in FIG.

31a, but instead of being mounted singly inside a metal housing they are all mounted together on a single substrate.

Figure 33:
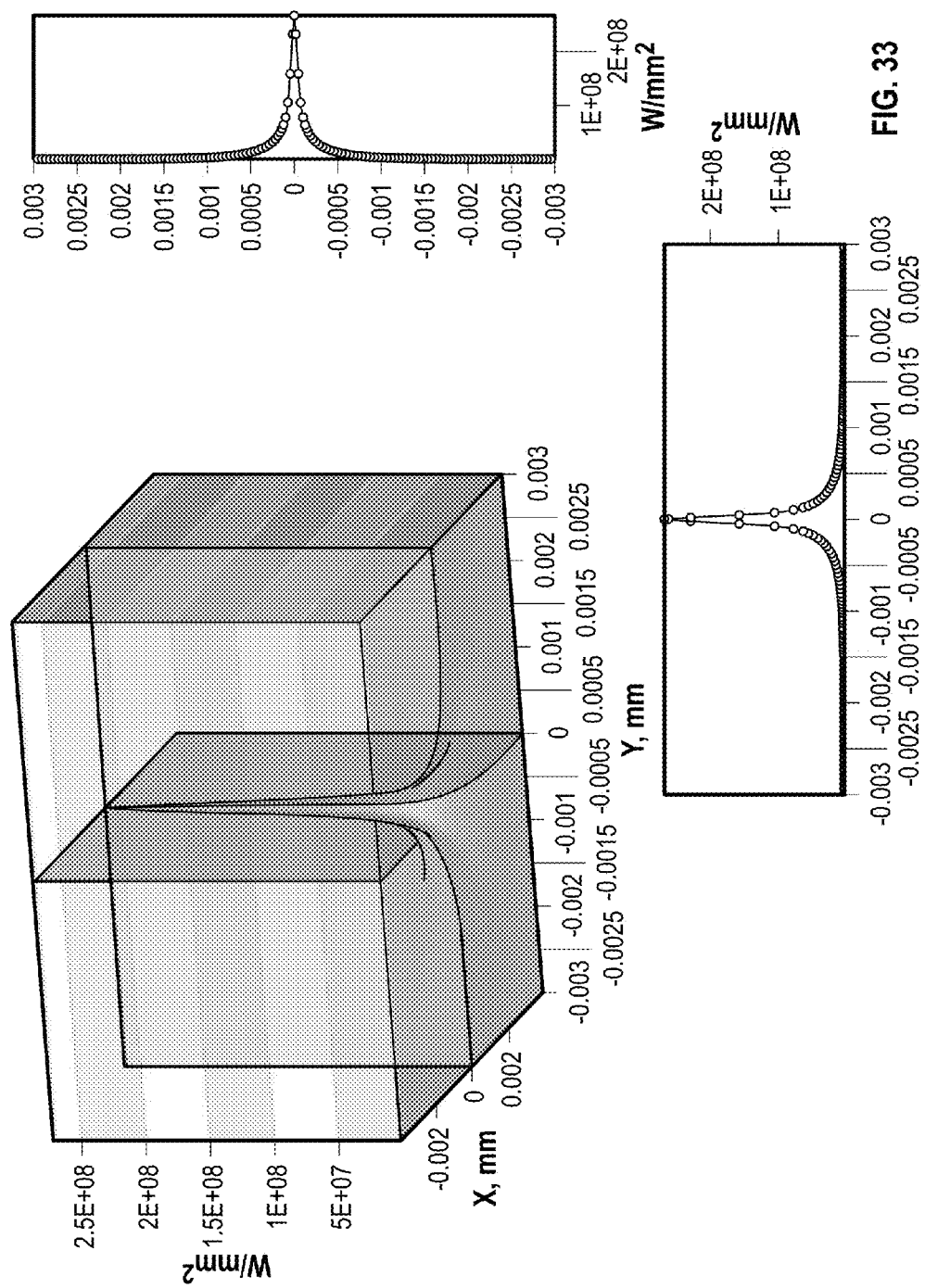
FIG. 33 depicts the irradiance distribution produced on a single detector (e.g., one of the detectors in the detector array of FIG. 32) of the OSR using the lenslet array of FIG. 29b as an OSR optic when the incident beam from an optical transmitter is centered on the FOV of the OSR.

FIG. 33 depicts the irradiance distribution produced on a single detector (e.g., one of the detectors in the detector array of FIG. 32) of the OSR using the lenslet array of FIG. 29b as an OSR optic when the incident beam from an optical transmitter (e.g., OTA 800 of FIG. 9) is centered on the FOV of the OSR. The width of this distribution is much smaller than the 0.203-mm width of the active area of the detector, so 100% of the flux transferred to the focal plane of each lens may be incident on the active area when the incident beam is centered on the OSR's FOV.

In various embodiments, the full width of the OSR's FOV can be computed from the formula:

$$FOV_{rec} = 2\tan^{-1}\left(\frac{x_{det}}{2f_{rec}}\right)$$

where $x_{det}$ is the width of the square detector and $f_{rec}$ is the focal length of the OSR optic.

Substitution of the detector width and the focal length of the receiver into the previous formula then gives:

$$FOV_{rec} = 2\tan^{-1}\left(\frac{0.203 \text{ mm}}{2 \cdot 3.23 \text{ mm}}\right) = 3.6°$$

Figure 34:
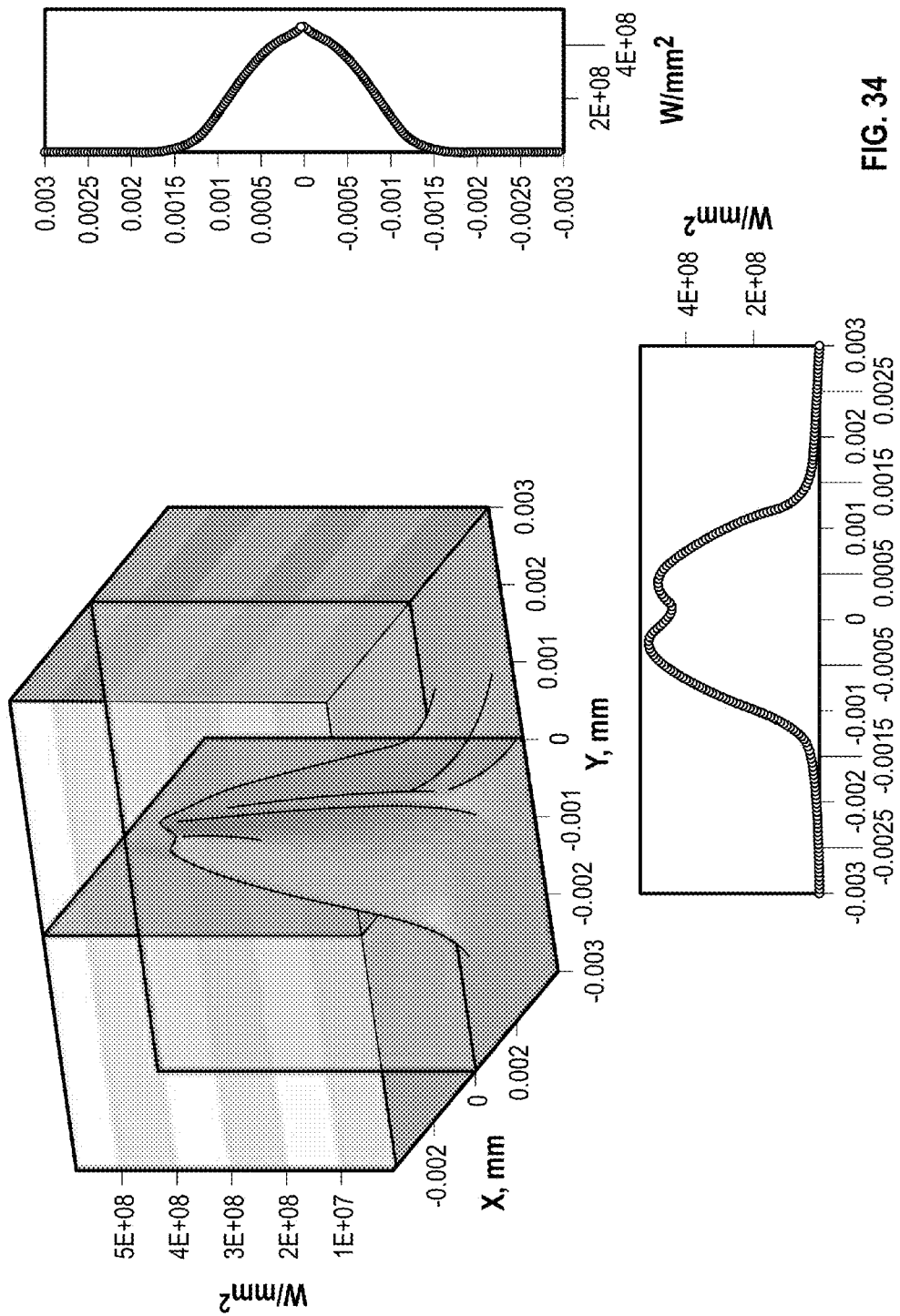
FIG. 34 depicts the irradiance distribution produced on a single detector when the transmitted beam is incident at an angle of 1.8° (i.e., half the width of the OSR's FOV) relative to the center of the FOV.

FIG. 34 depicts the irradiance distribution produced on a single detector when the transmitted beam is incident at an angle of 1.8° (i.e., half the width of the OSR's FOV) relative to the center of the FOV. Although the distribution is wider than when the incident beam is centered on the FOV, its width is still small relative to the width of the active area of the detector.

The external quantum efficiency of the example detector is:

$$QE_{det} = 0.74$$

The D-star value of the detector is $$Dstar_{det} = 4.06 \times 10^{12} \frac{\text{cm}\sqrt{\text{Hz}}}{W}$$

The optics in an OSR optic 2602 and in an OBR optic 2610 may include any number of optical components. The optical components in an OSR optic 2602 and in an OBR optic 2610 receiver may utilize refraction, reflection, and/or diffraction.

An étendue analysis of an example OSR 2502 comprising the lenslet array 2904 of FIG. 29b, where each lenslet 2902 has a detector 2900 in its focal plane, as depicted in FIG. 29a, is as follows. The étendue of a single detector in the detector array is given by the formula:

$$\epsilon_{det} = \pi n_{det}^2 a_{det} \sin^2(\theta_{det})$$

where $a_{det}$ is the area of a single detector, $n_{det}$ is the refractive index of the material in which the detectors are immersed, and $\theta_{det}$ is the maximum incidence angle of rays incident on the detector relative to its surface normal. In this example, the OSR's FOV corresponding to a single detector is square, with angular width $FOV_{rec}$. Since this angle is sufficiently small relative to 90°, the small-angle approximation may be used in computing the solid angle. In this example, the solid angle corresponding to the single-detector receiver FOV is therefore:

$$\Omega_{rec} = FOV_{rec}^2$$

Because of the small-angle approximation, the projected solid angle is equal to the solid angle:

$$\Omega_{p,rec} = FOV_{rec}^2$$

The étendue of one of the lenslets of the OSR lenslet array is:

$$\epsilon_{rec} = a_{rec} FOV_{rec}^2$$

where $a_{rec}$ is its entrance pupil area. Setting the detector étendue equal to the lenslet étendue and solving for $a_{rec}$ gives the result:

$$a_{rec,max} = \frac{\pi n_{det}^2 a_{det} \sin^2(\theta_{det})}{FOV_{rec}^2}$$

The quantity $a_{rec,max}$ represents the maximum allowable entrance-pupil area of one of the receiver optics for which it will be possible to obtain efficient flux transfer. The maximum allowable total combined receiver entrance pupil area is:

$$A_{rec,max} = \frac{\pi n_{det}^2 N_{rec} a_{det} \sin^2(\theta_{det})}{FOV_{rec}^2}$$

where $N_{rec}$ is the total number of lenslets in the lenslet array. The minimum allowable value $\theta_{det,min}$ of the angle $\theta_{det}$ given a desired value $A_{rec}$ of the total combined entrance pupil area of the OSR lenslet array and the values of other OSR parameters may be computed as follows:

$$\theta_{det,min} = \sin^{-1}\left(\frac{FOV_{rec}}{n_{det}}\sqrt{\frac{A_{rec}}{\pi n_{rec} a_{det}}}\right)$$

The detectors in this example are square, so the width each side of the active area of a detector is:

$$x_{det} = \sqrt{a_{det}}$$

The signal intensity (in W/sr) produced at the entrance pupil of the OSR optic during a transmitted 1-bit from an OTA located a distance r from the OSR optic is:

$$I_{rec}(r, I_{trans}) = \eta_{trans} T_{atmos}(r) I_{trans}$$

where $I_{trans}$ is the ideal loss-free (i.e., not including reflection, transmission, and absorption losses due to non-ideal coatings and optical materials used in the OTA optics) output intensity produced by the OTA along the line of sight from the OTA to the OSR optic. The ideal loss-free intensity $I_{trans}$ is used in the above formula because the losses due to non-ideal optical materials and coatings are accounted for via the optical efficiency $\eta_{trans}$ of the OTA optics. The function $T_{atmos}(r)$ in the above formula is the in-band atmospheric transmittance along the propagation path. Characterizing the atmospheric transmittance in terms of the atmospheric extinction coefficient $\alpha_{atmos}$, the above formula becomes:

$$I_{rec}(r, I_{trans}) = \eta_{trans} \exp(-\alpha_{atmos} r) I_{trans}$$

The solid angle subtended at the OTA by the entrance pupil of one of the OSR lenslets may be:

$$\Omega_{rec,pupil}(r) = \frac{a_{rec}}{r^2}$$

When the OTA is within the FOV of the OSR, the optical power incident on one of the OSR detectors during transmission of a single 1-bit may be:

$$\Phi_{det}(r, I_{trans}) = n_{rec} I_{rec}(r, I_{trans}) \Omega_{rec,pupil}(r)$$

where $n_{rec}$ is the optical efficiency of the OSR optic, which includes the effects of non-ideal optical materials and coatings. The aberrations of the OSR optic may be sufficiently low that all of the transmitted power incident on the entrance pupil of a single lenslet falls on a single OSR detector when the angular position of the OTA lies within the OSR's FOV. The total signal energy deposited on this detector during transmission of a single 1-bit may simply be the optical power times the bit duration $\tau$:

$$E_{det}(r, I_{trans}) = \Phi_{det}(r, I_{trans}) \tau$$

The corresponding number of signal electrons produced in this detector may be:

$$e_{det}(r, I_{trans}) = QE_{det} \frac{\lambda_c}{hc} E_{det}(r, I_{trans})$$

where $QE_{det}$ is the external quantum efficiency of the detector, h is Planck's constant, c is the speed of light, and $\lambda_c$ is the center wavelength of the OSR waveband. The bit duration $\tau$ may be expressed as the modulation duty cycle $n_{mod}$ of the transmitted optical pulses divided by the transmitted bit rate B. As a result of the foregoing:

$$e_{det}(r, I_{trans}) = \frac{n_{trans} n_{rec} n_{mod} QE_{det} \lambda_c a_{rec}}{hcB} \frac{I_{trans}}{r^2} \exp(-\alpha_{atmos} r)$$

The standard deviation of the photon noise produced in a single detector due to the 1-bit signal electrons is the square root of the number of signal electrons. In this example, this photon-noise standard deviation may be:

$$\sigma_{det}(r, I_{trans}) = \sqrt{\frac{n_{trans} n_{rec} n_{mod} QE_{det} \lambda_c a_{rec}}{hcB}} \sqrt{\frac{I_{trans}}{r}} \exp\left(-\frac{\alpha_{atmos}}{2} r\right)$$

The optical power incident on a single OSR detector due to background radiation may be:

$$\Phi_{back} = n_{rec} L_{back} \Delta\lambda \Omega_{rec} a_{rec}$$

where $L_{back}$ is the spectral background radiance, $\Delta\lambda$ is the optical waveband, and $\Omega_{rec}$ is the solid angle corresponding to the OSR's FOV. The corresponding energy collected during one integration time may be:

$$E_{back} = \Phi_{back} \tau_{int}$$

where $\tau_{int}$ is the integration time, which can be expressed in terms of the bit rate B as:

$$\tau_{int} = \frac{1}{B}$$

As a result of the foregoing:

$$E_{back} = \frac{n_{rec} L_{back} \Delta\lambda \Omega_{rec} a_{rec}}{B}$$

The corresponding number of electrons produced by background radiation in one detector during one integration time may be:

$$e_{back} = QE_{det} \frac{\lambda_c}{hc} E_{back}$$

As a result of the foregoing:

$$e_{back} = \frac{n_{rec} QE_{det} L_{back} \Delta\lambda \lambda_c \Omega_{rec} a_{rec}}{hcB}$$

The standard deviation of the photon noise due to background radiation is obtained by taking the square root of $e_{back}$:

$$\sigma_{back} = \sqrt{\frac{n_{rec} QE_{det} L_{back} \Delta\lambda \lambda_c \Omega_{rec} a_{rec}}{hcB}}$$

Detector noise may be characterized by a D-star value. The electrical bandwidth of the detector is half the bit rate:

$$\Delta f_{det} = \frac{B}{2}$$

From the definition of D-star, the noise-equivalent power for one OSR detector is:

$$NEP_{det} = \sqrt{a_{det} \Delta f_{det}} \frac{1}{Dstar_{det}}$$

where $Dstar_{det}$ is the D-star value for each of the detectors in the receiver. The standard deviation of the detector-noise electrons produced during one integration time is:

$$\sigma_{Dstar} = NEP_{det} \tau_{int} \frac{QE_{det} \lambda_c}{hc}$$

Since the bit rate B is the inverse of $\tau_{int}$, the result is:

$$\sigma_{Dstar} = \sqrt{\frac{a_{det}}{2B}} \frac{QE_{det} \lambda_c}{hc Dstar_{det}}$$

The three noise sources discussed above are all statistically independent. Thus the combined noise variance equals the sum of the variances of the separate noise sources. For a 1-bit, the combined noise produced in one detector may be:

$$\sigma_{1,total}(r,I_{trans}) = \sqrt{\sigma_{det}^2(r,I_{trans}) + \sigma_{back}^2 + \sigma_{Dstar}^2}.$$

The corresponding combined noise produced during a 0-bit is the same as for a 1-bit, except that there is no contribution from photon noise produced by the transmitted signal, since no optical power is transmitted during a 0-bit. Thus, the combined noise in one detector during a 0-bit may be:

$$\sigma_{0,total} = \sqrt{\sigma_{back}^2 + \sigma_{Dstar}^2}.$$

Invoking the statistical independence of the noise in each detector in the OSR, the combined noise in these $N_{rec}$ detectors may be:

$$\sigma_{1N,total}(r,I_{trans}) = \sqrt{N_{rec}}\sqrt{\sigma_{det}^2(r,I_{trans}) + \sigma_{back}^2 + \sigma_{Dstar}^2}$$

for a transmitted 1-bit and $$\sigma_{0N,total} = \sqrt{N_{rec}}\sqrt{\sigma_{back}^2 + \sigma_{Dstar}^2}$$

for a transmitted 0-bit. The signal-to-noise ratio for the optical receiver is defined as the combined 1-bit signal level divided by the combined 1-bit noise level:

$$SNR_{rec}(r, I_{trans}) = \frac{N_{rec} e_{det}(r, I_{trans})}{\sqrt{N_{rec}}\sqrt{\sigma_{det}^2(r, I_{trans}) + \sigma_{back}^2 + \sigma_{Dstar}^2}}.$$

This simplifies to:

$$SNR_{rec}(r, I_{trans}) = \sqrt{\frac{N_{rec}}{\sigma_{det}^2(r, I_{trans}) + \sigma_{back}^2 + \sigma_{Dstar}^2}} \, e_{det}(r, I_{trans}).$$

The software in the optical receiver may use a threshold to determine whether or not a given bit is a 0-bit or a 1-bit. The following threshold level may be used for this purpose:

$$Thresh_{bit}(r, I_{trans}) = \frac{\sigma_{0N,total}}{\sigma_{0N,total} + \sigma_{1N,total}(r, I_{trans})} N_{rec} e_{det}(r, I_{trans}).$$

In various embodiments, when the combined signal received during one integration time by the optical receiver is greater than or equal to this threshold value, the received bit is assumed to be a 1-bit. Otherwise, the received bit is assumed to be a 0-bit. Using the threshold level herein may ensure that the bit-error probability is the same for 0-bits as for 1-bits, and that the overall bit-error probability is as low as possible. The bit-error probability is $$P_{bit,error}(r,I_{trans}) = P_{cnorm}[-Thresh_{bit}(r,I_{trans}), 0, \sigma_{0N,total}]$$

where $P_{cnorm}(x,\mu,\sigma)$ is the cumulative normal probability distribution with mean $\mu$ and standard deviation $\sigma$. This equation may be solved numerically to obtain the communication range $r_{comm}(I_{trans})$ as a function of ideal (i.e., loss-free) intensity for which the bit-error probability equals a desired value.

As previously noted, the technology disclosed herein may be used to transmit and receive information within an ad hoc network, which is a type of communications network established directly between two or more devices without relying on a base station or central access point. As such, two devices may directly communicate over long ranges at high bandwidths without any access to conventional radio-wave based communications systems such as cellular networks, satellite networks, WiFi networks, Bluetooth® networks, and the like. In some instances, the ad-hoc network may include an internet-gateway device that shares its RF data connection with one or more optical narrowcasting devices that do not have access to RF data networks.

Figure 35:
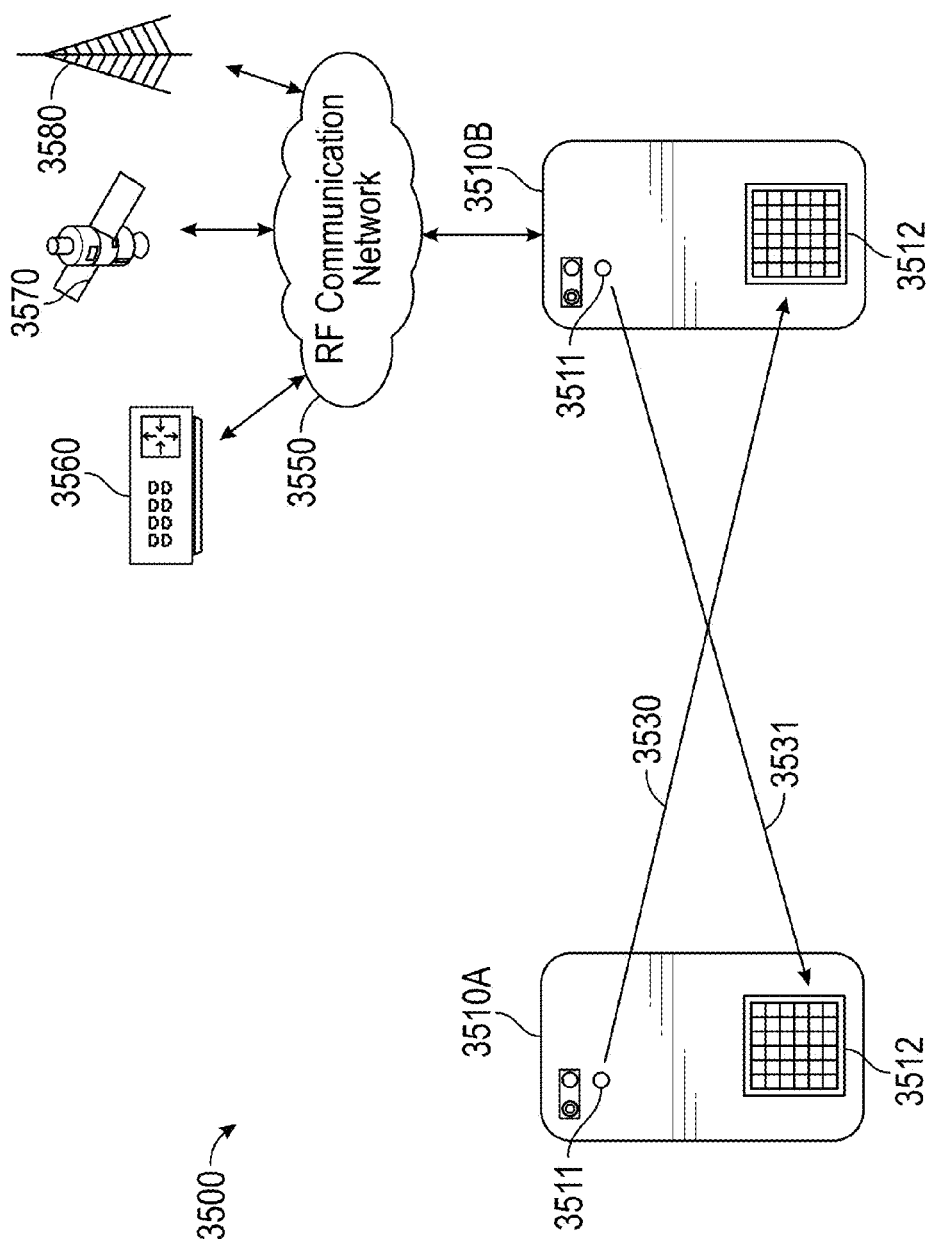
FIG. 35 illustrates an example ad-hoc optical narrowcasting network environment.

FIG. 35 illustrates one such implementation of an ad-hoc optical narrowcasting network environment 3500. It should be noted that although the ad-hoc optical narrowcasting network environment of FIG. 35 will be described primarily with reference to a mobile device providing internet access through an RF data connection, in other instances the ad hoc optical narrowcasting network may be established for other purposes. For example, the ad-hoc network may be implemented as a mobile ad-hoc network that provides point-to-point communications between mobile devices, as a vehicular ad-hoc network that provides point-to-point communications between vehicles and roadside equipment or advertising nodes, as an ad hoc network that links a mobile device with a fixed Internet-gateway device, as an ad hoc network that links a mobile device with a fixed node of an advertising business, as an ad hoc network linking multiple individuals in a social setting, and for other purposes.

In ad-hoc environment 3500, mobile devices 3510A and 3510B (e.g., smartphones) directly communicate by transmitting digitally modulated optical beams 3530-3531 through space or some other propagation medium. Each device respectively includes an optical transmitting element 3511 (e.g., an element of an OTA) and an optical receiving element 3512 (e.g., an element of an ORA including one or more lenses or lenslet arrays and one or more optical detectors). Although bidirectional communication is illustrated in this example, in some instances the ad hoc network may be unidirectional. For example, a transmitting element 3511 of mobile device 3510B may broadcast a digitally modulated optical beam 3531 that is received by receiving element 3512 of mobile device 3510A. Additionally, although the ad hoc network in this exemplary environment is established between mobile devices 3510A and 3510B, in other implementations the ad hoc network may be established using fixed devices configured with OTAs/ORAs, vehicles configured with OTAs/ORAs, and other devices.

Modulated optical beams 3530 and 3531 may include information such as text information, voice information, audio information, video information, application information, and other information that may be shared over the ad-hoc network. For example, the devices may use optical narrowcasting in accordance with the disclosure to share photographs, a live video stream, a voice conversation, or documents. Additionally, as further described below, modulated optical beam 3530 may include information to be sent over RF communication network 3550 by device 3510B, and modulated optical beam 3531 may include information retrieved by mobile device 3510B over RF communication network 3550. In implementations, mobile devices may initialize an optical narrowcasting application, further described below, that may be used to control various parameters of the ad-hoc network connection such as device trust, device permissions, what received information is stored in volatile or non-volatile memory, etc.

In the example environment of FIG. 35, device 3510A has no access or limited access to RF communication networks. For example, device 3510A may be a smartphone located in an area without WiFi network availability and where the user's cellular carrier does not offer coverage. By contrast, mobile device 3510B has access to one or more RF communication networks over an RF communication network 3550. For example, device 3510B may access one or more WiFi networks through one or more Wifi access points 3560 (e.g., routers), a satellite network through one or more satellites 3570 (and an outdoor/indoor satellite unit), and a cellular network through one or more cellular or radio stations 3580. The RF communication network 3550 may use any suitable RF communication protocols such as cellular telecommunications protocols (e.g., GSM, LTE, CDMA2000, etc.), WiFi communications protocols (e.g., 802.11g, 802.11n, 802.11ac, etc.), etc.

As such, in this environment mobile device 3510B may be configured as an optical narrowcasting hotspot that shares an RF connection (e.g., a connection to the Internet, a LAN, and/or a WAN) with devices (e.g., mobile device 3510A) that do not have access to or cannot access RF networks. In other words, mobile device 3510A may be "tethered" to mobile device 3510B using an ad hoc optical narrowcasting connection. A variety of benefits may be realized by this implementation.

By way of example, ad-hoc optical narrowcasting network environment 3500 may be used to provide or extend Internet access to devices that are located in remote locations without RF signal availability and/or devices that do not have the necessary hardware/chipsets for forming cellular, satellite, WiFi or other like connections. For instance, consider a rural area residence that relies on a fixed satellite outdoor unit for providing Internet access. In this scenario, a wireless RF gateway (e.g., a WiFi router) may broadcast wireless access to the satellite connection that is available provided that residents are within a close proximity of the gateway. However, if a resident moves a substantial distance from the gateway (e.g., greater than 50 m), the gateway's signal may be too weak for a mobile device of the resident to access the network. The aforementioned problem may be addressed by deploying an OTA and ORA at the residence that may broadcast and receive modulated optical beams at distances of 200 m, 400 m, or even greater. For instance, the satellite outdoor unit may be retrofitted with a OTA and ORA. As another example, ad-hoc optical narrowcasting networks may be used to provide or extend Internet access in disaster relief zones, in military zones, and other zones that do not readily have access to RF communication networks.

In some implementations, before an optical narrowcasting ad-hoc network is established directly between mobile devices 3510A and 35106, at least one of the devices may first confirm that the other device is a trusted device to which it will transmit optical beacons and/or optical signals containing information other than identifying information (e.g., voice messages, text messages, document files, advertisements, etc.) and/or a trusted device from which it will demodulate and decode received optical beacons and/or optical signals containing information other than identifying information. In implementations, trust may be established by reviewing the source identifying information contained in an optical beacon transmitted by a device. For example, the beacon transmitted by a device may contain source identifying information such as a unique optical narrowcasting ID assigned to the device, a unique media access control (MAC) address assigned to the device, or some other type of identification information. In some instances trust may be established by transmitting a code or password in an optical beacon or optical signal. Alternatively, the information contained in an optical beacon or optical signal may be encrypted using a key that was previously made available to trusted users. As would be appreciated by one having skill in the art, a variety of methods may be implemented to establish trust and/or secure communications between devices on an optical narrowcasting ad-hoc network.

Alternatively, in some instances there may be no need to establish trust. For example, where the information transmitted by an OTA is intended to be publically received by any device within the modulated optical beam's path (e.g., advertising information), or where an ORA is configured to accept all optical signals, a device may forego the trust process.

FIGS. 36A-36C illustrate an example graphical user interface 3600 for setting ad-hoc networking settings that may be implemented in embodiments. The graphical user interface may be provided by initializing an application instance on a device (e.g., mobile devices 3510A or 3510B). For example, the application may be offered as a component of an optical narrowcasting application. Depending on the implementation, the application may be a native application or a third-party application. In the particular example of FIGS. 36A-36C, the application is implemented on a smartphone.

As illustrated by FIG. 36A, the graphical user interface may present a user with a control 3610 (e.g., a radio box, button, toggle, slider, etc.) for enabling or disabling optical narrowcasting. When optical narrowcasting is enabled, the mobile device's OTA and/or ORA may be configured to transmit and/or receive modulated optical beams. As such, the mobile device may form an optical narrowcasting ad-hoc network with other devices. Conversely, when optical narrowcasting is disabled, the mobile device's OTA and/or ORA may not transmit/receive modulated optical beams and may be powered off to conserve battery life. In the example of FIG. 36A, optical narrowcasting is enabled. As such, the mobile device is configured to transmit a modulated optical beacon that makes the device discoverable (e.g., as "John's Phone") by other devices equipped with an ORA. For example, an OTA of the mobile device may transmit a beacon, including mobile device identifying information, within a certain angular region.

The example graphical user interface 3600 also displays a list of stored trusted devices 3620 that includes devices with which the mobile device has previously established an optical narrowcasting ad-hoc network. In this manner, graphical user interface 3600 may permit a user of the mobile device to specify trusted devices with which to automatically form ad-hoc networks. For example, if the mobile device's ORA receives a beacon from a device on the trusted device list, an ad-hoc network may be automatically established. The trusted device list may also display an indication of which trusted devices are currently connected to the mobile device and other information associated with trusted (or untrusted) devices. For example, in FIG. 36A a trusted device identified as "John's Home Tx" is currently connected to the mobile device via an optical narrowcasting ad-hoc network.

As another example, the trusted device list may display a short visual indication of a trusted device's position relative to the mobile device (e.g., distance and absolute orientation in a north-east-south-west plane). This visual indication of the trusted device's position may be supplemented by, for example, an AR representation of the device's position relative to the mobile device's ORA FOV, a navigational map interface showing the trusted device's position, or some other indication. This visual indication may be particularly useful in the case of fixed devices such as Internet gateway devices. The visual indication may provide a quick means of locating the device and establishing optical narrowcasting ad-hoc networks such as connections to optical narrowcasting hotspots that provide access to an RF network.

The graphical user interface 3600 also displays a list of other devices 3630 that are not on a trusted device list. For example, this may include devices with which the mobile device has not previously formed an optical narrowcasting ad-hoc network, devices that were not added to a trusted device list after forming an optical narrowcasting ad-hoc network, or devices with which the user does not wish to form an optical narrowcasting ad-hoc network. In the example of FIG. 36A, a beacon is received from a device identified as a "Dan's Phone", a device with which the mobile has not previously formed an ad-hoc network.

With reference now to FIG. 36B, the device identified as "Dan's Phone" may send an optical signal or other modulated optical beam including a request to form an ad-hoc network. The optical signal may be received at an ORA of the mobile device, which demodulates the beam, and causes graphical user interface 3600 to display to the user a prompt that "Dan's Phone" would like form an ad-hoc network. In the example of FIG. 36B, a user of the device may either accept the request and form an ad-hoc network, deny the request, or block future communications with the device (e.g., ignore future optical signals received from the device).

With reference now to FIG. 36C, assuming the mobile device accepts the request from "Dan's Phone" to form an optical narrowcasting ad-hoc network, the graphical user interface may present options to the user for configuring communications between the user's mobile device and "Dan's Phone" over the optical narrowcasting ad-hoc network. In the example of FIG. 36C, the user is presented with a control 3640 for adding "Dan's Phone" to the trusted device list and controls 3650 for setting permitted optical narrowcasting ad-hoc network communications between the user's device and Dan's Phone. For example, permissions may be set for initiating voice and/or video calls over the optical narrowcasting ad-hoc network (e.g., "Opti Call"), sending text messages over the optical narrowcasting ad-hoc network (e.g., "Opti Text"), transferring document, video, audio, or other files over the optical narrowcasting ad-hoc network ("File Transfer"), communicating using particular applications installed on the mobile device (e.g., "App1" and "App2"), or other permissions. Additionally, using a permission control 3650, a user of the mobile device may choose whether to allow "Dan's Phone" to use the user's device as an optical narrowcasting hotspot (e.g., "tethering") that provides a gateway to an RF connection (e.g., an Internet gateway).

Figure 37:
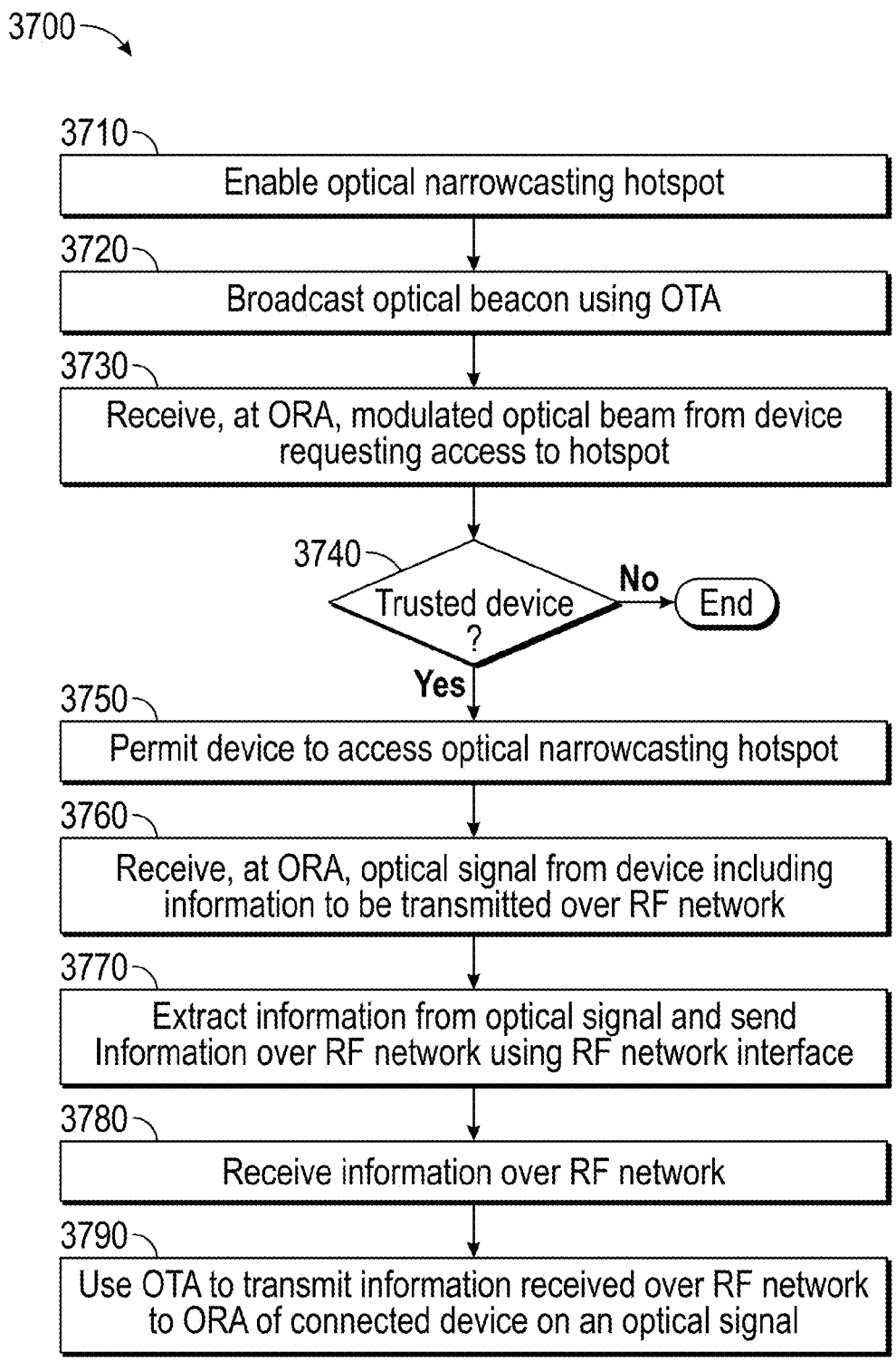
FIG. 37 is a flow diagram illustrating an example method that may be implemented by a device to create or extend an RF network using an optical narrowcasting ad hoc network.

FIG. 37 is a flow diagram illustrating an example method 3700 that may be implemented by a device (e.g., device 3510B) to create or extend an RF network using an optical narrowcasting ad hoc network. The device creating or extending the RF network may i) utilize a connection to an RF network to retrieve information requested by another device over an optical narrowcasting ad-hoc network; and ii) send the information retrieved over the RF network back to the requesting device over the optical ad-hoc network (e.g., using an optical signal).

At operation 3710, the device is enabled as an optical narrowcasting hotspot. For example, a user of mobile device 3510B, may use a GUI (e.g., similar to GUI described with reference to FIGS. 36A-36C) to select a control that authorizes the device to share its RF connection (e.g., a connection to the Internet) over an ad-hoc optical narrowcasting network. As another example, a user may deploy a fixed Internet gateway device at a residence, remote location, or other location to extend or create access to the Internet to devices that do not otherwise have access to RF networks. In this example, a user may configure the fixed Internet gateway device in advance such that only trusted devices and/or devices having a private encryption key may access the gateway's Internet connection over the optical narrowcasting ad-hoc network.

At operation 3720, the device uses an OTA to broadcast a beacon or other modulated optical beam identifying the device as an optical narrowcasting hotspot source. In implementations, the beacon may be broadcast over a fixed angular region. For example, the beacon may be broadcast in a same angular region as the optical narrowcasting hotpot source broadcasts an optical signal or other modulated optical beam carrying information retrieved over an RF network. In some implementations, multiple beacons may be broadcast to increase the angular region of the signal. Alternatively, in some implementations the beacon may be swept over a horizontal and/or vertical angular direction (e.g., using one or more tilt actuators of an OTA) to increase the probability of a device receiving the beacon identifying the optical narrowcasting hotspot source.

At operation 3730, the device receives at an ORA a modulated optical beam from a device requesting access the optical narrowcasting hotspot source. In implementations, the requesting device may transmit an optical beacon identifying the device and an optical signal requesting access to the optical narrowcasting hotspot. As previously noted, the optical beacon and optical signal may be transmitted on the same modulated optical beam or separate modulated optical beams.

At decision 3740, it is determined if the device requesting access to the optical narrowcasting hotspot is a trusted device. For example, the device requesting access may transmit a beacon including identifying information (e.g., a unique optical narrowcasting ID) that the optical narrowcasting hotspot device compares against a stored trusted device list to determine if the device is trusted. As another example, the device requesting access may transmit an optical signal including an encryption key or other information that the optical narrowcasting hotspot device may use to determine if the device is trusted. If the device is trusted, at operation 3750, the optical narrowcasting hotspot may permit the device to access the RF network connection of the optical narrowcasting hotspot. In some implementations, the optical narrowcasting hotspot may transmit an optical signal authenticating or otherwise confirming the connection with the requesting device.

If at decision 3740 the optical narrowcasting hotspot is unable to determine that the requesting device is trusted, the optical narrowcasting hotspot may ignore optical signals from the requesting device until the requesting device can establish it is trusted (e.g., by transmitting a modulated optical beam including a private key). Alternatively, in some implementations all devices that can receive modulated optical beams from the optical narrowcasting hotspot (e.g., all devices configured with an ORA having a FOV within the optical signal path of the optical narrowcasting hotspot) may be permitted to access the optical narrowcasting hotspot. In such implementations, operations 3730-3750 may be skipped.

At operation 3760, the optical narrowcasting hotspot device receives an optical signal at an ORA from the device permitted to access the hotspot. The optical signal, in implementations, is a modulated optical beam including information to be sent over the RF communication network made available by the optical narrowcasting hotspot device. Depending on the destination node and application (e.g., a web browser request) of the information to be sent over the RF communication network, the information carried by the optical beam may be encapsulated by the requesting device using suitable headers and trailers.

At operation 3770, the optical narrowcasting hotspot device may extract the information from the optical signal (e.g., using the systems and methods disclosed herein for demodulating and otherwise receiving a modulated optical beam). The information may then be transmitted over the RF network to a node using an RF connection interface of the device (e.g., by modulating the information onto an RF carrier signal). For example, with reference to the example of FIG. 35, optical narrowcasting hotspot device 3510B may receive an optical beam 3530 from device 3510A, extract information intended for RF communication network 3550 from the optical beam, encapsulate and/or remodulate the information in preparation for transmission over RF communication network 3550, and transmit the information over RF communication network 3550.

At operation 3780, in response to transmitting the information over the RF communication network, the optical narrowcasting hotspot device receives a response (e.g., a modulated RF signal including information.) At operation 3790, the information retrieved over the RF network is modulated onto an optical signal and transmitted by the hotspot's OTA to an ORA of the requesting device (e.g., using the systems and methods disclosed herein for modulating and otherwise transmitting a modulated optical beam).

Figure 38:
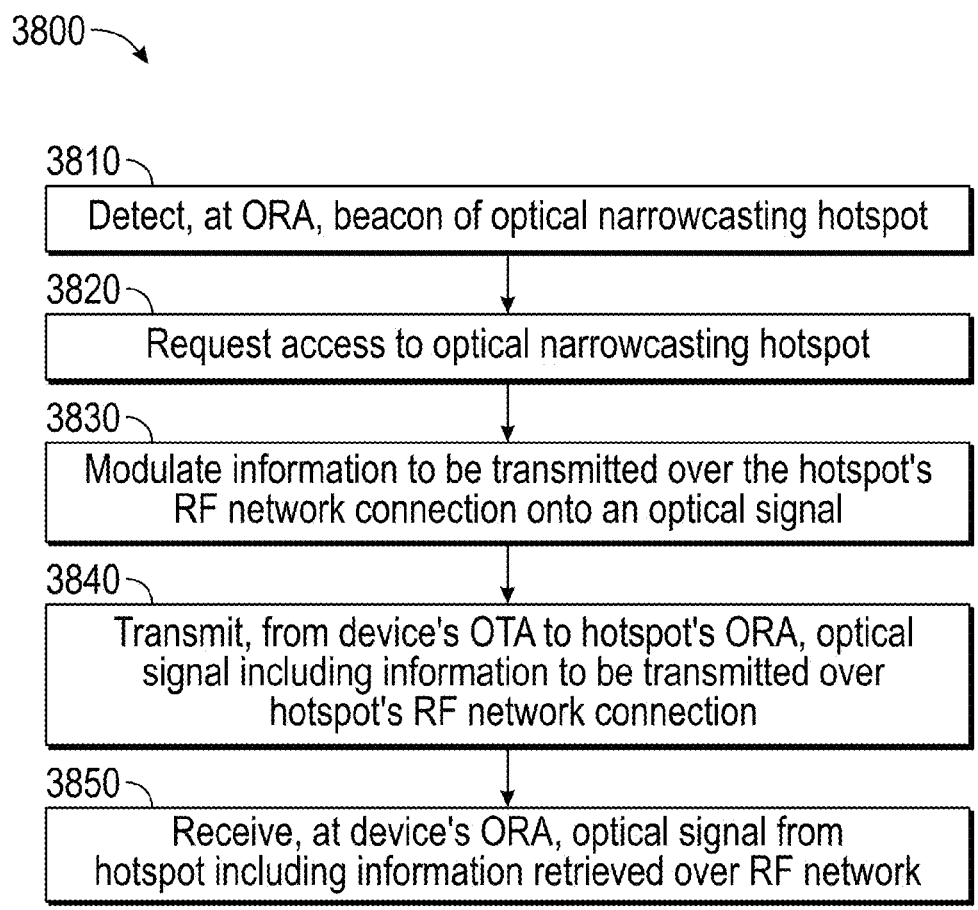
FIG. 38 is a flow diagram illustrating an example method that may be implemented by a device to access an RF network over an optical narrowcasting ad hoc network.

FIG. 38 is a flow diagram illustrating an example method 3800 that may be implemented by a device (e.g., device 3510A) to access an RF network over an optical narrowcasting ad hoc network. In various embodiments, the device implementing method 3800 may be a device without access to an RF network (e.g., a smartphone without cellular coverage or WiFi access) or a device that is not enabled to transmit information over an RF network (e.g., a mobile device that does not have a cellular or WiFi chipset). At operation 3810, the device detects at an ORA a beacon broadcast by an optical narrowcasting hotspot that provides access to an RF network. In implementations where the device has previously stored the location of the hotspot in memory, detection of the beacon may be facilitated by a GUI of an application that directs a user of the device to the absolute direction of the beacon relative to the FOV of the device's ORA and/or camera. At operation 3820, the device may transmit a modulated optical beam to the hotspot requesting access to the optical narrowcasting hotspot. For example, the device may transmit an optical beacon followed by an optical signal requesting access to the optical narrowcasting hotspot. In embodiments, the device may confirm that it is trusted device and otherwise establish a secure connection as discussed above with reference to method 3700.

At operation 3830, the device may modulate information to be transmitted over the hotspot's RF network connection onto an optical signal. At operation 3840, the device's OTA may transmit to the hotspot's ORA, the modulated optical beam, including the information to be transmitted over the hotspot's RF network connection. At operation 3850, the device receives at an ORA a modulated optical signal from an OTA of the hotspot including information retrieved over the RF network by the hotspot.

In various embodiments, a computing system may be configured to provide graphical user interfaces (GUIs) for optical narrowcasting in accordance with the present disclosure. For example, GUIs may be provided for presenting and selecting OTAs and/or sources of OTAs, information extracted from modulated optical beams produced by the OTAs, and graphical representations thereof. In some embodiments, for sake of illustrative clarity, reference to an OTA may refer to a physical OTA and/or graphical representation thereof.

As used herein to describe a UI or GUI, the term "user input" generally refers to any user action that generates data that triggers one or more actions at the UI (e.g., the retrieval of optical signal information, the display of optical signal information, the selection of graphical controls, the movement of an ORA, etc.). A user input may include, for example, a touch user interface gesture (e.g., taps, holds, swipes, pinches, etc.), vocal input (e.g., voice commands that are digitized and translated into a corresponding action), a keyboard input (e.g., pressing a keyboard key), a mouse input (e.g., clicking and/or moving a mouse pointer), and the like. User input may include a sequence of inputs, such as a particular sequence of touch gestures, voice commands, and/or key presses. User input may select, modify, or otherwise manipulate a displayed graphical control element such as, for example, buttons, checkboxes, menus, windows, sliders, navigational control elements, and the like.

Figure 39:
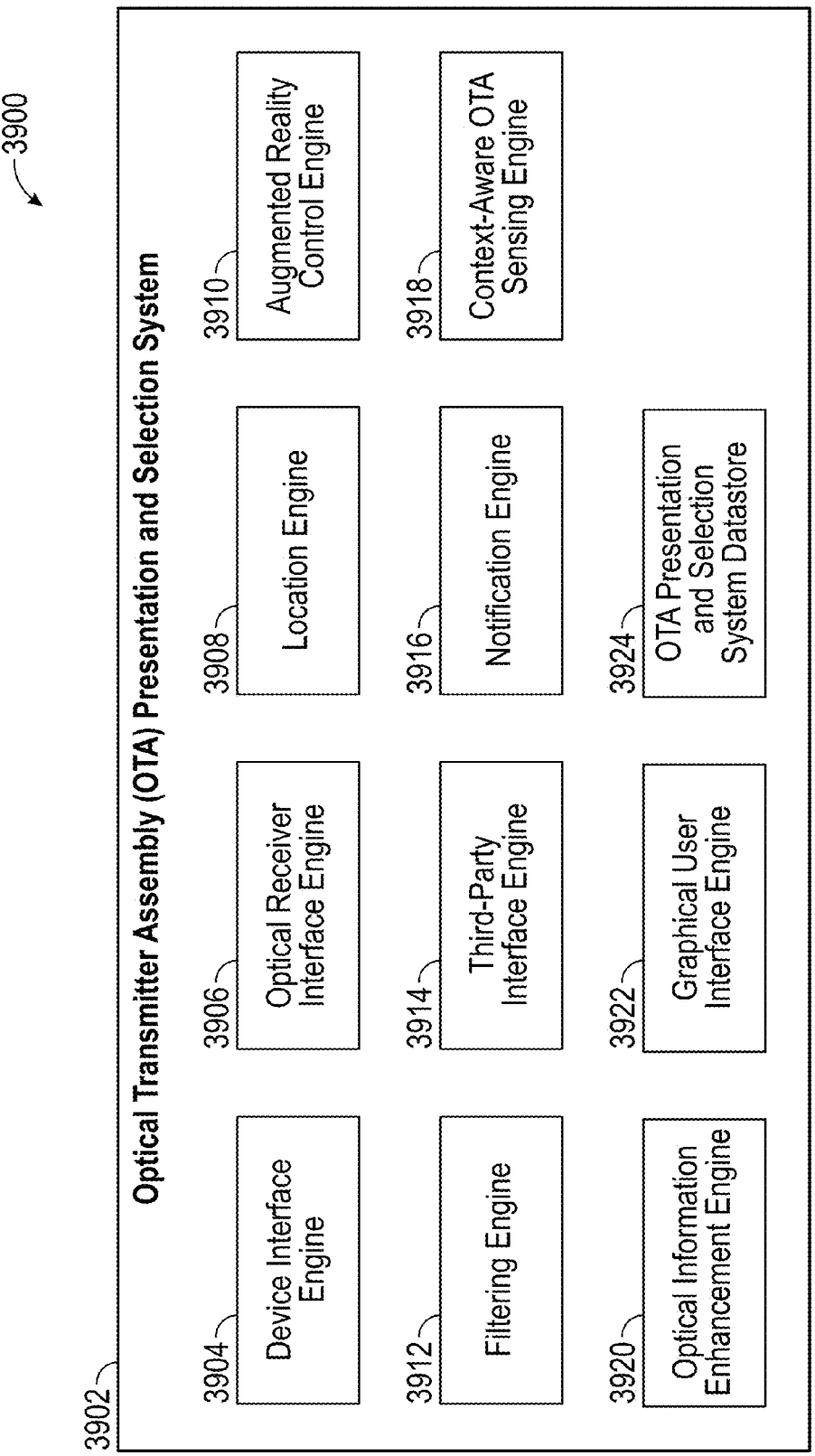
FIG. 39 depicts a block diagram of an example of an OTA presentation and selection system according to some embodiments.

FIG. 39 depicts a block diagram 3900 of an example of an OTA presentation and selection system (or, "presentation and selection system") 3902 according to some embodiments. In implementations, the components of presentation and selection system 3902 may comprise components of one or more software applications that are provided to a mobile device (e.g., a smartphone, laptop, an augmented reality device such as a head mounted display), a computing device of a vehicle (e.g., an automobile), or some other user device. In some instances these components may be integrated into one or more applications. For sake of illustrative clarity, as used herein, reference to a user device may also include other devices and systems associated with the user device (e.g., an ORA coupled or integrated into the user device). Depending on the implementation, the software applications may be executed locally by the device (e.g. as a native application or third-party application), or may be provided as a part of a web application or cloud application service.

In the example of FIG. 39, the presentation and selection system 3902 includes a device interface engine 3904, an optical receiver interface engine 3906, a location engine 3908, an augmented reality control engine 3910, a filtering engine 3912, a third-party interface engine 3914, a notification engine 3916, a context-aware OTA sensing engine 3918, a signal information enhancement engine 3920, a graphical user interface engine 3922, and a datastore 3924.

The device interface engine 3904 facilitates interaction between the presentation and selection system 3902 and one or more associated user devices. For example, user devices may include mobile devices (e.g., smartphones, cell phones, smartwatches, head mounted displays, tablet computers, or laptop computers), computing devices of vehicles such as automobiles (e.g., on-board automobile computing devices and sensors), and the like. In some embodiments, the device interface engine 3904 may access or otherwise control functionality of content capture devices (e.g., cameras and microphones), presentation devices (e.g., displays and speakers) and sensors (e.g., location and orientation sensors) of one or more user devices. The device interface engine 3904 may include one or more application programming interfaces (APIs) or communication protocols for interacting with user devices.

The optical receiver interface engine 3906 facilitates interaction between the presentation and selection system 3902 and one or more ORAs. For example, the optical receiver interface engine 3906 may access an ORA included in, or coupled to, the user device. The optical receiver interface engine 3906 may utilize one or more APIs or communication protocols for interacting with any number of ORAs, simultaneously or otherwise.

In some embodiments, the optical receiver interface engine 3906 obtains optical information (e.g., identification data and descriptive data) from one or more ORAs. The optical receiver interface engine 3906 may obtain optical information automatically (e.g., without requiring user input) or manually (e.g., in response to user input). For example, the optical receiver interface engine 3906 may automatically obtain optical information from an ORA once it begins extracting optical information from a received modulated optical beam or after the ORA finishes extracting all optical information from a received modulated optical beam.

In some embodiments, the optical receiver interface engine 3906 stores optical information. For example, the optical receiver interface engine 3906 may persistently store or temporarily store (e.g., cache or buffer) optical information in a datastore (e.g., datastore 3924). This may allow the presentation and selection system 3902 to access optical information after an OTA's modulated optical beam is no longer within the FOV of an OBR or OSR of an ORA. In some embodiments, rules may define conditions for determining when to store optical information, what optical information to store, an amount of time to store optical information, when to purge stored optical information, and other conditions for storing received optical information. For example, the rules may define that optical information may be stored for a threshold number of OTAs. For example, a FIFO structure may store optical information for twenty OTAs, and as optical information is stored for additional OTAs, the optical information associated with the first-in OTA may be purged.

In some embodiments, the optical information rules define a geographic proximity condition for storing optical information. For example, if an ORA or associated user device is within a threshold geographic proximity (e.g., 1 km) of an OTA, or a location the optical information was received, the optical information may be stored. As follows, if the user device exceeds the geographic proximity, the optical information may be purged. This may help ensure, for example, that stored optical information is current, and that resources (e.g., memory) are not unnecessarily consumed.

The location engine 3908 functions to determine a location of an ORA, or associated user device, relative to one or more OTAs. In some embodiments, the location engine 3908 may determine the relative location from a current location and orientation of the user device (e.g., as indicated by one or more sensors of the user device) and a current location and orientation of an OTA. As the user device changes location (e.g., user operating the user device is walking) or orientation (e.g., a user tilts or rotates the user device), the location engine 3908 may update the relative location between the user device and the OTA.

In the example of FIG. 39, the augmented reality control engine 3910 functions to provide augmented reality features for presenting, selecting and otherwise interacting with OTAs and optical information. The augmented reality control engine 3910 may receive user input, and otherwise control augmented reality features of the presentation and selection system 3902. For example, augmented reality actions may include selecting an augmented reality object, generating a request for optical information associated with a selected augmented reality object, and removing augmented reality objects.

In some embodiments, the augmented reality control engine 3910 may capture content (e.g., images, pictures, video, or audio) and overlay augmented reality objects on the content at the same, or substantially same, time as the content is being captured. Augmented reality objects may include visual objects (e.g., graphics, icons, text, images, pictures, or video), audio objects (e.g., songs or other audio tracks), and metadata objects, such as URI links (e.g., hyperlinks) or instructions to execute one or more third-party systems (e.g., web browser or mobile application). In some embodiments, augmented reality objects may represent OTAs or a source of an OTA. For example, an augmented reality object representing an OTA may comprise an icon representing an OTA, text and images representing optical information, and the like.

In some embodiments, the augmented reality control engine 3910 renders a field-of-view (FOV) augmented reality object that provides a visual representation of the boundaries of a FOV in which optical receivers (e.g., an OBR and/or an OSR) associated with an ORA may receive modulated optical beams. For example, the FOV augmented reality object may be visually rendered as a square, rectangle, circle, or other geometric object. If a visual representation of an OTA or source of an OTA is within the boundaries of the FOV augmented reality object, an optical receiver of an ORA may be able to receive optical information from the visually represented OTA because at least a portion of a modulated optical beam transmitted by the OTA is within the optical receiver's FOV. Conversely, if the visual representation of the OTA is outside of the FOV boundaries, the ORA may be moved (e.g., by tilt actuators and/or user movement of the user device) so that the visual representation of the OTA is within the boundaries of the FOV augmented reality object. In some embodiments, the FOV augmented reality object is scalable and/or maintains a relative location on a display (e.g., a centered location). For example, as a user zooms in or zooms out, the FOV augmented reality object can change sizes, and when a user pans in a direction (e.g., left or right), the field-of-view augmented reality object may maintain the same relative location on the display.

In some embodiments, some or all augmented reality objects are interactive. For example, the augmented reality control engine 3910 may select an augmented reality object in response to user input, and perform one or more actions in response to the selection. For example, selection of an augmented reality object such as a visual representation of an OTA or source of an OTA may trigger the presentation of optical information received from the OTA.

The filtering engine 3912 functions to select or remove (or, collectively, "filter") one or more subsets of OTAs from a set of OTAs. The filtering engine 3912 may filter OTAs based on one or more filter parameters and corresponding tags associated with a modulated optical beam. Filter parameters and tags may indicate a source of an OTA (e.g., a location), one or more entities associated with an OTA (e.g., name or other identifier of a person, company or organization), one or more categories associated with an OTA (e.g., merchant, music venue, or real estate agent), and one or more subcategories associated with an OTA (e.g., jewelry merchant, or residential real estate agent). Filter parameters and tags may be predetermined or user defined. In some embodiments, a tag may be included in optical information (e.g., a header of the optical information of a beacon signal).

The filtering engine 3912 may match, or otherwise compare, filter parameters and tags to filter OTAs.

In the example of FIG. 39, the third-party interface engine 3914 functions to facilitate interaction between the presentation and selection system 3902 and one or more third-party systems. The third-party systems may include mobile application systems (e.g., Google Maps®), social media systems (e.g., Facebook® or Twitter®), and the like, and they may comprise local or remote systems. For example, the third-party interface engine 3914 may present visual indicators of OTAs on a map generated by a third party system, and allow users to select and otherwise interact with OTAs using the third party system. In some embodiments, the third-party interface engine 3914 comprises one or more APIs or communication protocols.

In the example of FIG. 39, the notification engine 3916 functions to generate and provide messages or alerts associated with OTAs. For example, the notification engine 3916 may trigger notification messages in response to satisfaction of one or more notification trigger conditions or based on notification parameters. Notification trigger conditions may include detection of OTAs, signal strength or signal quality, OTA connection status, and the like, and may be predetermined or user defined. The messages may be provided to a user through a component of the presentation and selection system 3902 and/or the user device, and the messages may comprise augmented reality objects or other visual indicators, sounds, or haptics.

In some embodiments, the notification engine 3916 functions to provide indicators for orientating an OTA and/or user device. For example, the notification engine 3916 may generate visual indicators (e.g., graphical arrows) or audio indicators (e.g., speech instructions) for orienting an ORA relative to an OTA in order to receive a modulated optical beam or improve a strength and/or quality of a modulated optical beam. The indicators may be generated in response to user input (e.g., a user requesting orientation instructions) or automatically (e.g., a connection drops, or signal strength and/or quality falls below a threshold value).

In the example of FIG. 39, the context-aware OTA sensing engine 3918 functions to recommend OTAs. In some embodiments, the context-aware OTA sensing engine 3918 detects whether an OTA may be of interest to a user. For example, ten OTAs may be available at a particular location, and the context-aware OTA sensing engine 3918 may categorize each available OTA based on a predicted interest level of a user (e.g., low, medium, or high). The context-aware OTA sensing engine 3918 may select which OTAs may be presented based on the interest level. For example, the context-aware OTA sensing engine 3918 may select medium and high interest level OTAs for display, and ignore low interest level OTAs. This may help ensure, for example, that users are not unnecessarily inundated with information received from OTA.

In some embodiments, the context-aware OTA sensing engine 3918 may generate an OTA interest vector for some or all available OTAs. As used herein, available OTAs may include OTAs currently transmitting to an ORA, OTAs currently capable of transmitting to an ORA, OTAs capable of transmitting to an ORA with limited location or orientation change, and/or OTAs with available stored (e.g., cached) optical information. The interest vector may include an OTA identifier and a history of previous user interactions. The interest vectors may be compared with each other or a threshold value to determine OTAs to present to a user and/or determine OTAs to emphasize to a user. For example, if an interest vector indicates that an associated user has previously interacted with a particular OTA, or OTAs transmitting particular categories or subcategories of signal information (e.g., merchant, jewelry merchant, and the like), a threshold number of times or frequency, the context-aware OTA sensing engine 3918 may categorize a predicted interest level as "high". Similarly, if an interest vector indicates user interaction below a particular threshold, the context-aware OTA sensing engine 3918 may categorize a predicted interest level as "low".

In the example of FIG. 39, the optical information enhancement engine 3920 functions to provide enhanced signal information. As used herein, enhanced signal information may include enhanced signal information obtained from a supplemental communication connection (e.g., WiFi). As used herein, a supplemental communication connection may be any communication connection other than the communication connection providing the optical information. For example, enhanced signal information may include a detailed description of an entity's business, videos, pictures, online retail features, and the like. This may allow, for example, additional information to be provided that may not be reasonably transmitted through a modulated optical beam. In some embodiments, the signal information enhancement engine 3920 may automatically detect and/or access supplemental communication connections, and/or automatically obtain enhanced signal information upon accessing a supplemental communication connection.

The graphical user interface engine 3922 functions to provide a graphical user interface for presenting, selecting, and otherwise interacting with one or more OTAs. For example, the graphical user interface engine 3922 may be implemented as a mobile application, desktop application, web application, or the like. In some embodiments, the graphical user interface engine 3922 provides functionality for interacting with OTAs as described elsewhere herein, albeit in a non-augmented reality environment. For example, the graphical user interface engine 3922 may present a list of available OTAs (e.g., a filtered or non-filtered list), receive user selections regarding OTAs, present optical information from selected OTAs, present notifications, present enhanced signal information, and so forth.

The datastore 3924 functions to store data persistently and/or temporarily. For example, the datastore 3924 may store communications received from other systems, optical and enhanced signal information, rules, and filters.

Figure 40:
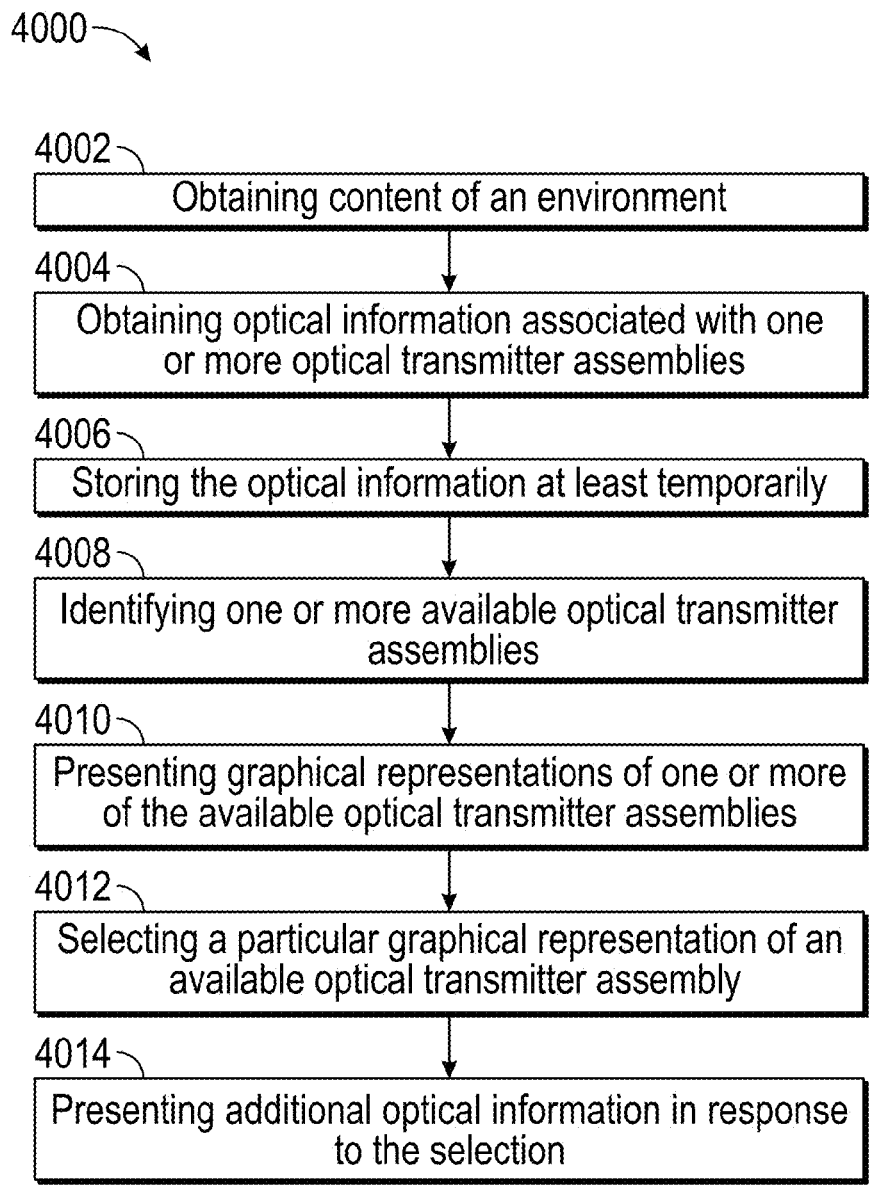
FIG. 40 depicts a flowchart of an example method for presenting graphical representations of OTAs according to some embodiments.

FIG. 40 depicts a flowchart 4000 of an example method for presenting graphical representations of OTAs according to some embodiments. At operation 4002, a presentation and selection system (e.g., presentation and selection system 3902) obtains content of an environment, such as an urban or other environment within a field-of-view of one or more cameras of a user device (e.g., a mobile device camera or an automobile camera). For example, the content may be obtained in real-time (e.g., at the same, or substantially same, time as the content is being captured). In some embodiments, a device interface engine (e.g., device interface engine 3904) obtains the content.

At operation 4004, the presentation and selection system obtains optical information associated with one or more OTAs. In some embodiments, an optical receiver interface engine (e.g., optical receiver interface engine 3906) obtains the optical information.

At operation 4006, the presentation and selection system stores the optical information at least temporarily. For example, the presentation and selection system may cache the optical information in a datastore (e.g., datastore 3924) and/or persistently store the optical information in a datastore (e.g., datastore 3924). In some embodiments, the presentation and selection system stores the optical information based on one or more optical information rules.

At operation 4008, the presentation and selection system identifies one or more available OTAs. In some embodiments, the optical receiver interface engine identifies the one or more available OTAs. In various embodiments, a filtering engine (e.g., filtering engine 3912) may filter the one or more available OTAs. For example, ten OTAs may be available, although only five OTAs may be of interest to the user. The filtering engine may filter the available OTAs such that only the OTAs of interest to the user are identified. Example filtering methods are discussed further below.

At operation 4010, the presentation and selection system presents one or more graphical representations of the one or more available OTAs. In some embodiments an augmented reality control engine (e.g., augmented reality control engine 3910), a third-party interface engine (e.g., third-party interface engine 3914), or a graphical user interface engine (e.g., graphical user interface engine 3922) presents the graphical representations. For example, the augmented reality control engine may generate one or more augmented reality objects representing at least a portion of the available OTAs, and overlay the one or more augmented reality objects on the content. By way of further example, the third-party interface engine may generate and overall one or more graphical icons on a third-party system (e.g., Google Maps®) indicating locations of the corresponding OTAs. By way of further example, the graphical user interface engine may present a list of the available OTAs.

At operation 4012, the presentation and selection system graphically renders a representation of the one or more OTAs. In some embodiments, the augmented reality control engine, the third-party interface engine, and/or the graphical user interface engine renders the graphical representation in response to user input.

At operation 4014, the presentation and selection system presents additional optical information in response to the selection. For example, the additional information may include additional identification data, additional descriptive data, and the like. In various embodiments, the augmented reality control engine, the third-party interface engine, or the graphical user interface engine presents the particular graphical representation.

Figure 41:
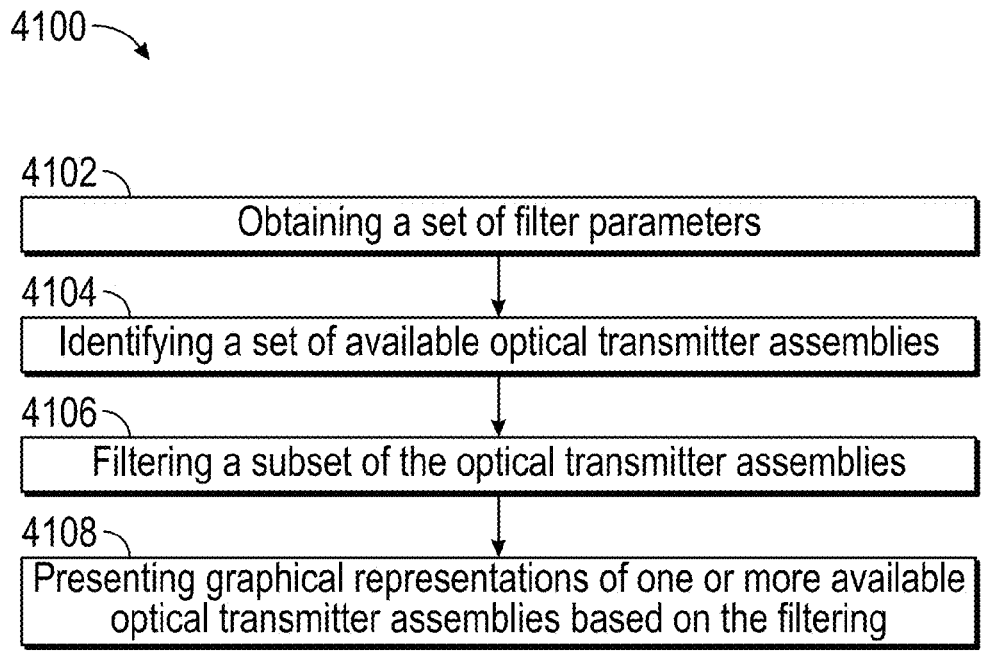
FIG. 41 depicts a flowchart of an example of a method for filtering optical transmitter assemblies or representations thereof according to some embodiments.

FIG. 41 depicts a flowchart 4100 of an example of a method for filtering OTAs or representations thereof according to some embodiments.

At operation 4102, a presentation and selection system (e.g., presentation and selection system 3902) obtains a set of filter parameters. The set of filter parameters may correspond to OTA parameters (e.g., source, category, sub-category, and the like). Filter parameters may be obtained in real-time (e.g., at the same time, or substantially same time, an associated user device is capturing content of an environment) or otherwise. In some embodiments, a filtering engine (e.g., filtering engine 3912) obtains the set of filter parameters automatically (e.g., based on predetermined filter rules) or based on user input received by an augmented reality control engine (e.g., augmented reality control engine 3910) or a graphical user interface engine (e.g., graphical user interface engine 3922).

At operation 4104, the presentation and selection system identifies a set of available OTAs. For example, the presentation and selection system may identify the set of available OTAs based on one or more tags or other optical information of one or more beacon signals. The one or more tags and/or other optical information of the one or more beacon signals may be "active" (e.g., currently being received by an associated ORA) and/or stored (e.g., cached or persistently stored). Accordingly, an available OTA may be an OTA transmitting, or capable of transmitting, a modulated optical beam to an associated ORA, and/or an OTA that is not currently transmitting, or currently unable to transmit, to an associated ORA. In some embodiments, the filtering engine identifies the set of available OTAs.

At operation 4106, the presentation and selection system filters a subset of OTAs from the set of available OTAs based on the set of filter parameters. The subset of OTAs may indicate which, if any, of the available OTAs to present. In various embodiments, the presentation and selection system filters the subset of OTAs from the set of available OTAs based on the set of filter parameters and one or more corresponding tags of a modulated optical beam. For example, if a source of a modulated optical beam matches a corresponding source parameter of the set of filter parameters, the OTA associated with that modulated optical beam may be filtered. Similarly, if the set of filter parameters indicates that a first particular category (e.g., real estate) is of interest to a user, while a second particular category (e.g., jewelry) is not of interest to the user, the set of available OTAs may be filtered such that the subset of OTAs includes OTAs associated with the first particular category, and does not include OTAs associated with the second particular category. Filtering may be performed based on any number of filter parameters, and may indicate parameters of interest to a user and/or not of interest to a user. In some embodiments, the filtering engine filters the one or more subsets of OTAs.

In various embodiments, physical OTAs, as well as graphical representations thereof, may be filtered. More specifically, the user device and/or associated ORA(s) may deny (e.g., ignore) transmissions from OTAs based on the set of filter parameters. For example, a first optical beam from a particular OTA may include one or more tags indicating parameters of the OTA (e.g., source, category, sub-category, and the like). Based on the set of filter parameters, the user device and/or associated ORA(s) may deny subsequent transmissions the particular OTA. For example, subsequent transmissions may be denied for a particular period of time (e.g., an hour, a day, a month, and so forth) for the particular OTA.

In various embodiments, filtering may be based on context and/or predicted interest level(s) for a user with respect to available OTAs. Filtering based on context may be performed by the filtering engine and/or a context-aware OTA sensing engine (e.g., context-aware OTA sensing engine 3918). An example filtering method based on context is discussed below.

At operation 4108, the presentation and selection system presents graphical representations of one or more OTAs of the set of available OTAs based on the filtering. For example, the presentation and selection system may present the subset of OTAs. It will be appreciated that in some examples, the filtering may indicate that none of the available OTAs are to be presented to a user. In some embodiments, the augmented reality control engine or the graphical user interface engine presents the graphical representations.

Figure 42:
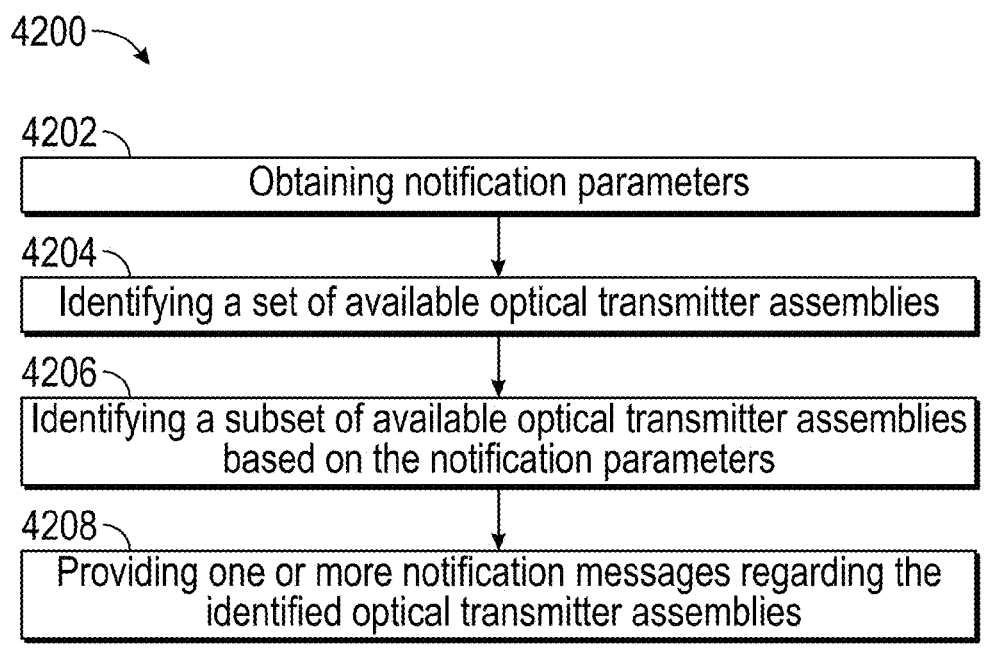
FIG. 42 depicts a flowchart of an example of a method for providing notifications according to some embodiments.

FIG. 42 depicts a flowchart 4200 of an example of a method for providing notifications according to some embodiments.

At operation 4202, a presentation and selection system (e.g., presentation and selection system 3902) obtains notification parameters. For example, the notifications parameters may comprise filter parameters, or other notification parameters. In some embodiments, a notification engine (e.g., notification engine 3916) obtains the notification parameters.

At operation 4204, the presentation and selection system identifies a set of available OTAs. In some embodiments, the notification engine identifies the set of available OTAs.

At operation 4206, the presentation and selection system identifies a subset of OTAs from the set of available OTAs based on the notification parameters. In some embodiments, the notification engine performs the determination.

At operation 4208, one or more notification messages are provided regarding the identified OTAs. For example, a notification message may indicate the set of available OTAs, or the subset of available OTAs. In some embodiments, the notification engine provides the one or more notification messages to a user through an augmented reality control engine (e.g., augmented reality control engine 3910), a third-party interface engine (e.g., third-party interface engine 3914), or a graphical user interface engine (e.g., graphical user interface engine 3922).

Figure 43:
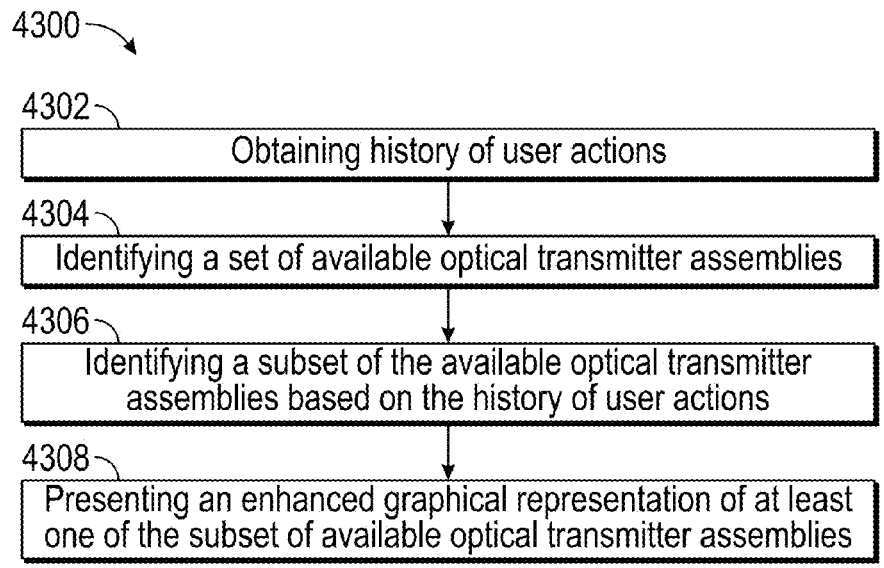
FIG. 43 depicts a flowchart of an example of a method for predicting one or more OTAs that may be of interest to a user according to some embodiments.

FIG. 43 depicts a flowchart 4300 of an example of a method for predicting one or more OTAs that may be of interest to a user according to some embodiments.

At operation 4302, a presentation and selection system (e.g., presentation and selection system 3902) obtains a history of prior user actions. In some embodiments, a context-aware OTA sensing engine (e.g., context-aware OTA sensing engine 3918) identifies the subset of OTAs.

At operation 4304, the presentation and selection system identifies a set of available OTAs. In some embodiments, the context-aware OTA sensing engine identifies the set of available OTAs.

At operation 4306, the presentation and selection system identifies a subset of OTAs from the available OTAs based on the history of prior actions. In some embodiments, the context-aware OTA sensing engine identifies the subset of OTAs.

At operation 4308, the presentation and selection system presents an enhanced graphical representation for at least a portion of the subset of OTAs. For example, enhanced graphical representations can include modified colors, sizes, and/or shapes. In some embodiments, an augmented reality control engine (e.g., augmented reality control engine 3910), third-party interface engine 3914, or graphical user interface engine 3922 provides the enhanced graphical representations.

Figure 44:
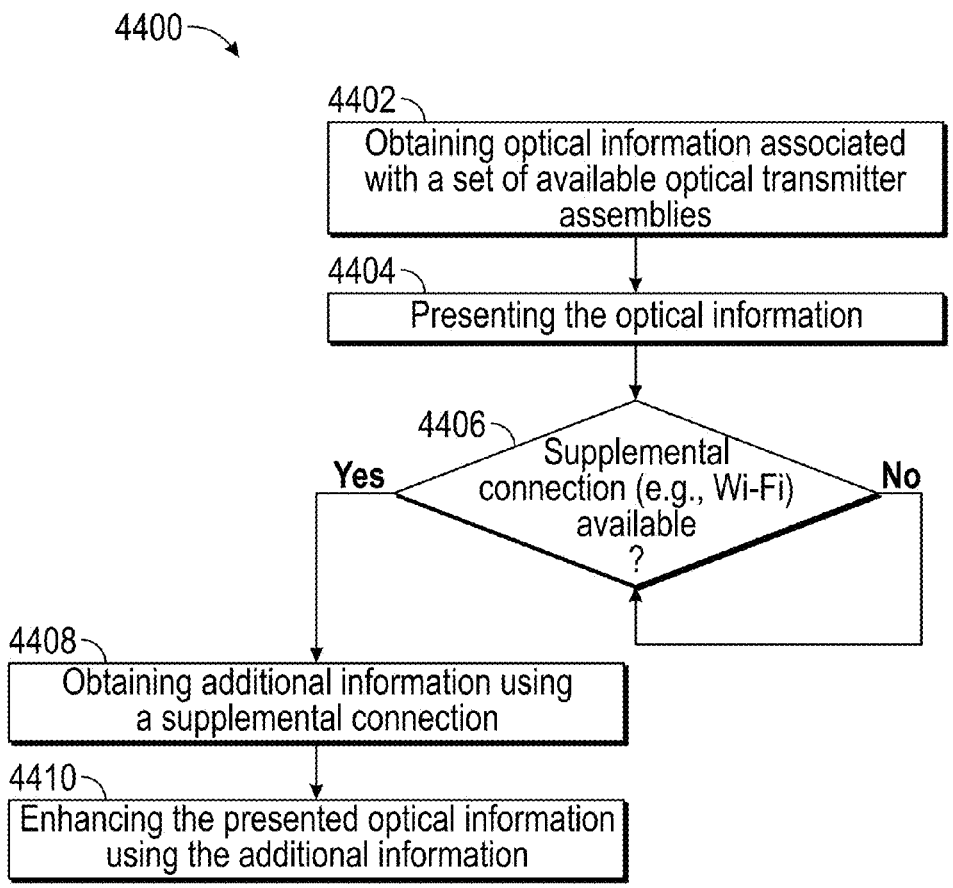
FIG. 44 depicts a flowchart of an example of a method for enhancing signal information using a supplemental communication connection according to some embodiments.

FIG. 44 depicts a flowchart 4400 of an example of a method for enhancing signal information using a supplemental communication connection (e.g., WiFi) according to some embodiments.

At operation 4402, a presentation and selection system (e.g., presentation and selection system 3902) obtains optical information associated with a set of available OTAs. In some embodiments, an optical receiver interface engine (e.g., optical receiver interface engine 3906) obtains the optical information.

At operation 4404, the presentation and selection system presents the optical information. In some embodiments an augmented reality control engine (e.g., augmented reality control engine 3910), a third-party interface engine (e.g., third-party interface engine 3914), or a graphical user interface engine (e.g., graphical user interface engine 3922) provides the graphical representations.

At operation 4406, the presentation and selection system determines whether a supplemental connection is available. In some embodiments, a signal information enhancement engine (e.g., signal enhancement engine 3920) determines available supplemental connections.

At operation 4408, the presentation and selection system obtains enhanced information using the supplemental connection, if such a supplemental connection is available. Otherwise, the method may terminate, or wait for a supplemental connection to become available. In some embodiments, the signal information enhancement engine obtains the enhanced information if the supplemental connection is available, or waits for a supplemental connection to become available.

At operation 4410, the presentation and selection system enhances the graphical representation with the enhanced information. In some embodiments, the augmented reality control engine, the third-party interface engine, or the graphical user interface engine enhances the graphical representations with the enhanced information obtained by the signal information enhancement engine.

Figure 45:
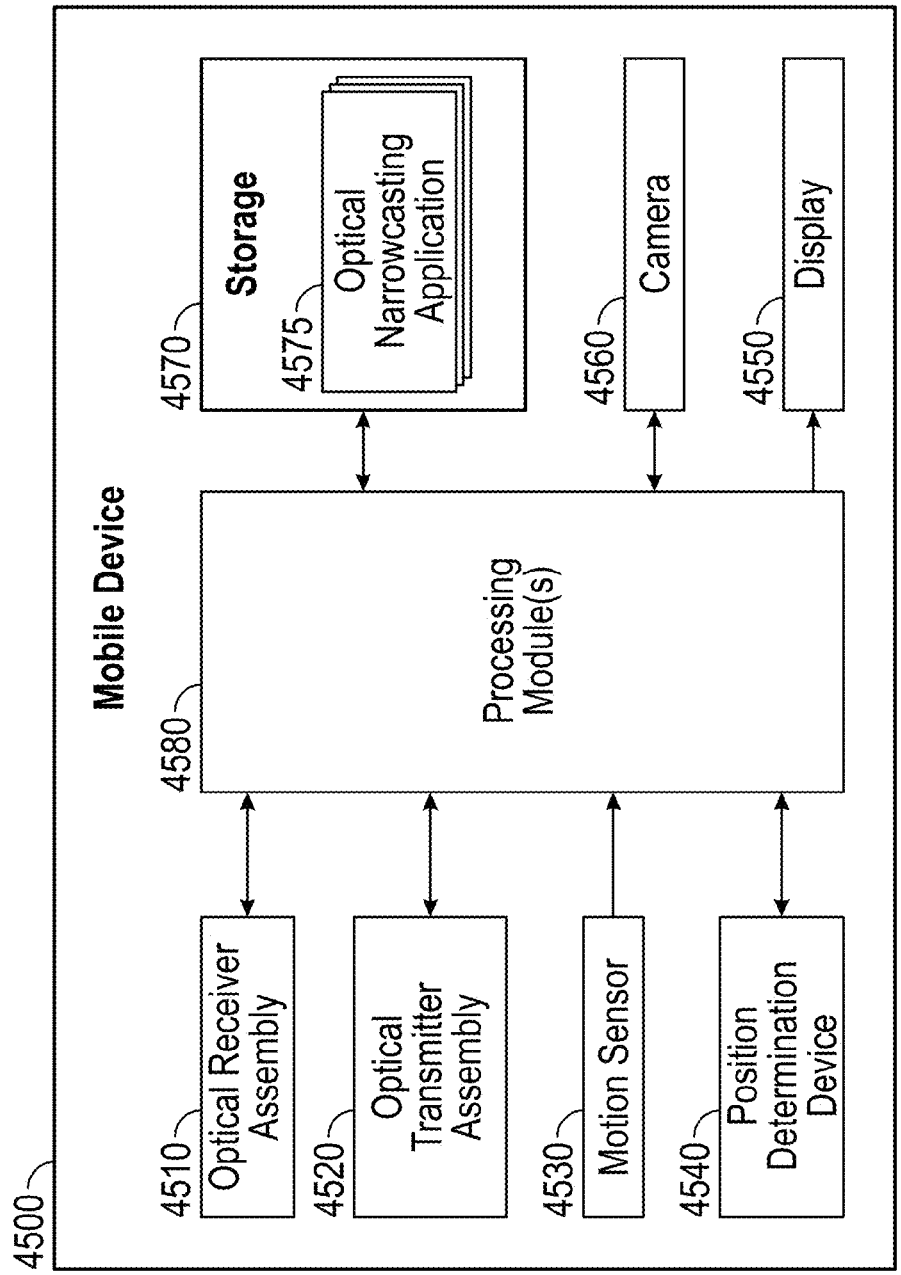
FIG. 45 depicts a block diagram of an example optical narrowcasting mobile device configured to provide GUIs for optical narrowcasting in accordance with embodiments.

FIG. 45 depicts a block diagram of an example optical narrowcasting mobile device 4500 configured to provide GUIs for optical narrowcasting in accordance with the disclosure. The GUIs may be provided by initializing one or more optical narrowcasting applications 4575 of mobile device 4500. The one or more optical narrowcasting applications 4575 may include one or more components of the presentation and selection system 3902 discussed above. In some instances, the optical narrowcasting applications 4575 may be implemented as a component of another application available on the mobile device. For example, in one embodiment, an optical narrowcasting application 4575 may be provided through a camera application initialized by the mobile device.

Mobile device 4500 includes optical receiver assembly 4510, optical transmitter assembly 4520, motion sensor 4530, position determination device 4540, display 4550, camera 4560, storage 4570, and processing modules 4580.

As illustrated in the example of FIG. 45, ORA 4510 and OTA 4520 are integrated into mobile device 4500 (e.g., inside the casing of mobile device 4500). However, in alternative implementations ORA 4510 and/or OTA 4520 may instead be communicatively coupled to mobile device 4500 (e.g., using a smartphone case with a built-in ORA). Additionally, in the example of FIG. 45, camera 4560 is a separate component from ORA 4510. However, as discussed with reference to FIGS. 25-26A, in some instances camera 4560 may be utilized as an ORA to receive optical beacons and/or optical signals. In such implementations, camera 4560 may be used in place of or in addition to ORA 4510. Example implementations of ORA 4510 and OTA 4520 are described in greater detail with reference to FIGS. 8-34.

Storage 4570 may include non-volatile memory (e.g., flash storage), volatile memory (e.g. RAM), or some combination thereof. In the example of FIG. 45, storage 4570 stores an optical narrowcasting application 4575, that when executed by a processing module 4580 (e.g., a digital signal processor), provides an optical narrowcasting GUI on display 4550 (e.g., a touchscreen display of a smartphone or a head mounted display). Additionally, storage 4570 may store information retrieved or created by using optical narrowcasting application 4575. For example, storage 4570 may store application settings (e.g., filters, notifications, OTA/ORA settings), information extracted from optical beacons and optical signals, and other information.

Motion sensor 4530 generates electronic input signals representative of the orientation of mobile 4500. These electronic input signals may be received and processed by circuitry of processing modules 4580 to determine a relative orientation of mobile device 4500 (e.g., an orientation in the north-east-south-west (NESW) and up-down planes). In embodiments, motion sensor 4530 may include one or more gyroscopes, accelerometers, and magnetometers.

Position determination device 4540 includes a device for retrieving geographical positional information over an RF communication medium. For example, position determination device 4540 may include a cellular receiver, a global positioning system receiver, a network interface card, an altimeter, or some combination thereof. The positional information retrieved by device 4540 may be processed by processing modules 4580 to determine the geographical coordinates of mobile device 4500. For example, a GPS receiver may acquires time signals from three or more satellites and determine mobile device 4500's position using three-dimensional trilateration. As another example, the geographical coordinates of mobile device 4500 may be determined relative to one or more WiFi access points using fingerprinting, received signal strength indication (RSSI), angle of arrival (AoA), time of flight (ToF) or other techniques known in the art.

As further described below, the determined orientation (e.g., absolute orientation in an NESW direction) and geographical position (e.g., geographical coordinates) of mobile device 4500 may assist in generating an optical narrowcasting GUI display. For example, a GUI of optical narrowcasting application 4575 may render an augmented reality display of the location of one or more OTAs relative to a FOV of an optical receiver of ORA 4510 (e.g., an OBR or OSR) based at least in part on the determined orientation and/or geographical position of the mobile device.

Camera 4560 captures a video stream of the user's real world environment that may be presented on display 4550. In implementations, further described below, an optical narrowcasting application 4575 may overlay augmented reality objects such as FOV augmented reality objects and visual representations of OTAs over the display of the video stream captured by camera 4560.

Figure 46:
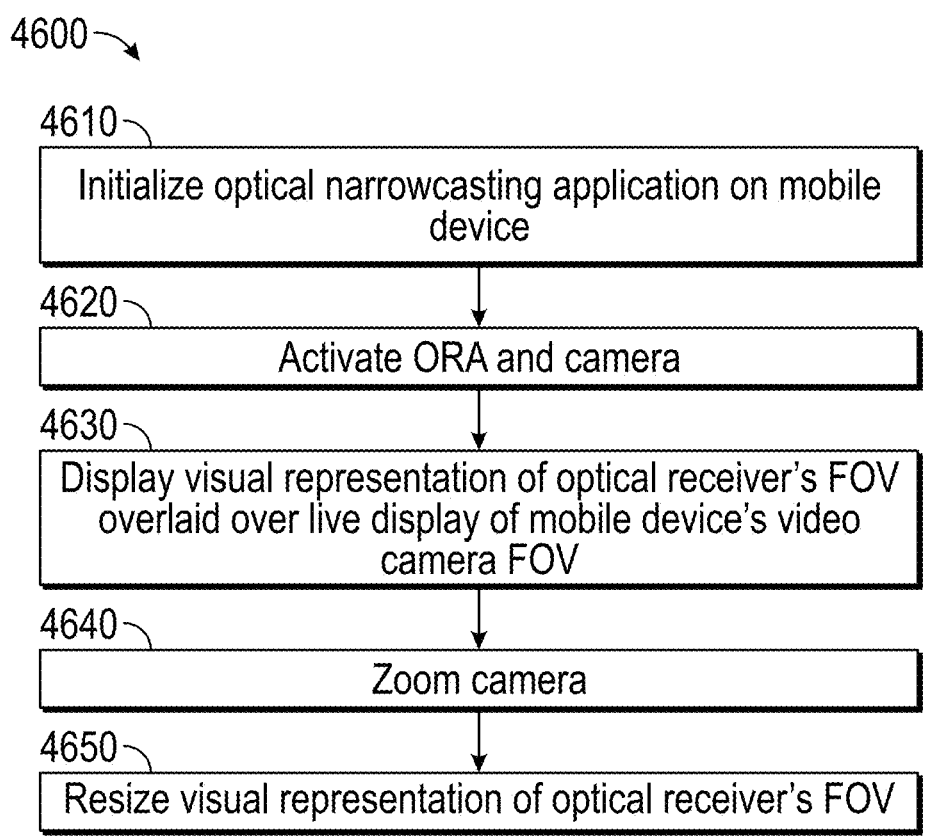
FIG. 46 is a flow diagram illustrating an example method 4600 of rendering an augmented reality display of an optical receiver's field of view in accordance with embodiments.

FIG. 46 is a flow diagram illustrating an example method 4600 of rendering an AR display of an optical receiver's FOV in accordance with embodiments. FIG. 46 will be described with reference to FIGS. 47A-47B, which illustrate example displays of an AR GUI that may be provided by a mobile device 4500 (e.g., a device running an optical narrowcasting application 4575).

At operation 4610, an optical narrowcasting application 4575 is initialized on the mobile device 4500. For example, a user operating a smartphone or tablet device may tap or otherwise touch an icon corresponding to an optical narrowcasting application. As another example, the optical narrowcasting application may be automatically initialized after the mobile device 4500 is powered on. In some implementations, the optical narrowcasting application may be initialized within another application installed on the device. For instance, a camera application of mobile device 4500 may include an option for initializing an optical narrowcasting mode.

At operation 4620, a camera 4560 and ORA 4510 of the mobile device may be activated (e.g., from a powered off or idle state). In some instances, camera 4560 and ORA 4510 may be activated in response to initialization of the optical narrowcasting application. Once activated, camera 4560 may capture a live feed of the user's real-world environment that is displayed on a display 4550, and ORA 4510 may receive optical beacons and/or optical signals from one or more OTAs.

Figure 47:
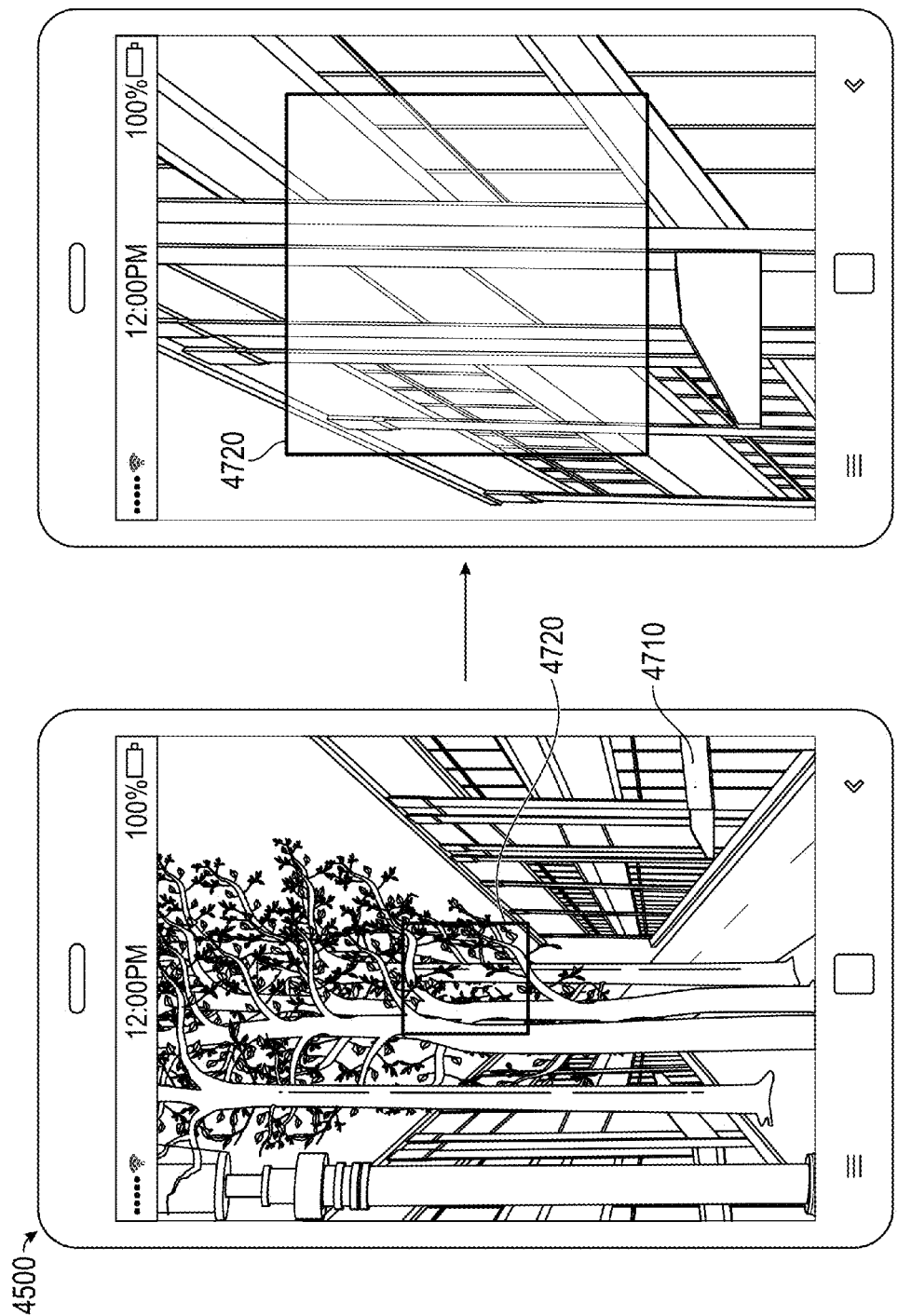
FIG. 47A illustrates an example display of an augmented reality graphical user interface showing a field of view augmented reality object.
FIG. 47B illustrates an example display of the augmented reality graphical user interface of FIG. 47A showing the field of view augmented reality object after zooming a camera.

Following activation of the ORA and camera, at operation 4630 a visual representation of the FOV of an optical receiver of the ORA (e.g., a FOV of an OBR and/or OSR) overlaid over a live display of the camera's FOV is shown on a GUI. FIG. 47A illustrates one such example of an AR GUI 4710 showing a FOV AR object 4720 overlaid over a live camera feed. FOV AR object 4720 provides a visual representation of the boundaries of a FOV in which optical receivers (e.g., an OBR and/or an OSR) of ORA 4510 receive optical signals. As the FOV of the optical receiver depends on an angular region in which it receives optical beacons or optical signals, the displayed FOV AR object 4720 may be sized relative to the displayed FOV of the camera. For example, if a 16° by 8° angular region is displayed on AR GUI 4710, and the FOV of the optical receiver receives signals within angular region of 4° by 4°, the area of FOV AR object 4720 may cover ⅛ of the area of the display of AR GUI 4710.

It should be noted that in various embodiments the FOV of the OBR may coincide with, or may even extend somewhat beyond, the FOV of the camera to facilitate the process of finding beacons. In such embodiments, the FOV AR object 4720 represents a smaller FOV of an OSR as illustrated in FIG. 49A and FIG. 49B. In such implementations, once beacons have been detected, the smaller field of view of the OSR may be positioned so that an optical signal can be received by moving and/or tilting the mobile device to bring an optical signal transmitted by an OTA within the FOV of the OSR.

In some instances, the boundaries of FOV AR object 4720 may be based on an area of the receiver's FOV that receives optical beacons or optical signals at a threshold SNR and/or threshold bit rate. As shown in this example, the FOV AR object 4720 is rendered as a square. However, depending on the configuration of the one or more receivers within ORA (e.g., a rectangular array or circular array configuration), in some instances FOV AR object 4720 may instead be rendered as a rectangle or other polygon, a circle or other ellipse, or some other geometric shape. In other words, FOV AR object 4720 may be rendered as a cross-section of an angular region in which an optical receiver may receive optical beacons or optical signals.

In embodiments, illustrated by FIG. 47A, FOV AR object 4720 is displayed as a semi-transparent object to avoid obstruction of a user's view of the live environment and/or other AR objects (e.g., visual representations of OTA). Alternatively, FOV AR object 4720 may be displayed as an outline of the receiver's FOV. In yet further embodiments, GUI 4710 may provide a control for modifying the appearance of FOV AR object 4720 or hiding FOV AR object 4720 from view.

In embodiments, FOV AR object 4720 stays fixed to a relative location of a display 4550 or GUI 4710 (e.g., a centered location as illustrated by FIGS. 47A-47B) as the mobile device (and correspondingly, the ORA) is moved (i.e., tilted or panned) in different directions. For example, as a user tilts the mobile device in a direction (e.g., left or right), the FOV AR object 4720 maintains the same relative location on the display.

At operation 4640, a camera 4560 of the mobile device is zoomed in or out. In implementations, the camera may be zoomed optically and/or digitally. As zooming in or out changes the angular region of the user's environment that is displayed by GUI 4710, at operation 4650 the visual representation of the FOV of the optical receiver of the ORA (e.g. FOV AR object 4720) is resized. For example, as illustrated in the example of FIG. 47B, FOV AR object 4720 is increased in response to the camera zooming in. Conversely, if the camera zoomed out, the size of AR object 4720 is decreased.

Figure 48:
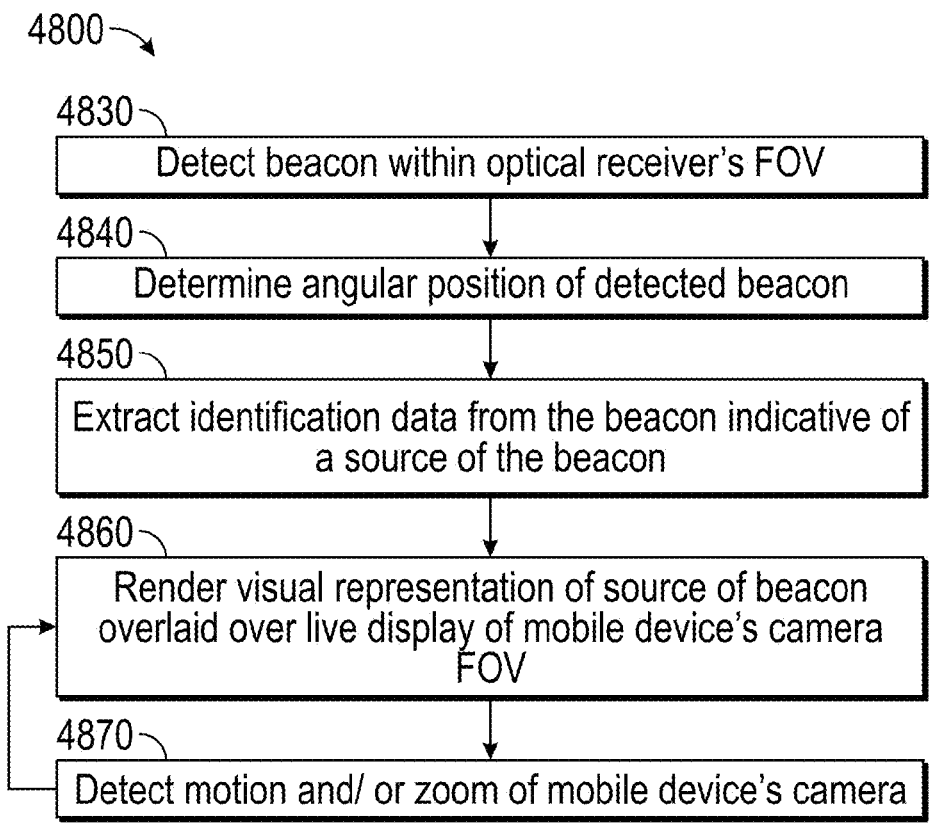
FIG. 48 is a flow diagram illustrating an example method of rendering an augmented reality display of detected optical transmitter assemblies or sources of optical transmitter assemblies in accordance with embodiments.

FIG. 48 is a flow diagram illustrating an example method 4800 of rendering an AR display of detected OTAs or sources of OTAs in accordance with embodiments. Prior to initiating method 4800, an optical narrowcasting application 4575 may be initiated and an ORA and camera may be activated as discussed above with reference to method 4600. FIG. 48 will be described with reference to FIGS. 49A-49B, which illustrate example displays of an AR GUI that may be provided by a mobile device 4500 (e.g., a device running an optical narrowcasting application 4575).

At operation 4830, a beacon transmitted by an OBT of an OTA is detected within the FOV of an OBR of an ORA 4510. For example, as a user moves a mobile device in an environment, optical beacons transmitted by OBTs in the environment may come into the FOV of the OBR. Upon detection of the optical beacon, at operation 4840 ORA 4510 may estimate the horizontal and vertical angular positions of the received beacon relative to the OBR's FOV. For example, the angular position of the optical beacon may be detected by mapping between the horizontal and vertical position where an electrical signal is produced in a detector array of the OBR and the horizontal and vertical angular position within the OBR's FOV of the optical beacon that produced an electrical signal.

At operation 4850, ORA 4510 extracts identifying information from the received beacon. The identifying information may identify the name of the source or entity (e.g., business name, device name, individual name, etc.) associated with the OTA that sent the optical beacon. In some instances, the identifying information may further identify the category and/or type of the source. For example, the identifying information may specify whether the source is an individual, business, organization, landmark, product, or object. In the case of businesses, the identifying information may specify, for example, whether the business is a restaurant, a hotel, a department store, a supermarket, a warehouse store, a gas station, a movie theater, etc.

The extracted identifying information may be temporarily cached or permanently stored in a memory of ORA 4510 and/or another storage of mobile device 4500 (e.g., storage 4570). Once extracted, the identifying information is made available to an optical narrowcasting application 4575.

At operation 4860, the extracted identifying information and estimated angular positions of the received beacon may be used by optical narrowcasting application 4575 to render a visual representation of the beacon's source overlaid over a live display of the camera's FOV. The visual representation, in various implementations, may identify the source of the beacon (e.g., based on the extracted identifying information) and visually represent the location of the source/OTA relative to the display of the live feed from the camera (e.g., based on the estimated angular positions of the received beacon). One such implementation is illustrated by FIG. 49A, which shows an AR GUI displaying an icon or marker 4913 associated with a business (e.g., "Business A") transmitting a beacon that was detected by an ORA of the mobile device. In this example, icon 4913 is overlaid over a live display of a FOV of the mobile device's camera. The location of icon 4913 in this example represents the estimated location of "Business A" relative to the displayed live feed of camera imagery, based on the estimated angular position of the received beacon. For example, as a user moved the mobile device in the urban environment, a beacon transmitted by "Business A" came into the FOV of the OBR of the mobile device's ORA (where the FOV of said OBR coincides substantially with the FOV of the mobile device's camera), identifying information was extracted from the received beacon, and a graphical representation 4913 of "Business A" was rendered on the GUI.

In some implementations, the visual representation of the beacon's source may include an icon indicating the category or type of source in addition to the source's name. For example, the icon may indicate if the source is a restaurant, a hotel, a department store, a supermarket, a warehouse store, a gas station, a movie theater, and the like. In such instances, a predetermined set of icons may be used by the optical narrowcasting application to represent the different types of entities.

At operation 4870, the mobile device's camera may move (e.g., pan, tilt, or roll) and/or the displayed imagery produced by the camera may be zoomed in or out. In response to the change this produces in the size and/or orientation of the camera's FOV, the visual representation of the source of the beacon may be updated such that its position relative to the displayed live-feed imagery is always an accurate representation of the actual location relative to the real-world scene of the OTA that transmitted said beacon. In some instances this may be implemented by overlaying an AR visual layer over the displayed live feed of the camera output. The AR visual layer may store the positions of AR objects representing beacons relative to each other. As the camera is moved and/or zoomed, AR objects representing beacons may remain "anchored" to this layer, which is kept properly registered or aligned with the camera's live-feed imagery as the camera is moved and/or zoomed. In some instances, the size of the displayed visual representation of the source may be increased as the camera zooms in and decreased as the camera zooms out.

In some embodiments, a motion sensor 4530 may be used to determine the mobile device's absolute orientation in the direction of the optical receiver's FOV (e.g., in the NESW and up-down planes), and a position determination device 4540 may be used to determine the mobile device's geographical position (e.g., latitude, longitude, and altitude) upon detecting a beacon. This additional information, along with the beacon's estimated angular position, may be stored in memory and used to "map" the relative position of the beacon such that it may be rendered by a GUI of an optical narrowcasting application when the beacon is no longer within the FOV of OBR, or even when the optical narrowcasting application is closed and reinitialized at a later time.

FIG. 49B illustrates one example of an AR GUI 4710 displaying a plurality of icons 4913-4916 associated with corresponding OTAs/entities (i.e., "Business A", "Business B", "Business C", and "Business D"). The icons 4913-4916 may have been generated in response to detection of optical beacons and are overlaid over a live feed of a mobile device's camera. In some instances, the information associated with the detected beacons may be stored in a persistent storage (e.g., storage 4570) such that an OBR of the mobile device's ORA does not need to redetect the beacons to generate the AR GUI during subsequent application sessions.

As further discussed below, a user may take advantage of these AR representations of sources of beacons along with a FOV AR representation of an OSR to retrieve additional descriptive information associated with each of the sources of the beacons. For example, a user may tilt a mobile device such that icons representing a previously detected optical beacon are moved within an FOV AR object, such that the user may select an icon corresponding to an ORA to initiate receipt of one or more optical signals corresponding to the ORA. Such example use cases are further described below.

Figure 50A:
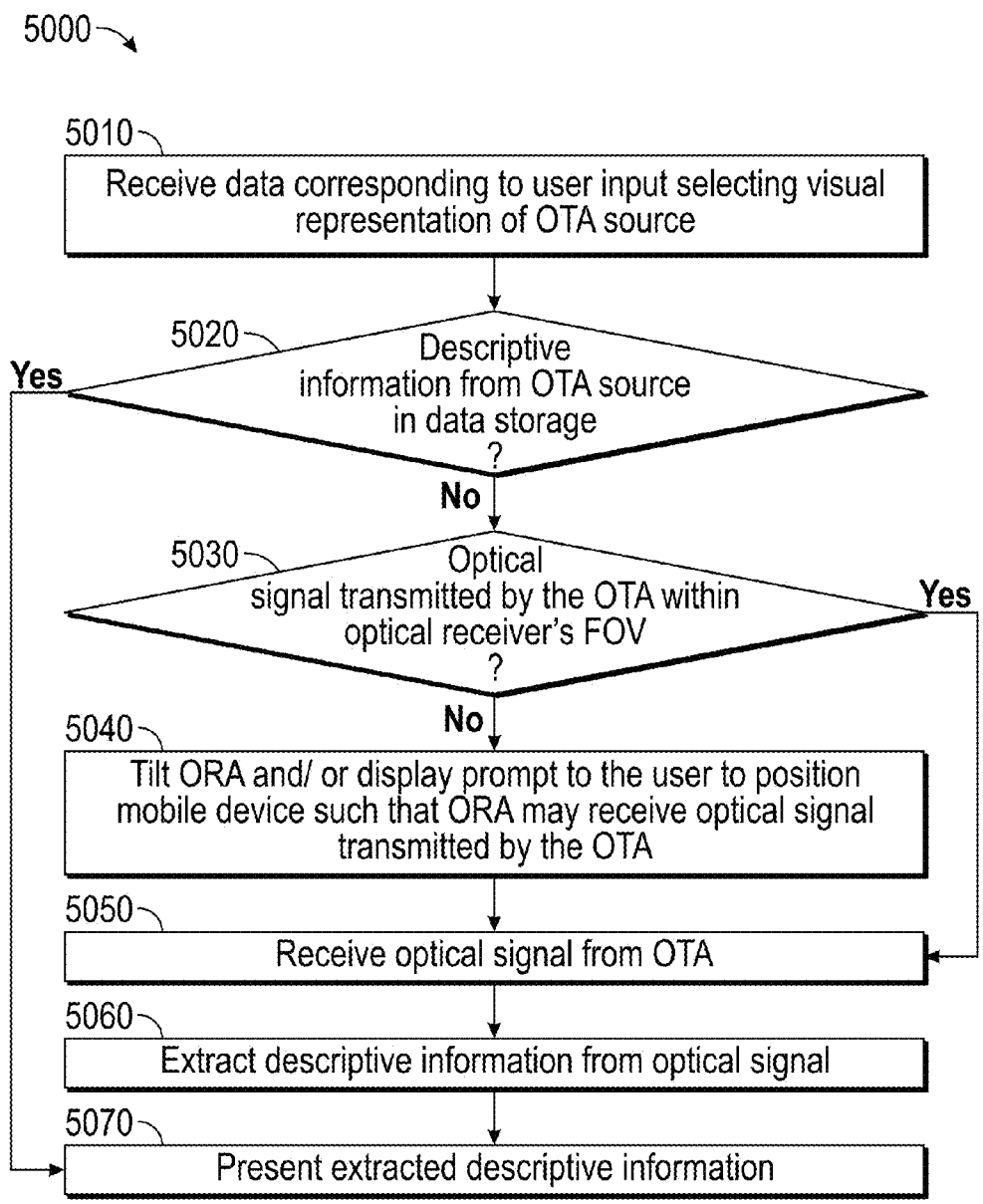
FIG. 50A is a flow diagram illustrating an example graphical user interface method that may be implemented by a mobile device to extract descriptive data from detected optical transmitter assemblies in accordance with embodiments.

FIG. 50A is a flow diagram illustrating an example GUI method 5000 that may be implemented by a mobile device to extract descriptive data (e.g., information obtained from optical signals) from detected OTAs in accordance with embodiments. Example GUI method 5000 may be implemented for example, by running the optical narrowcasting application 4575. At operation 5010, a device (e.g., mobile device 4500) receives data corresponding to user input selecting a visual representation of an OTA source (e.g., a visual representation previously generated by detecting a beacon transmitted by the OTA source). For example, with reference to the example of FIG. 49B, a user may tap, touch, or otherwise select the icon 4913 represented by "Business A."

At decision 5020, it is determined if descriptive information associated with the selected OTA source has previously been stored in an available data storage. For example, it may be determined if the descriptive information is persistently stored or temporarily cached in a storage 4570 or a memory of ORA assembly 4510. This descriptive information may have been stored during a prior user session with optical narrowcasting application 4575. If the descriptive information is stored, the information may be retrieved from storage and presented at operation 5070.

On the other hand, if the descriptive information for the OTA source is not available for retrieval from storage, the mobile device may instead receive the data using an OSR of an ORA 4510. As such, at decision 5030 it is determined if an optical signal transmitted by the OTA (i.e., an OST) of the source is within the FOV of an OSR of the ORA. It should be noted that in most cases an optical signal associated with an entity will be transmitted from the same or substantially the same angular position as a beacon (e.g., the OST and OBT are the same device or are integrated into the same OTA). For instance, in the example of FIG. 49A, as Business A is within the FOV of an OSR, as represented by AR FOV object 4720, it may be determined that an optical signal transmitted by the OTA associated with Business A is within the FOV of the OSR. Conversely, in the example of FIG. 49B, none of the optical signals transmitted by the represented entities are within the FOV of the OSR.

If the optical signal is not within the FOV of the OSR, at operation 5040 a GUI of the optical narrowcasting application may display a prompt to the mobile device's user to position (e.g., tilt) the mobile device such that the ORA may receive optical signals transmitted by the selected OTA. For instance, in the example of FIG. 49B, if a user selects "Business A", the GUI may prompt the user to position the mobile device such that icon 4913 is within the FOV of FOV AR object 4720. Additionally, at operation 5040 control electronics and ORA software and/or firmware may be used to control the direction from which optical signals are received by the OSR by tilting one or more tilt actuators such that the FOV of the OSR falls within the path of the desired optical signal.

In some implementations, GUI 4710 may provide a control for zooming camera 4560 such that FOV AR object 4720 fits or exceeds the FOV of the camera 4560. Such a configuration may provide an intuitive way of detecting and selecting an OTA within the aforementioned AR GUI as all visual representations of OTAs/sources of OTAs displayed on the GUI will immediately be within the OSR's FOV, ready for optical signal acquisition.

At operation 5050, the optical signal is received from the OTA, and at operation 5060 descriptive information is extracted from the received optical signal. Particular systems and methods for receiving optical signals and extracting information from received optical signals are described in greater detail with reference to FIGS. 25-34. The extracted descriptive information may include a variety of information generated by the source of the OTA. For example, the extracted information may include source contact information, photographic imagery, videos, text, product listings, advertisements, and other information generated by the source of the OTA. In some implementations, further described below, the descriptive information extracted from the detected optical signal may be stored in a persistent storage for later access.

Figure 50B:
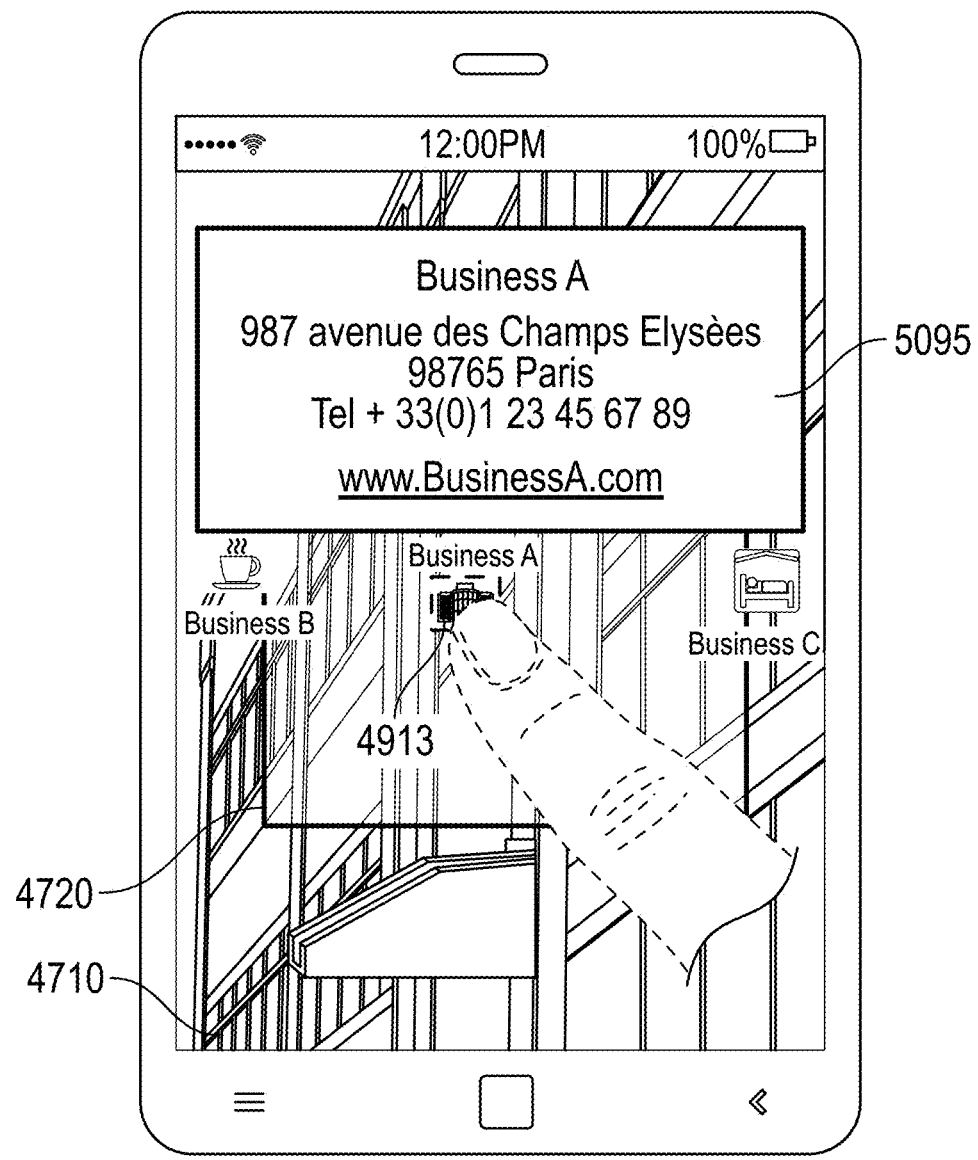
FIG. 50B illustrates an example graphical user interface displaying descriptive data extracted from an optical signal received from an optical transmitter assembly.

At operation 5070, the extracted descriptive information is presented to the user using a GUI of the optical narrowcasting application. In implementations, extracted descriptive information may be presented using windows, window controls, menus, icons, or some combination thereof. For example, in cases where different types of descriptive information are extracted (e.g., video information, contact information, shopping information, etc.), the different types of descriptive information may be organized by icons or menu items, that when selected, present a window including the type of selected information. FIG. 50B illustrates one such example of a GUI 4710 displaying descriptive data 5095 extracted from an optical signal received from an OTA of an entity. In this example, a user may have selected the icon 4913 corresponding to Business A (e.g., by a touch user interface gesture) and positioned FOV AR object 4720 such that an optical signal transmitted by an OST of Business A is within a FOV of the mobile device's OSR. In this example, the descriptive data 5095 extracted from the optical signal is displayed in a window and includes contact information for Business A including a physical address, phone number, and web address.

Although example method 5000 illustrates an example GUI method through which a user may manually retrieve optical-signal information from OTA sources by selecting the OTA sources, it should be noted that in alternative implementations an optical narrowcasting application 4575 may be configured such that optical signal information is automatically retrieved for all or a subset of OTAs (e.g., as determined by user-defined filters) that transmit an optical signal that falls within the FOV of the OSR of the mobile device. For example, the optical narrowcasting application may present the user with a GUI controller for enabling or disabling automatic retrieval of optical-signal information as the mobile device is moved around the environment.

In some cases, optical signals may carry descriptive data that takes a non-trivial amount of time to retrieve (e.g., a few seconds, several seconds, a minute, a few minutes, or longer). For example, optical signals may carry high fidelity image data, video data, audio data, documents with large file sizes, or some combination thereof. In such cases it may be desirable to dynamically present (e.g., stream) data extracted from an incident optical signal while the ORA receives the optical signal and extracts remaining data. Additionally, it may be desirable to provide an indication to the user that data is being "downloaded" or retrieved from an optical signal to ensure that the user keeps the FOV of a mobile device's OSR in place.

Figure 51:
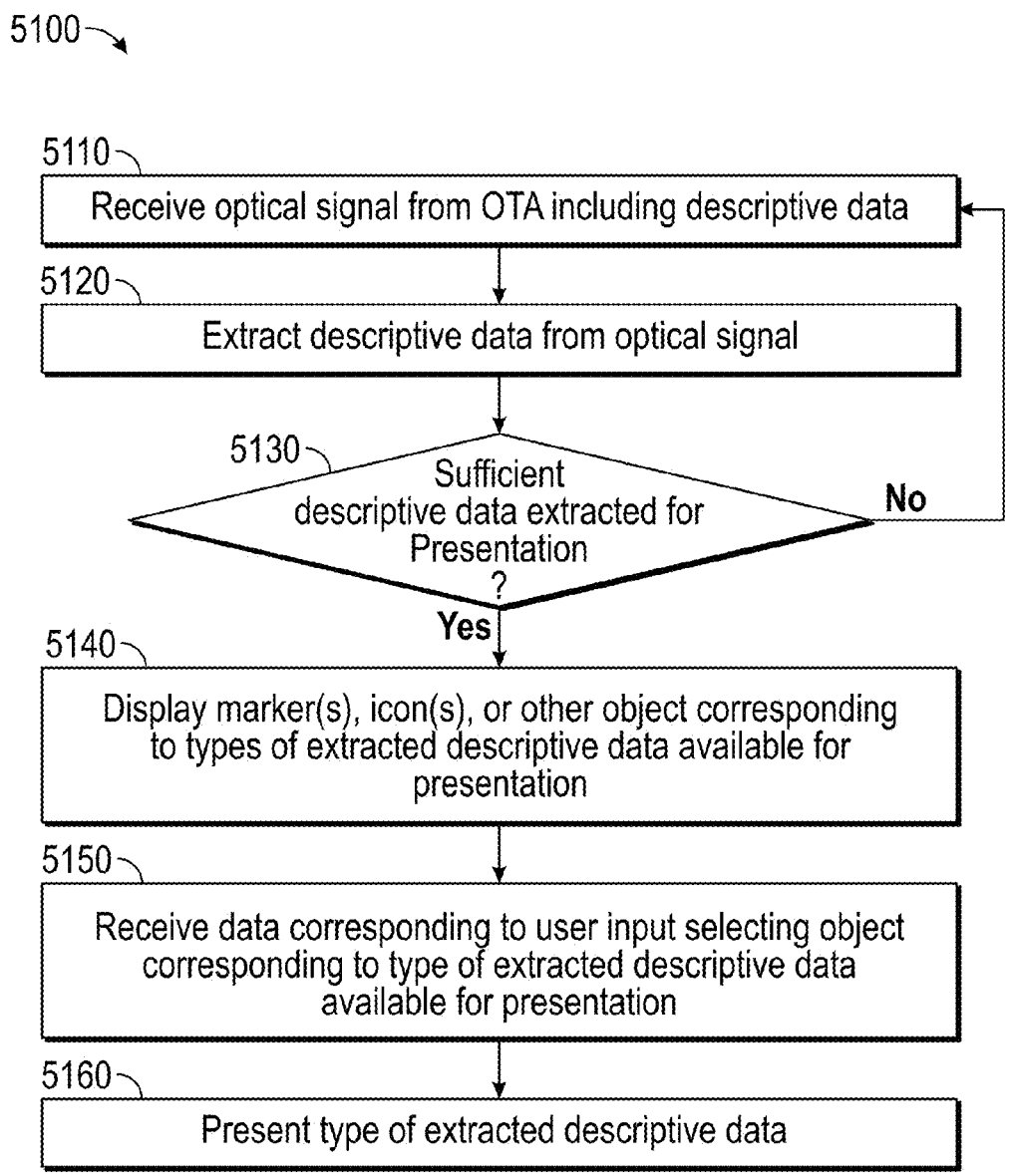
FIG. 51 is a flow diagram illustrating an example graphical user interface method of dynamically presenting descriptive data extracted from an optical signal transmitted by an optical transmitter assembly.

FIG. 51 is a flow diagram illustrating one such example GUI method 5100 of dynamically presenting descriptive data extracted from an optical signal transmitted by an OTA. FIG. 51 will be described with reference to FIGS. 52A-52I, which illustrate an example GUI 4710 for implementing method 5100. At operation 5110, an optical signal is received at an ORA, and at operation 5120 the ORA begins extracting descriptive data from the received optical signal. During receipt of the descriptive data, the GUI may provide a visual indication to the user that data extraction of an optical signal is currently pending or has completed. For instance, in the example of FIG. 52A a user may position FOV AR object 4720 over icon 4913 and begin retrieving optical signal information transmitted by the OTA of Business A by selecting a start control 5210 or by tapping icon 4913. During data retrieval, icon 4913 may flash and/or GUI 4710 may provide some other visual indication that data is being retrieved for that specific OTA.

At decision 5130, it is determined if sufficient descriptive data has been extracted for presentation on the GUI. For example, in the case where different types of data are extracted (e.g., contact information, video, photographs, etc.), the extracted descriptive data may be ready for presentation if one type of data (e.g., contact information) has been completely extracted. As another example, video data may be ready for presentation if a sufficient buffer of video data has been created such that the video data may be streamed.

If sufficient descriptive data has been extracted for presentation, at operation 5140, one or more icons, markers, or menu items associated with the types of extracted descriptive data may be made available for presentation. For instance, in the example of FIG. 52B, a video icon signal 5250 (e.g., square with symbol of video camera) is displayed next to the icon 4913 of the associated Business. In this example, the appearance of the icon may indicate that video data is available for viewing. In some instances, the icon may initially be displayed to indicate the type of data that is being retrieved even before such data is ready for presentation. For example, video icon 5250 may be grayed out until enough video data is available for presentation. As also illustrated in the example GUI of FIG. 52B, a user may be presented with a control 5240 (e.g., a save icon) for saving or archiving data that has already been received, and a control 5230 (e.g., an exit icon) for pausing or stopping data receipt. Alternatively, all received data may be automatically archived.

At operation 5150, the mobile device receives data corresponding to user input selecting an object corresponding to a type of extracted descriptive data available for presentation. For instance, in the example of FIG. 52B, a user may tap video icon 5250 or provide some other user input for selecting the video information extracted from the optical signal transmitted by the OTA of Business A. At operation 5160, the type of extracted descriptive data is presented on the GUI.

Figure 52D:
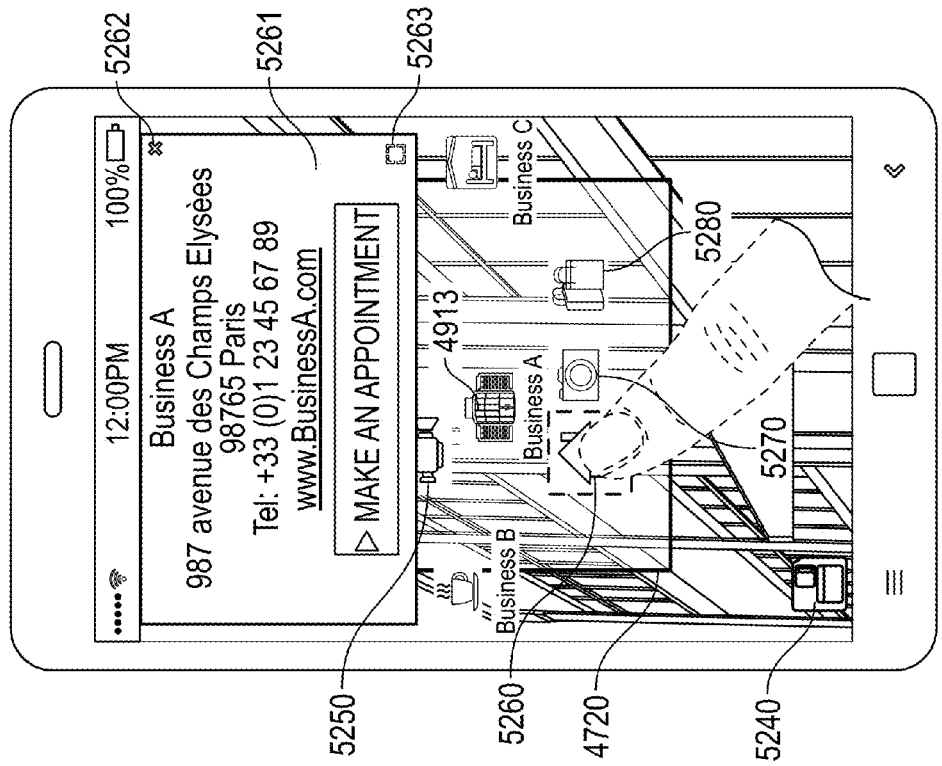
FIG. 52D illustrates an example display of a graphical user interface after extracting all optical signal information received from an optical transmitter assembly.
Figure 52C:
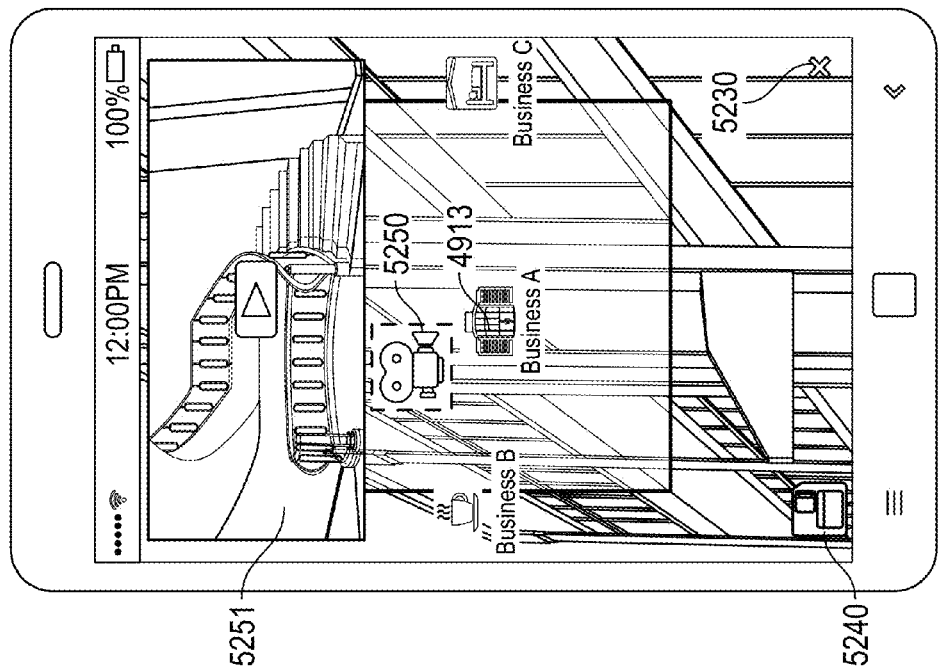
FIG. 52C illustrates an example display of a graphical user interface after retrieving optical signal information including a video.

By way of example, FIG. 52C illustrates the GUI displaying a window with an advertising video 5251 for Business A that may be presented after a user touches video icon 5250. In this case the video is overlaid on the GUI in a window and begins playing after the user selects a playback control. During video playback, icon 4913 may continue blinking or the GUI may provide some other indication that data is still being retrieved from the optical signal transmitted by an OTA of Business A.

FIG. 52D illustrates the example GUI after all optical signal information has been extracted (i.e., data transfer is complete). In this example, the user's mobile device may now be repositioned as desired for comfortable viewing of received data (i.e., it is not necessary to have icon 4913 within AR FOV object 4720). As illustrated, three more icons appear, indicating the presence of other data that has been received and is ready to be viewed. The icons include a store-information icon 5260, a photo-gallery icon 5270, and a product listing icon 5280. In this example, a store-information icon 5260 is now selected. Selection of the icon 5260 brings up a window 5261 showing the store location, phone number, etc. Additionally, navigational controls 5262 (e.g., for closing the window) and 5263 (e.g., for enlarging the window) for the window are displayed in this example.

Figure 52E:
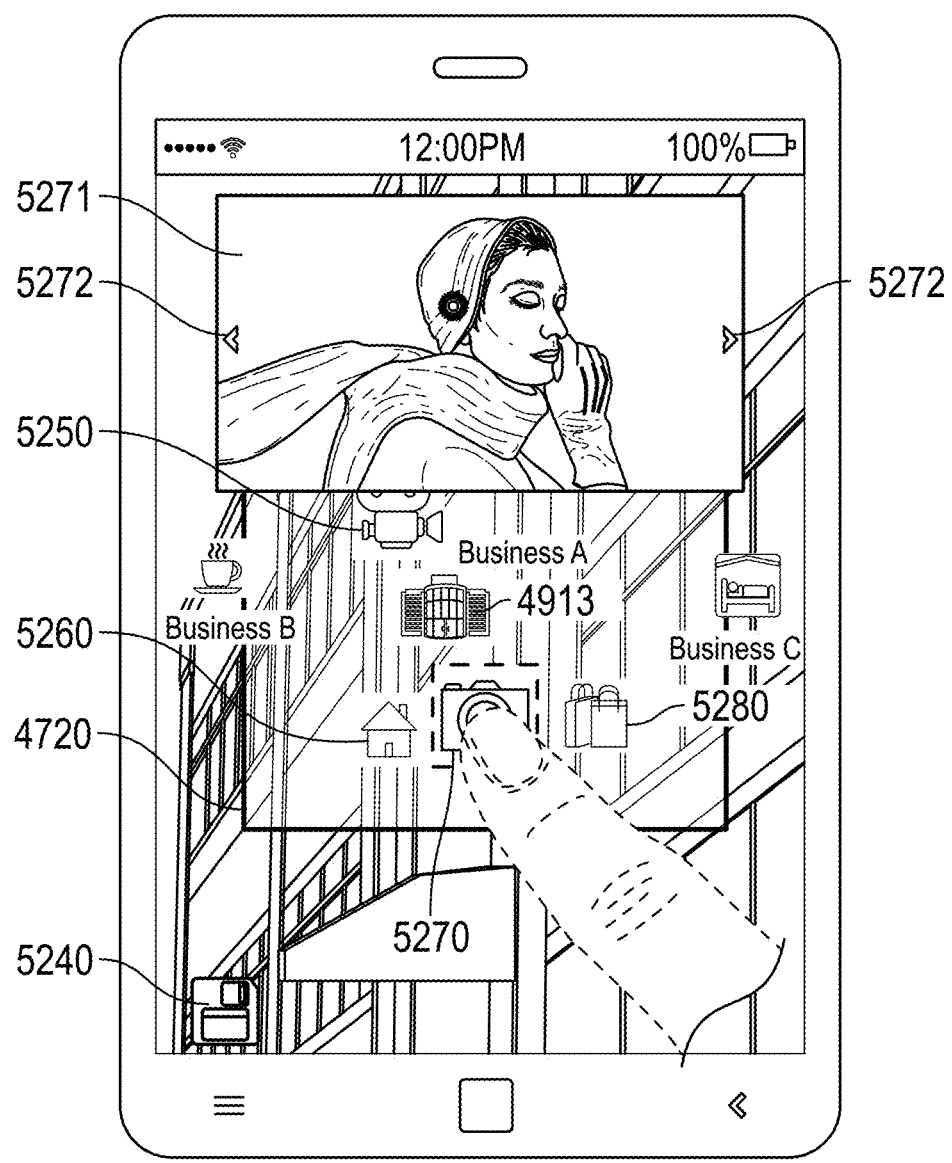
FIG. 52E illustrates an example display of a graphical user interface after user input selecting a photo-gallery icon displayed by the graphical user interface of FIG. 52D.

FIG. 52E illustrates the example GUI after user input selecting the photo-gallery icon 5270. In this example, touching the photo-gallery icon may display a window 5271 including a photo-gallery with navigational controls 5272 for navigating the photographs of the gallery.

FIG. 52F illustrates the example GUI after user input selecting the product listing icon 5280. In this example, touching the product listing icon 5280 may display a window 5281 including a listing of product categories (e.g., jewelry, fragrances, etc.) and controls for navigating the product categories. In this example, window 5281 may provide hierarchical navigation of extracted descriptive information using pointers or other links embedded in the displayed information. FIG. 52G illustrates the example GUI after user input selecting a fragrance product category displayed in window 5281. Selection of the fragrance product category updates the window 5281 or generates a new window to display information about available fragrances. FIG. 52H illustrates the example GUI after user input selecting a women's fragrances product category. Selection of the women's fragrances product category updates the window to display a list of fragrances for women. FIG. 52I illustrates the example GUI after user input selecting a particular fragrance listed in FIG. 52H. Selection of the fragrance brings up information about the product and provides the user with a control for selecting an option for ordering the product from Business A.

As would be appreciated by one having skill in the art, the navigational controls illustrated with reference to FIGS. 52A-52I need not be implemented in the precise form illustrated therein, and in some instances other user interface inputs such as touch user interface gestures and/or voice commands may be used in place of the controls. For instance, in the example of photo-galley window 5271, swipe user interface gestures may be used in place of controls 5272 to navigate the photograph collection.

As illustrated by the example GUI of FIG. 52I, as part of the process of presenting the optical signal information received from an OTA of an entity, the GUI may also present controls for communicating with the entity associated with the OTA (e.g., the "Order" control of FIG. 52I). As such, selection of one or more of these controls may cause the mobile device to generate information through the optical narrowcasting application that is modulated onto an optical beacon and/or an optical signal that is transmitted from the mobile device's OTA to an ORA of the entity.

Figure 53:
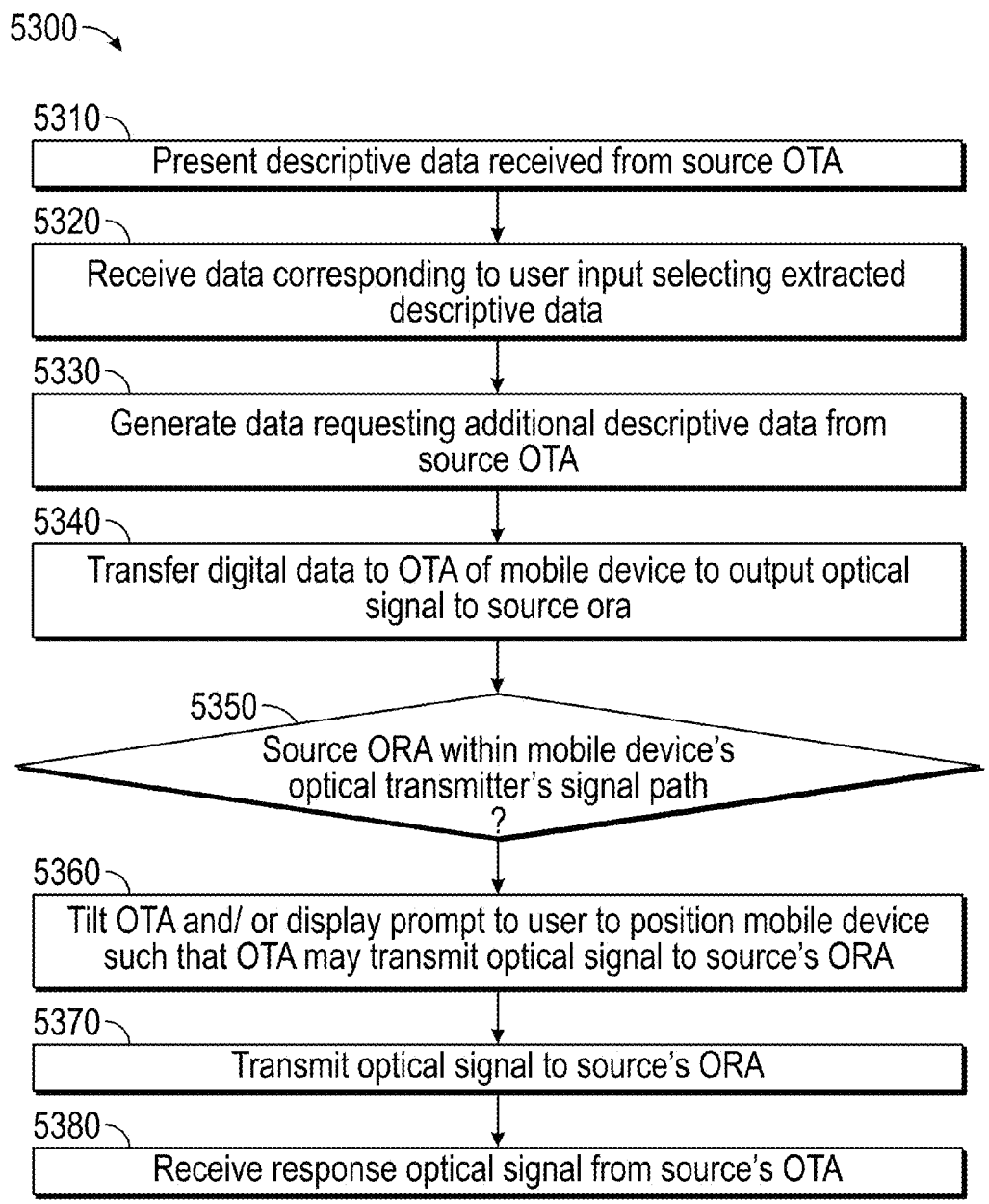
FIG. 53 is a flow diagram illustrating an example method of communicating with an entity over an optical narrowcasting network in response to user input received at a graphical user interface that presents optical signal information received from the entity.

FIG. 53 is a flow diagram illustrating one such example GUI method 5300 of a device communicating with an entity over an optical narrowcasting network in response to user input received at a GUI that presents optical signal information received from the entity. At operation 5310, descriptive data extracted from an optical signal received from a source's OTA is presented by an optical narrowcasting GUI. The presented descriptive information, in embodiments, may include controls for initiating a request from the device to the source. The request may include, for example, a request for additional information that was not available in the optical signal, a request to order a product, etc. For example, with reference to FIG. 52I, the mobile device may initiate an order request for a product for sale by Business A.

At operation 5320, data corresponding to user input selecting the extracted descriptive data is received. For example, a user may select a control for initiating a request such as a product order request.

In response to the user input, data requesting additional data from the source of the OTA may be generated at operation 5330. For example, by creating a product order request, a mobile device may generate a secure transaction request to be transmitted to an ORA associated with the source of the OTA. At operation 5340, the generated data may be transferred to an OTA of the mobile device in preparation for outputting an optical signal to an ORA of the source.

At decision 5350, it is determined if the source's ORA is within the transmitting path of an optical transmitter of the mobile device. In implementations, this decision may be based on the assumption that the source's ORA is located in the same or substantially the same location as the source's OTA. If the source's ORA is not within the transmitting path of the OST, at operation 5360, OTA hardware, software and/or firmware may be used to control the pointing direction of the optical signal output by the OST by tilting one or more tilt actuators. Additionally, at operation 5360 a prompt may be displayed to a user of the mobile device to position the mobile device such that the OTA may transmit optical signals to the source's ORA.

In implementations, a GUI of an optical narrowcasting application of the mobile device may display an AR object corresponding to a transmitting emitting region covered by an optical transmitter of the mobile device. The displayed AR object may be displayed in a similar manner as described above with respect to example FOV AR object 4720. Assuming the source's ORA is located in the same or substantially the same location as the source's OTA, the GUI may display a prompt to the user to position the mobile device such that the visual representation of the source on the GUI is within the AR object corresponding to the optical transmitter's emitting region.

At operation 5370, the mobile device transmits the optical signal to the source's ORA. At operation 5380, the mobile device receives a response optical signal from the source's OTA. For example, the mobile device may transmit an optical signal including a secure transaction request to purchase a product and receive a response optical signal including confirmation of the secure transaction request.

In some instances, method 5300 may be implemented by establishing an optical narrowcasting ad-hoc network between the mobile device and one or more devices of the entity including an OTA and ORA. Systems and methods for creating optical narrowcasting ad-hoc network are described in greater detail in FIGS. 35-38.

Figure 54:
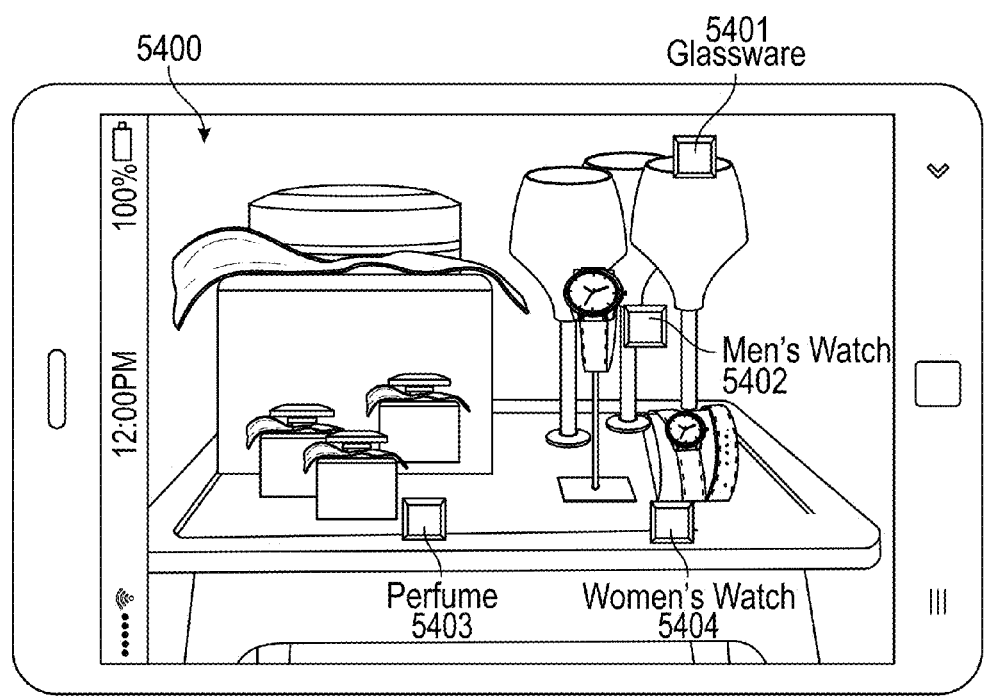
FIG. 54 illustrates an example augmented reality optical narrowcasting graphical user interface for a shop-window or in-store display that may be presented by running an optical narrowcasting application on a mobile device.

FIG. 54 illustrates an example AR optical narrowcasting graphical user interface 5400 for a shop-window or in-store display that may be presented by running an optical narrowcasting application on a mobile device. In this example, the optical narrowcasting application may enhance a display of merchandise within a store or at a store window. As illustrated, a live camera feed is overlaid with icons and text 5401 through 5404 representing optically transmitted information associated with the displayed merchandise (e.g., glassware, men's watch, etc.). In this example, the locations of the overlaid icons correspond to the locations of OBT with small apertures (e.g., on the order of 1-2 mm diameter) emitting optical beacons. The icons and text appear to float in space over the live image and continuously maintain their alignment with the image as the mobile device camera is moved. This gives the illusion that the icons and text are part of the live video image.

In the remaining examples, it is assumed that the FOVs of all OBRs and OSRs are all at least as large as the FOV of the camera providing the live-feed imagery for the AR display of information received from optical beacons and optical signals. When this is the case, it is not necessary to utilize AR objects in the GUI to represent the FOVs of OBR or OSRs (e.g., FOV AR object 4720) for the purpose of indicating to the user the angular region within which an OTA must be located in order to receive optical beacons and/or optical signals from it.

As in the examples described above, touching one of the icons on the mobile device's display may retrieve additional information from an OST and bring up additional graphical information and/or text describing the merchandise. For example, touching an icon 5402 representing the men's watch may render a pop-up box with the price and detailed specifications of that watch, as well as photos and videos. Additionally, a magnified 3D representation of the watch could be overlaid on the live scene. This 3D representation could be manipulated using one's fingers on the mobile device's touchscreen display to zoom in or out and rotate it to any desired orientation.

Figure 55C:
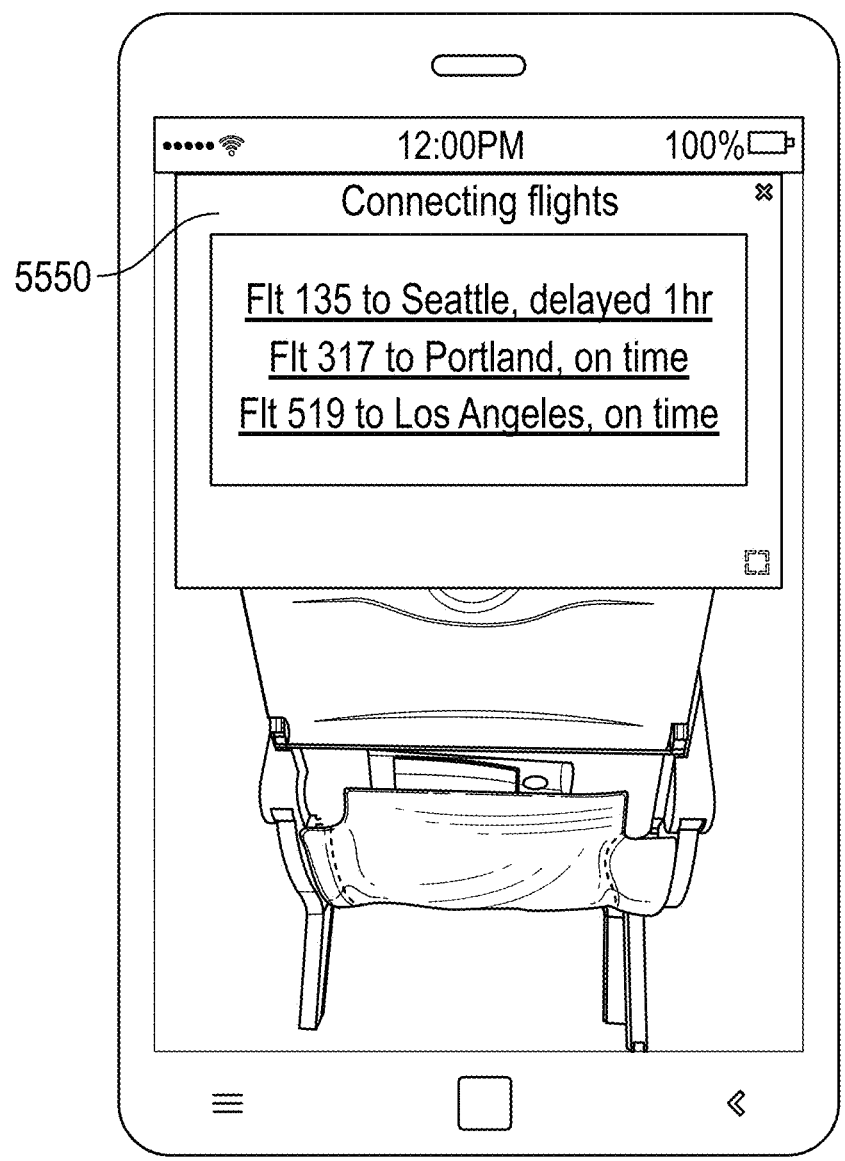
FIG. 55C illustrates an example augmented reality graphical user interface after user input selecting a menu item shown in FIG. 55B.

FIGS. 55A-55C illustrates an example augmented reality graphical user interface 5500 that may be presented in an airplane environment by running an optical narrowcasting application on a mobile device. In this environment, the optical narrowcasting application may enhance a passenger's experience during a flight by presenting information received from one or more optical transceivers installed on the airplane, where the term "optical transceiver" refers to an optical narrowcasting device that comprises one or more OTAs and one or more ORAs, and that is capable of providing two-way optical communications between itself and one or more other optical transceivers.

As shown, an optical transceiver 5520 is integrated or attached to an aircraft seat back 5510 positioned in front of the passenger, above the passenger's tray table. Placement of optical transceiver 5520 in this position may facilitate reception of optical beacons and optical signals in instances where the FOV of an ORA of the mobile device is positioned on the backside of the mobile device (i.e., on the same side as the mobile device's forward-facing camera). Similarly it may facilitate transmission of optical signals from an OTA of the mobile device to optical transceiver 5520. For example, the passenger may hold the mobile device in his/her hand such that the mobile device's display is visible while the ORA of the mobile device receives optical signals from transceiver 5520. However, in other implementations, the transceiver 5520 may alternatively be integrated into an armrest of the passenger's seat, overhead in the ceiling above the passenger, or some other location.

As illustrated in the example of FIG. 55A, a live camera feed of the mobile device is overlaid with a visual representation 5530 (e.g., icon and/or text) representing optically transmitted information provided by the airline to the passenger during the flight using optical transceiver 5520. For example, icon and text 5530 (illustrated in FIG. 55A as "in-flight information") may be displayed as a result of the transceiver 5520 using its OBT to transmit to the ORA in the mobile device an optical beacon containing identifying information associated with said transceiver. In this example, the portion of the identifying information displayed in the form of the visual representation 5530 identifies the transceiver 5520 as a source of in-flight information. Selecting 5530 (e.g., by a touch user interface gesture) may cause the mobile device to download and display, via GUI 5500, additional information received from the optical signal transmitted by transceiver 5520. In the example of FIG. 55B, selection of the "in-flight information" icon 5530 causes the GUI 5500 to display a window 5540 including menu options available for selection. For example, the menu options may include an "in-flight entertainment" option, an "in-flight meals" option, a "connecting flight information" option, a "restaurants at destination airport" option, and other options. In the example of FIG. 55C, selection of the "connecting flight information" option may display information 5550 on connecting flights received from the optical signal. A user may subsequently cancel this option and bring back the previous menu. For example, a user may navigate to the previous menu and select the "restaurants at destination airport option" to bring up a series of menus pertaining to airport restaurants.

In some instances, an optical narrowcasting ad-hoc network may be established between the user's mobile device and transceiver 5520 installed on seat back 5510. This may be particularly advantageous, for example, where the passenger transmits commands to transceiver 5520 requesting transmission of particular content (e.g., movies) over an optical signal.

Use of optical narrowcasting in this example environment may be particularly advantageous as the passenger's mobile device may transmit and receive optical signal information even when it is placed in "airplane mode" to comply with FAA regulations relating to RF signal interference. In addition to using optical narrowcasting to receive and present optical-beacon and optical-signal information from an optical transceiver installed in the airplane's seatback, a passenger may use optical narrowcasting to receive optical beacons and optical signals (e.g. from businesses) from the ground through an airplane window.

Figure 56:
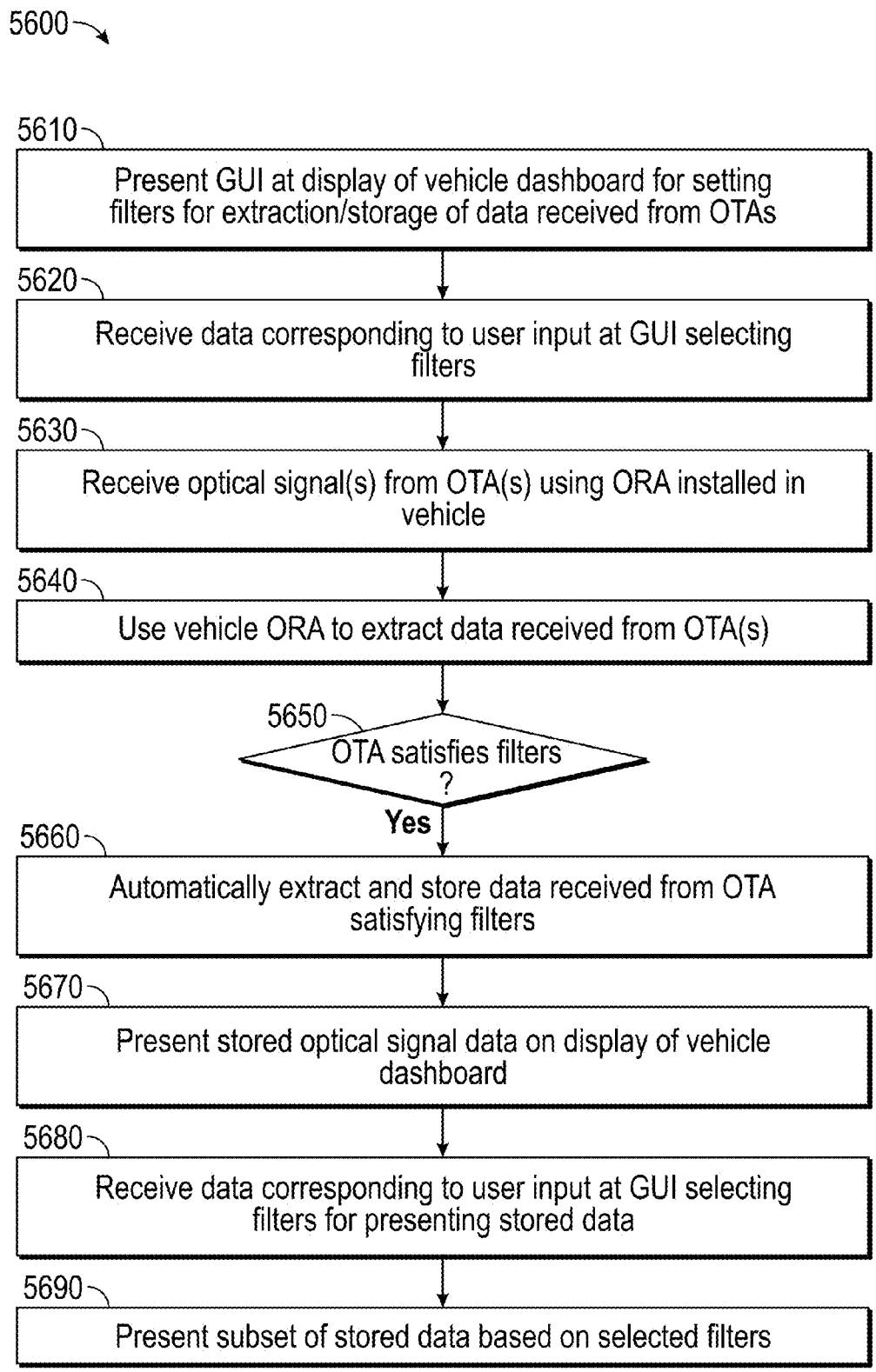
FIG. 56 is a flow diagram illustrating an example graphical user interface method of implementing optical narrowcasting in a vehicle.

As noted above, in addition to mobile devices, the optical narrowcasting technology disclosed herein may be implemented using vehicles such as buses and automobiles. GUI methods of implementing this technology in automobiles are further discussed below. FIG. 56 is a flow diagram illustrating an example of one such GUI method 5600 of implementing optical narrowcasting in a vehicle. Method 5600, in various embodiments, may be implemented by a vehicle equipped with an ORA as discussed above with reference to FIGS. 5A-5B. The vehicle may additionally include a dashboard system including the necessary hardware (e.g., camera, display, GPS, storage, etc.), software, and/or firmware to visually present an optical narrowcasting GUI to the vehicle occupants. In some instances, the optical narrowcasting GUI may be provided as a component of a navigational map interface of the vehicle.

Following the method of 5600, an ORA of the vehicle may automatically retrieve and filter information received from multiple OTAs. The filtered information of interest may be presented by a display on the vehicle's dashboard. The information of interest may be filtered during extraction and storage (e.g., received optical signal information is only extracted and stored for OST that transmit information of interest), during presentation (e.g., a subset of stored information is made available for presentation), or some combination thereof. FIG. 56 will be described with reference to FIGS. 57A-57C, which illustrate example displays of an optical narrowcasting GUI that may be provided by a vehicle to a driver and/or passenger interested in purchasing real estate.

At operation 5610, a display of the vehicle's dashboard system presents an optical narrowcasting GUI including controls for setting filters for extraction and storage of data received from OTA by the vehicle's ORA. At operation 5620, the vehicle's dashboard system receives data corresponding to user input at the GUI selecting filters for extraction and storage of information received from OST. For example, a user may select controls for specifying categories and subcategories of information that are of interest and/or not of interest to the user. For example, a user may specify that only restaurants, gas stations, and houses for sale are of interest to the user. As such, in this example, only optical signal information that falls into one of these categories (e.g., as determined by the ORA's extraction of identifying information from an optical beacon) may be stored by the vehicle's dashboard system. As a further example, for a given category of information (e.g., restaurants), a user may specify additional filters (e.g., pricing, cuisine, hours, etc.) such that only optical signal information satisfying these parameters is stored by the vehicle's dashboard system. Alternatively, in some embodiments operations 5610-5620 may be skipped, all information transmitted by OSTs may be extracted and stored, and the filtering of information of interest may occur during presentation of the information to the user.

At operation 5630, the ORA of the vehicle receives information transmitted by OTAs. For example, the ORA of the vehicle may receive optical beacons and/or optical signals containing information about businesses, houses for sale, and the like. At operation 5640, the ORA of the vehicle extracts identifying data from received optical beacons and, optionally, other data from optical signals. For example, the identifying data may specify a business name and business category. Depending on the extracted identifying data, at decision 5650 it may be determined by software on the vehicle's dashboard system whether or not the data transmitted by the OTA satisfies the filters specified by the user during operation 5620. If the data transmitted by the OTA does not satisfy the specified filters, the ORA of the vehicle may disregard (e.g., not extract or store) data received from the OTA. In some implementations, it may be necessary to extract optical signal data, in addition to optical beacon data, from an OTA to make a determination of whether the data transmitted by the OTA complies with the filters specified by the user during operation 5620. In such implementations, operation 5640 includes the vehicle ORA extracting data from the optical signal and decision 5650 includes comparing the extracted optical signal data against the filters.

Figure 57A:
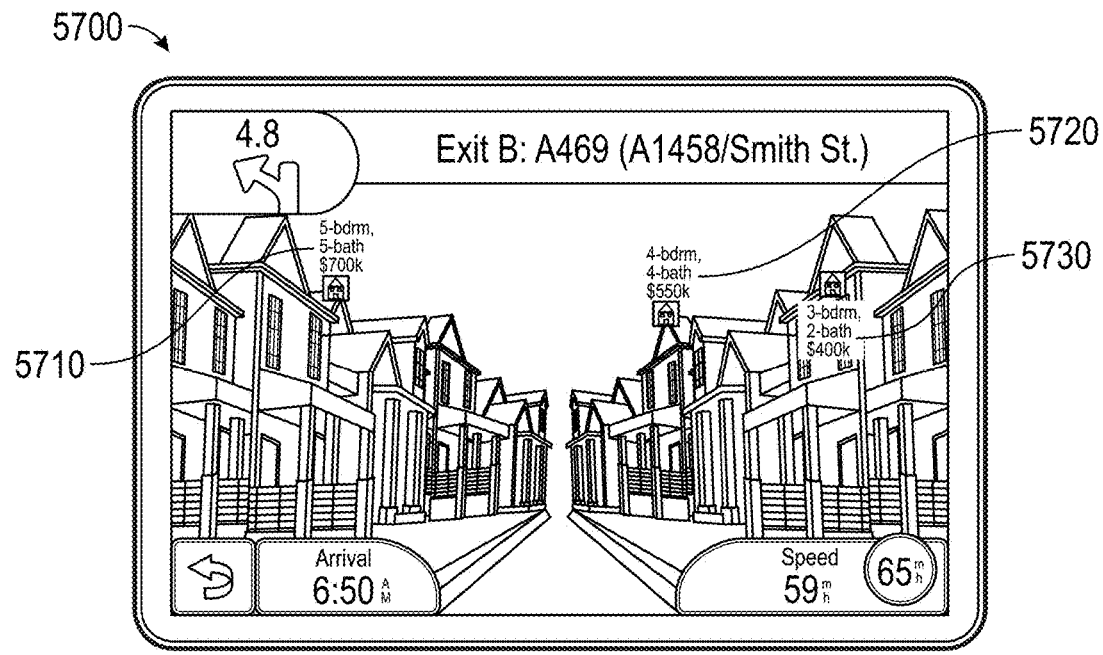
FIG. 57A illustrates an example display of an optical narrowcasting graphical user interface that may be provided by a vehicle to a driver and/or passenger interested in purchasing real estate.

At operation 5660, all or a subset of the stored optical beacon data and optical signal data is presented on the display of the vehicle's dashboard. FIG. 57A illustrates one such example presentation of an optical narrowcasting GUI on a display 5700 of a vehicle's dashboard. In this example, information is retrieved from OTAs broadcasting for-sale information relating to homes or other real estate. For example, prior to the drive, a user may have set filters for retrieving and storing for-sale information and other information broadcast by OTAs meeting the filters. For example, along with specifying that homes for sale were of interest, the user may have specified additional criteria such as pricing criteria, bedroom number criteria, bathroom number criteria, square footage criteria, location criteria, or other criteria. As such, during the drive, detailed information may have been received and stored for each house meeting the user specified criteria.

As illustrated in the example of FIG. 57A, the GUI shown on the dashboard display overlays AR objects 5710, 5720, and 5730 associated with respective homes over a live camera feed of the vehicle. In this example, each AR object is a visual representation of optical beacon and/or optical signal information extracted from an OTA associated with a home for sale and is overlaid based on the respective angular positions (e.g., in the direction of the home) from which they were received by the vehicle's ORA from each home's OTA. Additionally, the AR objects display extracted information of interest such as price and number of rooms. Although in the example of FIG. 57A, an AR GUI is illustrated for presenting the received optical beacon data and optical signal data, in some instances, alternative GUIs may be used to present the data. For example, the extracted data may instead be presented as an overlay of a virtual representation of a street view or as an overlay of an overhead map view of the car's position (e.g., as generated using a navigational map interface of the vehicle dashboard system).

With reference again to method 5600, during or before presentation of the optical beacon and/or optical signal data on the display of the vehicle dashboard, the user may select filters for specifying what stored data is presented. As such, at operation 5680 data may be received corresponding to user input at the GUI selecting filters presenting the stored data. In response, at operation 5690 the GUI may present a subset of the stored data based on the selected filters.

Figure 57B:
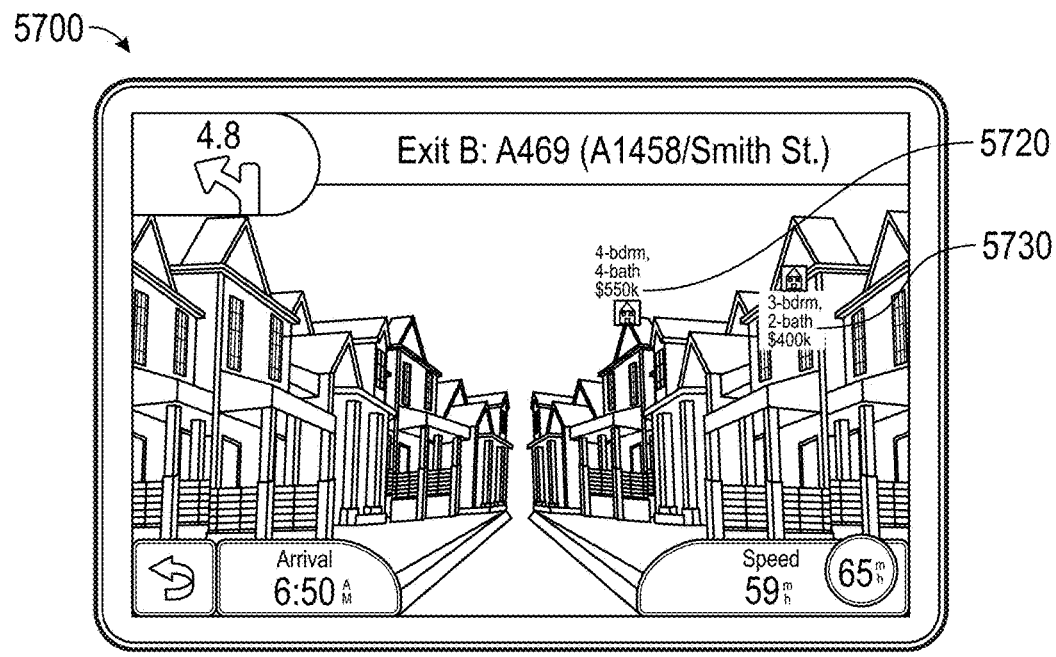
FIG. 57B illustrates an example display of an optical narrowcasting graphical user interface that may be provided by a vehicle to a driver and/or passenger after filtering information displayed on the graphical user interface of FIG. 57A.

Referring now to the example of FIG. 57B, a user may select price and/or room filters such that the home for-sale represented by AR icon 5710 is filtered out of view. For example, the user may filter out homes with a price greater than $600 k and/or homes having more than four bedrooms.

Figure 57C:
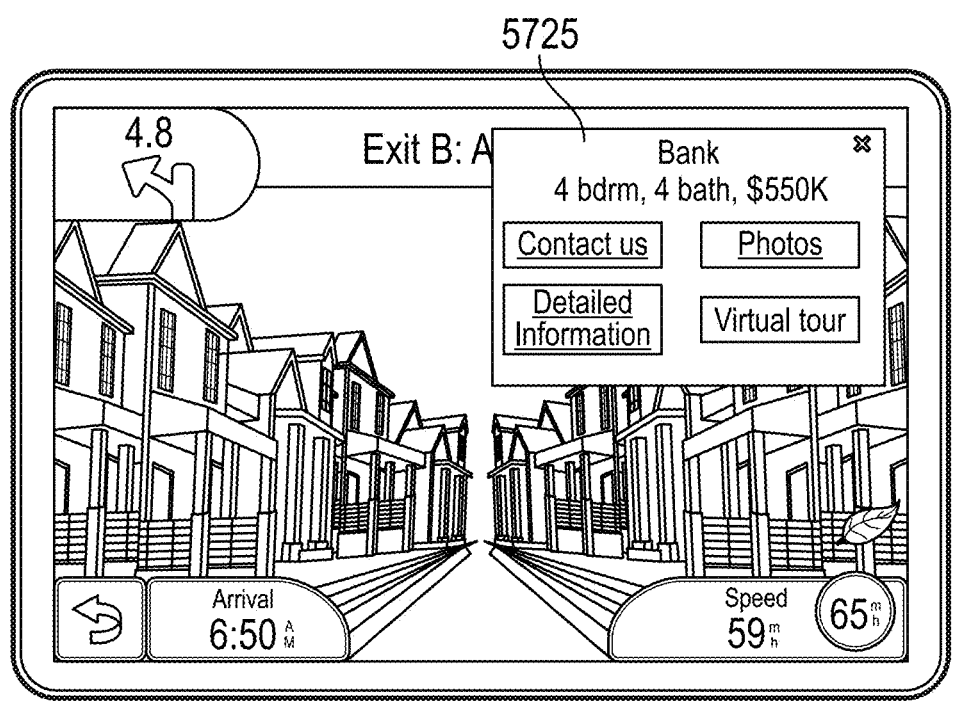
FIG. 57C illustrates an example display of an optical narrowcasting graphical user interface that may be provided by a vehicle to a driver and/or passenger after user input selecting an icon associated with a home for sale shown in FIG. 57B.

In the example of FIG. 57C, a user in the vehicle selects an icon 5720 associated with a home for sale. In response, more detailed information associated with the home is presented to the user in a window 5725 including a menu of options.

Although example method 5600 has been described with reference to vehicles, it should be appreciated that in other implementations some or all of the steps of method 5600 may be implemented in mobile devices or other devices. For example, a user of a smartphone may run an optical narrowcasting application that may be used to set filters for extraction and storage of data extracted from optical beacons and/or optical signals, automatically store extracted data satisfying filter parameters, and set filters for specifying what data is presented by a GUI. In addition, in some instances the optical beacon data and/or optical signal data extracted and stored by the user's vehicle may be transferred to the user's mobile device (e.g., via Bluetooth® or other suitable connection) for similar presentation using an optical narrowcasting application installed on the user's mobile device.

Although the example of FIGS. 57A-57C illustrate one exemplary use case in which the disclosed optical narrowcasting technology may be utilized with vehicles, a variety of other uses are possible. For example, in some implementations, vehicles may receive optical transmissions from advertising billboards equipped with OTAs associated with businesses such as restaurants. Following the GUI methods described above, for example, receipt of optical-beacon and/or optical-signal information from the OTA installed on the advertising billboard may cause a GUI on the vehicle's dashboard to display icons, windows, or other information associated with the business. In some instances, an ad-hoc network may be established.

In some implementations, road signs such as guide signs (e.g., route markers), warning signs (e.g., left turn ahead sign), regulatory signs (e.g., stop signs and yield signs), and other signs may be equipped with an OTA that transmits optical-beacon and/or optical-signal information to oncoming traffic. This information may be received by vehicles equipped with an ORA and presented to a user via the vehicle's dashboard. For example, an optical transmission from a road sign may warn of upcoming road repairs. This optically transmitted information may be made available to a navigational map interface presented by the vehicle's dashboard to adjust estimated travel times and/or remap routes.

Referring again to FIG. 6, and as alluded to previously, augmented reality component 164a may permit recording of the augmented reality scene and embedding in a resulting media file any optically narrowcast content (i.e., information) received by one or more ORAs from one or more OTAs. Such embedded content received by ORAs from OTAs may include identifying information extracted from one or more optical beacons, information extracted from one or more optical signals, and/or horizontal and/or vertical position coordinates within a recorded scene of one or more of the OTAs that sent the embedded optically transmitted content. If desired, the user may disseminate the resulting recorded scene containing embedded optically narrowcast content via, e.g., social media outlets, to be accessed by others. This embedding technique can allow optically narrowcast information to be accessed in a non-real-time manner, not only by the user, e.g., at a later time, but by social-media subscribers or others (e.g., on social-media sites), which may provide an enhanced social-media experience for social-media subscribers. It may also significantly increase the number of viewers of optically narrowcast information (e.g., advertisements), and new opportunities for social-media services to generate online advertising revenue may result. Accordingly, augmented reality component 164a may be thought of as an enhanced media component. In some embodiments, a separate and/or distinct enhanced media component may be utilized to embed optically narrowcast information into one or more media files. In some embodiments, control electronics of an ORA (e.g., control electronics 106d of FIG. 3A) may be used to effectuate the embedding of information or data.

Figure 58A:
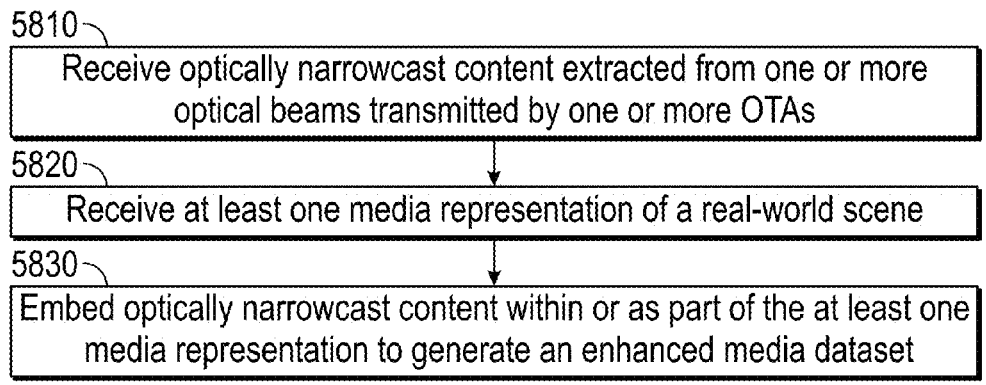
FIG. 58A is a flow chart illustrating example operations that may be performed for embedding optically narrowcast content in media content.

FIG. 58A is a flow chart illustrating example operations that may be performed by an ORA, e.g., ORA 166 of FIG. 6, an augmented reality/enhanced media component, e.g., component 164a, and/or ORA control electronics, e.g., control electronics 106d of FIG. 3A, for embedding optically narrowcast content in media content. At operation 5810, content extracted from one or more optical beams sent by one or more OTAs may be received. Such content may be extracted and received from one or more optical beacons and/or one or more optical signals sent by one or more OTAs. More specifically, identifying information regarding entities (e.g., persons, businesses, or organizations) that own, operate, and/or are otherwise associated with OTAs may be received from one or more optical beacons using one or more OBRs, and other information or data may be received from one or more optical signals using one or more OSRs. In addition, information regarding the estimated horizontal and vertical angular positions of OTAs within the FOVs of one or more OBRs may be obtained from optical beacons by, for example, using the OBRs capable of measuring the propagation direction of said optical beacons. In the case of an augmented reality/enhanced media component handling the embedding of information (where such ORA control electronics can be an embodiment of enhanced media component 164a), such optically narrowcast content can be received by the augmented reality/enhanced media component from an associated ORA. In the case of ORA control electronics handling the embedding of information, such optically narrowcast content can be received by the control electronics from one or more OBRs, one or more OSRs, or both, where the OBRs and OSRs may be components of the same ORA as that associated with the ORA control electronics.

At operation 5820, at least one media representation (e.g., video imagery, digital photographic imagery, and/or recorded audio) of a real-world scene may be received. Receipt of such a media representation can occur at an augmented reality/enhanced media component or at control electronics of an ORA. Referring again to FIG. 6, user device 164 may comprise one or more cameras 164b and/or one or more sensors 164e. The one or more cameras 164b may be used to capture a media representation of the real-world environment, such as one or more images of said real-world environment. In some embodiments, the one or more images may be still images/photographs. In some embodiments, a series of images may comprise frames of a video or animated image of the real-world scene. In some embodiments, audio or other media representation of the real-world environment may be captured using at least one of the one or more sensors 164e. For example, one of one or more sensors 164e may be a microphone adapted to capture sound/audio sensed in conjunction with the capture of the at least one image representative of the real-world scene. In some embodiments, content from other sensors with which ORA 166 and/or user device 164 may be interfaced can be received and used to contribute content to the media representation of the real-world scene. For example, user device 164 may accept audio transmitted via one or more audio input ports from one or more co-located or remotely located microphones or audio transducers. In some embodiments, the aforementioned media representation of the real-world environment may be captured during substantially the same time interval as that during which the optical narrowcasting content that will be embedded in it is captured. In some embodiments in which the aforementioned media representation of the real-world environment is captured by a camera, the camera imagery may be captured during substantially the same time interval as that during which the optical narrowcasting content that will be embedded in it is captured. Moreover, the propagation directions from which said camera can receive light to form imagery may coincide substantially with the propagation directions from which optically narrowcast content can be received by the ORA that provides the optically narrowcast content to be embedded. As such, the horizontal and vertical location within the captured imagery corresponding to the horizontal and vertical location in the real-world scene of each OTA that contributes optically narrowcast content (i.e., to be embedded) may be accurately computed (e.g., based on a location-mapping function or lookup table) from the OTA location data provided for that OTA by the ORA.

At operation 5830, optically narrowcast content may be embedded within or as part of at least one media representation to generate an enhanced media dataset. An augmented reality/enhanced media component or control electronics of an ORA may perform this embedding of optically narrowcast content. Various methods of embedding such information/data can be utilized in accordance with embodiments of the present disclosure. For example, stenography techniques may be used where optically narrowcast content may be embedded in a cover medium, which can be image(s), video(s), and/or audio captured by the one or more cameras 164b and/or one or more sensors 164e. In some embodiments, digital watermarking techniques may be used to insert a digital signal or pattern representing optically narrowcast content into digital media content such as captured image(s) and/or audio representing an associated real-world scene. Still other techniques, such as least significant bit insertion, discrete wavelet or cosine transformation, or other techniques may be used. In some embodiments, a combination of techniques may be used. For example, digital watermarking techniques may be utilized to embed identification information into captured video. As digital watermarking may be typically used for identifying an owner of a work, embedded identification information, such as source information, GPS coordinates, and the like may be appropriately addressed by digital watermarking. For data received or extracted from an optical signal (e.g., data that may include other media itself) that may be more comprehensive or voluminous than data received or extracted from optical beacons, stenography techniques may be utilized, where the media representation of the real-world environment (e.g., a video) itself may be temporally modulated. It should be noted that embedded information may be "broken up" between two or more images or sets of captured media representations.

By virtue of embedding optically narrowcast content into captured media content, a single, combined dataset can be generated that combines photographic, video, and/or audio representations of the real-world environment with data that has been received from optical beacons and/or optical signals concurrently received from one or more OTAs, including information regarding horizontal and vertical positions of detected OTAs within an FOV of an ORA. In some embodiments, this single dataset may be generated in a standardized format. Optionally, other data can be received and/or sensed and embedded, such as a timestamp, a latitude, longitude, and/or altitude of a device in which an ORA is located or with which it is associated, such as user device 164. Such a combined dataset could be uploaded or live-streamed to other devices or onto a data network, such as the Internet, via WiFi or other data connections and/or stored as a file for later use. The aforementioned dataset can be referred to generally as signal-enhanced media (SEM), particular examples of which may be referred to as a signal-enhanced photo (SEP), a signal-enhanced video (SEV), and signal-enhanced audio (SEA) depending on the type of media with which the optically transmitted signal/beacon information is combined. It should be noted that while new/modified audio, image, and/or video formats may be developed and utilized to include embedded optical beam information, existing formats may be utilized as well. It should be noted that enhanced media component 164a may be existing software/hardware resident in user device 164 for generating audio, image(s), and/or video(s) captured by the one or more cameras 164b and/or the one or more sensors 164e.

Figure 58B:
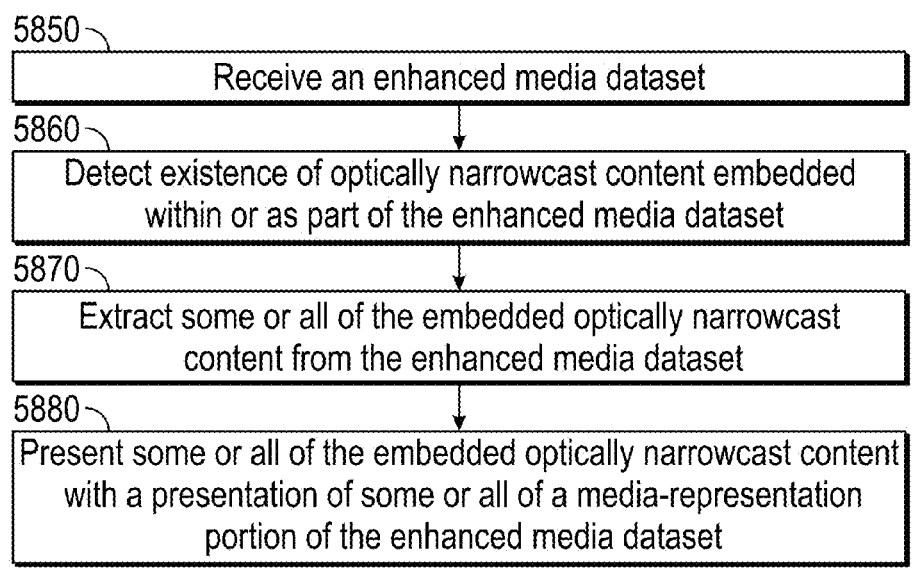
FIG. 58B is a flow chart illustrating example operations that may be performed to retrieve information or data embedded in a signal-enhanced media.

FIG. 58B is a flow chart illustrating example operations that may be performed to retrieve information or data embedded in a SEM. These example operations may be performed by any appropriate media presentation device and/or application/software. As will be described subsequently in further detail, social-media platforms/applications may present SEM to users/viewers. Media players, such as those resident on user devices, e.g., smartphones, laptop PCs, tablet PCs, and the like may present SEM.

At operation 5850, an enhanced media dataset, such as the aforementioned SEM may be received by a user device. The user device may be any device capable of rendering or presenting media content, such as a smartphone, laptop PC, tablet PC, etc. The enhanced media dataset may be received from a server, data repository, and/or any mechanism, device, or system used to receive and/or store an enhanced media dataset. For example, software or applications used to view photos and videos and/or listen to audio could be upgraded to provide the capability to conveniently view the full content of one or more SEMs. At operation 5860, the existence of optically narrowcast content embedded within or as part of the enhanced media dataset may be detected. At operation 5870, some or all of the optically narrowcast content may be extracted. At operation 5880, some or all of the optically narrowcast content may be presented (e.g., displayed) in conjunction with a presentation of some or all of the media-representation portion (e.g., the media representation of the real-world environment) of the enhanced media dataset. It should be noted that the manner of presentation can vary. For example, a user may be presented with the option of viewing a photo or video captured by a camera 164b of a real-world scene by itself or with symbols and/or identifying text/imagery superimposed on the locations in said photo or video corresponding to the actual locations (relative to horizontal and/or vertical locations in the photographic or video imagery) of OTAs from which information was received and embedded in said captured photo or video. In some embodiments, a symbol may be presented as a selectable icon or control that may be selected by a viewer to bring up a pop-up window or other graphic containing information transmitted by a particular OTA associated with that symbol. In some embodiments, such a selectable icon may be presented in conjunction with the presentation of audio that was captured during substantially the same time interval as that during which embedded optically narrowcast content was captured.

It should be noted that if media captured by a user device (e.g., a camera or a microphone) has been stored as a media file, a media player utilized to present the media to the user of the user device can allow any and all "standard" or non-signal-enhanced functions to be performed when playing back the media. It should be noted that the captured media can be presented, e.g., as streaming media or non-real-time media. Additionally, the media player can provide the ability for the user to pan, zoom, or otherwise "move around" within a captured photographic or video media representation of a real-world environment to bring overlaid (i.e., superimposed) embedded optically narrowcast content received from one or more OTAs into view commensurate with the horizontal and vertical location(s) of said OTAs relative to said captured photographic or video representation. Software to perform these functions could also be installed on any other devices to be used to view live-streamed and/or pre-recorded media containing embedded optically narrowcast content successfully received from one or more OTAs, whether or not the device used to consume the SEM itself actually produced the SEM itself. That is, any information received by ORAs in the form of optical beacons and/or optical signals may be embedded in media datasets produced by user devices other than ORAs (e.g., cameras and microphones) and would be available to anyone who receives such media datasets, either in the form of a live stream or as a pre-recorded media file.

It should be noted that the embedding of optically narrowcast content into media can be automatically accomplished. For example, operation 5830 of FIG. 58A may occur automatically upon detecting the existence of optically narrowcast content within the FOV of an optical receiver during presentation of an augmented reality experience presented to a user (see FIGS. 6-7). In some embodiments, augmented reality component 164a may present an option to a user of user device 164 to embed optically narrowcast content rather than automatically embedding such content in one or more media representations of the real-world scene captured in the augmented reality experience. In some embodiments, a user may set parameters regarding what information to embed, and under what conditions to embed the information. For example, user device 164 may present a GUI to a user setting forth one or more options or filters that specify conditions or parameters defining conditions under which optically narrowcast content is embedded in an image or video. For example, parameters may specify that information may be embedded when an OTA is within a specified distance from the user/user device, if the information is identified as being a particular type of information, if an OTA is identified as being a particular type or associated with a specified retailer, business, etc.

Some example applications highlighting the uses and advantages of SEM are discussed herein. As a first example, consider a retail business that uses optical narrowcasting to provide information to customers and potential customers in the vicinity of its brick-and-mortar store. The retail business may use one or more OTAs inside and/or outside its brick-and-mortar store to provide information such as the name, street address, and phone number of the retail business/store, as well as advertising media, links to its website, Twitter® page, Facebook® page, etc. In the event that a user utilizes an ORA-equipped smartphone to take a video either inside or outside the store, with one or more of the store's OTAs located within the FOV of the ORA, the optically narrowcast information received by the ORA can be embedded into the video to produce a SEV. When this SEV is shared via social media (e.g., uploaded to YouTube®, Facebook®, or Instagram®), the store can benefit from an increase in the number of people who have access to the information transmitted by the brick-and-mortar store (which may encompass additional information not discoverable/available absent being present at the brick-and-mortar store).

Consider another example where an SEV is uploaded to YouTube®. A YouTube® server can be configured to detect the presence of optically narrowcast content embedded in an uploaded SEV file, and would provide convenient means for people viewing the SEV to display this embedded content. It should be noted that the embedding of optically narrowcast content need not prevent the addition/embedding of other information to a SEM. For example, a SEM creator may also embed additional information into the SEV, such as links to the SEM creator's own social-media accounts. The latitude and longitude of the location at which an SEM was recorded may also be automatically embedded, thereby allowing people to find that location online using a location-based search. The SEM creator's name (or other identifier, such as a social-media account name associated with the creator) may be included in the SEM allowing other SEMs the SEM creator has uploaded to YouTube® to be conveniently accessed. For SEMs that become extremely popular (i.e., go viral), any embedded information can be accessed by a large number of viewers. This represents a powerful form of advertising for the store (or any other person or organization) whose information has been embedded in the SEM. Embedded information, which can also be considered a form of metadata, may further be encoded with identifying information that can be used to search for and/or identify SEM associated with a particular source of embedded optically narrowcast content (e.g., a retail business, source entity, person, etc., that/who owns or is otherwise associated with one or more OTAs). In this way, such a source can search for and access popular (e.g., viral) SEMs that are associated with itself/himself/herself for use in enhancing their own advertising, for use in an advertising campaign, etc. To that end, such metadata may be associated with one or more forms of digital media rights (DRM). For example a SEM creator can institute DRM in a SEM that he/she creates. For example an information source can embed DRM information/mechanisms in transmitted information such that, e.g., usage of a video recording made within the confines a brick-and-mortar store can be controlled by the brick-and-mortar store/associated business entity.

As another example of the social-media-related benefits of embedding optically transmitted information in media, consider the use of SEM by individuals for business and/or social-networking purposes. For example, two persons who have met may wish to exchange contact information but neither have business cards. However, each person may have a smartphone equipped to send and receive information optically, e.g., each person's respective smartphone may have an OTA and an ORA. In order to connect on a social-media platform, the first person may activate his/her OTA and configure it to transmit his/her contact information, including one or more of his/her social-media usernames. The second person may capture a video or photo of the first person with his/her smartphone's ORA activated and capable of detecting and receiving the first person's optical beacons and/or optical signals. The second person's smartphone may generate a SEM, e.g., a SEV or SEP of the first person, which incorporates or embeds the first person's contact information (e.g., name, phone numbers, social-media usernames, etc.) into the SEM.

In some embodiments, the SEM may be uploaded to the second person's social-media platform server(s)/database(s) for storage. In some embodiments, the second person's smartphone, e.g., an augmented reality/enhanced media component, can extract the first person's contact information and upload that contact information to the second person's social-media platform server(s)/database(s). As evidenced by this example, the entirety of the SEM need not be uploaded/stored. In some embodiments, a user may wish to locally store identification and/or descriptive data without the corresponding media content, while storing the SEM (i.e., the optically narrowcast content along with the captured media) to a social-media platform server/database or other data repository.

In some embodiments, "tagging" media with information regarding known subjects can be accomplished using optical narrowcasting. For example, an optical narrowcasting enabled device may simultaneously record information transmitted optically by each member of a group of people, by taking a single photo or video of the group, with each person using his or her OTA-equipped user device, e.g., a smartphone, to transmit desired information into the ORA of the person taking the picture or video. An important advantage of this method is that the horizontal and vertical position of each OTA within the recorded imagery would also be captured, so that the each person's recorded video or photographic image(s) could be correctly associated with the information he or she transmitted optically.

Figure 59A:
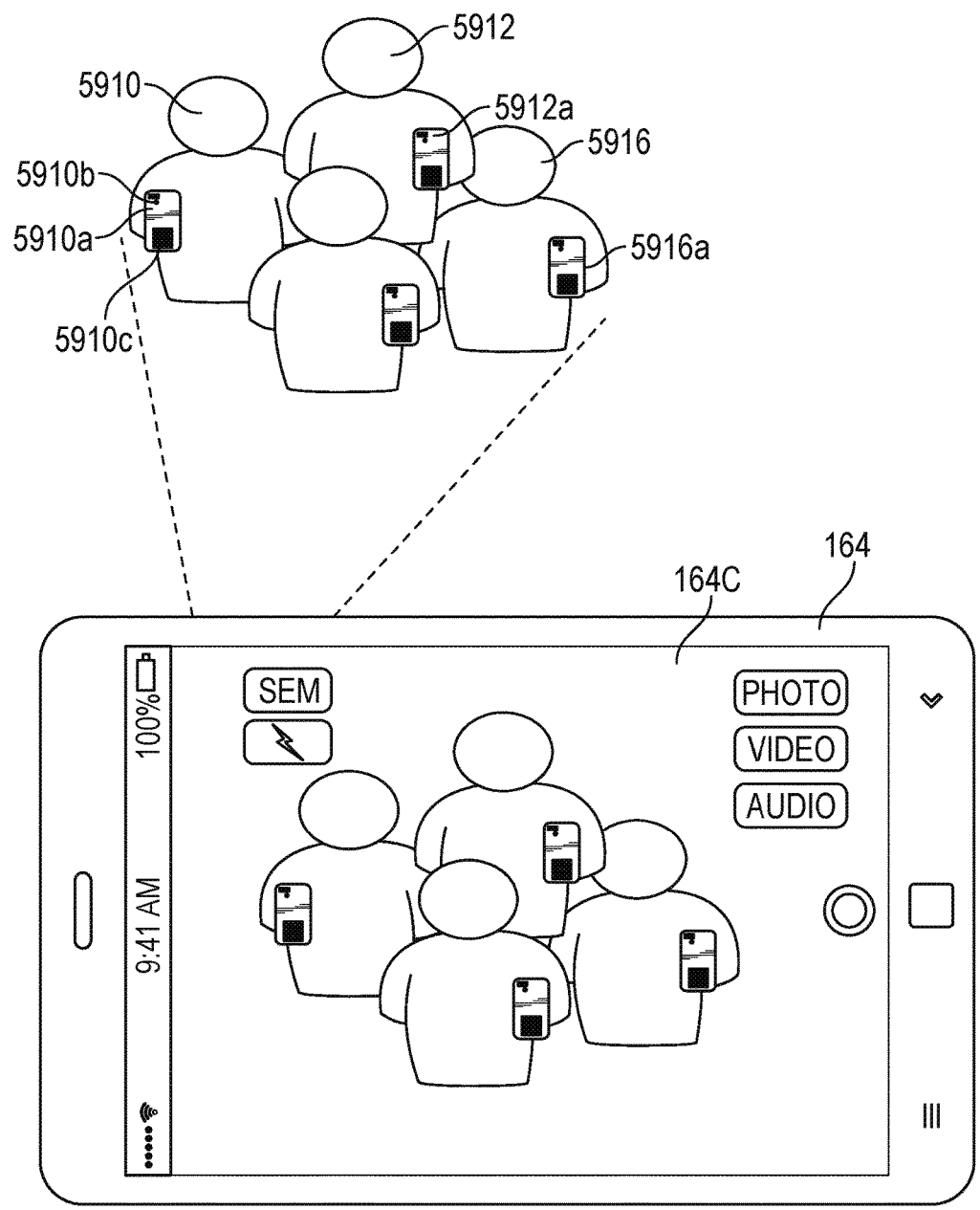
FIG. 59A illustrates a scenario in which a user may utilize a user device to capture an image or video of a group of individuals.

For example, FIG. 59A illustrates a scenario in which a user may utilize a user device, e.g., smartphone 164, to capture an image or video of a group of individuals, e.g., persons 5910, 5912, 5914, and 5916. Each of persons 5910, 5912, 5914, and 5916 may transmit his/her respective identification and/or descriptive data, such as his/her name, contact information, or other data using his/her respective OTA-equipped user device, e.g., user devices 5910a, 5912a, 5914a, and 5916a. Each of user devices 5910a, 5912a, 5914a, and 5916a may have respective OTAs and/or ORAs, one example of which is 5910b/c. For clarity, other respective OTAs/ORAs are not labeled in FIG. 59A, but are understood to be present. The OTAs may transmit one or more optical beacons and/or optical signals that can be received by an ORA of user device 164 (not shown here, but illustrated, for example, in FIG. 6). User device 164 may present a media capture GUI to the user of user device 164 on display 164c. The media capture GUI may be presented in accordance with usage of one or more cameras 164b (not shown here, but illustrated, for example, in FIG. 6), or as an augmented reality experience, with a real-world scene captured using one or more cameras 164b and created via augmented reality/enhanced media component 164a. The media capture GUI/augmented reality experience may provide the user with options to capture one or more types of media, e.g., a photo, video, and/or audio. The media capture GUI/augmented reality experience may provide the user with one or more options to capture a SEM, set an operating parameter such as flash, etc. In some embodiments, the capturing of one or more types of media can automatically include capturing optically narrowcast content, without the need to specify an option to capture a SEM. Upon capturing an image, in this example a photo, all or selectable/filterable information transmitted optically by one or more OTAs (e.g., the four OTAs operated by the four persons depicted in FIG. 59A) may be embedded in the resulting SEP. Such information may maintained in the SEP, extracted for use/storage apart from the SEP, etc.

In this way, a new dimension to social networking may be created that may likely have great appeal to many users. Information about people in photographs and videos could be conveniently received optically and automatically stored in image and video files, without the need for extra processing and/or errors associated with visual facial recognition methods. After sharing these files using a social-media service, the embedded information could be conveniently accessed by users. Additionally, information received from OTAs mounted on nearby fixed structures (e.g., shops, restaurants, billboards, and homes) and vehicles (e.g., buses, trucks, and cars) could also be automatically incorporated into shared photos and videos. The social-media service can also provide a search capability allowing users to search for shared media with embedded content relating to persons, businesses, geographical locations of interest, etc. If desired, any user could use privacy settings to limit the ability of strangers to perform searches for information regarding the user, create DRM associated with created SEM, etc.

Figure 59B:
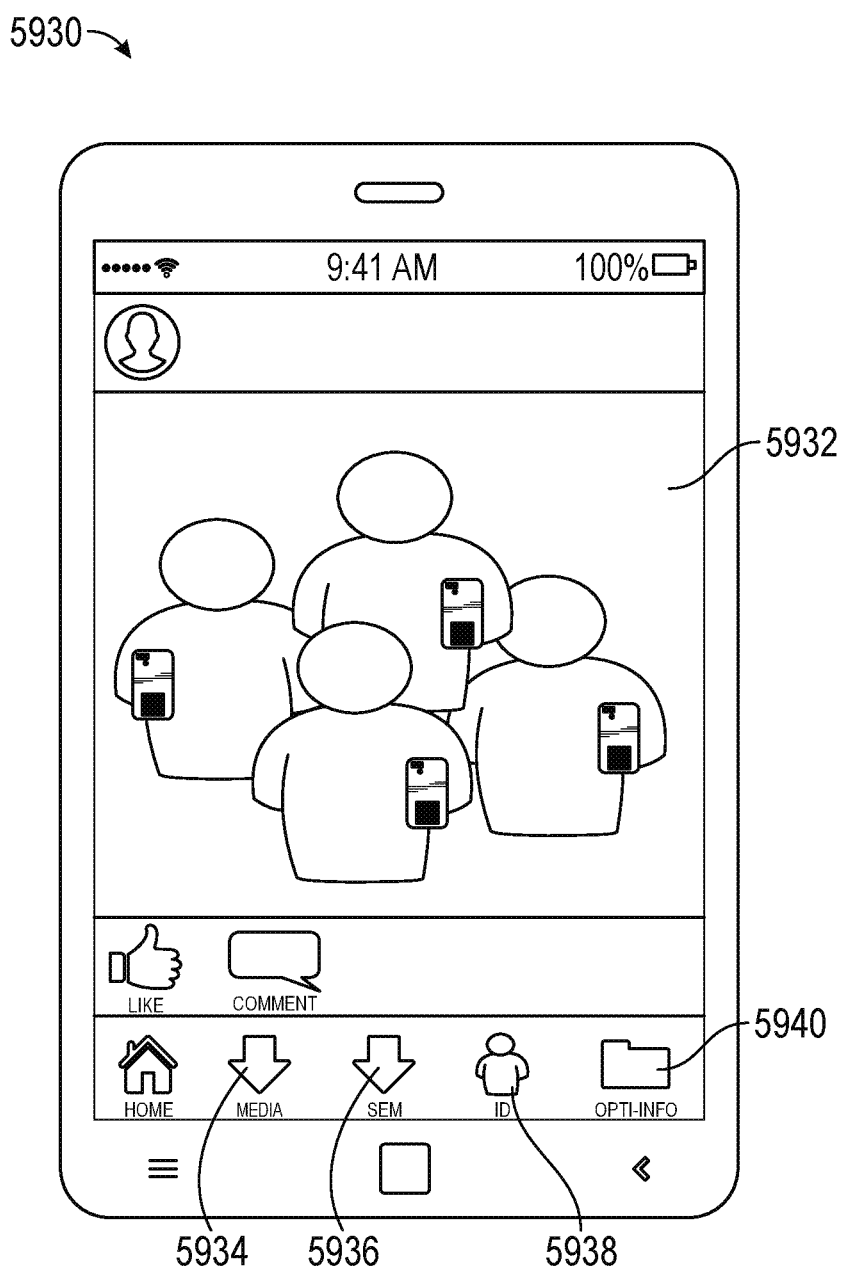
FIG. 59B illustrates an example view of a signal-enhanced photo taken in accordance with the example scenario illustrated in FIG. 59A.

For example, FIG. 59B illustrates an example view of a SEP taken in accordance with example scenario illustrated in FIG. 59A. As illustrated in FIG. 59B, the resulting SEP 5932 may be displayed on a social-media platform webpage 5930 presented to a user on, e.g., a user device, such as a smartphone. An appropriate user interface of the social-media platform webpage 5930 may include options to download media alone without embedded optically narrowcast content, e.g., an option to download media 5934. The user interface may provide an option to download the entirety of SEP 5932 vis-à-vis "SEM download" option 5936. The user interface may provide an option to tag each of the persons in the SEP 5932 using one or more aspects of the embedded information, e.g., the embedded name information associated with each person and transmitted by each person's respective OTA. This can be accomplished via an "ID" option 5938. The user interface may provide an option to download solely the embedded optically transmitted information, in this case, name and contact information of each person in the SEP 5932 via "OPTI-INFO" option 5940 Such embedded information may be extracted and stored locally, e.g., in a digital address book.

Still another example may involve utilization of embedded optically narrowcast content as a pointer or bookmark to additional and/or other information or content, such as narrowcast content. As previously discussed, optical beacon information as well as optical signal information may be transmitted by an OTA and received by an ORA. In some embodiments, optical beacon information may be embedded as optically narrowcast content into SEM such that a user viewing the SEM in the same or proximate location to that in which the optically narrowcast content was obtained may at that time, receive optical signal information transmitted by, e.g., the OTA that transmitted the embedded optically narrowcast content. In some embodiments, the additional and/or other information or content may be content associated with and/or available due to proximity to the location in which the embedded optically narrowcast content was obtained. Such additional and/or other information or content may be received by the user via another communication channel, e.g., WiFi or Bluetooth® channel. In this way, a user may filter and/or otherwise experience the ability to selectively receive information or content. In this way, memory of a user device may be reserved.

Additional example applications of the optical narrowcasting technology disclosed herein are discussed below.

In various embodiments, the optical narrowcasting technology disclosed herein may be applied to a variety of business environments, including but not limited to:

Selling or leasing optical narrowcasting hardware and software directly to businesses and other organizations for use in their marketing campaigns. For example, a company could purchase optical narrowcasting hardware and software to be installed at their brick-and-mortar retail stores. This could be used to optically transmit product information, store hours, and other information of interest to potential customers.

Selling or leasing optical narrowcasting hardware and software to out-of-home advertising companies, or partnering with such companies to sell or lease such hardware and software to other businesses for use in their marketing campaigns. For example, a billboard company could supply optical narrowcasting hardware to companies for use on billboards, storefront displays, and other locations where out-of-home advertising is used.

Selling portable-device-based optical narrowcasting hardware directly to individual consumers or to companies selling smartphones and similar devices to consumers. For example, smartphone cases with optical receivers and/or optical transmitters built into them could be sold directly to consumers. Or, optical narrowcasting equipment could be sold to manufacturers to be incorporated into smartphones and other portable devices (e.g., tablet computers, e-book readers, etc.).

Charging fees to sellers of various products for optically transmitted ads that direct traffic to the sellers' websites. For example, optical narrowcasting equipment could be set up in various outdoor locations. Ads could be transmitted from these locations, which could be received by individuals using portable-device-based optical receivers. These ads could contain links that, when clicked on, may direct the portable device user to product-related websites where he could obtain product information and/or purchase specific products. The sellers of such products could, for example, be charged an advertising fee for each instance of traffic being directed to their websites or for each product sale resulting from such traffic. Additionally, optically transmitted ad content could be embedded in videos and photos recorded by portable device users and then uploaded or livestreamed to one or more social media websites. Other individuals viewing such videos or photos online may have the opportunity to click on such embedded ads to view the ad content and/or be redirected to sellers' websites. Companies advertising their products via such embedded ads could be charged advertising fees on a pay-per-click, pay-per-sale, or similar basis.

Creating new social media sites and apps based on the sharing of content obtained via optical narrowcasting, and then generating income through online ads appearing on these sites and apps. For example, a social media app could be created that may allow individuals to conveniently use their smartphones and other portable devices to create and share videos and photos containing embedded optically transmitted content. Companies selling various products could be charged fees in exchange for ads viewed by users of the social media app.

The optical narrowcasting technology disclosed herein may also be applied to a variety of social media environments.

In various embodiments, the presently disclosed optical narrowcasting technology provides a new way to disseminate digital information. Its unique characteristics make important contributions to social media, and therefore offer great opportunities.

In various embodiments, the presently optical narrowcasting technology is its highly localized nature. The term "localized" here refers to the fact that for this technology to successfully transmit data from one location to another, it utilizes, on some embodiments, a direct or indirect (e.g., diffusely reflected) optical path between the transmitter and receiver, with a sufficiently small path length to prevent excessive bit errors. This characteristic can be taken advantage of in a social media context to obtain information that might otherwise be difficult or impossible to obtain regarding the location of people sending the information.

For example, consider the case of a store in a shopping mall that wants to use a social media app to collect feedback from customers regarding various products it's selling. But it only wants people who are currently inside the store to be able to leave feedback, because such people are much more likely to be customers who are interested in and knowledgeable about the store's products. One potential solution is to use the location-sensing feature available in most smartphones and other portable devices. However, the information provided by the location-sensing feature may not be sufficiently accurate to reliably determine whether people leaving feedback are actually in the store. They may, for example, be just outside the store or in a different store directly above or below the store that is collecting the feedback. Another potential problem is that many people may not have the location-sensing feature activated in their portable device. Or, even if they do have it activated, they may not wish to give the store's feedback-collection app permission to access their location information. Similar problems would prevent WiFi from being used to limit feedback collection to in-store customers. WiFi signals pass through walls, floors, and ceilings. Additionally, many customers may not be willing to log into the store's WiFi system.

These problems could be eliminated by using one or more optical receivers mounted in the ceiling of the store to collect customer feedback. The field of view (FOV) of the receivers can be designed to only pick up information optically transmitted by people actually in the store. In addition, optical information does not pass through walls, floors, or ceilings. Using an array of receivers, detailed information about where people are within the store could also be obtained. This could be used to provide accurate navigation within the store, with a search feature to help people locate specific products they're interested in.

The localized nature of the optical narrowcasting technology in some embodiments could also be used to motivate people to visit a particular geographic location, for business purposes or otherwise. For example, a chain of retail stores could use social media to advertise a contest with valuable prizes. But to enter the contest, a person may be required to visit one of the chain's store and transmit his or her contact information to one of the store's optical receivers using the optical transmitter controlled by a social media app in his or her smartphone or other portable device. As in the previous example, the optical narrowcasting technology may provide superior localization relative to what could be achieved using WiFi or built-in location sensors.

As another example of an application taking advantage of the localized nature of optical narrowcasting, consider a new form of travel-related social media service that may allow people to easily document trips they've taken and share that information with their online friends. The service itself may be given a descriptive name, such as Placebook. The company providing the service may establish a worldwide network of optical receivers at convenient locations, such as parks, museums, restaurants, hotels, airports, train stations, etc. A subscriber could use his smartphone or other portable device to find nearby receivers. Once they've found one, they could to go to its location and use their smartphone to optically transmit their identifying information to it. This could be done without the need for either a cellular network or WiFi. Besides their identifying information, users could also transmit relevant text, photos, and/or video imagery. The optical receiver could also be equipped with a camera, which it may use to record photographs or video of subscribers while they are transmitting their information.

In various embodiments, all of this information, including any photos or videos recorded by the Placebook receiver may be stored on the subscriber's Placebook page, along with the location of the receiver and a timestamp, providing a record of the subscriber's travels. This information could be shared with the subscriber's Placebook "friends" and/or with other subscribers, so travelers could compare notes on different travel destinations. The information may be fully searchable by date, location, key words, etc. The Placebook receivers could be installed and paid for by the company providing the service. Additionally, other companies, organizations, or communities could benefit by sponsoring receivers, which may attract Placebook subscribers to their locations. Revenue could also be generated via ads viewable by users of the social media service.

Another characteristic of the presently disclosed optical narrowcasting technology is that, in some embodiments, it can more easily provide privacy and anonymity to its users than other forms of digital communication currently in use. Many current users of social media are sufficiently concerned about privacy that they have a strong preference for social media technology that preserves as much privacy as possible.

Consider a person who is simply interested in receiving information. Using a smartphone equipped with an optical receiver, she will be able to receive information from any nearby optical transmitter, as long as there is an unobstructed line of sight—or indirect diffuse propagation path—between the transmitter and the receiver, and the range from the transmitter to the receiver is low enough to provide a sufficiently high signal-to-noise ratio. She will be able to receive such signals without needing to log-in to a WiFi network or use his cellular connection. In fact, She will be able to receive data even when his phone in "airplane mode". Thus, people who only want to receive data can do this while remaining anonymous. Even for someone who also wants to send data, a high degree of privacy can be achieved. The primary reason for this is that the beam transmitted by an optical transmitter can be made quite narrow, if desired. Thus, only receivers within this narrow beam width will be capable of receiving information. This is in contrast to signals sent using wireless service, WiFi, and Bluetooth®, which are omnidirectional. If an even higher level of security in transmitting data is desired, encryption can be used.

An appealing characteristic of the optical narrowcasting technology disclosed herein is that it can serve as an effective substitute for conventional signage and as a new medium for personal expression. A homeowner can install an optical narrowcasting transmitter on the side of his house. He could then transmit information regarding his business to passersby without violating local ordinances. People could be interested in installing optical transmitters on their homes for such non-business purposes as uncensored personal expression, declaring support for particular political candidates, advertising free kittens, announcing a neighborhood barbecue, transmitting a new music composition or a personal video.

A characteristic of the optical narrowcasting technology as it relates to social media, in some embodiments, is the capability it provides to automatically embed information received from an optical transmitter into videos or photographs captured by smartphones or other portable devices. This capability could add a new and powerful dimension to social media by greatly increasing the potential audience size for any given message transmitted via optical narrowcasting. The best way to understand this is to discuss some examples.

As an example of the social media-related benefits of embedding optically transmitted information in videos and photographs, we consider the use of this technology by individuals for business- or social-networking purposes. Suppose two strangers, Bob and Susan, are seated next to each other on a commercial airliner and have struck up a conversation during their flight. At the end of the flight, they agree to keep in touch. Neither of them have business cards, but they both have smartphones equipped to send and receive information optically. To connect with Susan on social media, Bob may simply activate his optical transmitter, setting it up to transmit his contact information, including one or more of his social media usernames. Susan could then take a video or photo of Bob, with her phone's optical receiver activated and with his phone's optical transmitter within the receiver's FOV. Her phone may then create an SEV or a signal-enhanced photograph (SEP) of Bob, which may incorporate Bob's contact information (e.g., name, phone numbers, social media usernames, etc.) into the image file.

All of this information, including the video or photo itself, could then be automatically uploaded to Susan's account on a social media service providing the capability of storing and sharing SEPs and SEVs. The same method could be used to simultaneously record information transmitted optically by each member of a group of people, by taking a single photo or video of the group, with each person using his or her smartphone to transmit the desired information into the optical receiver of the person taking the picture or video. An advantage of this method is that, in some embodiments, the horizontal and vertical position of each optical transmitter within the recorded imagery may also be captured, so that the each person's recorded video or photographic images could be correctly associated with the information he or she transmitted optically.

In some embodiments, the above features may be implemented in a new social media service, rather than utilize existing social media platforms (e.g., Facebook®). For example, a new social media service could be created that may be devoted to sharing SEPs and SEVs rather than conventional photos and videos.

In some embodiments, the new social media service discussed above could be given an appropriate name, such as Optigram, and could be capable of displaying and extracting embedded information from SEPs and SEVs. This may provide a new dimension to social networking having great appeal to many users. For the first time, information about people in photographs and videos could be conveniently received optically and automatically stored in image and video files. After sharing these files using the social media service, the embedded information could be conveniently accessed by users. Additionally, information received from optical transmitters mounted on nearby fixed structures (e.g., shops, restaurants, billboards, and homes) and vehicles (e.g., buses, trucks, and cars) could also be automatically incorporated into shared photos and videos. The social media service may also provide a search capability allowing users to search for shared media with embedded content relating to persons, businesses, geographical locations of interest, etc. (If desired, any user could use privacy settings to limit the ability of strangers to perform searches for information regarding himself.)

Advertising revenue could be generated by existing methods and/or by optically transmitted ads embedded in uploaded photos and videos. The latter category of ads could gain further exposure—and therefore generate further revenue—whenever users provide links to them on other social media sites or re-upload them to such sites.

FIG. 60 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 60. Various embodiments are described in terms of this example—computing module 6000. After reading this description, it will become apparent to a person skilled in the relevant art how to implement the application using other computing modules or architectures.

Referring now to FIG. 60, computing module 6000 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 6000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 6000 might include, for example, one or more processors, controllers, control modules, or other processing devices, such as a processor 6004. Processor 6004 might be implemented using a general-purpose or special-purpose processing engine such as, for example, a microprocessor, controller, or other control logic. In the illustrated example, processor 6004 is connected to a bus 6002, although any communication medium can be used to facilitate interaction with other components of computing module 6000 or to communicate externally.

Computing module 6000 might also include one or more memory modules, simply referred to herein as main memory 6008. For example, preferably random access memory (RAM) or other dynamic memory, might be used for storing information and instructions to be executed by processor 6004. Main memory 6008 might also be used for storing temporary variables or other intermediate information during execution of instructions to be executed by processor 6004. Computing module 6000 might likewise include a read only memory ("ROM") or other static storage device coupled to bus 6002 for storing static information and instructions for processor 6004.

The computing module 6000 might also include one or more various forms of information storage mechanism 6010, which might include, for example, a media drive 6012 and a storage unit interface 6020. The media drive 6012 might include a drive or other mechanism to support fixed or removable storage media 6014. For example, a hard disk drive, a solid state drive, a magnetic tape drive, an optical disk drive, a CD or DVD drive (R or RW), or other removable or fixed media drive might be provided. Accordingly, storage media 6014 might include, for example, a hard disk, a solid state drive, magnetic tape, cartridge, optical disk, a CD, DVD, or Blu-ray, or other fixed or removable medium that is read by, written to or accessed by media drive 6012. As these examples illustrate, the storage media 6014 can include a computer usable storage medium having stored therein computer software or data.

In alternative embodiments, information storage mechanism 6010 might include other similar instrumentalities for allowing computer programs or other instructions or data to be loaded into computing module 6000. Such instrumentalities might include, for example, a fixed or removable storage unit 6022 and an interface 6020. Examples of such storage units 6022 and interfaces 6020 can include a program cartridge and cartridge interface, a removable memory (for example, a flash memory or other removable memory module) and memory slot, a PCMCIA slot and card, and other fixed or removable storage units 6022 and interfaces 6020 that allow software and data to be transferred from the storage unit 6022 to computing module 6000.

Computing module 6000 might also include a communications interface 6024. Communications interface 6024 might be used to allow software and data to be transferred between computing module 6000 and external devices. Examples of communications interface 6024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 6024 might typically be carried on signals, which can be electronic, electromagnetic (which includes optical) or other signals capable of being exchanged by a given communications interface 6024. These signals might be provided to communications interface 6024 via a channel 6028. This channel 6028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 6008, storage unit 6022, and media 6014. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 6000 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise. It should be understood that the steps may be reorganized for parallel execution, or reordered, as applicable.

What is claimed is:

1. A method, comprising:
receiving, at an optical receiver assembly communicatively coupled to a mobile device, a first modulated optical beam transmitted by a source;
extracting information from the modulated optical beam;
displaying the extracted information on a graphical user interface of an application presented on the mobile device;
receiving data corresponding to user input at the graphical user interface selecting the displayed information;
in response to receiving the data corresponding to user input at the graphical user interface selecting the extracted descriptive data, generating digital data to be transmitted by an optical transmitter assembly communicatively coupled to the mobile device to the source, wherein each of the optical receiver assembly and the optical transmitter assembly is a component of the mobile device or a component of a case physically coupled to the mobile device;
transferring the digital data to the optical transmitter assembly;
displaying, on the graphical user interface, an augmented reality object corresponding to a transmitting emitting region covered by the optical transmitter assembly, wherein the augmented reality object provides a visual representation of a field of view in which the optical transmitter assembly transmits modulated optical beams;
displaying, on the graphical user interface, a visual representation of the source; and
transmitting a second modulated optical beam from the optical transmitter assembly to the source, wherein the second modulated optical beam is modulated with the digital data.

2. The method of claim 1, further comprising: prior to transmitting the second modulated optical beam, determining at the mobile device if an optical receiver assembly of the source is within a signal path of an optical transmitter of the optical transmitter assembly.

3. The method of claim 2, further comprising:
displaying a prompt to position the mobile device such that the visual representation of the source is within the augmented reality object corresponding to the transmitting emitting region covered by the optical transmitter.

4. The method of claim 3, further comprising: tilting the optical transmitter assembly such that the source's optical receiver assembly is within a signal path of the optical transmitter.

5. The method of claim 1, wherein the first modulated optical beam is an optical beacon, wherein the information extracted from the first modulated optical beam indicates that the source is an optical narrowcasting hotspot, and wherein the generated digital data is a request from the mobile device to access the hotspot.

6. The method of claim 1, wherein the first modulated optical beam is an optical signal.

7. The method of claim 6, wherein the information extracted from the first modulated optical beam includes information associated with a product offered for sale by the source, and wherein the generated digital data is a request to conduct a transaction to purchase the product.

8. A system, comprising:
an optical receiver assembly communicatively coupled to a smartphone, the optical receiver assembly adapted to receive a modulated optical beam transmitted by a source and extract information from the modulated optical beam;
an optical transmitter assembly communicatively coupled to the smartphone, the optical transmitter assembly adapted to transmit optical beams modulated with digital data, wherein each of the optical receiver assembly and the optical transmitter assembly is a component of the smartphone or a component of a smartphone case physically coupled to the smartphone;
a non-transitory computer-readable medium having instructions stored thereon that, when executed by a processor, causes the smartphone to:
display the extracted information on a graphical user interface;
receive data corresponding to user input at the graphical user interface selecting the displayed information;
in response to receiving the data corresponding to user input at the graphical user interface selecting the extracted descriptive data, generating digital data to be transmitted by the optical transmitter assembly to an optical receiver assembly of the source;
transfer the digital data to the optical transmitter assembly;
display, on the graphical user interface, an augmented reality object corresponding to a transmitting emitting region covered by the optical transmitter assembly, wherein the augmented reality object provides a visual representation of a field of view in which the optical transmitter assembly transmits modulated optical beams; and
display, on the graphical user interface, a visual representation of the source.

9. The system of claim 8, wherein the modulated optical beam is an optical beacon, wherein the information extracted from the modulated optical beam indicates that the source is an optical narrowcasting hotspot, and wherein the generated digital data is a request from the smartphone to access the hotspot.

10. The system of claim 8, wherein the modulated optical beam is an optical signal.

11. The system of claim 8, wherein the optical receiver assembly communicatively coupled to the smartphone is integrated into a smartphone case attached and communicatively coupled to the smartphone, wherein the optical receiver assembly communicatively coupled to the smartphone comprises a lenslet array visible on a surface of the smartphone case.

12. The method of claim 1, further comprising: displaying on a graphical user interface of the mobile device controls for configuring permitted optical communications between the mobile device and the source over an ad-hoc optical network, the permitted communications over the ad-hoc optical network comprising one or more of voice or video calling, text messaging, file transfer, or using an application.

13. The method of claim 1, wherein the first modulated optical beam is received over a distance of at least 400 m at a bit rate of at least 1 MHz.

14. The method of claim 5, wherein the request from the mobile device to access the hotspot comprises a unique optical narrowcasting identification associated with the mobile device.

15. The method of claim 1, wherein the optical receiver assembly comprises a lenslet array and an optical detector array, the method further comprising:

receiving the modulated optical beam at a plurality of lenslets of the lenslet array;

each of the plurality of lenslets concentrating collected flux onto at least one optical detector of the optical detector array;

amplifying signals received from the optical detector array to create an amplified signal; and converting an optical format of the amplified signal to a digital signal.

16. The method of claim 1, further comprising:

converting the digital data to an optical format for optical transmission;

transmitting the converted data as light from a light-emitting element of the optical transmitter assembly to a collimator of the optical transmitter assembly;

receiving the light from the light-emitting element through an entrance pupil of the collimator; and emitting the light from an exit pupil of the collimator.

17. The method of claim 16, further comprising: homogenizing the light emitted from the exit pupil of the collimator using two or more lenslet arrays positioned in front of the exit pupil of the collimator.

18. The system of claim 8, wherein the instructions, when executed by the processor, further cause the smartphone to display on a graphical user interface controls for configuring permitted optical communications between the smartphone and the source over an ad-hoc optical network, the permitted communications over the ad-hoc optical network comprising one or more of voice or video calling, text messaging, file transfer, or using an application.

19. The system of claim 8, wherein the first modulated optical beam is received over a distance of at least 400 m at a bit rate of at least 1 MHz.

20. The system of claim 8, wherein the optical receiver assembly communicatively coupled to the smartphone is integrated into the smartphone, wherein the optical receiver assembly communicatively coupled to the smartphone comprises a lenslet array visible on a surface of the smartphone, the lenslet array comprising a plurality of lenslets configured to receive the modulated optical beam.

21. The system of claim 20, wherein the optical receiver assembly communicatively coupled to the smartphone further comprises:

an optical detector array including a plurality of optical detectors, each of the lenslets positioned to concentrate collected flux onto at least one optical detector of the plurality of optical detectors; and a signal amplifier coupled to the optical detector array and configured to amplify signals received from the optical detector array to create an amplified signal.

22. The system of claim 8, wherein the optical transmitter assembly communicatively coupled to the smartphone comprises:

a light emitting element configured to transmit light comprising the digital data converted to an optical format;

a collimator symmetric about an optical axis substantially centered on the light-emitting element, the collimator comprising a body between a circular entrance pupil and a circular exit pupil, wherein the collimator is positioned to receive light from the light source through the first entrance pupil and emit the light from the exit pupil; and two or more lenslet arrays positioned in front of the exit pupil of the collimator, wherein the lenslet arrays together act as a homogenizer to improve uniformity of light output from the exit pupil of the collimator.

* * * * *